(12) United States Patent
Choi et al.

(10) Patent No.: US 12,323,987 B2
(45) Date of Patent: *Jun. 3, 2025

(54) METHOD, APPARATUS, AND SYSTEM FOR TRANSMITTING UPLINK CONTROL INFORMATION IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Gyeonggi-do (KR); Geunyoung Seok, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/510,649

(22) Filed: Nov. 16, 2023

(65) Prior Publication Data

US 2024/0129921 A1   Apr. 18, 2024

Related U.S. Application Data

(63) Continuation of application No. 18/131,870, filed on Apr. 7, 2023, now Pat. No. 11,838,914, which is a
(Continued)

(30) Foreign Application Priority Data

Oct. 7, 2020   (KR) .................. 10-2020-0129147
Oct. 20, 2020  (KR) .................. 10-2020-0135724
(Continued)

(51) Int. Cl.
  *H04L 5/00*   (2006.01)
  *H04L 1/00*   (2006.01)
  (Continued)

(52) U.S. Cl.
  CPC .......... *H04W 72/21* (2023.01); *H04L 1/0004* (2013.01); *H04L 1/1812* (2013.01); *H04W 72/1273* (2013.01); *H04W 72/23* (2023.01)

(58) Field of Classification Search
  CPC ... H04L 5/0053; H04L 5/0055; H04L 5/0057; H04W 72/02; H04W 72/04;
  (Continued)

(56) References Cited

U.S. PATENT DOCUMENTS

2020/0106566 A1   4/2020   Yeo et al.
2020/0213981 A1   7/2020   Park et al.
(Continued)

FOREIGN PATENT DOCUMENTS

CN   109997327   7/2019
CN   111278143   6/2020
(Continued)

OTHER PUBLICATIONS

International Search Report for PCT/KR2021/013649 mailed on Feb. 4, 2022 and its English translation from WIPO (now published as WO 2022/075717).
(Continued)

*Primary Examiner* — Bo Hui A Zhu
(74) *Attorney, Agent, or Firm* — WOMBLE BOND DICKINSON (US) LLP

(57) ABSTRACT

The present specification relates to a method, an apparatus, and a system for transmitting uplink control information in a wireless communication system. The present specification provides a terminal comprising: a processor configured to determine a UCI to be dropped from among a first UCI
(Continued)

having a first priority and a second UCI having a second priority or to multiplex the first UCI and the second UCI, under the condition in which a first PUCCH, to which the first UCI is mapped, and a second PUCCH, to which the second UCI is mapped, overlap in at least one symbol with respect to time; and a communication module configured to transmit an undropped UCI from among the first UCI and the second UCI to a base station or transmit a third PUCCH, in which the first UCI and the second UCI are multiplexed to be mapped thereto, to the base station according to the control of the processor. Communication reliability can be increased by multiplexing and transmitting UCIs having different priorities or later retransmitting a dropped UCI.

20 Claims, 45 Drawing Sheets

Related U.S. Application Data continuation of application No. PCT/KR2021/013649, filed on Oct. 6, 2021.

(30) Foreign Application Priority Data

| | | |
|---|---|---|
| Oct. 23, 2020 | (KR) | 10-2020-0138045 |
| Jan. 5, 2021 | (KR) | 10-2021-0001134 |
| Jan. 18, 2021 | (KR) | 10-2021-0006469 |
| May 10, 2021 | (KR) | 10-2021-0060354 |
| May 20, 2021 | (KR) | 10-2021-0065131 |

(51) Int. Cl.
*H04L 1/1812* (2023.01)
*H04W 72/1273* (2023.01)
*H04W 72/21* (2023.01)
*H04W 72/23* (2023.01)

(58) Field of Classification Search
CPC ........... H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | |
|---|---|---|
| 2020/0221449 A1 | 7/2020 | Bang et al. |
| 2022/0022173 A1 | 1/2022 | Oh et al. |
| 2022/0045801 A1 | 2/2022 | Wang |
| 2022/0279537 A1 | 9/2022 | Freda et al. |
| 2022/0294573 A1 | 9/2022 | Lei et al. |
| 2022/0330307 A1 | 10/2022 | Korhonen et al. |
| 2023/0284227 A1 | 9/2023 | Choi et al. |

FOREIGN PATENT DOCUMENTS

| | | |
|---|---|---|
| JP | 7430441 | 2/2024 |
| KR | 10-2020-0099582 | 8/2020 |
| WO | 2022/075717 | 4/2022 |

OTHER PUBLICATIONS

Written Opinion of the International Searching Authority for PCT/KR2021/013649 mailed on Feb. 4, 2022 and its English translation by Google Translate (now published as WO 2022/075717).

Moderator (Qualcomm): "Summary #2 of [102-e-NR-Llenh-URLLC-Scheduling and HARQ-01]", 3GPP TSG RAN WG1 #102e, R1-2007429, Sep. 1, 2020, pp. 1-16.
MediaTek Inc.: "On the retransmission of a cancelled UL TB", 3GPP TSG RAN WG1 Meeting #102-e, R1-2005632, Aug. 8, 2020, pp. 1-3.
Huawei et al.: "Correction on operation of HARQ", 3GPP TSG RAN WG1 Meeting #102-e, R1-2006389, Aug. 8, 2020, pp. 1-11.
CATT: "Clarification for processing order of UL multiplexing and cancellation", 3GPP TSG RAN WG1 #100bis, R1-2002060, Apr. 11, 2020, pp. 1-6.
Notice of Allowance dated Jul. 26, 2023 for U.S. Appl. No. 18/131,870 (now published as US 2023/0284227).
Notice of Allowance dated Dec. 25, 2023 for Japanese Patent Application No. 2023-521647 and its English translation provided by the Applicant's foreign counsel.
Moderator (Nokia): "Feature lead summary #1 o on Rel-17 HARQ-ACK feedback enhancements for NR Rel-17 URLLC/IIoT (AI 8.3.1.1)", 3GPP TSG-RAN WG1 Meeting #102-e, R1-2007059, e-Meeting, Aug. 19, 2020, pp. 1-28.
Nokia, Nokia Shanghai Bell: "HARQ-ACK Feedback Enhancements for URLLC/IIoT", 3GPP TSG RAN WG1 #106-bis-e, R1-2109159, e-Meeting, Oct. 1, 2021, pp. 1-27.
Notice of Allowance dated Jan. 25, 2024 for Korean Patent Application No. 10-2023-7011922 and its English translation provided by the Applicant's foreign counsel.
Qualcomm: "Summary of the Remaining Issues on HARQ and Scheduling Enhancements for URLLC", 3GPP TSG RAN WG1 #100 eMeeting, R1-2000971, Feb. 24-Mar. 6, 2020, pp. 1-5.
Samsung: "HARQ-ACK feedback enhancements for Rel-17 URLLC/IIoT", 3GPP TSG RAN WG1 #102-e, R1-2006139, e-Meeting, Aug. 17-28, 2020, pp. 1-4.
Asia Pacific Telecom: "Discussion on HARQ-ACK enhancements", 3GPP TSG-RAN WG1 Meeting #102-e, R1-2006639, Aug. 17-28, 2020, pp. 1-2.
Extended European Search Report dated Mar. 12, 2024 for European Patent Application No. 21877968.4.
CMCC: "Enhancements on HARQ for NTN", 3GPP Draft; R1-2006212, 3rd Generation Partnership Project (3GPP), Mobile Competence Centre; 650, Route Des Lucioles; F-06921 Sophia-Antipolis Cedex ; France vol. RAN WGI, No. e-Meeting; Aug. 17, 2020-Aug. 28, 2020 Aug. 7, 2020 (Aug. 7, 2020), XP052347586, Retrieved from the Internet: URL:https://ftp.3gpp.org/tsg_ran/WG1_RL1/TSGR1_102-e/Docs/R1-2006212.zipR1-2006212.docx[retrieved on Aug. 7, 2020] pp. 1, 4.
Lenovo et al: "Remaining issues on CBG-based (re)transmission", 3GPP Draft; R1-1719745—Final, 3rd Generation Partnership Project (3GPP), Mobile Competence Centre; 650, Route Des Lucioles; F-06921 Sophia-Antipolis Cedex ; France vol. RAN WGI, No. Reno, USA; Nov. 27, 2017-Dec. 1, 2017 Nov. 19, 2017 (Nov. 19, 2017), XP051370414, Retrieved from the Internet: URL:http://www.3gpp.org/ftp/tsg%5Fran/WG1%5FRL1/TSGR1%5F91/Docs/ [retrieved on Nov. 19, 2017] p. 2.
HUAWEI: "Feature lead summary#1 of HARQ enhancements for NR-U", 3GPP Draft; R1-1911339 FL Summary#I for 72223 NRU HARQ RAN1_98B, 3rd Generation Partnership Project (3GPP), Mobile Competence Centre; 650, Route Des Lucioles; F-06921 Sophia-Antipolis Cedex ; France vol. RAN WGI, No. Chongqing, China; Oct. 14, 2019-Oct. 20, 2019 Oct. 22, 2019 (Oct. 22, 2019), XP051798621, Retrieved from the Internet: URL:https://ftp.3gpp.org/tsg_ran/WG1_RL1/TSGR1_98b/Docs/R1-1911339.zip R1-1911339 FL summary#I.
Office Action dated Apr. 28, 2024 for Chinese Patent Application No. 202180078880.2 and its English translation provided by Applicant's foreign counsel.
Office Action dated Sep. 29, 2024 for U.S. Appl. No. 18/510,654.
Office Action dated Nov. 5, 2024 for Japanese Patent Application No. 2024-002008 and its English translation provided by Applicant's foreign counsel.
Office Action dated Nov. 5, 2024 for Japanese Patent Application No. 2024-002009 and its English translation provided by Applicant's foreign counsel.

(56) References Cited

OTHER PUBLICATIONS

Office Action (2$^{nd}$) dated Nov. 28, 2024 for Chinese Patent Application No. 202180078880.2 and its English translation provided by Applicant's foreign counsel.
Office Action dated Dec. 24, 2024 for Indian Patent Application No. 202327031555.
Office Action (1st) dated Jan. 3, 2025 for European Patent Application No. 21 877 968.4.
Notice of Allowance dated Feb. 28, 2025 for U.S. Appl. No. 18/510,654.

FIG. 26
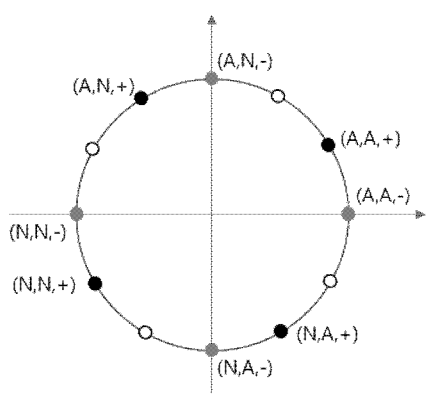
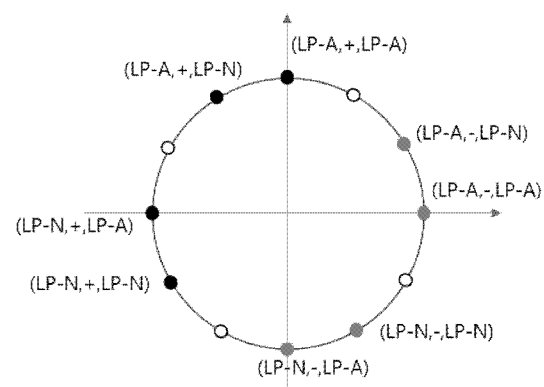
(a) minimum distance for HP-SR = 1 CS
(b) minimum distance for LP-HARQ = 1 CS FIG. 27
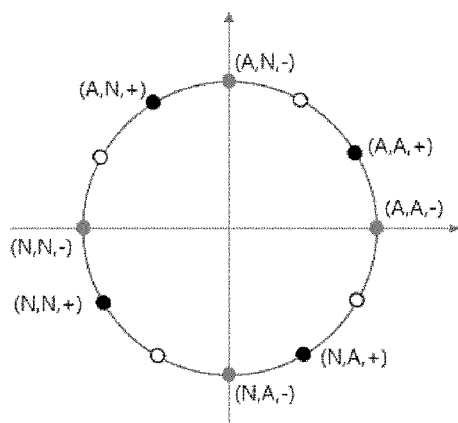
(a) minimum distance for HP-SR
= 1 CS
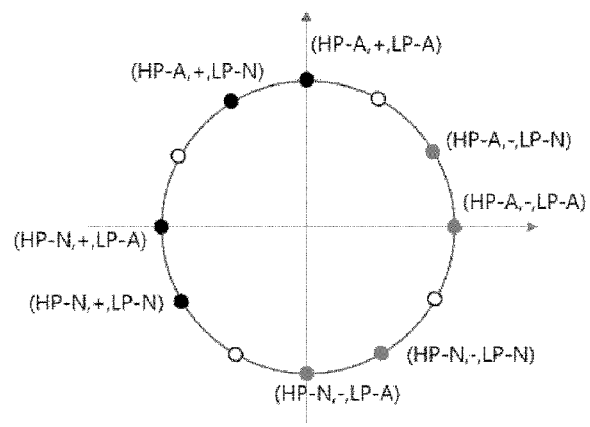
(b) minimum distance for LP-HARQ
= 1 CS FIG. 37
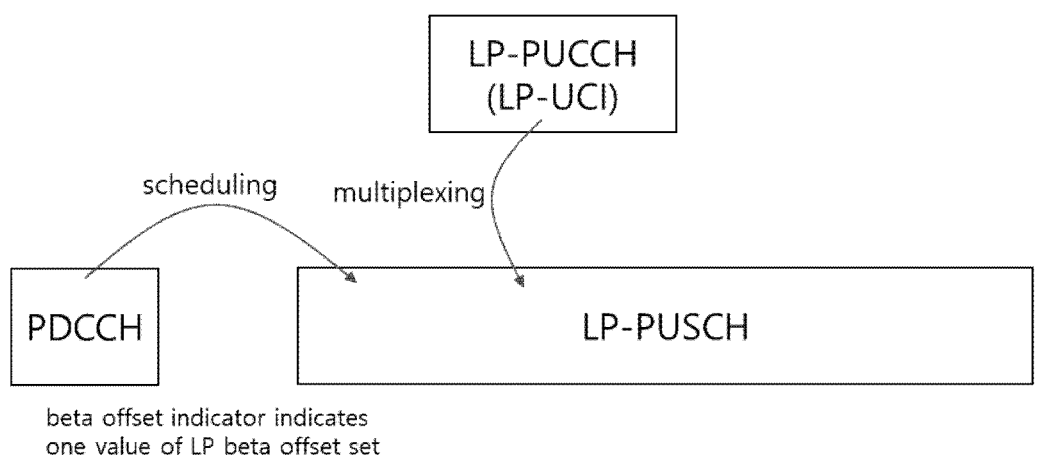
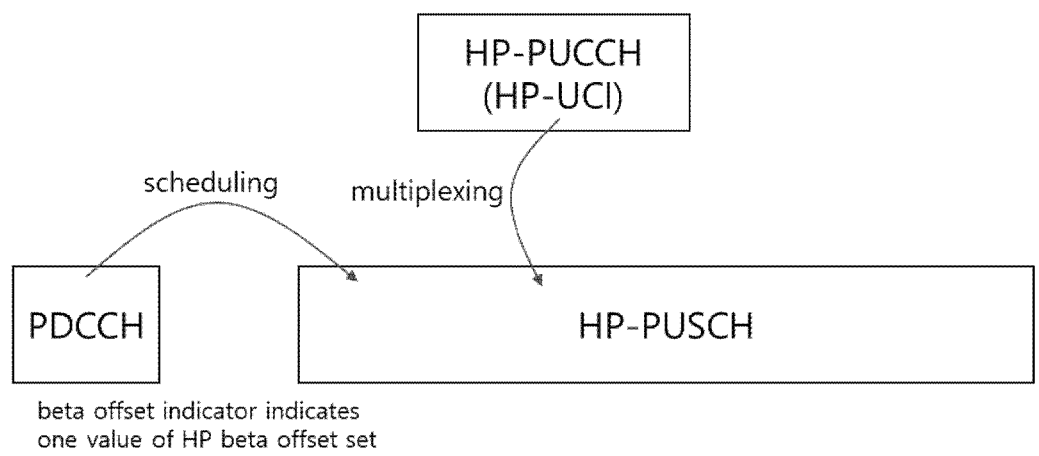

FIG. 38
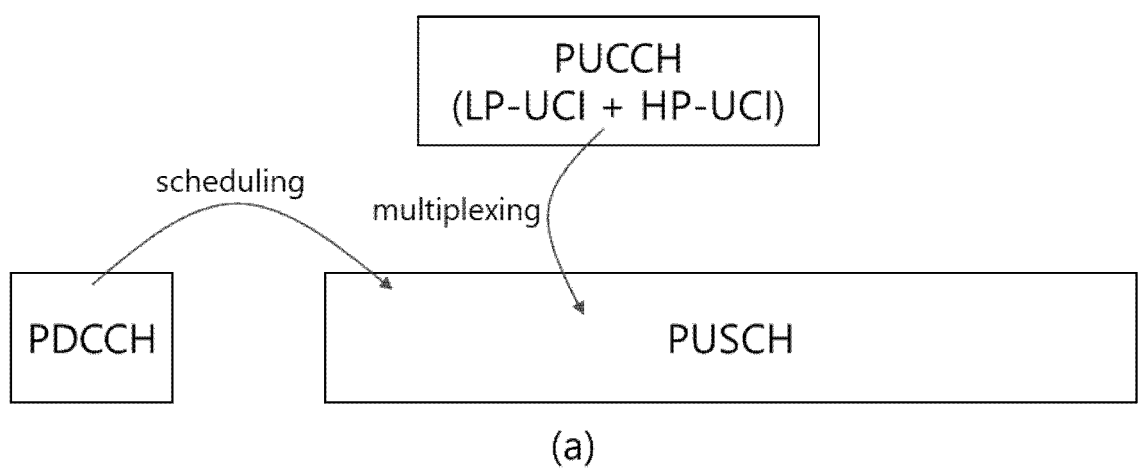
(a)
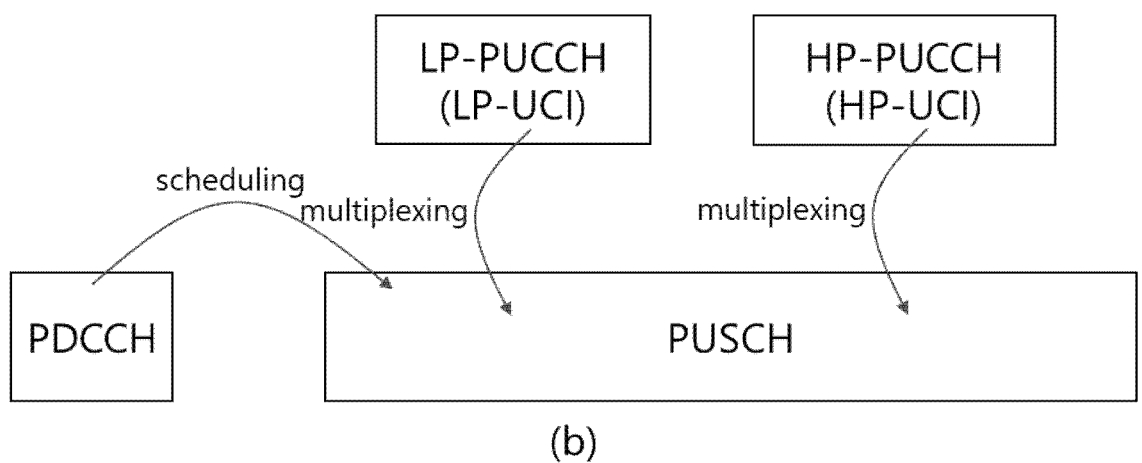
(b)

FIG. 42
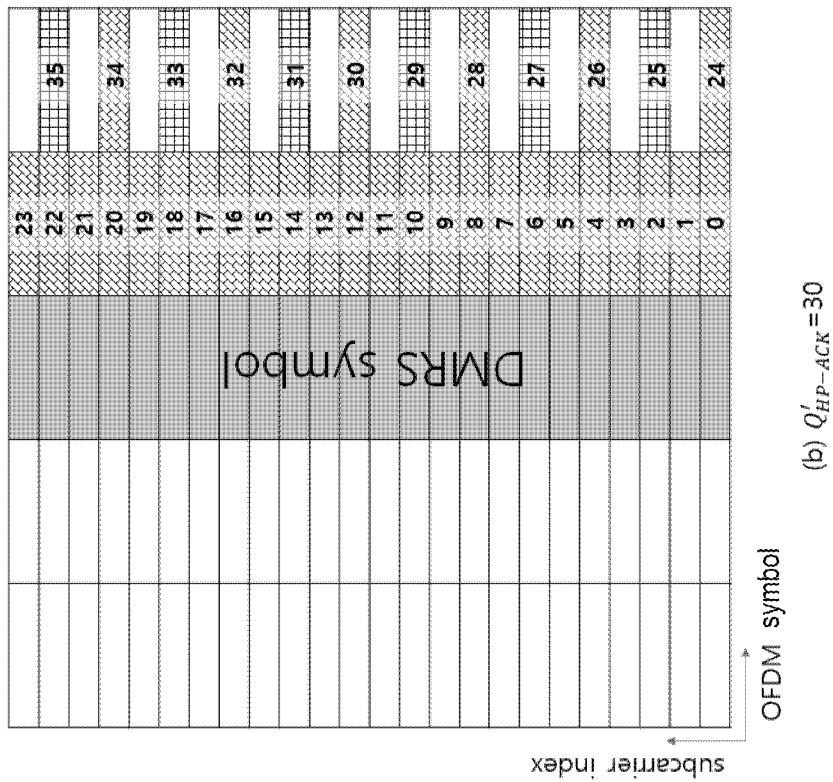
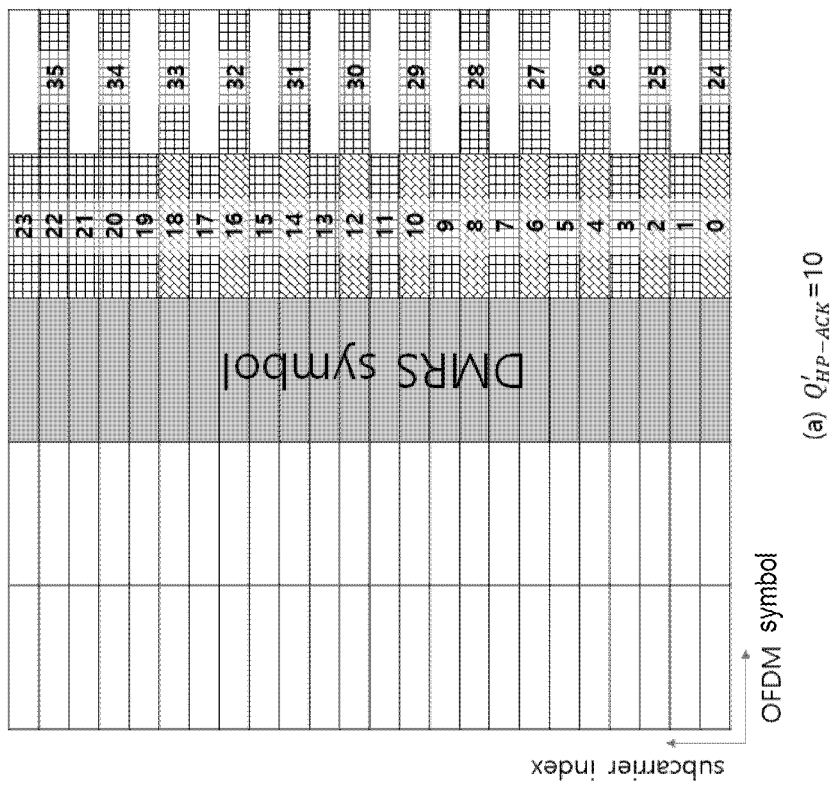

METHOD, APPARATUS, AND SYSTEM FOR TRANSMITTING UPLINK CONTROL INFORMATION IN WIRELESS COMMUNICATION SYSTEM

CROSS-REFERENCE TO RELATED APPLICATIONS

This application is a continuation of U.S. patent application Ser. No. 18/131,870 filed on Apr. 7, 2023, which is a continuation of International Patent Application No. PCT/KR2021/013649 filed on Oct. 6, 2021, which claims the priority to Korean Patent Application No. 10-2020-0129147 filed in the Korean Intellectual Property Office on Oct. 7, 2020, Korean Patent Application No. 10-2020-0135724 filed in the Korean Intellectual Property Office on Oct. 20, 2020, Korean Patent Application No. 10-2020-0138045 filed in the Korean Intellectual Property Office on Oct. 23, 2020, Korean Patent Application No. 10-2021-0001134 filed in the Korean Intellectual Property Office on Jan. 5, 2021, Korean Patent Application No. 10-2021-0006469 filed in the Korean Intellectual Property Office on Jan. 18, 2021, Korean Patent Application No. 10-2021-0060354 filed in the Korean Intellectual Property Office on May 10, 2021, and Korean Patent Application No. 10-2021-0065131 filed in the Korean Intellectual Property Office on May 20, 2021, the entire contents of which are incorporated herein by reference.

TECHNICAL FIELD

The present invention relates to a wireless communication system, and more particularly, to a method, apparatus, and system for transmitting uplink control information in the wireless communication system.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, a mobile communication system is gradually expanding its scope to data services as well as voice, and have now developed to the extent that it can provide high-speed data services. However, in the mobile communication system currently providing services, a more advanced mobile communication system is required due to lack of resources and users' demand for high-speed service.

DISCLOSURE OF THE INVENTION

Technical Problem

A technical problem of the present invention is to provide a method for transmitting uplink control information in a wireless communication system, particularly a cellular wireless communication system, and an apparatus for the same.

Technical Solution

According to one aspect of the present invention, a UE transmitting uplink control information (UCI) is provided. The UE includes a processor configured to determine the UCI to be dropped from among a first UCI having a first priority and a second UCI having a second priority or to multiplex the first UCI and the second UCI, under the condition that a first PUCCH, to which the first UCI is mapped, and a second PUCCH, to which the second UCI is mapped, overlap in at least one symbol in time, and a communication module configured to transmit an undropped UCI from among the first UCI and the second UCI to a base station or transmit a third PUCCH, to which the first UCI and the second UCI are mapped by being multiplexed on the third PUCCH, to the base station according to the control of the processor. Here, the communication module is configured to receive downlink control information (DCI) for retransmission of the dropped UCI from the base station through a physical downlink control channel (PDCCH), and the DCI may include at least one of slot index information and information about the dropped UCI.

In one aspect, the slot index information may indicate one of the number of slots between a slot in which the PDCCH is received and a slot of a dropped PUCCH corresponding to the dropped UCI, the number of slots between the slot in which the PDCCH is received and a slot in which a PDCCH scheduling the dropped PUCCH is received, and an index of a slot of a PUCCH to be used for retransmission of the dropped UCI.

In another aspect, information about the dropped PUCCH may include one of a time order of the dropped PUCCH among time orders of a plurality of PUCCHs for the UE, a physical resource block (PRB) order of the dropped PUCCH among PRBs allocated to the plurality of PUCCHs for the UE, and an index assigned to the dropped PUCCH according to a PUCCH configuration for the UE.

In another aspect, the first priority is higher than the second priority, and a bit size of an entire UCI obtained by multiplexing the first UCI and the second UCI may be equal to a sum of a bit size of the first UCI and a bit size of the second UCI.

In another aspect, the bit size of the second UCI may be determined by excluding at least a part of channel state information (CSI) and scheduling request (SR) from the second UCI.

In another aspect, the bit size of the second UCI may be determined by excluding a UCI of a different type from the first UCI from the second UCI.

In another aspect, the communication module may separately encode and multiplex the first UCI and the second UCI, or jointly encode and multiplex the first UCI and the second UCI.

In another aspect, a resource for the third PUCCH may be included in a PUCCH resource set determined based on the bit size of the entire UCI among a plurality of PUCCH resource sets configured to the UE.

In another aspect, a resource for the third PUCCH may be included in a PUCCH resource set for transmission of the first UCI.

In another aspect, the PUCCH resource set may be selected based on at least one of a last symbol of the first PUCCH, a symbol at a boundary of a slot or sub-slot, a last symbol of a PDCCH scheduling the first PUCCH, a last symbol of a PDCCH scheduling the second PUCCH.

In another aspect, the PUCCH resource set may not include at least one of a PUCCH resource located after a certain number of symbols from the last symbol of the first PUCCH and a PUCCH resource mapped to a slot or sub-slot later than a slot or sub-slot to which the first PUCCH belongs.

In another aspect, the resource for the third PUCCH may be any one of a PUCCH resource having the earliest start symbol, a PUCCH resource having the earliest end symbol, and a PUCCH resource having the longest length among the PUCCH resources included in the PUCCH resource set.

In another aspect, the communication module may determine, as a first number of resources for transmission of the first UCI, the number of resources when the bit size of the first UCI is equal to or smaller than the maximum bit size calculated based on the maximum code rate and the number of resources for transmission of the first UCI among a plurality of numbers of resources of the third PUCCH.

In another aspect, the communication module may determine, as a second number of resources for transmission of the second UCI, the number of resources when the bit size of the second UCI is equal to or smaller than the maximum bit size calculated based on the maximum code rate and the number of PRBs for transmission of the second UCI among a plurality of numbers of resources of the third PUCCH.

In another aspect, if there is no number of resources when it is equal to or smaller than the maximum bit size, the communication module may determine the bit size of the second UCI by excluding at least a part of a first CSI part and a second CSI part.

In another aspect, the resource may be at least one of a PRB, a subcarrier, or a resource element (RE).

In another aspect, when the resource is the PRB, if the third PUCCH is PUCCH format 3, the number of PRBs may be one of $\{1,2,3,4,5,6,8,9,10,12,15,16\}$.

In another aspect, the communication module may determine, as a first number of subcarriers for the first UCI, the number of subcarriers when the bit size of the first UCI is equal to or smaller than the maximum number of bits calculated based on the maximum code rate and the number of subcarriers for transmission of the first UCI among a plurality of numbers of subcarriers of a third PUCCH as the first number of subcarriers for the first UCI.

In another aspect, the third PUCCH may include resources corresponding to the sum of the number of first resources and the number of second resources, and the communication module may allocate resources of the first number of resources and resources of the second number of resources from the lowest resource of the third PUCCH for transmission of the first UCI and the second UCI, respectively.

In another aspect, the third PUCCH may include PRBs corresponding to P_total, which is the sum of the first number of PRBs and the second number of PRBs, and the communication module may determine, as a first number of symbols for transmission of the first UCI, the number of symbols when the bit size of the first UCI is equal to or smaller than the maximum number of bits calculated based on the maximum code rate and P_total for transmission of the first UCI.

In another aspect, the communication module may determine, as a second number of symbols for transmission of the second UCI, the number of symbols when the bit size of the second UCI is equal to or smaller than the maximum number of bits calculated based on the maximum code rate and P_total for transmission of the second UCI as the number of second symbols for transmission of the second UCI.

In another aspect, the third PUCCH may include a first symbol set and a second symbol set in time, and the first symbol set may include symbols corresponding to the first number of the symbols at earlier positions in time in the third PUCCH or symbols corresponding to the first number of symbols at positions most adjacent to a demodulation reference signal (DMRS) symbol of the third PUCCH.

In another aspect, the second symbol set may include symbols not included in the first symbol set.

In another aspect, the third PUCCH may be a PUCCH format 2 structure, and the communication module may respectively localize and place the first UCI and the second UCI on the frequency axis of the third PUCCH.

In another aspect, the third PUCCH may be the PUCCH format 2 structure, and the communication module may respectively distribute and place the first UCI and the second UCI on the frequency axis of the third PUCCH.

In another aspect, the third PUCCH may be the PUCCH format 2 structure, and the communication module may generate a combined UCI bit sequence obtained by interleaving a bit sequence of the first UCI and a bit sequence of the second UCI, and may place the interleaved UCI bit sequence in the third PUCCH.

In another aspect, the interleaver may be a block interleaver, and the size of rows and columns of the block interleaver may be determined based on at least one of the bit size of the first UCI, the bit size of the second UCI, the number of REs excluding DMRS in one PRB, and the number of PRBs in the third PUCCH.

In another aspect, when the first PUCCH may be PUCCH format 0, the second PUCCH may be PUCCH format 0 or PUCCH format 1, and the first priority may be higher than the second priority, a third PUCCH, to which the first UCI and the second UCI are mapped by being multiplexed on the third PUCCH, may be the first PUCCH.

In another aspect, when the first PUCCH is PUCCH format 0 and the second PUCCH is PUCCH format 0 or PUCCH format 1 and the first priority is higher than the second priority, the communication module multiplexes the first UCI and the second UCI, maps the multiplexed UCI to any one of a resource for the first UCI and a resource for the 2nd UCI and transmits the multiplexed UCI mapped to the resource, and the mapped resource may be determined based on a combination of indications of the second UCI.

In another aspect, the first UCI may be a scheduling request (SR) and the second UCI may be HARQ-ACK.

In another aspect, each of the first UCI and the second UCI may be HARQ-ACK.

In another aspect, if the mapped resource is a resource for the second UCI, the communication module may use power obtained by adding a predetermined value to power for transmission of the second UCI.

In another aspect, the communication module may use any one of the first maximum code rate configured for the first UCI and the second maximum code rate configured for the second UCI, or a combination thereof as the maximum code rate for the multiplexed UCI.

In another aspect, the communication module may set the first maximum code rate for the first UCI and the second maximum code rate for the second UCI on the PUCCH format of the third PUCCH.

In another aspect, the communication module may set a first maximum code rate for the first UCI on the first PUCCH format of the first PUCCH, may set a second maximum code rate for the second UCI on a second PUCCH format of the second PUCCH, may set the first PUCCH format on a first PUCCH set for transmitting the first UCI, and may set the second PUCCH format on a second PUCCH set for transmitting the second UCI.

In another aspect, under the condition that a fourth PUCCH to which the fourth UCI is mapped overlaps the physical uplink shared channel (PUSCH) in at least one symbol in time, the processor may be configured to multiplex the fourth UCI on the PUSCH, may determine a priority of the PUSCH based on a DCI for scheduling the PUSCH, and may determine a beta offset for multiplexing the fourth UCI on the PUSCH based on at least a part of a priority of the fourth UCI and the priority of the PUSCH.

In another aspect, the beta offset may be set according to a combination of a priority of UCI and a priority of PUSCH, and the beta offset may be determined according to a combination of the priority of the fourth UCI and the priority of the PUSCH.

In another aspect, the beta offset may be set according to the priority of UCI, and the beta offset may be determined according to the priority of the fourth UCI.

In another aspect, the beta offset may be set according to the priority of the PUSCH, and the beta offset may be determined according to the priority of the PUSCH.

In another aspect, under the condition that the third PUCCH overlaps a physical uplink shared channel (PUSCH) in least one symbol in time, the processor may be configured to multiplex the first UCI and the second UCI on the PUSCH, and determines the priority of the PUSCH based on a DCI for scheduling the PUSCH, the first UCI may include a first HARQ-ACK codebook of a first priority, the second UCI may include a second HARQ-ACK codebook of a second priority, the DCI for scheduling the PUSCH may include at least one UL downlink assignment index (DAI) that determines sizes of the first HARQ-ACK codebook and the second HARQ-ACK codebook, the communication module may determine the sizes of the first HARQ-ACK codebook and the second HARQ-ACK codebook based on the at least one UL DAI, and multiplex the first HARQ-ACK codebook and the second HARQ-ACK codebook and transmit the multiplexed codebook to the base station on the PUSCH.

In another aspect, the DCI for scheduling the PUSCH may include one UL DAI for determining the size of the first HARQ-ACK codebook and the size of the second HARQ-ACK codebook, the communication module may determine the size of the first HARQ-ACK codebook and the size of the second HARQ-ACK codebook based on the one UL DAI, multiplex the first HARQ-ACK codebook and the second HARQ-ACK codebook, and transmit the multiplexed codebook to the base station on the PUSCH.

In another aspect, the bit size of the one UL DAI may be determined according to types of the first HARQ-ACK codebook and the second HARQ-ACK codebook, and the HARQ-ACK codebook type may be one of semi-static and dynamic.

In another aspect, the DCI for scheduling the PUSCH may include a first UL DAI for determining the size of the first HARQ-ACK codebook, and a second UL DAI for determining the size of the second HARQ-ACK codebook, and the communication module may determine the size of the first HARQ-ACK codebook based on the first UL DAI, determine the size of the second HARQ-ACK codebook based on the second UL DAI, and multiplex the first HARQ-ACK codebook and the second HARQ-ACK codebook and transmit the multiplexed codebook to the base station on the PUSCH.

In another aspect, the bit size of the first UL DAI and the bit size of the second UL DAI may be determined according to the types of the first HARQ-ACK codebook and the second HARQ-ACK codebook, respectively, and the HARQ-ACK codebook type may be one of semi-static and dynamic.

In another aspect, the processor may be configured to multiplex a fourth UCI having a fourth priority and a fifth UCI having a fifth priority on the PUSCH, and the communication module may be configured to map the fourth UCI to resource elements at positions most adjacent to the DMRS on the PUSCH first and then map the fifth UCI to the remaining resource elements on the PUSCH when the fourth priority is higher than the fifth priority, In another aspect, the fourth UCI may be a high priority HARQ-ACK, the fifth UCI may be a low priority HARQ-ACK, and the resource elements on the PUSCH may be resource elements allocated for HARQ-ACK or resource elements allocated for a first CSI part 1.

Advantageous Effects

According to an embodiment of the present invention, communication reliability can be increased by multiplexing and transmitting UCIs having different priorities or retransmitting a dropped UCI later. The effects obtainable in the present disclosure are not limited to the above-mentioned effects, and other effects that are not mentioned may be clearly understood by those skilled in the art to which the present disclosure belongs, from descriptions below.

BRIEF DESCRIPTION OF THE DRAWINGS

FIG. 26 is a diagram illustrating a cyclic shift value according to an embodiment.

FIG. 27 is a diagram illustrating a cyclic shift value according to another embodiment.

FIG. 37 is a diagram illustrating an operation of multiplexing a UCI of the same priority on a resource on a PUSCH according to an example.

FIG. 38 is a diagram illustrating an operation of multiplexing UCIs of different priorities on resources on a PUSCH according to an example.

FIG. 42 illustrates an indexing method of REs according to another example.

MODE FOR CARRYING OUT THE INVENTION

Figure 1:
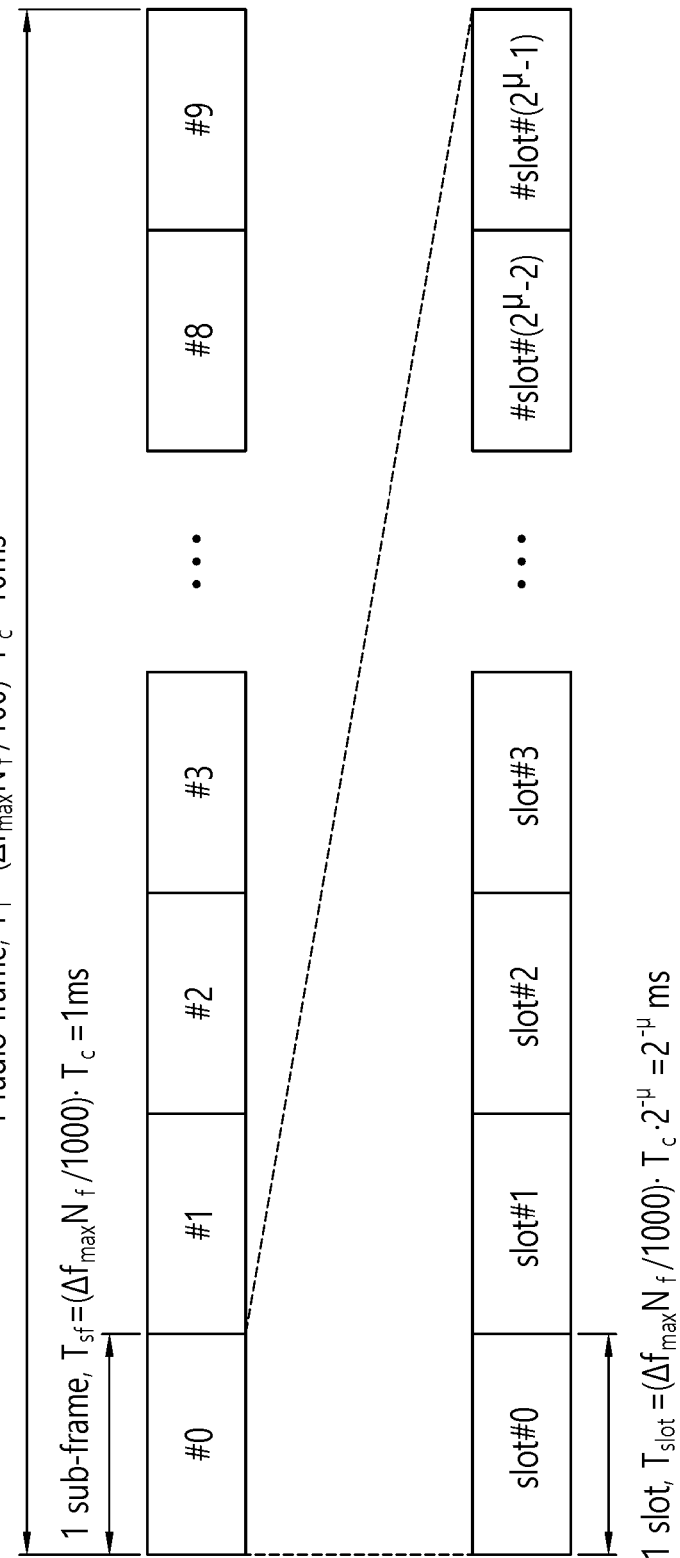
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11(Wi-Fi), IEEE 802.16(WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 2 slots. In this case, the length of each slot is $2^{-\mu}$ ms. Numbers from 0 to $2^\mu-1$ may be respectively allocated to 2 slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
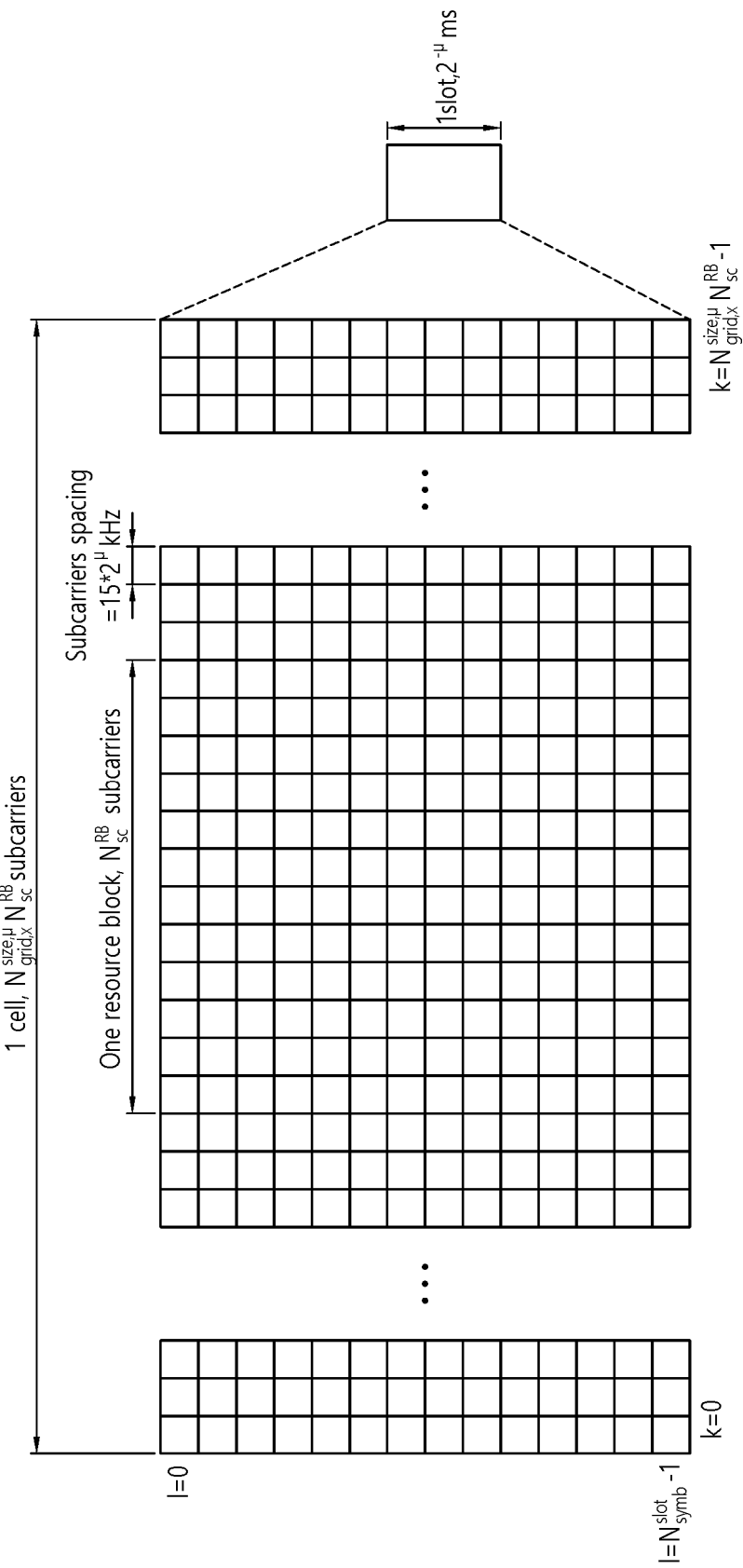
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x}*N^{RB}_{sc}-1$ in the frequency domain, and l may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | U | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | X | D | D | D | D | D | D | D | X | U |
| 47 | D | D | X | U | U | U | D | D | X | U | U | U | U | U |
| 48 | D | X | U | U | U | U | D | X | U | U | U | U | U | U |
| 49 | D | D | D | D | X | X | U | D | D | D | D | X | X | U |

TABLE 1-continued

| index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56~255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
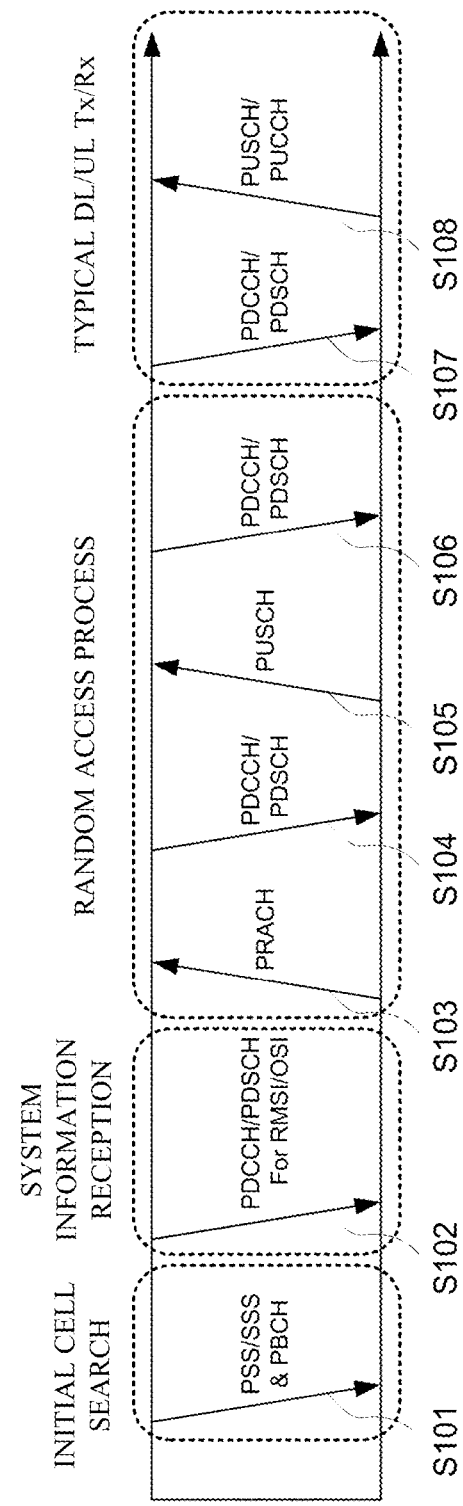
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
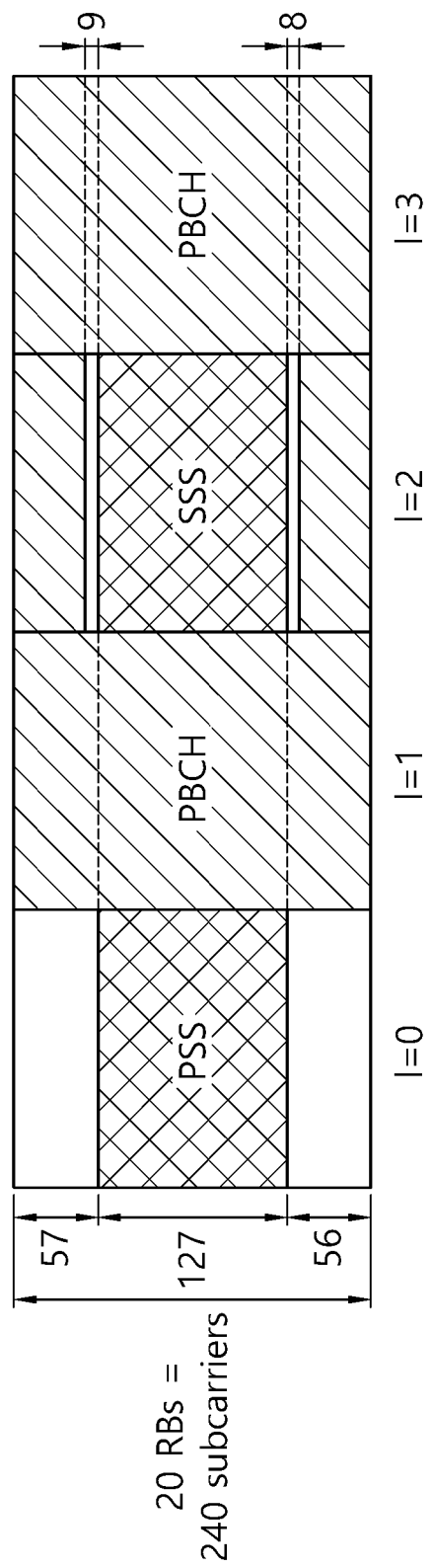
FIGS. 4a and 4b illustrates an SS/PBCH block for initial cell access in a 3GPP NR system.
Figure 4B:
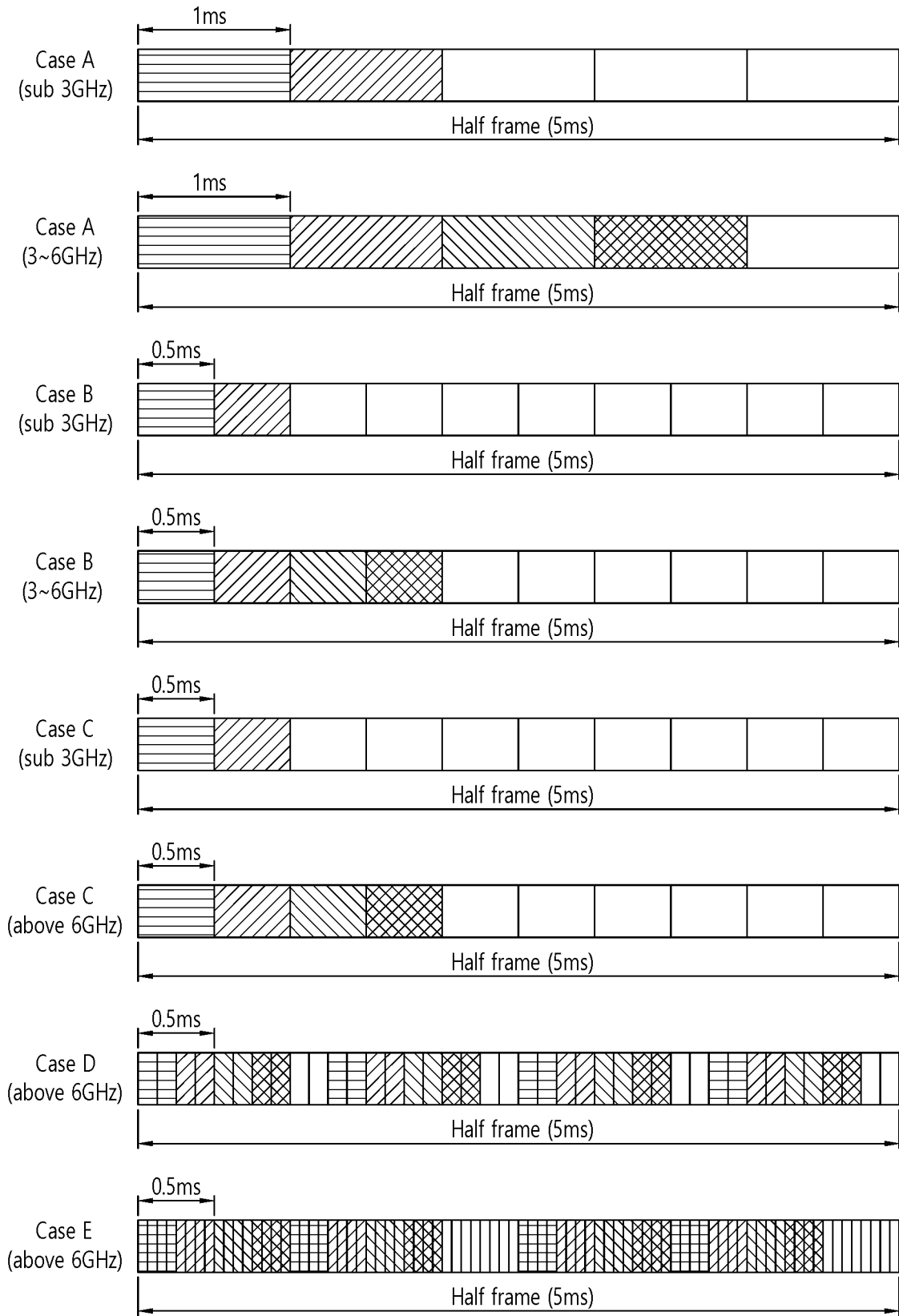

FIGS. 4a and 4b illustrate an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4a and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |

TABLE 2-continued

| Channel or signal | OFDM symbol number l relative to the start of an SS/PBCH block | Subcarrier number k relative to the start of an SS/PBCH block |
|---|---|---|
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N^{(2)}_{ID}) \bmod 127$$

$0 \le n < 127$

Here, $x(i+7)=(x(i+4)+x(i)) \bmod 2$ and is given as $$[x(6)x(5)x(4)x(3)x(2)x(1)x(0)]=[1\ 1\ 1\ 0\ 1\ 1\ 0].$$

Further, the sequence $d_{SSS}(n)$ of the SSS is as follows.

$$d_{SSS}(n)=[1-2x_0((n+m_0) \bmod 127)][1-2x_i((n+m_1) \bmod 127]$$

$$m_0=15\ \text{floor}(N^{(1)}_{ID}/112)+5N^{(2)}_{ID}$$

$$m1=N^{(1)}_{ID} \bmod 112$$

$0 \le n < 127$

Here, $x_0(i+7)=(x_0(i+4)+x_0(i)) \bmod 2$
$x_1(i+7)=(x_1(i+1)+x_1(i)) \bmod 2$ and is given as $$[x_0(6)x_0(5)x_0(4)x_0(3)x_0(2)x_0(1)x_0(0)]=[0\ 0\ 0\ 0\ 0\ 0\ 1]$$

$$[x_1(6)x_1(5)x_1(4)x_1(3)x_1(2)x_1(1)x_1(0)]=[0\ 0\ 0\ 0\ 0\ 0\ 1].$$

A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
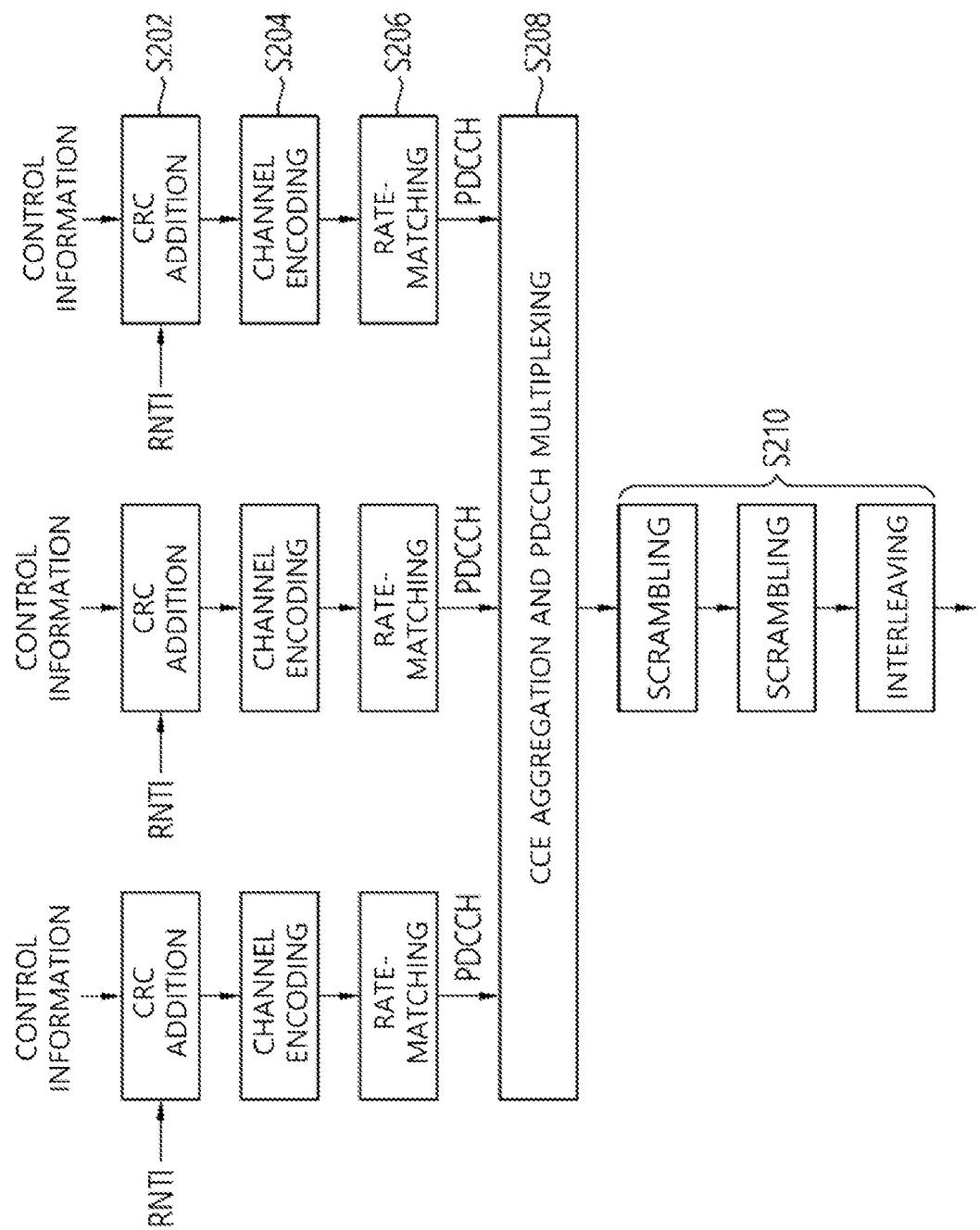
FIGS. 5a and 5b illustrates a procedure for transmitting control information and a control channel in a 3GPP NR system.
Figure 5B:
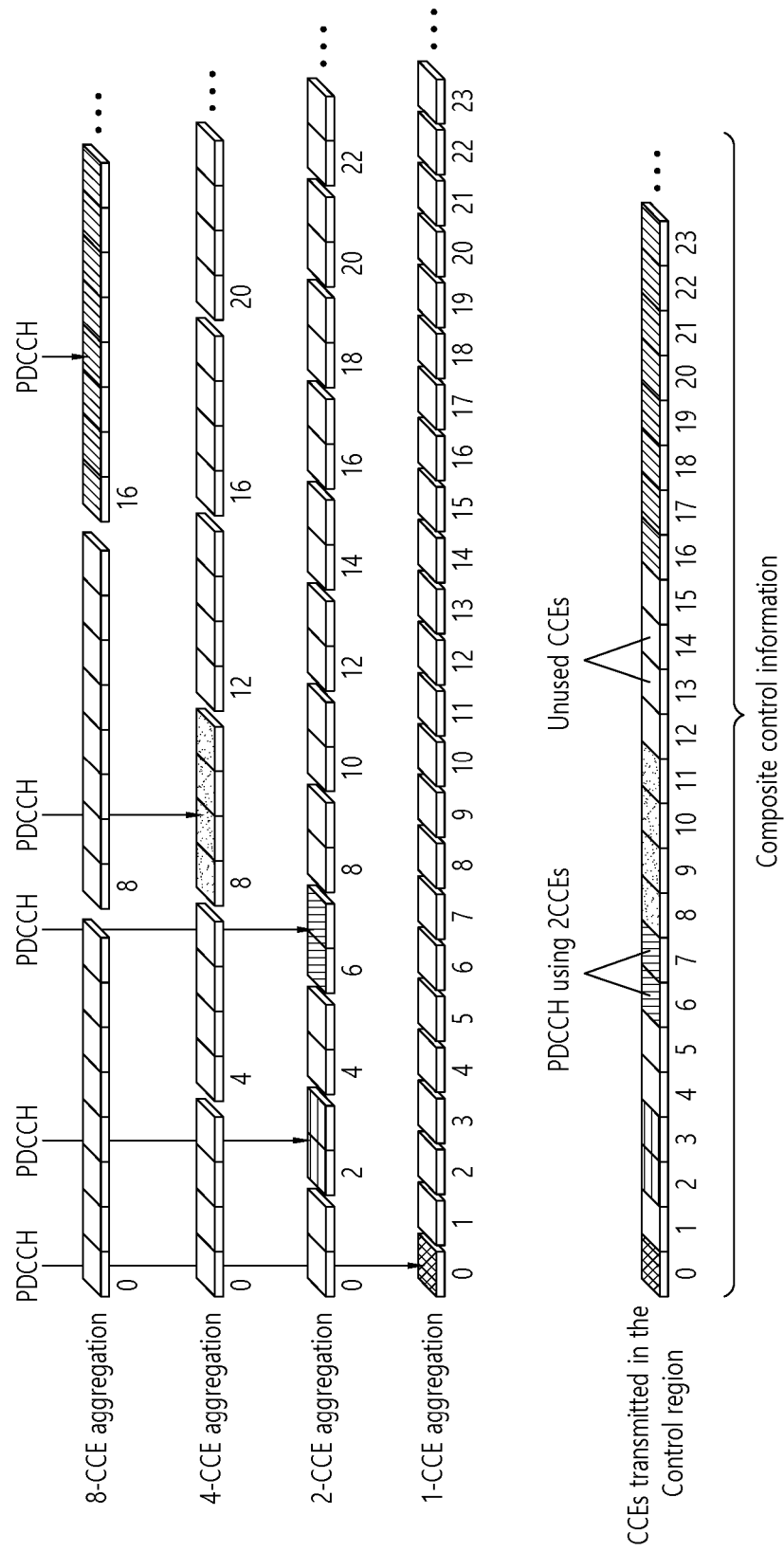

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208).

In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
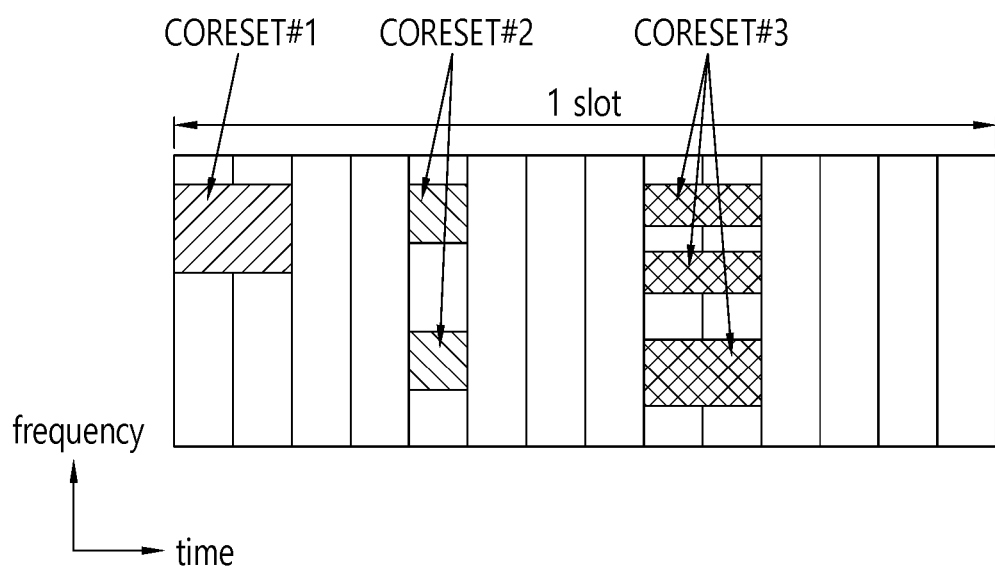
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
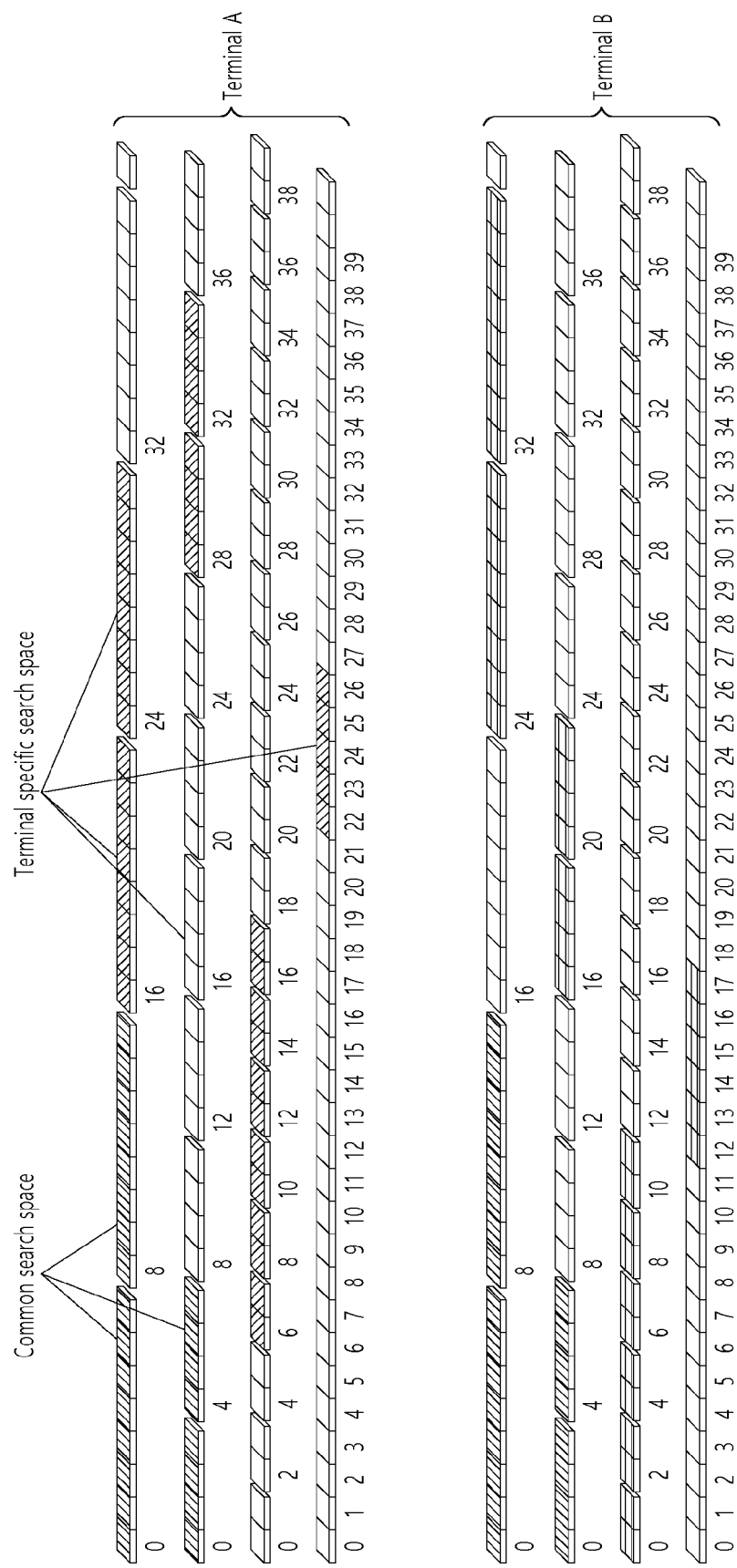
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one PRB. When the number of cyclic shifts available to the UE is 12 and $M_{bit}$=1, 1 bit UCI 0 and 1 may be represented by two cyclic shifted sequences having a difference of 6 in the cyclic shift value, respectively. In addition, when $M_{bit}$=2, 2 bit UCI 00, 01, 11, and 10 may be represented by four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Through this, the UE may obtain a frequency diversity gain. More specifically, $M_{bit}$ bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}-1$). Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
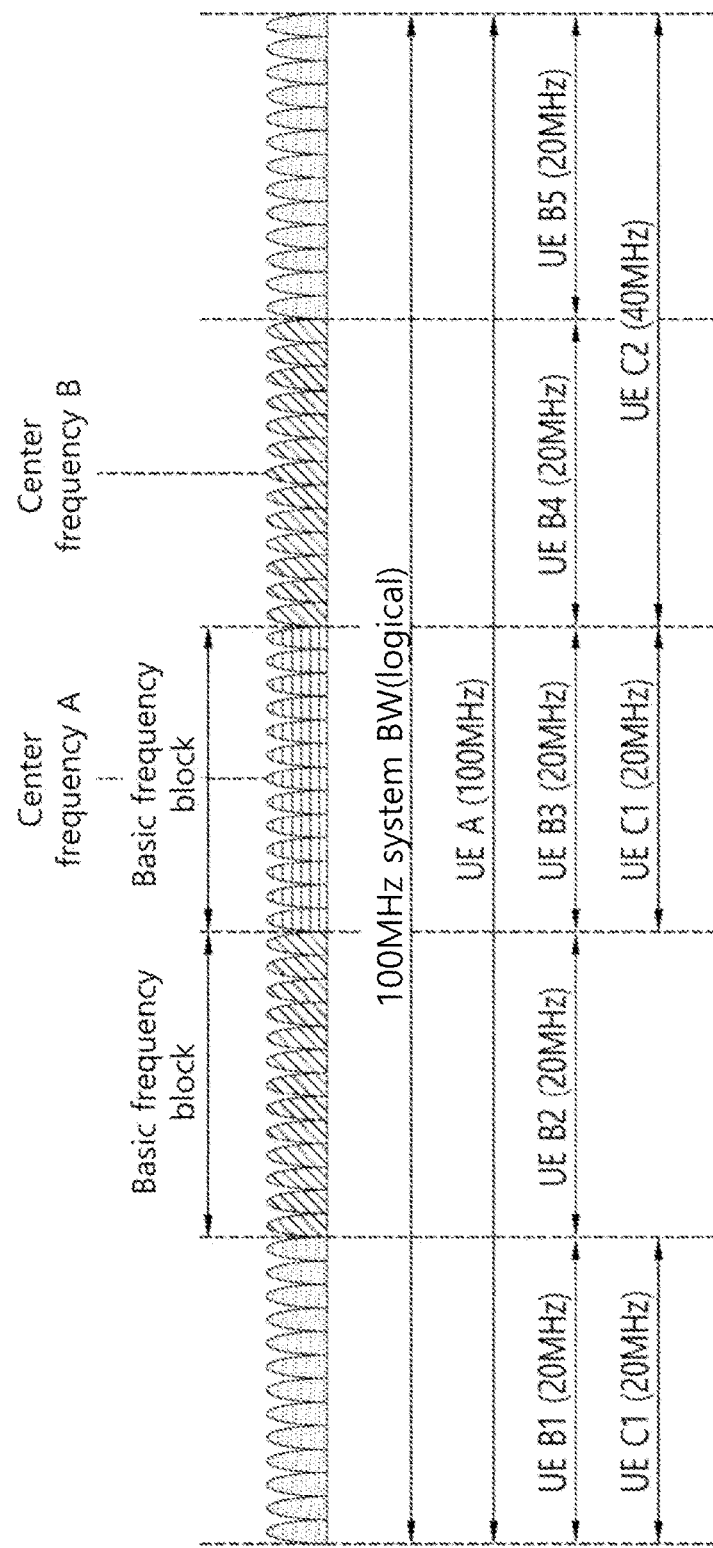
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$-$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
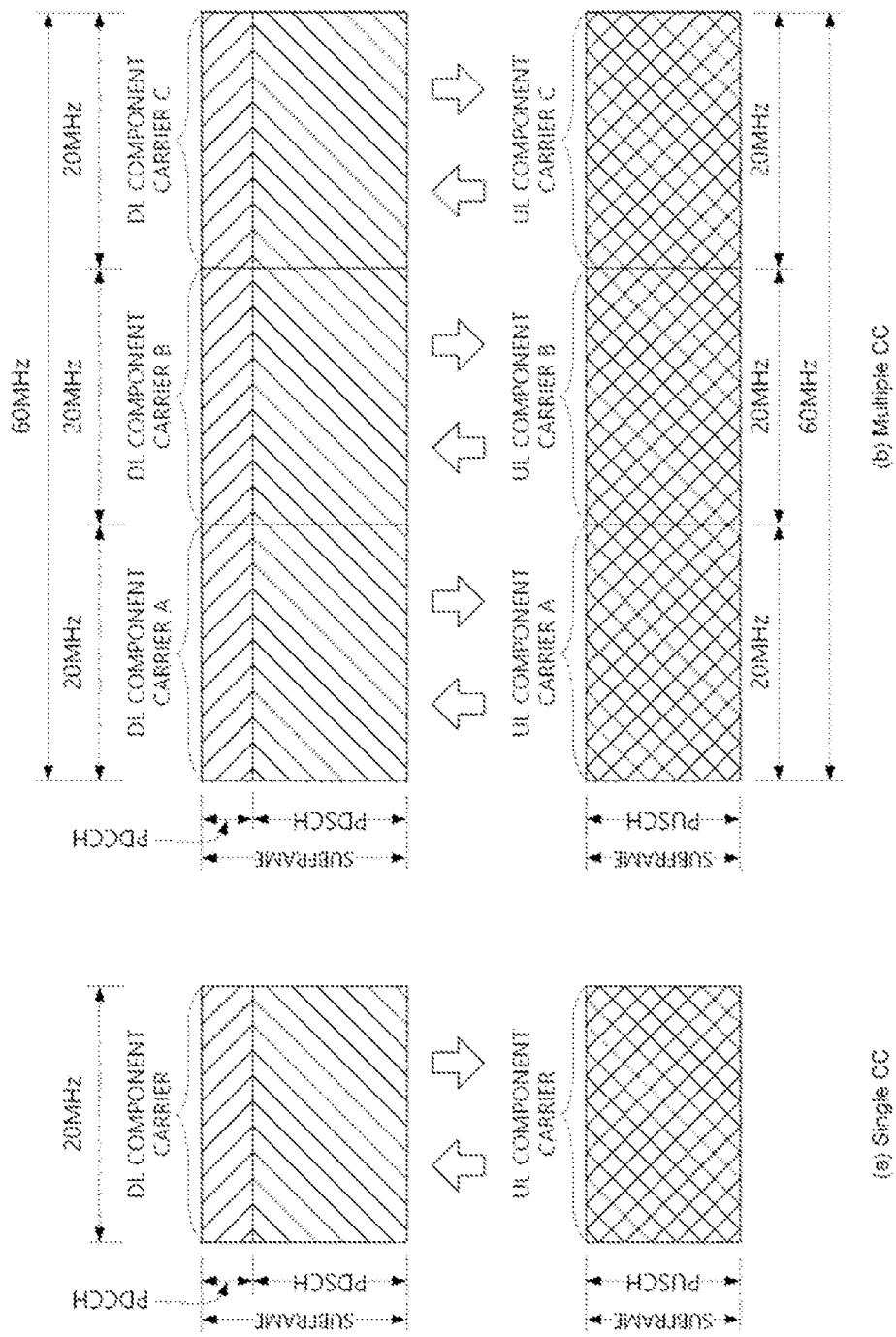
FIG. 9 is a diagram for explaining single carrier communication and multiple carrier communication.

FIG. 9 is a drawing for explaining single carrier communication and multiple carrier communication. Particularly, FIG. 9(a) shows a single carrier subframe structure and FIG. 9(b) shows a multi-carrier subframe structure.

Referring to FIG. 9(a), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(b), three 20 MHz component carriers (CCs) can be aggregated into each of UL and DL, so that a bandwidth of 60 MHz can be supported. Each CC may be adjacent or non-adjacent to one another in the frequency region. FIG. 9(b) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
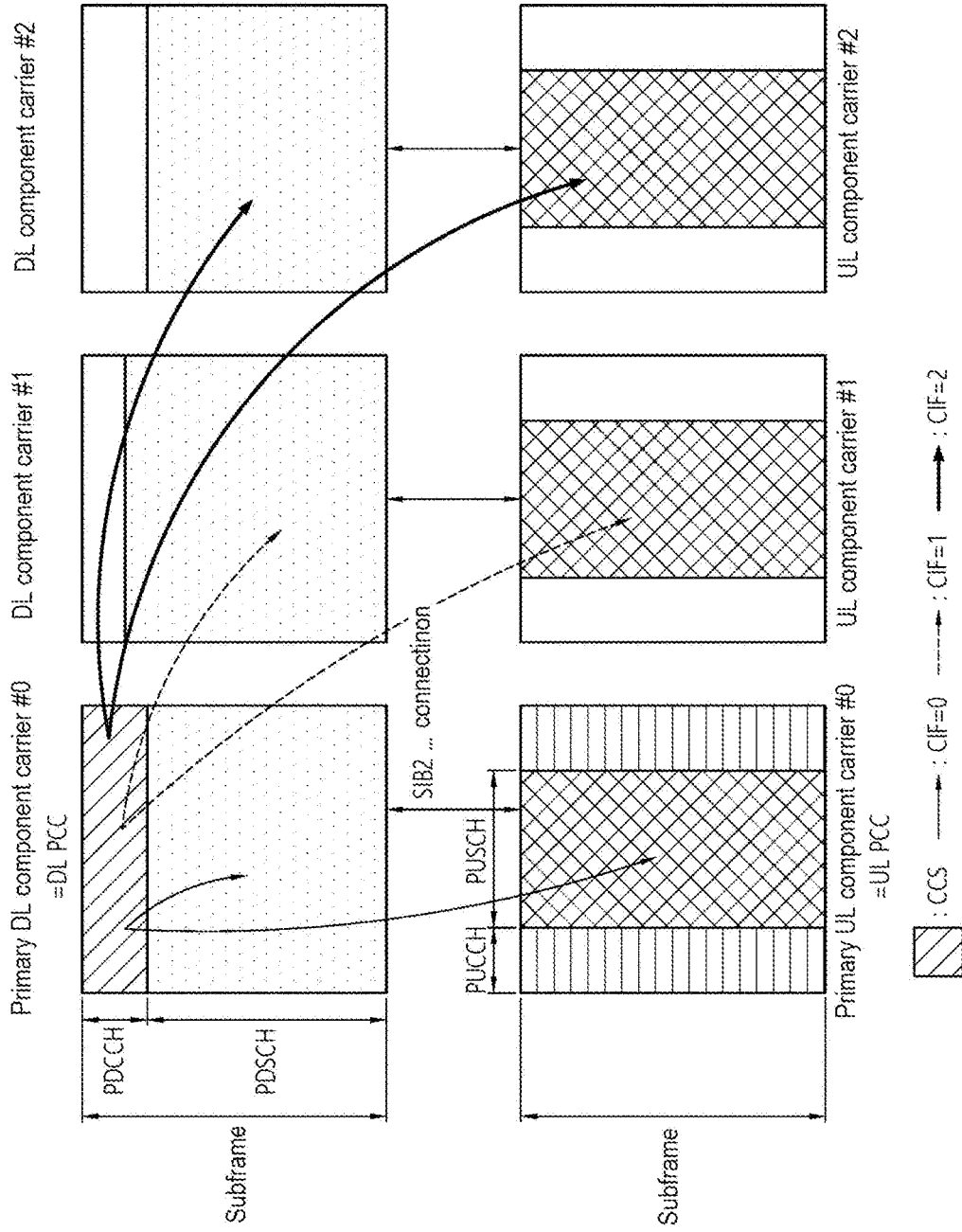
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

The NR system may provide different types of services to one UE. For example, one UE may simultaneously receive an enhanced mobile broadband (eMBB) service and an ultra-reliable low-latency communication (URLLC) service. Here, compared to the eMBB service, the URLLC service should provide low latency and high reliability. To this end, in the physical layer of the NR system, priorities are introduced to channels and signals. Accordingly, the UE may transmit or receive the channels or the signals to or from the base station according to the priorities. Hereinafter, this specification discloses a method for processing and transmitting or receiving, by the UE, the channels or signals having different priorities.

I. Dropping and Retransmission Method in PUCCH Collision

A problem to be solved in this embodiment is a collision between PUCCHs delivering uplink control information (UCI) having different priorities. More specifically, when the collision occurs, the UE should determine which UCI with which priority to be transmitted in which PUCCH resource. In this specification, a collision between two PUCCHs includes a case in which two PUCCHs that do not overlap in frequency overlap in at least one symbol in time. The fact that two PUCCHs do not overlap in frequency may mean that even one PRB does not overlap. Here, the collision may mean a collision between two or more different PUCCHs or a collision between two or more different UCIs.

For convenience of description of the present invention, only a maximum of two priorities are assumed. LP (low priority or priority-0) indicates a relatively low priority, and HP (high priority or priority-1) indicates a relatively high priority.

Figure 11:
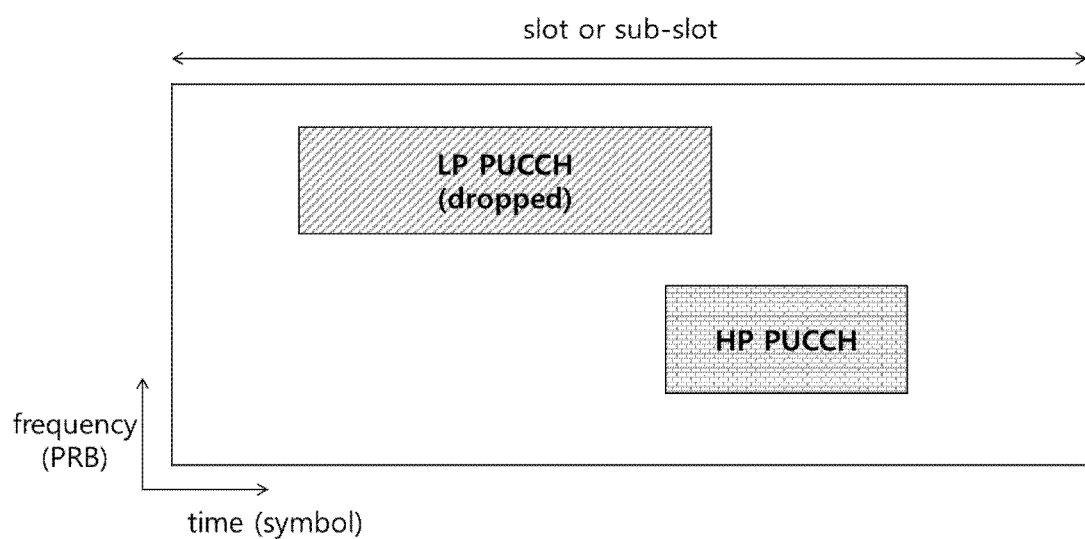
FIG. 11 illustrates a collision between a PUCCH (LP PUCCH) delivering LP UCI and a PUCCH (HP PUCCH) delivering HP UCI.

FIG. 11 illustrates a collision between a PUCCH (LP PUCCH) delivering LP UCI and a PUCCH (HP PUCCH) delivering HP UCI. According to the Rel-16 standard, the UE transmits the HP PUCCH corresponding to a high priority among the two PUCCHs, and does not transmit the LP PUCCH corresponding to a low priority. This Rel-16 operation is called the prioritization scheme. The PUCCH that is not transmitted is called a dropped PUCCH. Also, the UCI that is not transmitted is called a dropped UCI.

Since the UE supporting the priorityization scheme does not transmit the PUCCH corresponding to the low priority, the base station cannot receive a Low priority UCI. For example, if the Low priority UCI is HARQ-ACK information indicating whether the PDSCH reception was successful, the base station cannot know whether the UE successfully received the PDSCH. Accordingly, signaling for the base station to receive the HARQ-ACK again is required. As another example, if a Low priority UCI includes CSI information, the base station cannot know a channel state of the UE, and thus the base station cannot perform appropriate modulation and coding scheme (MCS) selection and time/frequency resource allocation. Accordingly, waste of downlink resources may occur due to inefficient downlink scheduling.

Accordingly, the present embodiment provides a method of retransmitting an untransmitted LP UCI (that is, dropped UCI) when an LP PUCCH corresponding to a low priority is not transmitted as shown in FIG. 11. Here, the LP UCI includes HARQ-ACK information indicating whether or not PDSCH reception is successful. Also, the LP UCI may include CSI information. The specific method is as follows.

The base station may transmit a PDCCH for retransmission of the dropped LP UCI to the UE. When the UE cannot transmit the LP PUCCH corresponding to a low priority, the UE may monitor the PDCCH for retransmission of the LP PUCCH that was not be transmitted.

A search space for monitoring the PDCCH may be a UE-specific search space. Also, the search space for monitoring the PDCCH may be a common search space, a group-common search space, or a cell-common search space.

The base station may transmit a DCI format for retransmission of the dropped UCI to the UE through the PDCCH. The DCI format may be at least one of DCI format 10, DCI format 11, and DCI format 1_2 for scheduling a PDSCH.

The DCI format may include at least the following information.

The DCI format may include a slot index as first information.

As an example, the slot index may be represented by a relative value (that is, the number of slots) between the slot in which the PDCCH is received and the slot of the dropped PUCCH.

More specifically, if the subcarrier spacing (SCS) of a UL BWP through which the PUCCH is transmitted and the subcarrier spacing (SCS) of a DL BWP through which the PDCCH is received are the same, the slot in which the PDCCH is received is slot A, and the slot of the dropped PUCCH is slot B, a value based on (A−B) may be included in the DCI format. If the SCS of UL BWP (SCS UL) through which PUCCH is transmitted and the SCS of DL BWP (SCS_DL) through which PDCCH is received are different, the slot in which the PDCCH is received is downlink slot A, and the slot of the dropped PUCCH is uplink slot B, a value based on (floor(A*(SCS UL/SCS_DL))−B) may be included in the DCI format. As another example, the slot index may be represented by a relative value (that is, the number of slots) between the slot in which the PDCCH is received and the slot in which the PDCCH for scheduling the dropped PUCCH is received. The UE may obtain the slot index of the dropped PUCCH through the PDCCH for scheduling the dropped PUCCH. Here, when the SCS of the slot in which the PDCCH is received and the SCS of the slot in which the dropped PUCCH should have been transmitted are different from each other, the relative value (that is, the number of slots) between the slots may be the number of slots determined based on one SCS. Here, one SCS may be an SCS of the slot in which the PDCCH is received or an SCS of the slot in which the dropped PUCCH should have been transmitted. Here, one SCS may be a larger value of the SCS of the slot in which the PDCCH is received and the SCS of the slot in which the dropped PUCCH should have been transmitted. Here, one SCS may be a smaller value of the SCS of the slot in which the PDCCH is received and the SCS of the slot in which the dropped PUCCH should have been transmitted.

For reference, when the SCS of the slot in which the PDCCH is received and one SCS are different from each other, an index of the slot in which the PDCCH is received may be determined based on the first symbol of the PDCCH among the slots determined by the one SCS. Furthermore, the index may be an index of the most preceding slot overlapping the first symbol of the PDCCH. For reference, when the SCS of the slot in which the dropped PUCCH should be transmitted and one SCS are different from each other, an index of the slot in which the dropped PUCCH should be transmitted may be determined based on the last symbol of the dropped PUCCH among the slots determined by the one SCS. Furthermore, the index may be an index of the latest slot overlapping the last symbol of the dropped PUCCH.

As another example, when the dropped PUCCH includes HARQ-ACK information, the slot index may be represented by a relative value (that is, the number of slots) between the slot in which the PDCCH is received and a slot in which a PDSCH corresponding to the HARQ-ACK is received. The UE may obtain the slot index of the dropped PUCCH from the slot in which the PDSCH is received.

As another example, the slot index may be represented by an absolute value of the slot index of the dropped PUCCH. Here, the absolute value refers to an index of a slot used by the system, and, for this slot index, 0 is assigned to the first slot of each frame. The absolute value may be a modulo operation value. The modulo operation may be determined according to the number of bits representing first information. For example, if the number of bits is B bits, it may be a modulo $2^B$ operation.

From the first information, the UE can know to which dropped PUCCH of which slot the LP UCI belongs to be retransmitted.

Even though the slot index of the dropped PUCCH can be known through the first information, if two or more LP PUCCHs are not transmitted in that slot, the UE may indicate one of the PUCCHs.

The DCI format may include an index corresponding to the dropped PUCCH as second information.

As an example, the index may be a unique index assigned in a configuration of a PUCCH. For example, the UE may receive a plurality of PUCCHs from a base station. In this case, each PUCCH may be given a unique index. If the UE receives 8 PUCCHs, each PUCCH may be given a value of one of 0, 1, 2, 3, 4, 5, 6, 7. Therefore, using the unique index, the UE can determine which PUCCH is indicated.

As another example, the index may indicate a value according to time order among two or more PUCCHs. The UE can determine which PUCCH precedes in time order in two or more PUCCHs. This can be determined based on the start symbol or the last symbol of two or more PUCCHs.

As another example, the index may indicate a value according to a PRB order among two or more PUCCHs. The UE can determine which PUCCH precedes in PRB order in two or more PUCCHs. This can be determined based on the first PRB or the last PRB of two or more PUCCHs.

As another example, the index may be determined based on a unique value assigned to each PUCCH transmission. When transmitting each PUCCH, the UE may assign a unique value. In one aspect, this unique value may be indicated in the PDCCH for scheduling PUCCH transmission. That is, a value corresponding to the unique value may be assigned to the DCI format of the PDCCH for scheduling PUCCH transmission. If PUCCH transmission is triggered due to an RRC signal, a value corresponding to the unique value of the PUCCH may be assigned to the RRC signal. In another aspect, the UE may determine a unique value when transmitting a PUCCH. For example, the UE may assign a different value to each PUCCH according to time order and set the value as the unique value. If there are 4 possible unique values (first value, second value, third value, fourth value), the UE may cyclically determine the unique values of the PUCCH as the first value, the second value, the third value, and the fourth value according to time order.

As another example, the index may be determined based on a unique value assigned for each PDSCH reception. When scheduling each PDSCH, the base station may assign a unique value to distinguish PDSCH reception. In one aspect, a HARQ process number (HPN) may be used as the unique value. The UE may obtain the HPN through the unique value, determine a PDSCH corresponding to the HPN, and determine a PUCCH through which the HARQ-ACK of the PDSCH is transmitted. That is, The UE may determine that HARQ-ACK information of the PDSCH corresponding to the HPN is a UCI to be retransmitted.

The DCI format may indicate not only one HPN but also a plurality of HPNs. For example, the DCI format may indicate HPN using a bitmap. Each bit in the bitmap may correspond to one HPN. Alternatively, each bit in the bitmap may correspond to a plurality of HPNs. Here, the correspondence relationship between each bit of the bitmap and the HPN may be configured through the RRC. In another aspect, an index of a cell in which the PDSCH is received may be used as the unique value. That is, the UE may obtain a cell index through the unique value, determine a PDSCH corresponding to the cell index, determine the PUCCH through which the HARQ-ACK of the PDSCH is transmitted. When retransmitting the UCI, the UE may retransmit only the LP UCI (that is, HARQ-ACK information) corresponding to the unique value for the PDSCH reception.

As another example, as a unique value, the base station may assign a different unique value for each HARQ-ACK codebook in the UE. For example, a first value may be assigned to one HARQ-ACK codebook and a second value may be assigned to another HARQ-ACK codebook. Based on the unique value of the HARQ-ACK codebook, the UE may determine the HARQ-ACK codebook and determine that the HARQ-ACK information of the HARQ-ACK codebook is a UCI to be retransmitted.

The UE may determine the UCI to be transmitted to the base station based on the first information or the second information. The UCI may be a UCI to be transmitted in a dropped PUCCH determined through first information or second information. If the DCI format includes the first information but does not include the second information (that is, if there is only information about the slot index), the UCI to be transmitted by the UE may be one or a plurality of dropped UCIs in a slot determined based on the slot index. The UE should transmit the UCI through PUCCH. To differentiate from the dropped PUCCH, a PUCCH through which a dropped UCI is transmitted according to the PDCCH is referred to as a re-transmit PUCCH.

The UE should determine the re-transmit PUCCH for transmitting the dropped UCI. To this end, at least the following information should be included in the DCI format.

The DCI format may include a slot index of the re-transmit PUCCH as third information. That is, the index of the slot in which the re-transmit PUCCH for transmitting the dropped UCI is transmitted may be indicated by the third information. This index may be represented as a relative value between the index of the slot in which the PDCCH is received and the index of the slot in which the re-transmit PUCCH is transmitted.

The DCI format may include a re-transmit PUCCH index as fourth information. The UE may be configured with candidates of the re-transmit PUCCH through the RRC signal. When the UE is configured with candidates for one or a plurality of re-transmit PUCCHs, a unique value may be given to each re-transmit PUCCH. One of these unique values may be included in the DCI format as fourth information.

Figure 12:
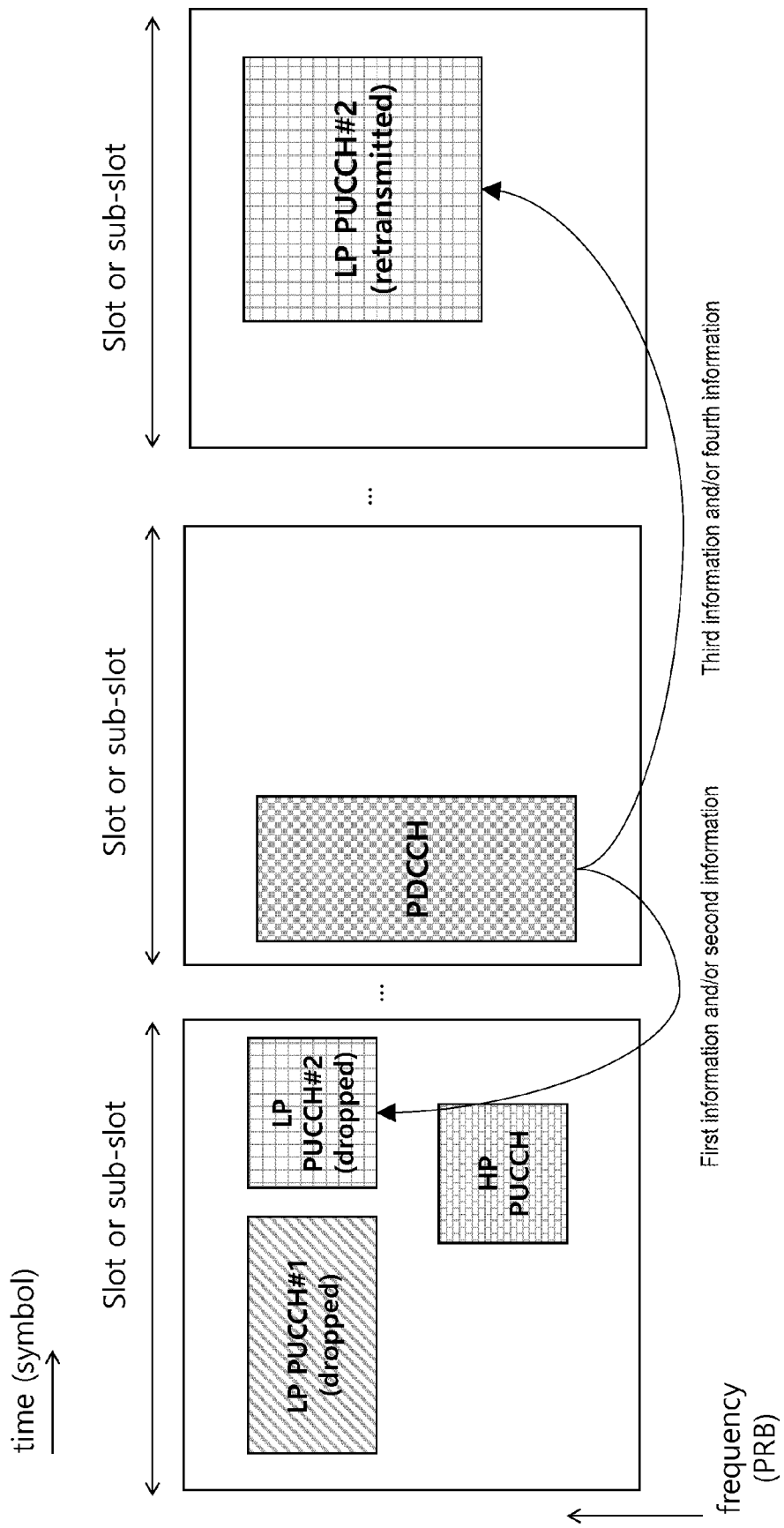
FIG. 12 illustrates a UE operation upon reception of the PDCCH.

FIG. 12 illustrates a UE operation upon reception of the PDCCH.

Referring to FIG. 12, the UE receives the PDCCH from the base station in slot n. The PDCCH carries the DCI format according to this embodiment. The DCI format may include at least one of the first to fourth information described above.

The first information may indicate that the dropped PUCCH is located in slot n-k. Also, the second information may indicate one dropped PUCCH (e.g., LP PUCCH #2) among a plurality of dropped PUCCHs (LP PUCCH #1, LP PUCCH #2).

The UE may determine the dropped PUCCH by combining the first information and the second information and retransmit the dropped UCI.

Third information may indicate a slot (slot n+m) in FIG. 12) in which a re-transmit PUCCH is to be transmitted. The fourth information may indicate the re-transmit PUCCH in slot n+m.

The UE may retransmit the dropped UCI through a re-transmit PUCCH by combining the third information and fourth information.

The UE may acquire the first information to the fourth information by reinterpreting the existing bit fields of DCI format 1_0 or DCI format 1_1 and DCI format 1_2.

As an example, in DCI format 1_0 or DCI format 1_1, and DCI format 1_2 a time-domain resource assignment (TDRA) field, a frequency-domain resource assignment (FDRA) field, a modulation and coding scheme (MCS) field, VRB-to-PRB mapping, a new data indicator (NDI) field, a redundancy version (RV) field, a downlink assignment index (DAI) field, or a DMRS sequence initialization field may be used to indicate the first information or the second information. The fields are used for scheduling the PDSCH, but are unnecessary when retransmitting the dropped UCI, and thus the fields may be used to indicate the first information or the second information. In this case, the fields are used in a way of being reinterpreted by the base station and the UE. For reference, when the fields are reinterpreted, the DCI format (DCI format 1_0, 1_1, and 1_1) may not schedule PDSCH reception. That is, when the fields are reinterpreted, the UE may not receive the PDSCH from the DCI format.

The UE needs to distinguish between a general DCI format for scheduling PDSCH reception and a DCI format for indicating retransmission of the dropped PUCCH. To this end, a 1-bit indicator may be included in the DCI format. When the 1-bit indicator is a specific value (e.g., in case of '1'), the UE may reinterpret the field as in the above embodiment. As another example, when the DCI format is scrambled with a specific CRC, the field may be reinterpreted as in the above embodiment. As another example, when some fields of the DCI format satisfy a specific condition, the fields may be reinterpreted as in the above embodiment.

As another example, in DCI format 1_0 or DCI format 11, and DCI format 1_2, the PDSCH-to-HARQ_feedback timing indicator field may be used for indicating the third information. In this case, the field is used in a way of being reinterpreted by the base station and the UE.

As another example, in DCI format 1_0 or DCI format 11, and DCI format 1_2, the PUCCH resource indicator field may be used for indicating the fourth information. In this case, the field is used in a way of being reinterpreted by the base station and the UE.

II. Multiplexing and Resource Determination Method 1 in PUCCH Collision

In I., a method of dropping and retransmitting any one PUCCH or UCI in PUCCH collision was disclosed. However, retransmission of the dropped UCI may cause waste of downlink resources due to inefficient downlink scheduling. Therefore, a method of transmitting LP UCI and HP UCI through one PUCCH may be considered. This method is called UCI multiplexing.

Hereinafter, this embodiment discloses a UCI multiplexing method and a resource determination method in a situation where a low priority (LP) UCI and a high priority (HP) UCI collide.

When compared to the prioritization method, in the multiplexing method, the UE transmits the LP UCI to the base station without dropping the LP UCI, and thus the base station can receive the LP UCI. For example, if the LP UCI includes HARQ-ACK, the base station can receive HARQ-ACK information from the UE. For example, if the LP UCI includes CSI information, since the base station can know a channel state of the UE, the base station can perform appropriate modulation and coding scheme (MCS) selection and time-frequency resource assignment. Accordingly, efficient transmission and reception is possible.

Figure 13:
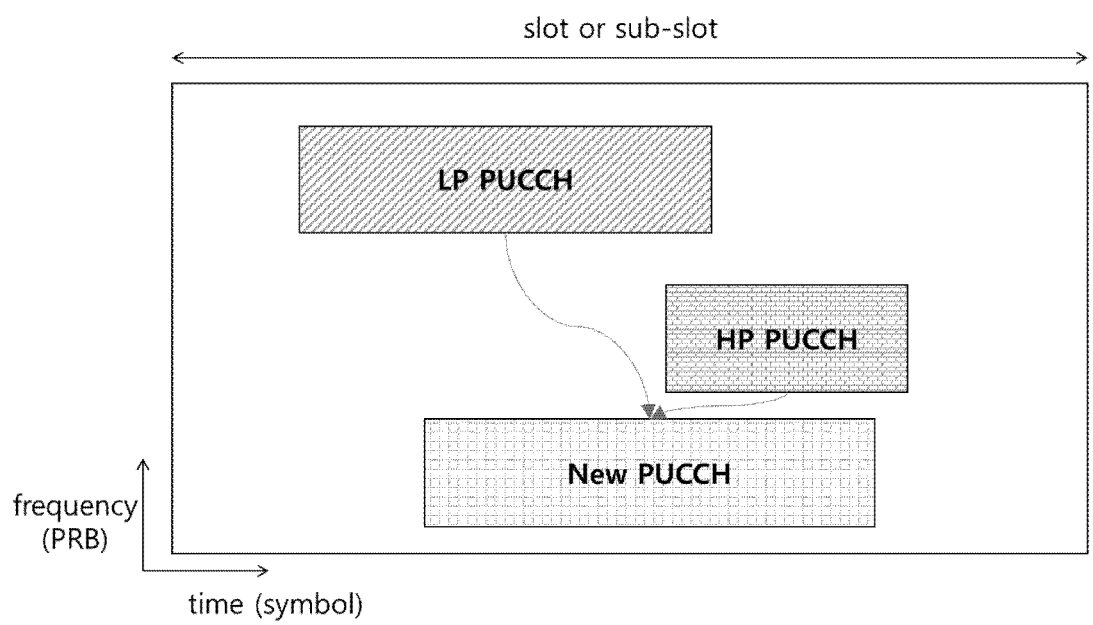
FIGS. 13 to 17 are methods in which the UE multiplexes LP UCI and HP UCI and transmits the multiplexed UCI in a newly configured new PUCCH resource according to an example.
Figure 14:
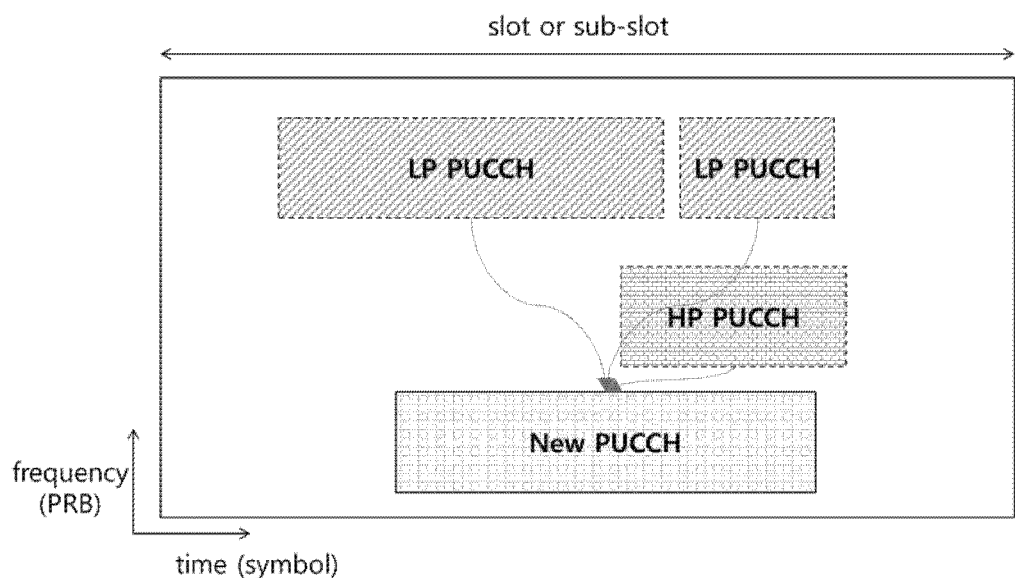
Figure 15:
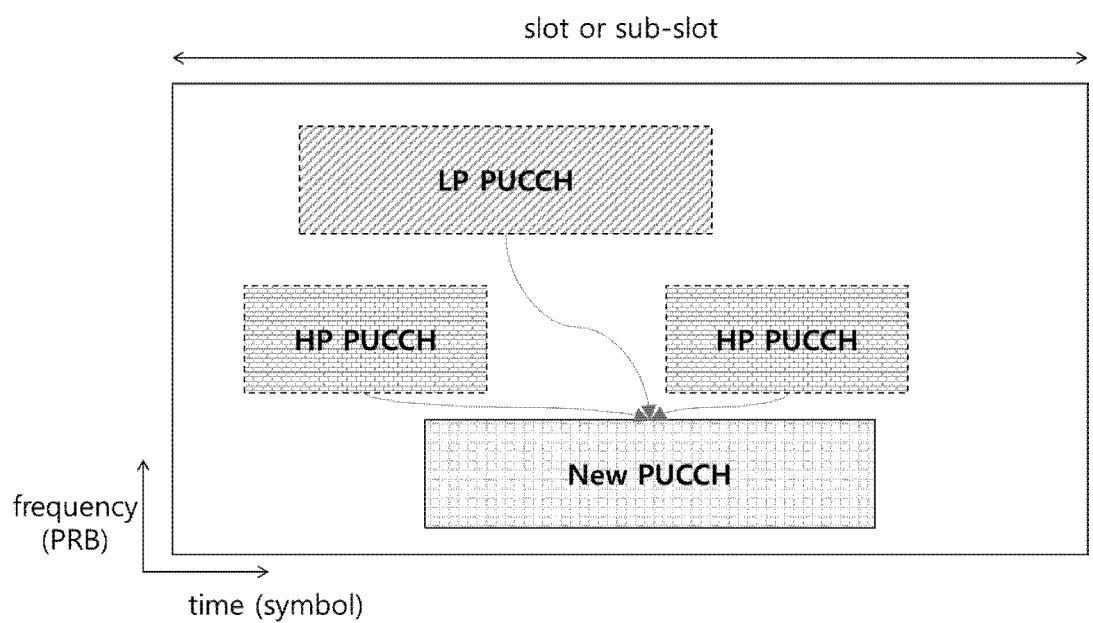

A first method is a method in which the UE multiplexes the LP UCI and the HP UCI and transmits the multiplexed UCI through a newly configured new PUCCH resource as shown in FIGS. 13 to 15.

Figure 16:
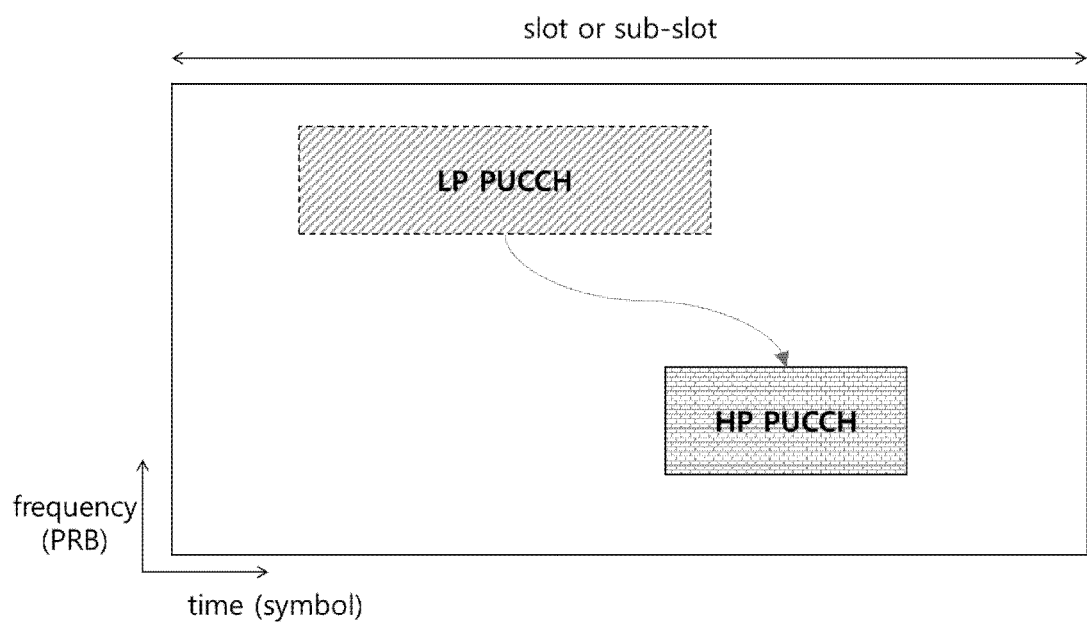

A second method is a method in which the UE multiplexes the LP UCI and the HP UCI and transmits the multiplexed UCI through an HP-PUCCH resource for HP UCI as shown in FIG. 16.

Figure 17:
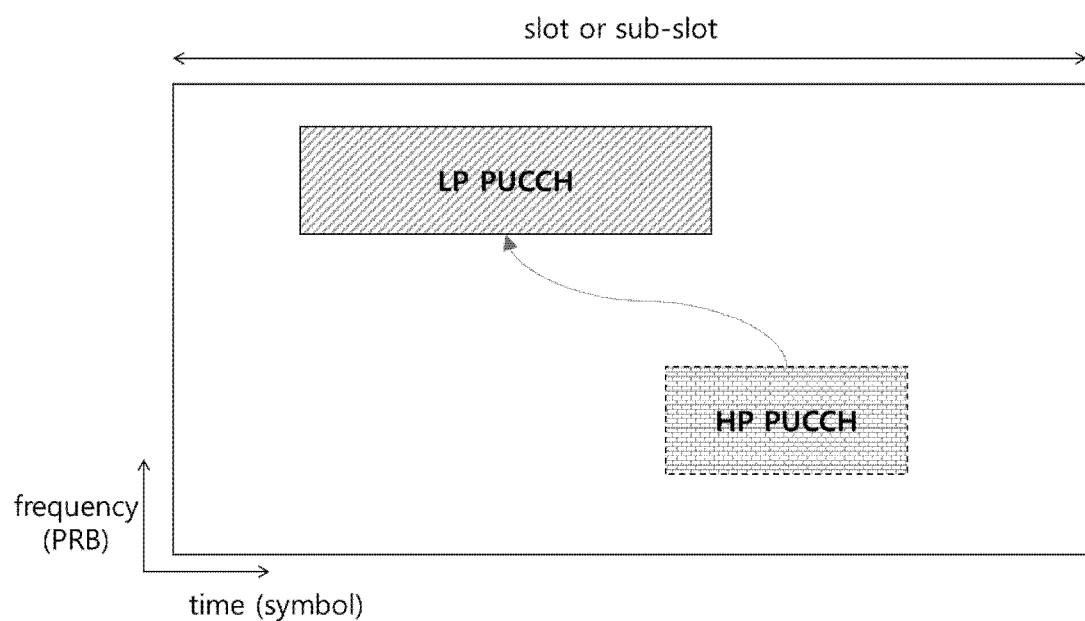

A third method is a method in which the UE multiplexes the LP UCI and the HP UCI and transmits the multiplexed UCI through an LP-PUCCH resource for LP UCI as shown in FIG. 17.

Here, the new PUCCH resource may be one PUCCH resource of a new PUCCH resource set, the HP-PUCCH resource may be one HP-PUCCH resource of an HP-PUCCH resource set, and the LP-PUCCH resource may be one LP-PUCCH resource of an LP-PUCCH resource set.

In this way, the base station may configure PUCCH resources to the UE in a set form. A PUCCH resource set may include a plurality of PUCCH resources. When a plurality of PUCCH resource sets are configured to the UE, the UE may select one PUCCH resource set. The selection may be performed according to a bit size of a UCI payload. If there is no special description in the following description of the present invention, the selection is for one PUCCH resource. In addition, a PUCCH corresponding to a high priority is called an HP-PUCCH, and a PUCCH corresponding to a low priority is called an LP-PUCCH.

Hereinafter, a method of selecting a size of the PUCCH resource to be multiplexed according to the first method of the present invention will be described.

As a first step, the UE determines the total bit size of UCIs to be multiplexed. Here, the UCIs to be multiplexed may include the HP UCI and the LP UCI. The bit size of all UCI is the sum of a bit size ($B\_high$) of the HP UCI and a bit size ($B\_low$) of the LP UCI. That is, the bit size of all UCIs is $B\_total=B\_high+B\_low$.

For reference, UCIs having the same priority may have a plurality of UCI types. The UCI types may include HARQ-ACK, scheduling request (SR), and CSI. Here, the CSI can be subdivided into CSI part 1 and CSI part 2. Therefore, the bit size of UCI can be described as follows.

$B\_high=HARQ\_ACK\_high+SR\_high+CSI\_high;$ $B\_low=HARQ\_ACK\_low+SR\_low+CSI\_low;$ Here, HARQ_ACK_high represents the bit size of high priority HARQ-ACK information, SR high represents the bit size of high priority SR information, and CSI high represents the bit size of high priority CSI information. HARQ_ACK_low represents the bit size of low priority HARQ-ACK information, SR_low represents the bit size of low priority SR information, and CSI_low represents the bit size of low priority CSI information. Here, the UCI has at least one type of HARQ-ACK, SR, and CSI. If there is no specific UCI type, the bit size thereof may be determined to be 0.

All UCI types may not be multiplexed. That is, some types of the low priority UCI may be excluded without being multiplexed.

More specifically, CSI low of the LP UCI may be excluded without being multiplexed. Accordingly, the obtained B_low may be limited to a value excluding CSI_low. As another example, SR_low and CSI_low of the LP UCI may be excluded without being multiplexed. Accordingly, the obtained B_low may be limited to a value excluding SR_low and CSI_low. As another example, a UCI type of the LP UCI overlapping an HP UCI may be excluded. For example, if the HP UCI type includes CSI, CSI included in the low priority UCI may be excluded. This is to prevent the same UCI type from being duplicated and transmitted. As another example, of the LP UCI, UCI types that do not overlap with the HP UCI type may be excluded. For example, if the HP UCI type includes only HARQ-ACK, other UCI types other than HARQ-ACK included in low priority UCI may be excluded. This is to multiplex only the same UCI types.

In the case of respectively performing separate coding of the LP UCI and the HP UCI, CRC_low may be added to B_low, and CRC_high may be added to B_high. Here, CRC_low is a cyclic redundancy code (CRC) value of the LP UCI, and CRC_low is a cyclic redundancy code (CRC) value of the HP UCI.

In the case of performing joint coding of the LP UCI and HP UCI, CRC may be added to B_total. Here, CRC is a cyclic redundancy code (CRC) value of the joined UCI.

As a second step, if new PUCCH resources for multiplexing are configured to the UE, the UE performs the following operation. If a plurality of new PUCCH resource sets are configured to the UE, the UE may select one new PUCCH resource set based on the bit size (B_total) of all UCIs. The new PUCCH resource set may be configured with one or a plurality of new PUCCH resources.

As another second step, if new PUCCH resources for multiplexing are not configured to the UE, the UE performs the following operation. Since new PUCCH resources are not configured to the UE, the UE should use the existing PUCCH resources and PUCCH resource set. In this case, two types of PUCCH resources and PUCCH resource sets according to priority are configured to the UE. One type is PUCCH resources and PUCCH resource sets for LP UCI transmission, and the other type is PUCCH resources and PUCCH resource sets for HP UCI transmission. Among the PUCCH resources and PUCCH resource sets, the UE may select one PUCCH resource set among PUCCH resource sets for HP UCI transmission based on the bit size (B_total) of all UCIs.

The UE may select one PUCCH resource set based on the second step or the other second step. This is called a selected PUCCH resource set. In the following description, a process of selecting one PUCCH resource from the selected PUCCH resource set will be described.

As a third step, the UE selects one PUCCH resource within the selected PUCCH resource set based on at least the following information.
 last symbol of HP-PUCCH
 boundary of slot or boundary of sub-slot
 last symbol of PDCCH for scheduling LP-PUCCH or, last symbol (hereinafter last symbol A) of PDSCH corresponding to the HARQ-ACK when LP-PUCCH includes HARQ-ACK information
 last symbol of PDCCH for scheduling HP-PUCCH or last symbol (hereinafter last symbol B) of PDSCH corresponding to the HARQ-ACK when HP-PUCCH includes HARQ-ACK information
 minimum processing time for multiplexing More specifically, the process of selecting, by the UE, one PUCCH resource within the selected PUCCH resource set may include the following.

Process 1) The UE may exclude a PUCCH resource that ends later than the last symbol of the HP-PUCCH by X symbols from among the selected PUCCH resource set. Here, if X is 0, the UE may exclude a PUCCH resource that ends later than the last symbol of the HP-PUCCH from among the selected PUCCH resource set. The X may be a predetermined value or a value set through the RRC signal.

Figure 18:
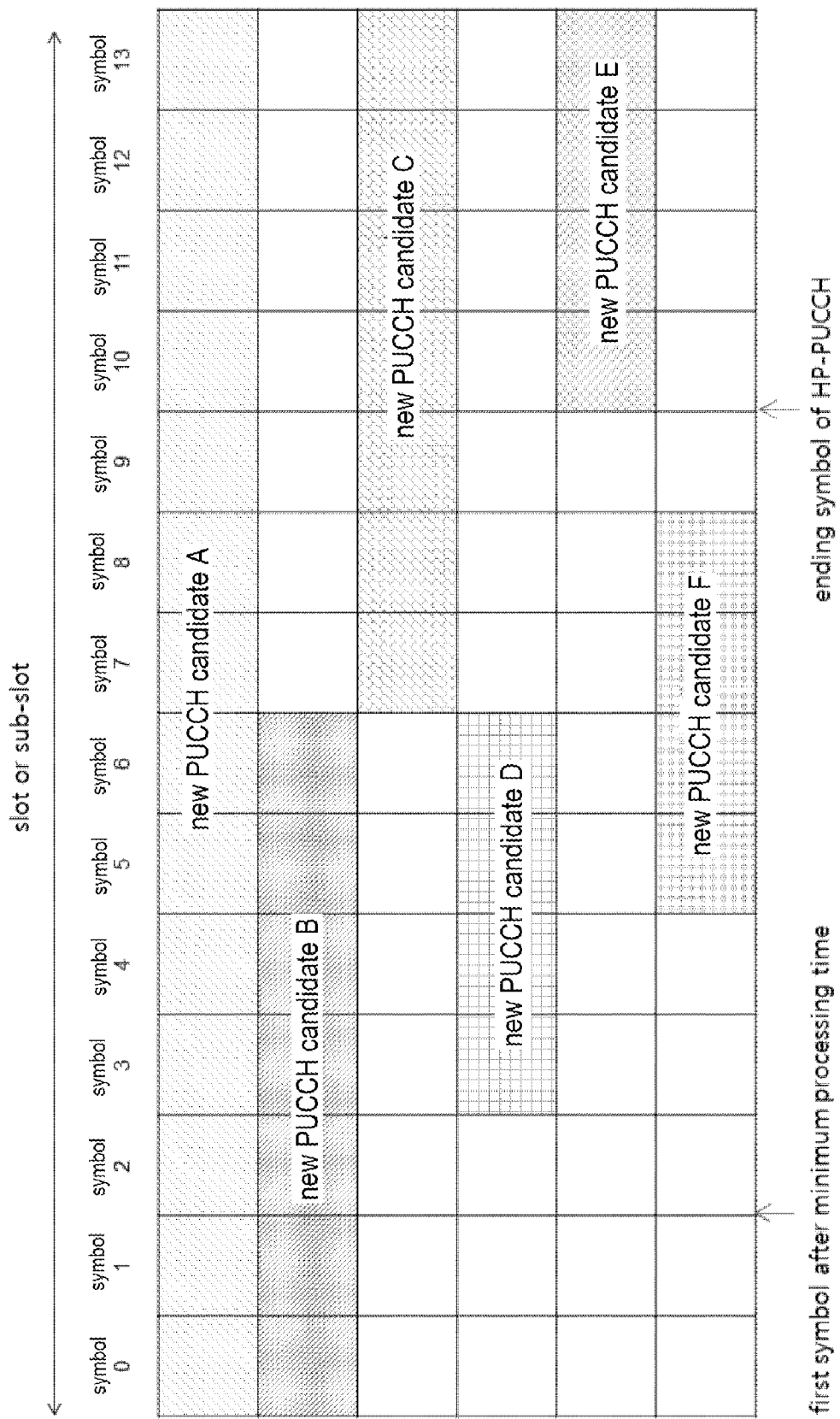
FIG. 18 is a diagram for describing) a method of selecting, by the UE, a PUCCH resource within a selected PUCCH resource set according to an embodiment.

FIG. 18 is a diagram for describing a method of for selecting, by the UE, a PUCCH resource within a selected PUCCH resource set according to an embodiment.

Referring to FIG. 18, the selected PUCCH resource set includes six new PUCCH candidates (A, B, C, D, E, F). Here, the last symbol of HP-PUCCH is referred to as symbol 9. Given X=0, new PUCCH candidates A, C, and E can be excluded because they end later than the last symbol of HP-PUCCH.

Process 2) The UE may exclude a PUCCH resource mapped to a slot or sub-slot later than the slot or sub-slot to which the HP-PUCCH belongs, among the selected PUCCH resource set.

Process 3) The UE excludes PUCCH resources that do not satisfy the minimum processing time for multiplexing from the last symbol of the last symbol A or the last symbol B of the selected PUCCH resource set. Here, the minimum processing time may be a value determined based on the PUSCH processing time.

Again, in FIG. 18, if the first symbol satisfying the minimum processing time is given as symbol 2, new PUCCH resources A and B may be excluded.

If one PUCCH resource exists in the selected PUCCH resource set as a result of the processes 1), 2), and 3) above, the UE may transmit the UCI (LP UCI and HP UCI) through the one PUCCH resource.

If a plurality of possible candidate PUCCH resources exist as a result of the processes 1), 2), and 3) above, one PUCCH should be selected from among the plurality of PUCCH resources. This process may include the following.

Process 4) The UE may select one PUCCH resource based on the start symbols of the plurality of PUCCH resources. For example, among the plurality of PUCCH resources, a PUCCH resource having an earliest start symbol may be selected.

Process 5) The UE may select one PUCCH resource based on the end symbols of the plurality of PUCCH resources. For example, among the plurality of PUCCH resources, a PUCCH resource whose end symbol starts the earliest may be selected.

Process 6) The UE may select one PUCCH resource based on the lengths (the number of symbols) of the plurality of PUCCH resources. For example, a PUCCH resource having the longest length (the number of symbols) may be selected among the plurality of PUCCH resources.

The UE may select one PUCCH resource in a combination of at least one of the processes 4), 5), and 6). Preferably, selection may be made based on start symbols of the plurality of PUCCH resources. For example, among the plurality of PUCCH resources, a PUCCH resource whose start symbol starts the earliest may be selected. If there are a plurality of PUCCH resources that start the earliest, one PUCCH resource may be selected based on the length (the number of symbols). That is, the PUCCH resource with a longest length (number of symbols) can be selected.

Again, in FIG. 18, if new PUCCH candidates D and F remain, a new PUCCH candidate D that starts first may be selected.

According to the third step, one PUCCH resource is selected. This PUCCH resource is called a selected PUCCH resource. The UE can transmit the multiplexed UCI (LP UCI and HP UCI) through the one selected PUCCH resource.

After that, the UE should determine the number of PRBs to be used for the selected PUCCH resource. In this case, a case may occur in which all of the multiplexed UCI cannot be transmitted on the selected PUCCH resource.

First, assume that the selected PUCCH resource is PUCCH format 2 or 3. In the case of PUCCH formats 2 or 3, the PRB in the frequency domain can be adjusted to the bit size or maximum code rate of the multiplexed UCI. For convenience, the description is made based on PUCCH format 3, but the above example can be equally applied to PUCCH format 2.

Assume that N_nonDMRS is the number of symbols excluding symbols used for DMRS in PUCCH format 3. For example, when the length of PUCCH format 3 is 4 symbols and one symbol is used for DMRS, N_nonDMRS=3. If P PRBs are used in PUCCH format 3, the number of REs used for UCI transmission is given as P*N_nonDMRS*N_sc. Here, N_sc is 12 as the number of REs that can be used for UCI transmission per PRB. And the number of bits transmittable on the REs is given as P*N_nonDMRS*N_sc*Q. Here, Q is 1 when BPSK is used and 2 when QPSK is used. Accordingly, if the bit size of the multiplexed UCI is smaller than or equal to P*N_nonDMRS*N_sc*Q*r, the UE can transmit the multiplexed UCI with the maximum code rate r or less using the P PRBs. However, if the bit size of the multiplexed UCI is greater than P*N_nonDMRS*N_sc*Q*r, the UCI cannot be transmitted with the maximum code rate r or less using the P PRBs. If the P value cannot be increased any more (in case of exceeding the maximum number of PRBs available in PUCCH format 3), the UE should not transmit some or all of the multiplexed UCI.

Assume separate coding, and assume that the new PUCCH resource is configured with the maximum code rate r_low of low priority and the maximum code rate r_high of high priority. Assumed that the selected PUCCH resource is PUCCH format 3. In this case, according to an embodiment of the present invention, a method of determining the number of PRBs to be used for the selected PUCCH resource is as follows.

(First method) First, the UE determines P_high, which is the number of PRBs for transmitting HP UCI. P_high can be selected as the smallest value among P values that satisfy the following equation. Here, the P value is one value of {1,2,3,4,5,6,8,9,10,12,15,16}.

$$B\_high \leq P*N\_nonDMRS*N\_sc*Q*r\_high$$

If there is no value that satisfies the above equation, the UE cannot transmit HP UCI through the selected new PUCCH resource. In this case, LP UCI cannot be multiplexed as a matter of course.

Therefore, assume that a value that satisfies the above equation exists. Now, P_low, which is the number of PRBs for transmitting LP UCI, is determined. P_low can be selected as the smallest value among P values that satisfy the following two equations. Here, the P value is one value of {1,2,3,4,5,6,8,9,10,12,15,16}.

$$B\_low \leq P*N\_nonDMRS*N\_sc*Q*r\_low \quad \text{(Equation 1)}$$

and $$P\_high+P \in \{1,2,3,4,5,6,8,9,10,12,15,16\} \quad \text{(Equation 2)}$$

If the P value that satisfies the above two equations is not found, the UE can find a P value based on the B_low value obtained by excluding some types of UCIs among LP UCI. In this case, as the type of UCI to be excluded, CSI part 2 may be excluded first, and then CSI part 1 may be excluded.

If the P value that satisfies the above two equations is not found even if all types of UCI are excluded, the UE may not multiplex the LP UCI.

If the P value that satisfies the two equations is found, Plow is determined from the P value. Therefore, the UE can multiplex the HP UCI and the LP UCI (unexcluded UCI) and transmit the multiplexed UCI using (P_total=P_high+P_low) PRBs through the PUCCH format 3.

In the first method, the UE selects P_low and P_high values from one value of {1,2,3,4,5,6,8,9,10,12,15,16}. Also, a (P_low+P_high) value is selected to satisfy one value of {1,2,3,4,5,6,8,9,10,12,15,16}. However, the P_low and P high values do not need to be limited to one value of {1,2,3,4,5,6,8,9,10,12,15,16}. Therefore, in the second method, this limitation can be relaxed.

(Second method) First, the UE determines P_high, which is the number of PRBs for transmitting HP UCI. P_high can be selected as the smallest value among P values that satisfy the following equation. Here, the P value is one value of {1,2,3,4,5,6,7,8,9,10,11,12,13,14,15,16}.

$$B\_high \leq P*N\_nonDMRS*N\_sc*Q*r\_high$$

If there is no value that satisfies the above equation, the UE cannot transmit HP UCI through the selected new PUCCH resource. In this case, LP UCI cannot be multiplexed as a matter of course.

Therefore, assume that a value that satisfies the above equation exists. Now, P_low, which is the number of PRBs for transmitting LP UCI, is determined. P_low can be selected as the smallest value among P values that satisfy the following two equations. Here, the P value is one value of {1,2,3,4,5,6,7,8,9,10,11,12,13,14,15,16}

$$B\_low \leq P*N\_nonDMRS*N\_sc*Q*r\_low \quad \text{(Equation 3)}$$

and $$P\_high+P \in \{1,2,3,4,5,6,8,9,10,12,15,16\} \quad \text{(Equation 4)}$$

If there is no P value that satisfies the above two equations, the UE can obtain a P value based on the B_low value obtained by excluding some types of UCI among LP UCI. In this case, as the type of UCI to be excluded, CSI part 2 may be excluded first, and then CSI part 1 may be excluded.

If a P value that satisfies the above two equations is not found even if all types of UCI are excluded, the UE may not multiplex the LP UCI.

If the P value that satisfies the two equations is found, Plow is determined from the P value. Therefore, the UE can multiplex the HP UCI and the LP UCI (unexcluded UCI) and transmit the multiplexed UCI using (P_total=P_high+P_low) PRBs through PUCCH format 3.

In the second method, P_high+P_low satisfies {1,2,3,4,5,6,8,9,10,12,15,16}. However, a problem in which an unwanted PRB is added to P_low may occur. For example, assume P_high=4 and assume that the P value that satisfies Equation 3 is 3. In this case, the P value is the minimum number of PRBs for transmitting the LP UCI having B_low length. However, according to Equation 4, P_low=4 is determined. Therefore, the PRB may be added to P_low. It is more preferable to use the added PRB to transmit HP UCI rather than to transmit LP UCI. A third method for this is as follows.

(Third method) First, the UE determines P_high_temp, which is the temporary number of PRBs for transmitting HP UCI.) P_high_temp can be selected as the smallest value among P values that satisfy the following equation. Here, the P value is one value of {1,2,3,4,5,6,7,8,9,10,11,12,13,14,15,16}

$$B\_high \le P*N\_nonDMRS*N\_sc*Q*r\_high$$

If there is no value that satisfies the above equation, the UE cannot transmit HP UCI through the selected new PUCCH resource. In this case, LP UCI cannot be multiplexed as a matter of course.

Therefore, assume that a value that satisfies the above equation exists. Now, P_low, which is the number of PRBs for transmitting LP UCI, P_low, is determined. P_low can be selected as the smallest value among P values that satisfy the following two equations. Here, the P value is one value of {1,2,3,4,5,6,7,8,9,10,11,12,13,14,15,16}

$$B\_low \le P*N\_nonDMRS*N\_sc*Q*r\_low \quad \text{(Equation 5)}$$

and $$P\_high\_temp+P \in \{1,2,3,4,5,6,7,8,9,10,11,12,13,14, 15,16\} \quad \text{(Equation 6)}$$

If there is no P value that satisfies the above two equations, the UE can find the P value based on the B_low value obtained by excluding some types of UCI among LP UCI. In this case, as the type of UCI to be excluded, CSI part 2 may be excluded first, and then CSI part 1 may be excluded.

If a P value that satisfies the above two equations is not found even if all types of UCI are excluded, the UE may not multiplex the LP UCI.

If the P value that satisfies the two equations is found, Plow is determined from the P value.

Based on the P_low and P_high_temp, the number of PRBs for transmitting HP UCI, hereinafter P_high, is determined. P_high is the smallest value among P values that satisfy the following equation.

$$P+P\_low \in \{1,2,3,4,5,6,8,9,10,12,15,16\} \quad \text{(Equation 7)}$$

and $$P \ge P\_high\_temp \quad \text{(Equation 8)}$$

Therefore, the UE can multiplex HP UCI and LP UCI (unexcluded UCI) and transmit the multiplexed UCI using (P_total=P_high+P_low) PRBs through the PUCCH format 3.

In the first method, the second method, or the third method, the HP UCI may occupy P_high PRBs and the LP UCI may occupy Plow PRBs. Here, P_high PRBs may be selected from the lowest PRBs of PUCCH format 3, and, as the LP UCIs, P_low LP UCIs after P_high from the lowest PRB of PUCCH format 3 may be selected.

Figure 19:
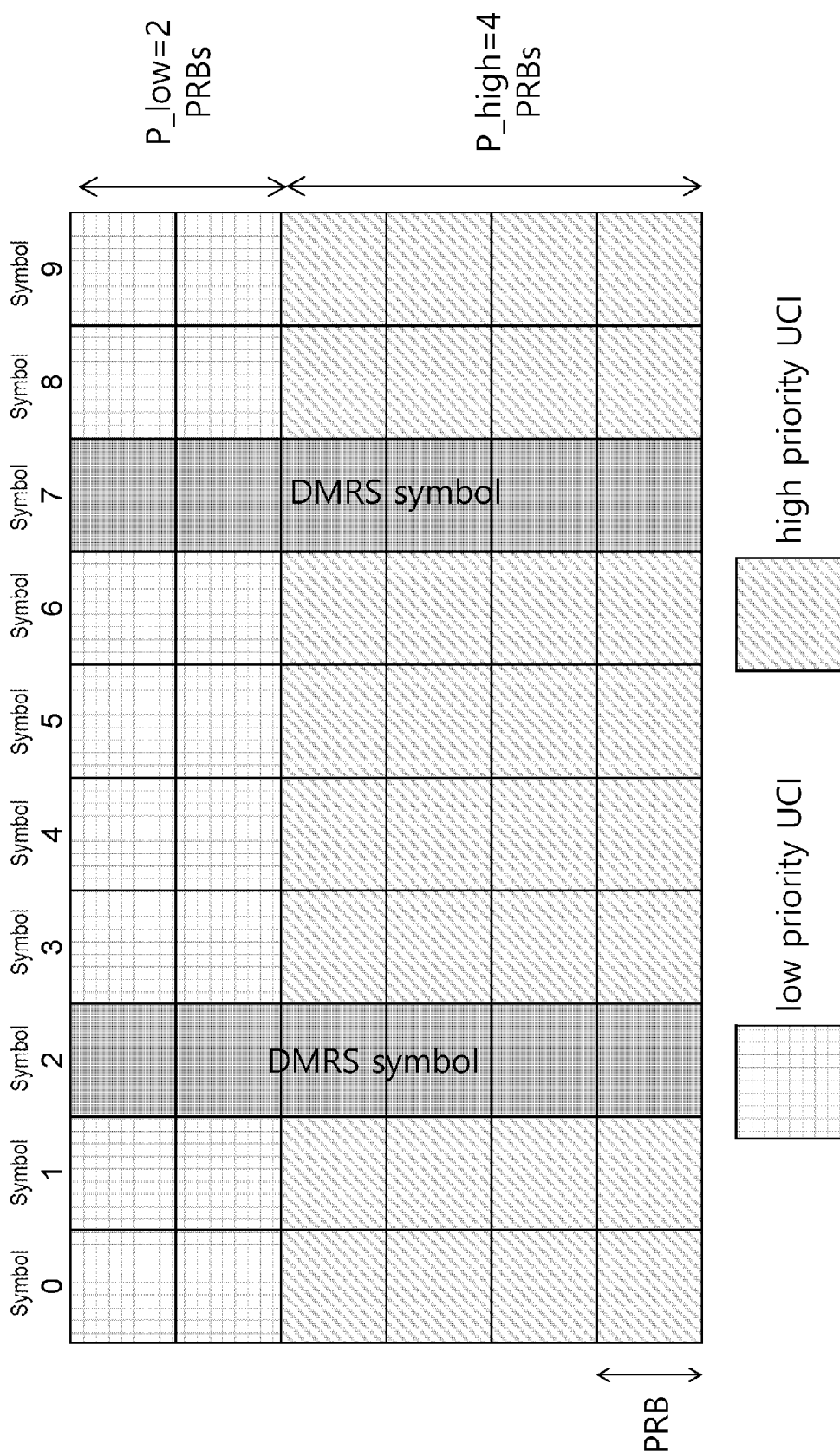
FIG. 19 illustrates a method of selecting a resource for transmitting a multiplexed UCI according to an embodiment.

FIG. 19 illustrates a method of selecting a resource for transmitting a multiplexed UCI according to an embodiment.

Referring to FIG. 19, the UE transmits HP UCI and LP UCI through PUCCH format 3. In this case, P_high=4 and P_low=2. Accordingly, the UE may transmit HP UCI using 4 PRBs starting from the lowest PRB and transmit LP UCI using the next 2 PRBs among a total of 6 PRBs of PUCCH format 3.

In the first method, the second method, or the third method, the number of PRBs occupied by the UCI of each priority is determined. And the HP UCI and the LP UCI were mapped to different PRBs. This can be replaced by determining the number of subcarriers in a fourth method.

(Fourth method) The UE determines the number of subcarriers for transmitting the HP UCI, hereinafter S_high. S_high may be selected as the smallest value among S values that satisfy the following equation. Here, S value is one value of {1,2, . . . ,16*N_sc}.

$$B\_high \le S*N\_nonDMRS*Q*r\_high$$

If there is no value that satisfies the above equation, the UE cannot transmit the HP UCI through the selected new PUCCH resource. In this case, the LP UCI cannot be multiplexed as a matter of course.

Therefore, assume that a value that satisfies the above equation exists. Now, the number of subcarriers for transmitting the LP UCI, hereinafter S_low, is determined. S_low can be selected as the smallest value among S values that satisfy the following two equations. Here, the S value is one value of {1,2, . . . ,16*N_sc}.

$$B\_low \le S*N\_nonDMRS*Q*r\_low \quad \text{(Equation 9)}$$

and $$(S\_high+S)/N\_sc \in \{1,2,3,4,5,6,7,8,9,10,11,12,13,14, 15,16\} \quad \text{(Equation 10)}$$

If an S value that satisfies the above two equations is not found, the UE can find the S value based on the B_low value obtained by excluding some types of UCI among LP UCI. In this case, as the type of UCI to be excluded, CSI part 2 may be excluded first, and then CSI part 1 may be excluded.

If the S value that satisfies the above two equations is not found even if all types of UCI are excluded, the UE may not multiplex the LP UCI.

If there is the S value that satisfies the two equations, S_low is determined from the S value. Therefore, the UE can multiplex the HP UCI and the LP UCI (unexcluded UCI) and transmit the multiplexed UCI using (S_high+S_low)N_sc) PRBs through PUCCH format 3.

Similar to the third method, in the fourth method, extra REs may be used for HP UCI transmission.

(Fifth method) The UE determines the temporary number of subcarriers for transmitting HP UCI, hereinafter S_high_temp. S_high_temp may be selected as the smallest value among S values that satisfy the following equation. Here, S value is one value of {1,2, . . . ,16*N_sc}.

$$B\_high \le S*N\_nonDMRS*Q*r\_high$$

If there is no value that satisfies the above equation, the UE cannot transmit the HP UCI through the selected new PUCCH resource. In this case, the LP UCI cannot be multiplexed as a matter of course.

Therefore, assume that a value that satisfies the above equation exists. Now, the number of subcarriers for transmitting the LP UCI, hereinafter S_low, is determined. S_low can be selected as the smallest value among S values that satisfy the following two equations. Here, the S value is one value of {1,2, . . . ,16*N_sc}.

$$B\_low \leq S*N\_nonDMRS*Q*r\_low \quad \text{(Equation 11)}$$

and $$(S\_high\_temp+S)/N\_sc \in \{1,2,3,4,5,6,8,9,10,12,15,16\} \quad \text{(Equation 12)}$$

If there is no S value that satisfies the above two equations, the UE can find the S value based on the B_low value obtained by excluding some types of UCI among LP UCI. In this case, as the type of UCI to be excluded, CSI part 2 may be excluded first, and then CSI part 1 may be excluded.

If an S value that satisfies the above two equations is not found even if all types of UCI are excluded, the UE may not multiplex the LP UCI.

If the S value that satisfies the two equations is found, S_low is determined from the S value.

Based on the S_low and S_high_temp, the number of subcarriers for transmitting HP UCI, hereinafter S_high, is determined. S_high is the smallest value among S values that satisfy the following equation.

$$(S+S\_low)/N\_sc \in \{1,2,3,4,5,6,8,9,10,12,15,16\} \quad \text{(Equation 13)}$$

and $$S \geq S\_high\_temp \quad \text{(Equation 14)}$$

Therefore, the UE can multiplex HP UCI and LP UCI (unexcluded UCI) and transmit the multiplexed UCI using (S_high+S_low) subcarriers through PUCCH format 3.

In the fourth method or the fifth method, the HP UCI may occupy S_high subcarriers, and the LP UCI may occupy S_low subcarriers. Here, the S_high subcarriers may be selected from the lowest subcarriers of the lowest PRBs of PUCCH format 3, and as the LP UCI, S_low LP UCIs after S_high from the lowest subcarriers of the lowest PRBs of PUCCH format 3 may be selected.

Figure 20:
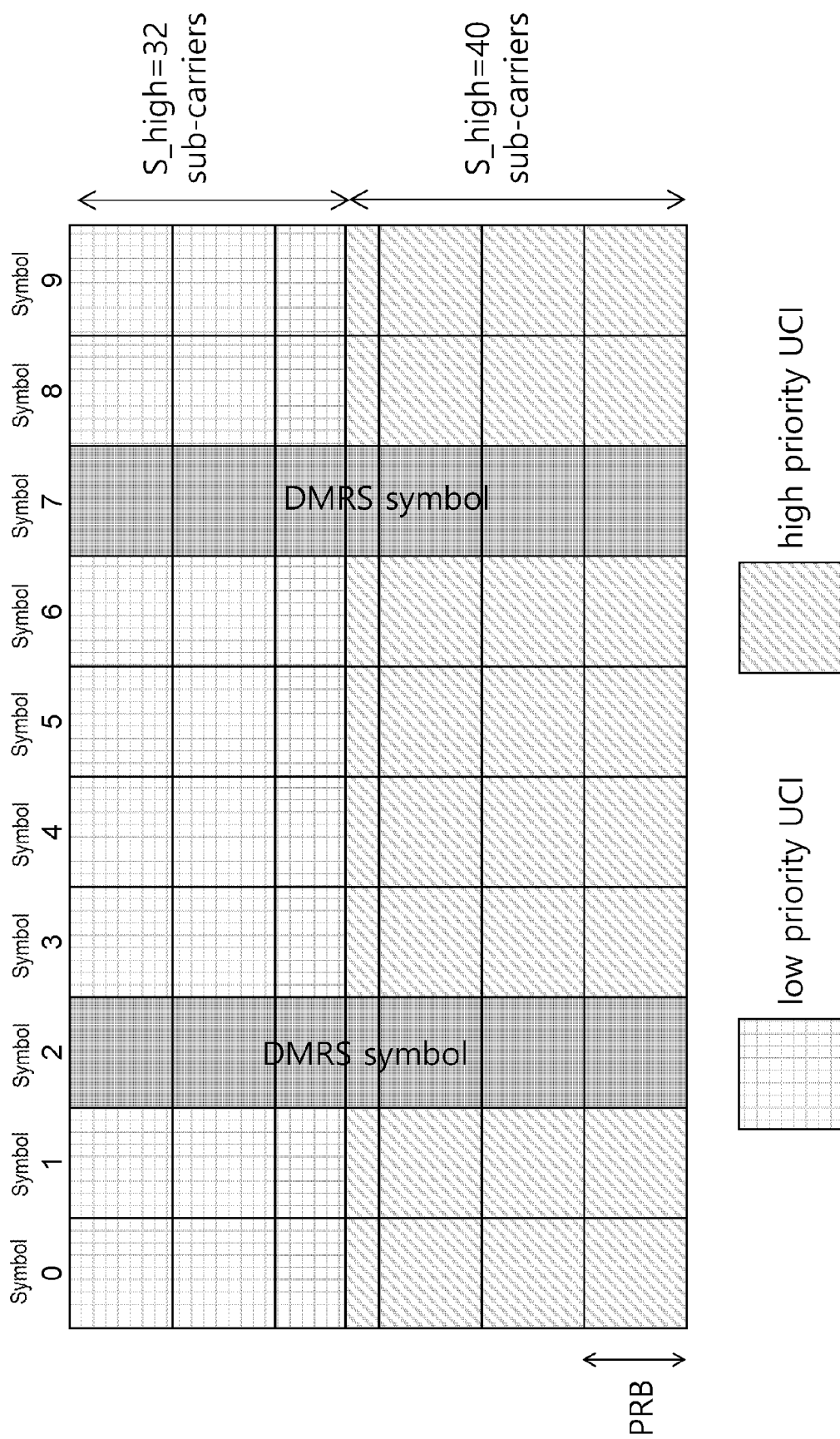
FIG. 20 illustrates a method of selecting a resource for transmitting a multiplexed UCI according to another embodiment.

FIG. 20 illustrates a method of selecting a resource for transmitting a multiplexed UCI according to another embodiment.

Referring to FIG. 20, the UE transmits HP UCI and LP UCI through PUCCH format 3. In this case, the UE has S_high=40 and S_low=32. Accordingly, the UE may transmit HP UCI using 40 subcarriers starting from the lowest subcarrier of the lowest PRB among a total of 6 PRBs of PUCCH format 3, and transmit LP UCI using the next 32 subcarriers.

In the first to fifth methods, UCIs having different priorities are split-mapped and transmitted on the frequency domain through the selected PUCCH resource. This method may be referred to as a frequency division multiplexed (FDMed) PUCCH structure.

As another method, a time division multiplexed (TDMed) PUCCH structure may also be possible. Here, in the TDMed PUCCH structure, HP UCI may be transmitted in some symbols by dividing the selected PUCCH resource in a time domain, and LP UCI may be transmitted in some remaining symbols. This may be designed by substituting the PRB or subcarrier mentioned in the first to fifth methods with a symbol that is a unit of time. A more specific method is as follows.

(Sixth method) It is assumed that the number of PRBs to be used for the PUCCH format, P_total, is determined. For example, in the case of PUCCH format 4, the number of PRBs is fixed to one. In the case of PUCCH format 2 or PUCCH format 3, it may be assumed that the number of PRBs is determined as P_total=P_high+P_low using the first to fifth methods.

First, the UE determines the number of symbols for transmitting HP UCI, hereinafter N_high. N_high can be selected as the smallest value of N values that satisfies the following equation. Here, N value is one value of $\{1,2,\ldots,N\_nonDMRS\}$.

$$B\_high \leq P\_total*N*N\_sc*Q*r\_high$$

If there is no value that satisfies the above equation, the UE cannot transmit the HP UCI through the selected new PUCCH resource. In this case, the LP UCI cannot be multiplexed as a matter of course.

Therefore, assume that a value that satisfies the above equation exists. Now, the UE determines the number of symbols for transmitting the LP UCI, hereinafter N_low. N_low=N_nonDMRS−N_high. That is, symbols other than the symbols used for HP UCI transmission can be used for low priority UCI transmission. If B_low does not satisfy the following equation, $$B\_low \leq P\_total*N\_low*N\_sc*Q*r\_low$$

The UE may obtain a B_low value obtained by excluding some types of UCIs among LP UCI. In this case, as the type of UCI to be excluded, CSI part 2 may be excluded first, and then CSI part 1 may be excluded.

Through the above equation, the HP UCI may be transmitted using the first symbol set (N_high symbols), and the LP UCI may be transmitted using the second symbol set (N_low symbols). A method of determining the first symbol set and the second symbol set in the PUCCH format is as follows.

(Method 6-1) The UE may select N_high symbols (non-DMRS symbols) preceding in time in the PUCCH format to set the N_high symbols as the first symbol set, and select N_low symbols (non-DMRS symbols) later in time to set the N_low symbols as the second symbol set. In this method, the HP UCI can be quickly transmitted by placing the HP UCI in a symbol as far ahead in time as possible.

For example, referring to Table 4, if the PUCCH format occupies 10 symbols and symbol 2 and symbol 7 are DMRS symbols, the first N_high symbols of the sequence of symbols 0, 1, 3, 4, 5, 6, 8, and 9 can be selected.

TABLE 4

|  | symbol 0 | symbol 1 | symbol 2DM-RS | symbol 3 | symbol 4 | symbol 5 | symbol 6 | symbol 7DM-RS | symbol 8 | symbol 9 |
| --- | --- | --- | --- | --- | --- | --- | --- | --- | --- | --- |
| Method 6-1 | 1 | 2 | X | 3 | 4 | 5 | 6 | X | 7 | 8 |
| Method 6-2 | 5 | 1 | X | 2 | 6 | 7 | 3 | X | 4 | 8 |
| Method 6-3 | 3 | 1 | X | 2 | 4 | (last assumed) 5 | — | X | — | — |

(Method 6-2) The UE may select N_high symbols (non-DMRS symbols) closest to the DMRS symbol in the PUCCH format and sets the N_high symbols as the first symbol set, and select remaining N_low symbols (non-DMRS symbols) distant from the DMRS symbols and sets the N_low symbols as the second symbol set. Here, the adjacency with the DMRS symbol can be determined as follows. The smaller the number of symbols between a certain symbol and the nearest DMRS symbol, the more adjacent the DMRS symbol is. If symbols are equally adjacent to the DMRS symbol, a symbol preceding in time may be preferentially included in the first symbol set. Referring to Table 4 again, when the PUCCH format occupies 10 symbols and symbols 2 and 7 are DMRS symbols, the most adjacent symbols (symbols with zero symbol spacing to the closest DMRS symbol) are symbols 1, 3, 6, and 8. And the next adjacent symbols (symbols with one symbol spacing to the closest DMRS symbol) are symbols 0, 4, 5, and 9. When determining the first symbol set, the first N_high symbols of the sequence of symbols 1, 3, 6, 8, 0, 4, 5, and 9 can be selected. For example, when 5 symbols are selected as the first symbol set, symbols 1, 3, 6, 8, and 0 may be selected. This is illustrated in FIG. 21.

Figure 21:
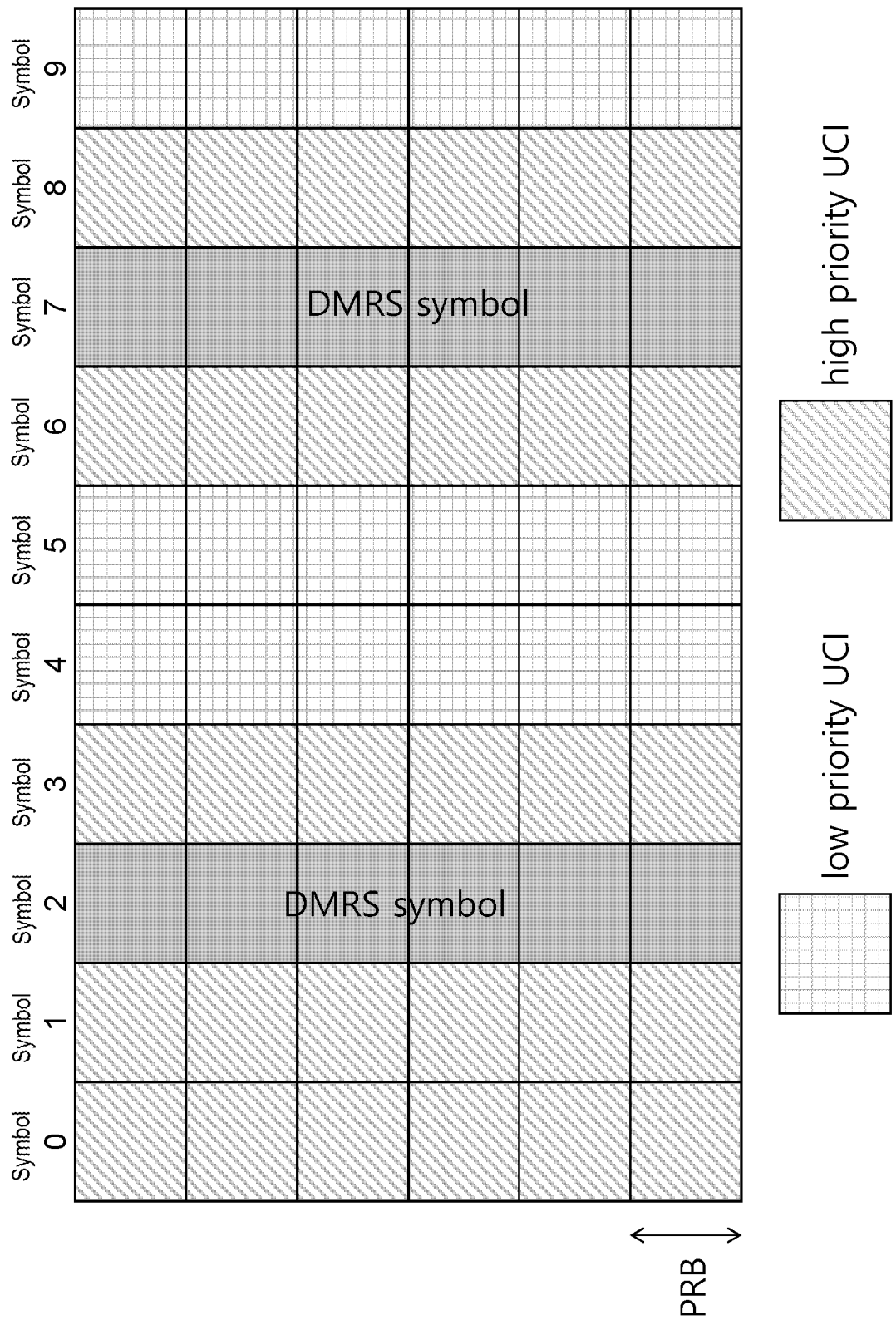
FIG. 21 illustrates a method of selecting a resource for transmitting a multiplexed UCI according to another embodiment.

FIG. 21 illustrates a method of selecting a resource for transmitting a multiplexed UCI according to another embodiment.

Referring to FIG. 21, it can be seen that the HP UCI is adjacent to the DMRS symbol.

In the method 6-2, compared to the method 6-1, delay may occur because the HP UCI is disposed in a later symbol (e.g., symbol 6 or 8) in time. The methods for solving this problem are as follows.

(Method 6-3) The UE may determine the maximum delayable symbol, and may select N_high symbols from previous symbols including the symbol.

For example, in Table 4, symbol 5 may be determined as the maximum delayable symbol. Accordingly, the UE should select N_high symbols from among symbols 0, 1, 2, 3, 4, and 5 to determine the first symbol set. The method 6-2 may be used as a method of selecting N_high symbols from among symbols 0, 1, 2, 3, 4, and 5. That is, a symbol adjacent to the DMRS symbol may be preferentially selected.

The time division multiplexed (TDMed) PUCCH structure has been described through the sixth method. Furthermore, time division multiplexing and frequency division multiplexing can be simultaneously supported. For example, in the sixth method, UCIs having two priorities in one symbol may be mapped to different frequency resources (e.g., different PRBs or different subcarriers). Specifically, this is as follows.

(Seventh method) It is assumed that the number of PRBs to be used for the PUCCH format, hereinafter P_total, is determined. For example, in the case of PUCCH format 4, the number of PRBs is fixed to one. In the case of PUCCH format 2 or PUCCH format 3, it may be assumed that the number of PRBs is determined as P_total=P_high+P_low using the first to fifth methods.

First, the UE determines the number of REs for transmitting HP UCI, hereinafter RE high. RE high may be selected as the smallest value among RE values that satisfy the following equation. Here, the RE value is one value of {1,2, ..., P_total*N_nonDMRS*N_sc}.

$$B\_high \leq N\_RE * Q * r\_high$$

If there is no value that satisfies the above equation, the UE cannot transmit the HP UCI through the selected new PUCCH resource. In this case, the LP UCI cannot be multiplexed as a matter of course.

Therefore, assume that a value that satisfies the above equation exists. Now, the number of REs for transmitting LP UCI, hereinafter RE_low, is determined. RE_low=P_total*N_nonDMRS*N_sc-RE_high. That is, the REs other than the REs used for HP UCI transmission can be used for low priority UCI. If B_low does not satisfy the following expression, $$B\_low \leq RE\_low * Q * r\_low$$

The UE may obtain a B_low value obtained by excluding some types of UCIs among LP UCI. In this case, as the type of UCI to be excluded, CSI part 2 may be excluded first, and then CSI part 1 may be excluded.

Through the above equation, HP UCI may be transmitted using the first RE set (RE_high symbols), and LP UCI may be transmitted using the second RE set (RE_low symbols). A method of determining the first RE set and the second symbol RE in PUCCH format is as follows.

The floor (RE_high/(P_total*N_sc)) symbol is a symbol to which only the HP UCI is mapped.

If RE_high/(P_total*N_sc) is not divisible, the HP UCI is mapped to (RE_high−floor (RE_high/(P_total*N_sc))* (P_total*N_sc)) REs in one symbol, and the LP UCI is mapped to the remaining REs of the symbol. Only the LP UCI is mapped to the remaining symbols.

Figure 22:
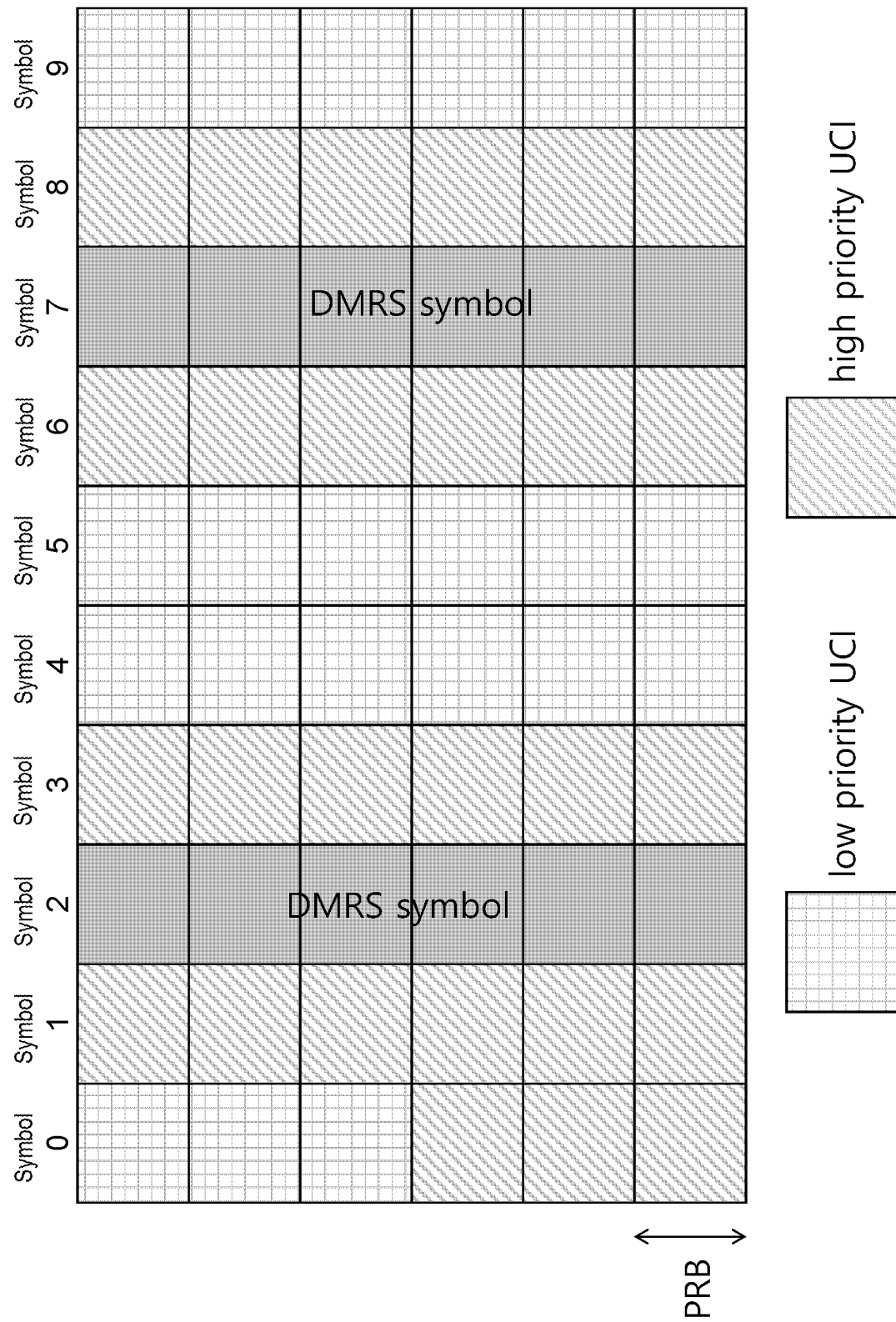
FIG. 22 illustrates a method of selecting a resource for transmitting a multiplexed UCI according to another embodiment.

FIG. 22 illustrates a method of selecting a resource for transmitting a multiplexed UCI according to another embodiment. FIG. 22 shows an example in which RE_high=324 and RE_low=252.

Referring to FIG. 22, P_total=6, and only the HP UCI is to mapped to symbols that are floor (RE_high/ (P_total*N_sc))=floor (324/(6*12))=4 symbols. In FIG. 22, symbols 1, 3, 6, and 8 correspond to these symbols.

RE_high/(P_total*N_sc) is not divisible, and thus the HP UCI is mapped to RE_high−floor(RE_high/ (P_total*N_sc))*(P_total*N_sc)=324−floor(324/(6*12))* (6*12)=36 REs in one symbol (symbol 0), and LP UCI is mapped to the remaining 36 REs of the symbol.

Only the LP UCI is mapped to the remaining symbols (symbols 4, 5, and 9).

In the description above, description is made based mainly on PUCCH format 3, but the method can be equally applied on PUCCH formats 2 and 4. If the above method is applied in PUCCH format 2, N_sc=8.

The UE can selectively use the TDMed PUCCH structure and the FDMed PUCCH structure described above.

As an example, the TDMed PUCCH structure and the FDMed PUCCH structure may be selectively used according to the PUCCH format used by the UE. In PUCCH format 2, since the number of symbols is 2 symbols or less, the FDMed PUCCH structure can be used. In PUCCH format 3, since the number of symbols is 4 symbols or more, a TDMed PUCCH structure can be used. Even in PUCCH format 4, since the number of symbols is 4 symbols or more, the TDMed PUCCH structure can be used.

As another example, the TDMed PUCCH structure and the FDMed PUCCH structure may be selectively used according to the number of PUCCH symbols used by the UE. For example, if the number of PUCCH symbols transmitted by the UE is greater than a certain number, the TDMed PUCCH structure may be used, and if the number of PUCCH symbols to be transmitted by the UE is equal to or smaller than a predetermined number, the FDMed PUCCH structure may be used. For example, when the predetermined number is 6, if the number of symbols of PUCCH format 3 or PUCCH format 4 is greater than 6, the TDMed PUCCH structure may be used, and if the number of symbols is 6 or less, the FDMed PUCCH structure may be used.

III. Transmission Method of Multiplexed UCI Based on PUCCH Format 2

In the case of PUCCH format 2, some REs among symbols with which PUCCH is transmitted are used as DMRS, and the remaining REs are used to transmit UCI. When the FDMed PUCCH structure is described in PUCCH format 3 above, symbols for transmitting DMRS and symbols for transmitting UCI in PUCCH are not the same. However, in the case of PUCCH format 2, since symbols for transmitting DMRS and symbols for transmitting UCI are the same, an additional description of the FDMed PUCCH structure is required. Here, the FDMed PUCCH structure for the case of PUCCH format 2 will be further described.

First, the structure of PUCCH format 2 is as follows. PUCCH format 2 may occupy one symbol or two consecutive symbols. PUCCH format 2 can occupy 1 RB to a maximum of 16 consecutive RBs. In PUCCH format 2, REs for transmitting DMRS within one RB may be placed at 3 subcarrier spacings. More specifically, indexes of REs used for DMRS transmission are as follows.

$$k=3*m+1$$

Here, k is a value determined from the lowest subcarrier (subcarrier index 0) of a common resource block (RB). Accordingly, 4 REs among 12 REs in one RB may be used for DMRS and the remaining 8 REs may be used for UCI. Accordingly, in the case of PUCCH format 2 in the above description, N_sc=8 may be used.

The UE can calculate the number of REs required for the high priority UCI and the number of REs required for the low priority UCI using N_sc=8 in the above embodiment and method. Here, a method of placing the REs in PUCCH format 2 will be described.

For reference, assume that a length of an HP UCI bit sequence to be transmitted by the UE in PUCCH format 2 is A bits, and a length of a LP UCI bit sequence is B bits. Here, assume that the number of REs used for UCI transmission in PUCCH format 2 is N_sc*N_PRB. Here, N_sc is the number of REs used for UCI transmission in one PRB, where N_sc=8, and N_PRB is the number of PRBs on which PUCCH format 2 is transmitted. For reference, since QPSK is used for transmission in PUCCH format 2, A is a multiple of 2. If A is not a multiple of 2, it is possible to make A a multiple of 2 by inserting a '0' at the end of A in order to make A a multiple of 2. In this case, B may be equal to a length obtained by subtracting A from 2*(N_sc*N_PRB), which is the number of bits that can be transmitted in PUCCH format 2. That is, B=2*(N_sc*N_PRB)−A.

According to the present invention, the FDMed PUCCH structure of PUCCH format 2 is as follows.

The first structure is a localized structure. In this method, HP UCIs and LP UCIs may be placed by being limited to a specific frequency band. More specifically, assume PUCCH format 2 of one symbol. Assume that there are N_RE REs, that are capable of being used for transmitting UCIs, in this PUCCH format 2. The UE may index N_RE REs, that are capable of being used for transmitting UCIs, of PUCCH format 2 from the lowest frequency. Here, the index is 0 (the lowest frequency RE) to N_RE−1 (the highest frequency RE). The UE may place UCIs of one priority starting from the lowest frequency RE. For example, HP UCIs may be placed starting from the lowest frequency REs. As a result, HP UCIs may be placed in REs corresponding to indexes 0, 1, . . . , N_high−1. Here, N_high is the number of REs required to place the HP UCIs. Then, HP UCIs may be placed in REs corresponding to indexes N_high, N_high+1, . . . , N_RE−1.

The second structure may be a distributed structure. In this method, HP UCIs and LP UCIs may be distributed and placed in a frequency band occupied by PUCCH format 2. Specific placements be determined according to the following embodiments.

Figure 23:
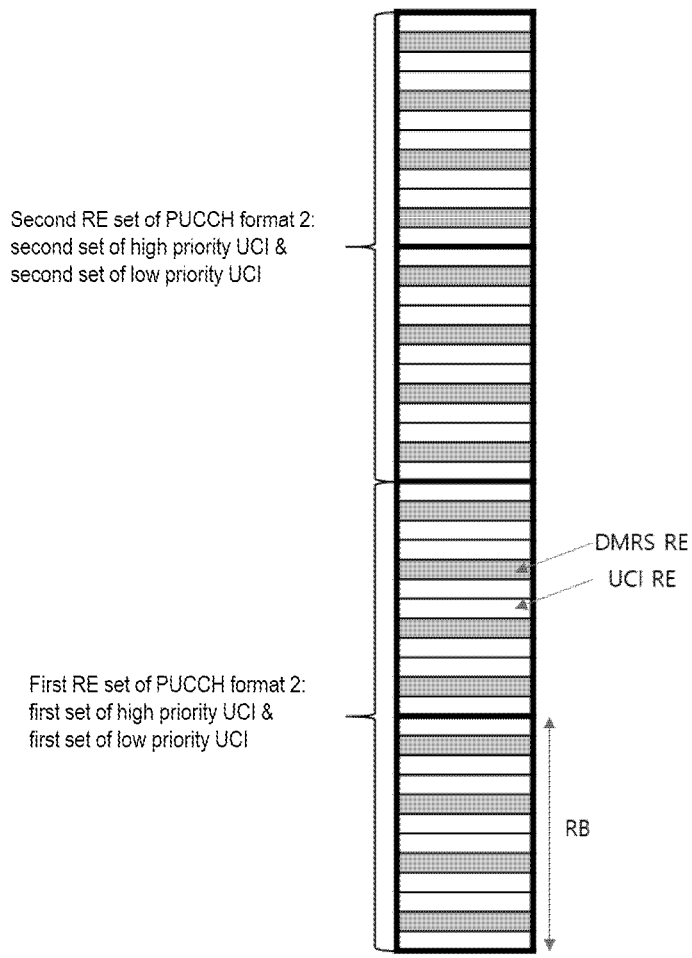
FIG. 23 illustrates a method of selecting a resource for transmitting a multiplexed UCI according to another embodiment.

FIG. 23 illustrates a method of selecting a resource for transmitting a multiplexed UCI according to another embodiment. This is a first embodiment of the distributed structure.

Referring to FIG. 23, the frequency band of PUCCH format 2 may be divided into a first frequency band and a second frequency band, LP UCI may be divided into a first LP UCI and a second LP UCI, and HP UCI may be divided into a first HP UCI and a second HP UCI. The UE may place the first LP UCI and the first HP UCI in the first frequency band and the second LP UCI and the second LP UCI in the second frequency band.

Assume that there are N_RE REs capable of being used for transmitting UCIs in PUCCH format 2. The UE may index N_RE Res, which are capable of being used for transmitting UCIs, of PUCCH format 2 from the lowest frequency. Here, the indexes are 0 (the lowest frequency RE) to N_RE−1 (the highest frequency RE). N_RE Res, which are capable of being used for transmitting UCIs, of PUCCH format 2 may be divided into two. A first RE set may include N_RE1 REs, and a second RE set may include N_RE2 REs. Here, N_RE1+N_RE2=N_RE. Also, the REs of the first set and the REs of the second set may be grouped to be localized. That is, N_RE1 REs of the first set may be grouped into REs corresponding to indexes 0, 1, . . . , N_RE1−1, and N_RE2 REs of the second set may be grouped into the remaining REs. Here, N_RE1=f(N_RE/2) may be determined. Here, f(x) may be at least one of ceil(x), floor(x), and round(x). Assume that N_high is the number of REs required for high priority UCI, and N_low be the number of REs required for low priority UCI. A first set of high priority UCIs may include N_high1 REs, and a second set of high priority UCIs may include N_high2 REs. Here, N_high1+N_high2=N_high. A first set of low priority UCIs may include N_low1 REs, and a second set of low priority UCIs may include N_low2 REs. Here, N_low1+N_low2=N_low. The UE may place the REs of the first set of high priority UCIs and the REs of the first set of low priority UCIs in the first RE set of the PUCCH. That is, N_RE1=N_high1+N_low1. The UE may place the REs of the second set of high priority UCIs and the REs of the second set of low priority UCIs in the second RE set of the PUCCH. That is, N_RE2=N_high2+N_low2.

Figure 24:
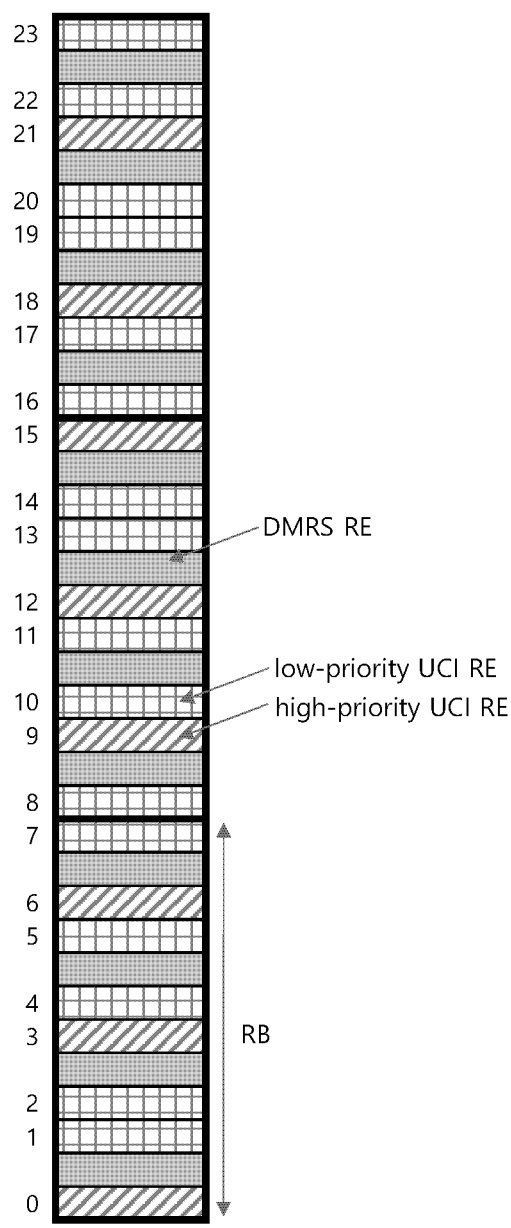
FIG. 24 illustrates a method of selecting a resource for transmitting a multiplexed UCI according to another embodiment.

FIG. 24 illustrates a method of selecting a resource for transmitting a multiplexed UCI according to another embodiment. This is a second embodiment of the distributed structure.

Referring to FIG. 24, HP UCIs may be distributed at equal spacings in REs for transmitting UCIs of PUCCH format 2. In addition, LP UCIs may be placed in the remaining REs of PUCCH format 2.

Assume that there are N_RE REs capable of being used for transmitting UCIs in PUCCH format 2. The UE may index N_RE Res, which are capable of being used for transmitting UCIs, of PUCCH format 2 from the lowest frequency. Here, the indexes are 0 (the lowest frequency RE) to N_RE−1 (the highest frequency RE). Assume that N_high is the number of REs required for high priority UCI, and N_low is the number of REs required for low priority UCI. The UE may calculate spacings for placing HP UCIs. For example, the spacing can be calculated as follows.

Spacing=$N\_RE/N\_high$

The UE may place the HP UCIs according to the Spacing. HP UCI can be place in REs whose index corresponds to 0, Spacing, 2*Spacing, . . . . If N_RE is 24 and N_high is 8, spacing is calculated as 3, and the UE can place the HP UCIs in REs corresponding to indexes 0, 3, 6, 9, 12, 15, 18, and 21. For reference, the start index is set to 0 here, but it may start with another index. For example, assuming that it starts with index i, the HP UCIs can be placed in REs corresponding to i, i+Spacing, i+2*Spacing, . . . . Here, values corresponding to i=0,1, . . . , and Spacing−1 are obtained. Preferably, i can be set to a value close to half of spacing. That is, i=f (Spacing/2) may be set. Here, f(x) may be one of ceil(x), floor(x), or round(x).

For reference, in the above example, N_RE/N_high may not be an integer. In this case, spacing may be determined as f(N_RE/N_high). Here, f(x) may be one of ceil(x), floor(x), or round(x). Preferably, it may be floor(x).

As a third embodiment of the distributed structure, the UE may first place the HP UCIs in the REs adjacent to the DMRS RE, and place the LP UCIs in the remaining REs less adjacent to the DMRS RE. Here, whether adjacency of one RE to the DMRS RE may be determined according to a subcarrier index difference with the nearest DMRS.

Assume that there are N_RE REs capable of being used for transmitting UCIs in PUCCH format 2. The UE may index N_RE Res, which are capable of being used for transmitting UCIs, of PUCCH format 2 from the lowest frequency. Here, the indexes are 0 (the lowest frequency RE) to N_RE−1 (the highest frequency RE). If the number of REs required for HP UCIs is N_high, the UE may select N_high REs most adjacent to the DMRS among the N_RE REs. And the remaining REs can be used for LP UCIs.

For reference, in the case of PUCCH format 2, it can be seen that all REs are adjacent to the DMRS RE. Accordingly, it can be seen that all REs are identically adjacent to the DMRS RE. The third embodiment is difficult to use in a structure in which DMRS is used every 3 REs like PUCCH format 2. The third embodiment is preferably used in a structure in which DMRS is used for every REs of which number is greater than 3.

Figure 25:
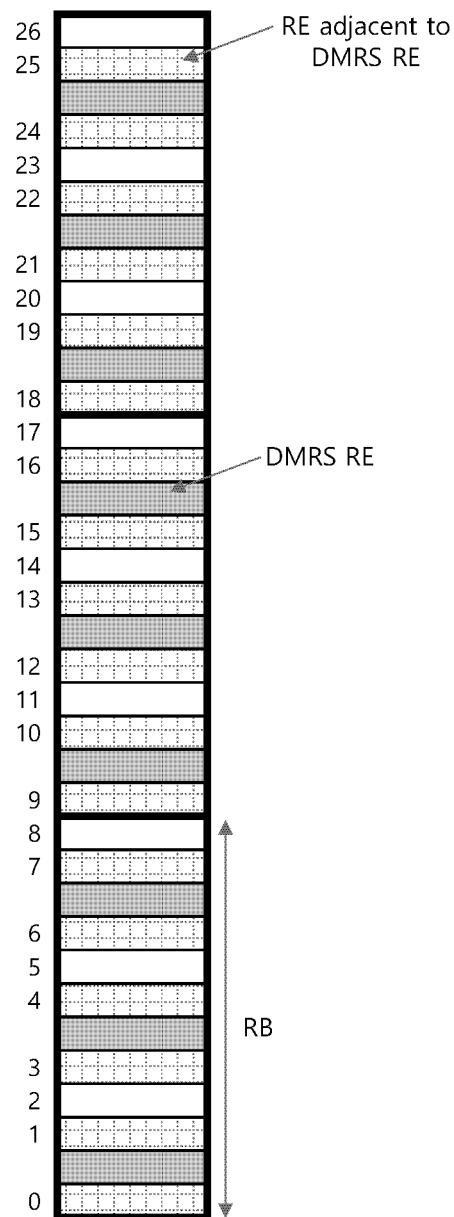
FIG. 25 illustrates a method of selecting a resource for transmitting a multiplexed UCI according to another embodiment.

FIG. 25 illustrates a method of selecting a resource for transmitting a multiplexed UCI according to another embodiment. This is the third embodiment of the distributed structure.

Referring to FIG. 25, DMRS is used for every four REs. In PUCCH, 27 REs can be used for UCI transmission. Here, REs with indexes of 0, 1, 3, 4, 6, 7, 9, 10, 12, 13, 15, 16, 18, 19, 21, 22, 24, and 25 are REs adjacent to the DMRSs. Accordingly, high priority REs may be preferentially placed in REs adjacent to the DMRSs.

As a fourth embodiment of the distributed structure, the UE may generate one UCI bit sequence by interleaving an HP UCI bit sequence and a LP UCI bit sequence, and then place the bit sequence in the REs of PUCCH format 2 and transmit the bit sequence. Here, the interleaving scheme may be determined according to at least one of the following.

As an example, the UE may interleave a first sequence and a second sequence using the following block interleaver. Here, the number of columns of the block interleaver may be equal to a length N1 of the first sequence, and the number of rows may be equal to (1+ceil (N2/N1)). The UE may sequentially insert the first sequence into a first row of the block interleaver. The UE can insert the first N1 pieces of the second sequence into a second row of the block interleaver in order. The UE can sequentially insert the next N1 pieces of the first sequence into a third row of the block interleaver. This process is repeated until all pieces of the second sequence are put into the block interleaver. If the number of pieces of second sequences to be inserted into one row is smaller than N1, the insufficient number of pieces of second sequence may be filled with 'NULL' to make A number of pieces of second sequence. For reference, the insufficient number of pieces of the sequence is ceil((N2/N1)*N1−N2).

The UE reads the contents filled in the block interleaver according to an index of row of a column with the lowest index and then increment the index of column to read the contents according to the index of row. In this case, 'NULL' can be ignored without reading. One sequence can be generated as a result of reading in this order.

For example, let the first sequence be x(0), x(1), . . . , x(7), and let the second sequence be y(0), y(1), . . . , y(11). Here, N1=8 and N2=12. The number of columns of the block interleaver is N1=8, and the number of rows is (1+ceil(N2/N1))=1+2=3. x(0), x(1), . . . , x(7) may be inserted into the first row. y(0), y(1), . . . , y(7) may be inserted into the second row. y(8), y(9), . . . y(11), 'NULL', 'NULL', 'NULL', 'NULL' may be inserted into the third row. Here, ceil(N2/N1)*N1−N2=16-12=4 'NULL's are added to the third row. Values inserted into the block interleaver can be checked in the following table.

TABLE 5

| x(0) | x(1) | x(2) | x(3) | x(4) | x(5) | x(6) | x(7) |
|---|---|---|---|---|---|---|---|
| y(0) | y(1) | y(2) | y(3) | y(4) | y(5) | y(6) | y(7) |
| y(8) | y(9) | y(10) | y(11) | 'NULL' | 'NULL' | 'NULL' | 'NULL' |

The UE reads the contents filled in the block interleaver according to the index of row of the column with the lowest index. The result is x(0), y(0), y(8). Then the index of column is incremented and the contents are read according to the index of row. The result is x(1), y(1), y(9). Then the index of column is incremented and the contents are read according to the index of row. The result is x(2), y(2), y(10). Then the index of column is incremented and the contents are read according to the index of row. The result is x(3), y(3), y(11). Then the index of column is incremented and the contents are read according to the index of row. The result is x(4), y(4). Here, 'NULL' is not read and ignored. Then the index of column is incremented and the contents are read according to the index of row. The result is x(5), y(5). Here, 'NULL' is not read and ignored. Then the index of column is incremented and the contents are read according to the index of row. The result is x(6), y(6). Here, 'NULL' is not read and ignored. Then the index of column is incremented and the contents are read according to the index of row. The result is x(7), y(7). Here, 'NULL' is not read and ignored. One sequence can be generated as a result of reading in this order. The one sequence is x(0), y(0), y(8), x(1), y(1), y(9), x(2), y(2), y(10), x (3), y(3), y(11), x(4), y(4), x(5), y(5), x(6), y(6), x(7), y (7). In a first method, the first sequence may be a high priority UCI bit sequence, and the second sequence may be a low priority UCI bit sequence. Accordingly, the number of columns of the block interleaver may be N1=A, and the number of rows may be 1+ceil(N2/N1)=1+ceil(B/A). Here, bits of the high priority UCI bit sequence or bits of the low priority UCI bit sequence may be inserted into the block interleaver.

In a second method, the first sequence may be a high priority UCI QPSK symbol sequence, and the second sequence may be a low priority UCI QPSK symbol sequence. Here, the high priority UCI QPSK symbol sequence is a sequence of QPSK symbols obtained by performing QPSK modulation of the high priority UCI bits sequence by grouping this sequence by 2 bits, and the low priority UCI QPSK symbol sequence is a sequence of QPSK symbols obtained by performing QPSK modulation of the low priority UCI bits sequence by grouping this sequence by 2 bits. Therefore, the number of columns of the block interleaver may be N1=A/2, and the number of rows may be 1+ceil(N2/N1)=1+ceil((B/2)/(A/2))=1+ceil(B/A). Here, QPSK symbols of the high priority UCI QPSK sequence or QPSK symbols of the low priority UCI QPSK symbol sequence may be inserted into the block interleaver.

In a third method, the first sequence may be a bit sequence having a shorter length of the high priority UCI bit sequence and the low priority UCI bit sequence, and the second sequence may be a bit sequence having a longer length of the high priority UCI bit sequence and the low priority UCI bit sequence. Therefore, the number of columns of the block interleaver may be N1=min{A,B}, and the number of rows may be 1+ceil(N2/N1)=1+ceil(max{A,B}/min{A,B}). Here, bits of the high priority UCI bit sequence or bits of the low priority UCI bit sequence may be inserted into the block interleaver.

In a fourth method, the first sequence may be a QPSK symbol sequence having a shorter length of the high priority UCI QPSK symbol sequence and the low priority UCI QPSK symbol sequence, and the second sequence may be a longer QPSK symbol sequence of the high priority UCI QPSK symbol sequence and the low priority UCI QPSK symbol sequence. Therefore, the number of columns of the block interleaver may be N1=min{A/2,B/2}, and the number of rows may be 1+ceil(N2/N1)=1+ceil(max{A/2,B/2}/min{A/2,B/2}). Here, QPSK symbols of the high priority UCI QPSK symbol sequence or QPSK symbols of the low priority UCI QPSK symbol sequence may be inserted into the block interleaver.

In a fifth method, the first sequence may be a high priority UCI bit sequence excluding the last bit from the high priority UCI bit sequence, and the second sequence may be a low priority UCI bit sequence. Therefore, the number of columns of the block interleaver may be N1=(A−1), and the number of rows may be 1+ceil(N2/N1)=1+ceil(B/(A−1)). Here, bits of the high priority UCI bit sequence or bits of the low priority UCI bit sequence may be inserted into the block interleaver. The last bit excluded above may be appended to the end of one UCI sequence obtained by the block interleaver.

In a sixth method, the first sequence may be a high priority UCI QPSK symbol sequence obtained by excluding the last QPSK symbol from the high priority UCI QPSK symbol sequence, and the second sequence may be the low priority UCI QPSK symbol sequence. Therefore, the number of columns of the block interleaver may be N1=A/2−1, and the number of rows may be 1+ceil(N2/N1)=1+ceil((B/2)/(A/2−1)). Here, QPSK symbols of the high priority UCI QPSK symbol sequence or QPSK symbols of the low priority UCI QPSK symbol sequence may be inserted into the block interleaver. The last QPSK symbol excluded above may be appended to the end of one UCI sequence obtained by the block interleaver.

In the first to sixth methods, the length of the row of the block interleaver is determined by the length of the first sequence. In the following method, the length of the row of the block interleaver may be a predetermined value. For example, the number of columns of the block interleaver may be M, which is a predetermined value. Also, the number of rows may be determined according to the length N1 of the first sequence and the length N2 of the second sequence. That is, the number of rows may be determined by ceil((N1+N2)/M). The UE may sequentially insert the first sequence and the second sequence into the block interleaver. Here, in the sequential insertion, a method of sequentially inserting M pieces of the first sequence and second sequence into the first row and then sequentially inserting M pieces of the first and second sequences into the second row is repeated. Here, if the number of pieces of the first sequence and second sequence to be inserted into the last row is smaller than M, 'NULL' may be inserted. Here, (ceil((N1+N2)/M)*M−(N1+N2)) 'NULL's may be inserted. This method of reading this block interleaver is the same as the first to sixth methods described above.

In a seventh method, M=N_sc=8, the first sequence may be the high priority QPKS symbol sequence, and the second sequence may be the low priority QPSK symbol sequence.

In an eighth method, M=N_PRB, and the first sequence may be the high priority QPKS symbol sequence, and the second sequence may be the low priority QPSK symbol sequence.

IV. Multiplexing and Resource Determination Method 2 in PUCCH Collision

This embodiment additionally discloses a method of selecting a PUCCH resource for transmitting a multiplexed UCI following "II. Multiplexing and resource determination method 1 in PUCCH collision.

The prioritization method of Rel-16 has been described with reference to FIG. 11. When PUCCH corresponding to a low priority is not transmitted, various problems occur, and a method of retransmitting the PUCCH has been disclosed in I. However, since the method according to I. uses the PDCCH, there is downlink control resource overhead.

The method of transmitting UCIs of LP PUCCH and HP PUCCH through one new PUCCH had been illustrated with reference to FIG. 13. Such a method is called a multiplexing method.

This embodiment discloses three embodiments of selecting a PUCCH resource for transmission of a multiplexed UCI.

(First embodiment) Referring to FIG. 13, the UE may select a new PUCCH resource as a PUCCH resource for multiplexing a PUCCH (LP-PUCCH) for transmitting LP UCI and a PUCCH (HP-PUCCH) for transmitting HP UCI. Here, the new PUCCH resource may be a PUCCH resource configured through an RRC signal different from an RRC signal for configuring a PUCCH for transmitting the LP UCI and an RRC signal for configuring a PUCCH for transmitting the HP UCI.

First, the base station may configure the new PUCCH resource to be used in multiplexing to the terminal. This may be configured through RRC signaling. The new PUCCH resource configured through the RRC signaling may include at least some of the following information.

PUCCH format, PUCCH start symbol index within a slot, PUCCH length, lowest PRB of PUCCH, maximum number of PRBs of PUCCH, cyclic shift value, and orthogonal covering code (OCC) value.

The above information is the same values as those configured when configuring the existing PUCCH (that is, PUCCH for transmitting UCI of the same priority). In addition, a new PUCCH to be used for multiplexing requires a maximum code rate of low priority and a maximum code rate of high priority in order to multiplex the LP UCI and the HP UCI. More specifically, if the base station performs separate coding on each of the LP UCI and the HP UCI to the UE, the UE needs the maximum code rate of low priority for the LP UCI and maximum code rate of high priority for the HP UCI. Here, performing the separate coding means that each UCI is subjected to separate coding and rate matching without being linked to each other.

A method of determining, by the UE, the maximum code rate of high priority and the maximum code rate of low priority is as follows.

(First method) The UE may receive the following configuration in a new PUCCH format from the base station.
one maximum code rate of low priority
one maximum code rate of high priority The UE may determine a new PUCCH resource for multiplexing LP UCI and HP UCI. The UE may determine the configured one maximum code rate of low priority and one maximum code rate of high priority configured in a format of the PUCCH resource. The UE may encode the LP UCI using the one maximum code rate of low priority. The UE may encode the HP UCI using the one maximum code rate of high priority. The UE may multiplex (multiplex) the encoded LP UCI and HP UCI and transmit the multiplexed UCI through the new PUCCH.

(Second method) The UE may receive the following configuration in a new PUCCH format from the base station.
maximum code rate of low priority for each PUCCH format
maximum code rate of high priority for each PUCCH format When the LP-PUCCH for transmitting LP UCI and the HP-PUCCH for transmitting HP UCI overlap in at least one symbol (this is termed a collision), the UE may determine a new PUCCH resource for multiplexing the LP UCI and the HP UCI. The UE may determine one of the maximum code rates of low priority and one of the maximum code rates of high priority configured in the format of the PUCCH resource. Here, one of the maximum code rates of low priority may be selected based on a format of a collided LP-PUCCH. That is, if the format of the collided LP-PUCCH is 1, a low priority maximum code rate corresponding to PUCCH format 1 may be selected from among the maximum code rates of low priority configured in the format of the PUCCH resource. Here, one of the maximum code rates of high priority may be selected based on a format of a collided HP-PUCCH. That is, if the format of the collided HP-PUCCH is 1, a high priority maximum code rate corresponding to PUCCH format 1 may be selected from among the maximum code rates of high priority configured in the format of the PUCCH resource.

When compared to the first method, in the second method, the base station configures the maximum code rates according to the PUCCH format, and the UE can select one of the configured maximum code rates based on the collided PUCCH format. In this way, different UCI reliability can be guaranteed according to the collided PUCCH format.

(Third method) The UE may not receive the maximum code rate in the new PUCCH format from the base station. In this case, the UE determine the maximum code rate of low priority and the maximum code rate of high priority as follows.

When LP-PUCCH for transmitting LP UCI and HP-PUCCH for transmitting HP UCI overlap in at least one symbol, the UE may determine a new PUCCH resource used for multiplexing the LP UCI and the HP UCI. The UE may determine the maximum code rate configured in a format of a collided LP-PUCCH as the maximum code rate of low priority. In addition, the maximum code rate configured in a format of a collided HP-PUCCH may be determined as the maximum code rate of high priority. That is, in the third method, the UE can multiplex the LP UCI and the HP UCI using the maximum code rate configured in the collided PUCCH format.

The maximum code rate used for multiplexing may vary based on the collided PUCCH format (LP-PUCCH or HP-PUCCH) in the second and third methods. Here, assume that the collided PUCCH format is a reference PUCCH format. A reference PUCCH format used to select the maximum code rate of low priority is called a low priority reference PUCCH format. A reference PUCCH format used to select the maximum code rate of high priority is called a high priority reference PUCCH format.

Hereinafter, in this embodiment, a method of determining one reference PUCCH format among a plurality of collided PUCCH formats is disclosed.

Referring to FIG. 14, since the HP-PUCCH overlaps two or more LP-PUCCH formats in at least one symbol, the UE can multiplex the LP UCI and the HP UCI and transmit multiplex the UCI through a new PUCCH. Here, since there are two or more LP-PUCCH formats multiplexed in the new PUCCH, one LP-PUCCH format among the two or more LP-PUCCH formats should be determined as the low priority reference PUCCH format. For reference, if the low priority reference PUCCH format is determined, the low priority maximum code rate may be determined according to the method of the second method and the third method.

Hereinafter, specific methods of determining the low priority reference PUCCH format is disclosed.

(First method) The UE may determine the LP-PUCCH configured with the highest maximum code rate among the plurality of collided LP-PUCCHs as the low priority reference PUCCH format. Here, the LP-PUCCH has a maximum code rate configured according to its own format. Therefore, the UE can compare the maximum code rates and select the LP-PUCCH configured with the highest maximum code rate as the low priority reference PUCCH format. In the first method, equivalently, the UE determines the highest maximum code rate among the plurality of collided LP-PUCCHs as the low priority maximum code rate.

Since it is determined using the highest maximum code rate in the first method, the LP UCI can be transmitted with low reliability. Since the number of resources occupied by the LP UCI may be small, the reliability of the HP UCI may be increased by allocating a larger number of resources to the HP UCI.

(Second method) The UE may determine the LP-PUCCH to which the lowest maximum code rate is configured among the plurality of collided LP-PUCCHs as a low priority reference PUCCH format. Here, the LP-PUCCH has a maximum code rate configured according to its own format. Therefore, the UE can compare the maximum code rates and select the LP-PUCCH configured with the lowest maximum code rate as the low priority reference PUCCH format. In the second method, equivalently, the UE determines the lowest maximum code rate among the plurality of collided LP-PUCCHs as the low priority maximum code rate.

Since it is determined using the lowest maximum code rate in the first method, the reliability of the LP UCI can be guaranteed.

(Third method) If there are an LP-PUCCH scheduled or indicated in DCI format and an LP-PUCCH configured with an RRC signal among a plurality of collided LP-PUCCHs, the UE may determine the LP-PUCCH scheduled or indicated in DCI format as the low priority reference PUCCH format. Here, the LP-PUCCH scheduled or indicated in DCI format includes the following cases.

i) a case where PDSCH is scheduled in DCI format and HARQ-ACK of the PDSCH is transmitted through LP-PUCCH ii) a case where SPS PDSCH release is indicated in DCI format, and HARQ-ACK of the SPS PDSCH release is transmitted through LP-PUCCH In the third method, since the base station can schedule or indicate the LP-PUCCH in DCI format, the LP-PUCCH in the DCI format can be used as the low priority reference PUCCH format.

(Fourth method) If there are several LP-PUCCHs scheduled or indicated in DCI format among a plurality of collided LP-PUCCHs, the UE may use the LP-PUCCH scheduled or indicated in the latest DCI format as the low priority reference PUCCH format. Here, the LP-PUCCH scheduled or indicated in the DCI format is the same as the case of the third method described above in the following cases.

Since the latest DCI format is used in the fourth method, the base station can change the low priority reference LP-PUCCH format using the DCI format transmitted at the latest time.

Referring to FIG. 15, since an LP-PUCCH overlaps two or more HP-PUCCH formats in at least one symbol, the UE can multiplex the LP-PUCCH and the HP-PUCCH formats and transmit them in a new PUCCH. Here, since there are two or more HP-PUCCH formats multiplexed on the new PUCCH, one HP-PUCCH format among the two or more HP-PUCCH formats should be determined as a high priority reference PUCCH format. For reference, if the high priority reference PUCCH format is determined, a high priority maximum code rate may be determined according to the method of the second method and the third method.

Hereinafter, specific methods of determining the high priority reference PUCCH format are disclosed.

(First method) The UE may determine the LP-PUCCH configured with the highest maximum code rate among the plurality of collided LP-PUCCHs as the high priority reference PUCCH format. Here, the HP-PUCCH has a maximum code rate configured according to its own format. Therefore, the UE can compare the maximum code rates and select the HP-PUCCH configured with the highest maximum code rate as the high priority reference PUCCH format. In the first method, equivalently, the UE determines the highest maximum code rate among the plurality of collided HP-PUCCHs as the high priority maximum code rate.

Since it is determined using the highest maximum code rate in the first method, the reliability of the HP UCI can be guaranteed.

(Second method) The UE may determine the HP-PUCCH to which the lowest maximum code rate is configured among the plurality of collided HP-PUCCHs as a high priority reference PUCCH format. Here, the HP-PUCCH has a maximum code rate configured according to its own format. Therefore, the UE can compare the maximum code rates and select the HP-PUCCH configured with the lowest maximum code rate as the high priority reference PUCCH format. In the second method, equivalently, the UE determines the lowest maximum code rate among the plurality of collided HP-PUCCHs as a high priority maximum code rate.

Since it is determined using the lowest maximum code rate in the first method, reliability of the HP UCI may be lowered. However, since the number of resources used for HP UCI is reduced, more LP UCIs can be transmitted.

(Third method) If there are an HP-PUCCH scheduled or indicated in DCI format and an HP-PUCCH configured with an RRC signal among a plurality of collided HP-PUCCHs, the UE may determine the HP-PUCCH scheduled or indicated in DCI format as the high priority reference PUCCH format. Here, the HP-PUCCH scheduled or indicated in DCI format includes the following cases.

i) a case where) PDSCH is scheduled in DCI format and HARQ-ACK of the PDSCH is transmitted through LP-PUCCH ii) a case where SPS PDSCH release is instructed in DCI format, and HARQ-ACK of the SPS PDSCH release is transmitted through the LP-PUCCH In the third method, since the base station can schedule or indicate the HP-PUCCH in DCI format, the HP-PUCCH in the DCI format can be used as the high priority reference PUCCH format.

(Fourth method) If there are several HP-PUCCHs scheduled or indicated in DCI format among a plurality of collided HP-PUCCHs, the UE may use the HP-PUCCH scheduled or indicated in the latest DCI format as the high priority reference PUCCH format. Here, the HP-PUCCH scheduled or indicated in the DCI format is the same as the case of the third method described above in the following cases.

Since the latest DCI format is used in the fourth method, the base station can change the high priority reference HP-PUCCH format using the DCI format transmitted at the latest time.

Now, a second embodiment of selecting PUCCH resources to be multiplexed is disclosed.

(Second embodiment) Referring to FIG. 16, the UE may select a high priority PUCCH resource as a PUCCH resource for multiplexing LP UCI and HP UCI. Here, the high priority PUCCH resource is a PUCCH resource for transmitting HP UCI among collided PUCCHs.

According to the second embodiment, when the UE selects the high priority PUCCH resource as a resource to be multiplexed, the UE may use the maximum code rate configured in the format of the high priority PUCCH as the high priority maximum code rate. In this case, it is necessary to determine a low priority maximum code rate. Methods for this are as follows.

(First method) The UE may additionally receive one maximum code rate of low priority in a high priority PUCCH format from the base station.

The UE may determine a new PUCCH resource used for multiplexing LP UCI and HP UCI. The UE may determine the one configured maximum code rate of low priority and the one configured maximum code rate of high priority configured in the format of the PUCCH resource. The UE may encode the LP UCI using the one maximum code rate of low priority. The UE may encode HP UCI using the maximum code rate configured in the PUCCH format. The UE may multiplex the encoded LP UCI and HP UCI and transmit the multiplexed UCI through a new PUCCH. That is, according to the first method, the maximum code rate already configured in the high priority PUCCH format may used for the HP UCI, and a new maximum code rate of low priority may be newly configured and the maximum code rate of low priority may be used for a low priority UCI.

As a modification of the first method, the UE may be configured with two maximum code rates in the high priority PUCCH format. Here, the lower maximum code rate of the two maximum code rates can be used for the HP UCI, and the higher maximum code rate of the two maximum code rates can be used for the low priority UCI.

(Second method) The UE may receive a maximum code rate of low priority in a new PUCCH format for each PUCCH format from the base station.

When LP-PUCCH for transmitting LP UCI and HP-PUCCH for transmitting HP UCI overlap (this is expressed as a collision) in at least one symbol, the UE may determine a new PUCCH resource for multiplexing the LP UCI and the HP UCI. The UE may determine one of the maximum code rates of low priority configured in the format of the PUCCH resource. Here, one of the maximum code rates of low priority may be selected based on the format of the collided LP-PUCCH. That is, if the format of the collided LP-PUCCH is 1, the low priority maximum code rate corresponding to PUCCH format 1 may be selected from among the maximum code rates of low priority configured in the format of the PUCCH resource.

When compared to the first method, in the second method, the base station may configure maximum code rates according to the PUCCH format, and the UE may select one of the configured maximum code rates based on the collided PUCCH format. In this way, different UCI reliability can be guaranteed according to the collided LP-PUCCH format.

(Third method) The UE may not receive the maximum code rate of low priority in the HP-PUCCH format from the base station. In this case, the UE may determine the maximum code rate of low priority as follows.

When LP-PUCCH for transmitting LP UCI and HP-PUCCH for transmitting HP UCI overlap in at least one symbol, the UE may multiplex LP UCI and HP UCI on the HP-PUCCH. The UE may determine the maximum code rate configured in the format of the collided LP-PUCCH as the maximum code rate of low priority. That is, in the third method, the LP UCI and the HP UCI may be multiplexed using the maximum code rate configured in the collided PUCCH format.

In the second and third methods, the UE may change the low priority maximum code rate used for multiplexing based on the collided LP-PUCCH format. Assume that the collided LP-PUCCH format is a low priority reference PUCCH format. The maximum code rate of low priority may be determined according to the low priority reference PUCCH format. Here, the low priority reference PUCCH format and the maximum code rate of low priority can be obtained by applying the methods of the first embodiment.

Now, a third embodiment of selecting PUCCH resources to be multiplexed is disclosed.

(Third embodiment) Referring to FIG. 17, the UE may select a low priority PUCCH resource as a PUCCH resource for multiplexing LP UCI and HP UCI. Here, the low priority PUCCH resource is a PUCCH resource for transmitting LP UCI among collided PUCCHs.

According to the third embodiment, when the UE selects the low priority PUCCH resource as a resource to be multiplexed, the UE may use the maximum code rate configured in the format of the low priority PUCCH as the low priority maximum code rate. In this case, it is necessary to determine a high priority maximum code rate. Methods for this are as follows.

(First method) The UE may additionally receive one maximum code rate of high priority in a low priority PUCCH format from the base station.

The UE may determine a new PUCCH resource used for multiplexing LP UCI and HP UCI. The UE may determine the one configured maximum code rate of high priority and the one configured maximum code rate of low priority configured in the format of the PUCCH resource. The UE may encode the LP UCI using the one maximum code rate of high priority. The UE may encode LP UCI using the maximum code rate configured in the LP-PUCCH to be multiplexed. The UE may multiplex the encoded LP UCI and HP UCI and transmit the multiplexed UCI through a new PUCCH. That is, according to the first method, the maximum code rate already configured in the low priority PUCCH format is used for the LP UCI, and a new maximum code rate of high priority may be newly configured and the maximum code rate of high priority may be used for the HP UCI.

As a modification of the first method, the UE may be configured with two maximum code rates in the low priority PUCCH format. Here, the lower maximum code rate of the two maximum code rates can be used for the HP UCI, and the higher maximum code rate of the two maximum code rates can be used for the low priority UCI.

(Second method) The UE may receive a maximum code rate of high priority in a new PUCCH format for each PUCCH format from the base station.

When HP UCI and LP UCI overlap in at least one symbol, the UE may determine a new PUCCH resource used for multiplexing the LP UCI and the HP UCI. The UE may determine one of the maximum code rates of high priority configured in the format of the PUCCH resource. Here, one of the maximum code rates of high priority may be selected based on the format of the collided HP-PUCCH. That is, if the format of the collided HP-PUCCH is 1, the high priority maximum code rate corresponding to PUCCH format 1 may be selected from among the high priority maximum code rates configured in the format of the PUCCH resource.

When compared to the first method, in the second method, the base station may configure maximum code rates according to the PUCCH format, and the UE may select one of the configured maximum code rates based on the collided PUCCH format. In this way, different UCI reliability can be guaranteed according to the collided HP-PUCCH format.

(Third method) The UE may not receive the maximum code rate of high priority in the HP-PUCCH format from the base station. In this case, the UE may determine the maximum code rate of high priority as follows.

When LP UCI and HP UCI overlap in at least one symbol, the UE may multiplex the LP UCI and the HP UCI on the LP-PUCCH. The UE may determine the maximum code rate configured in the format of the collided HP-PUCCH as the maximum code rate of high priority. That is, in the third embodiment, the LP UCI and the HP UCI may be multiplexed using the maximum code rate configured in the collided PUCCH format.

In the second and third methods, the UE may change the low priority maximum code rate used for multiplexing based on the collided HP-PUCCH format. Assume that the collided HP-PUCCH format is a low priority reference PUCCH format. The maximum code rate of high priority may be determined according to the high priority reference PUCCH format. Here, the high priority reference PUCCH format and the maximum code rate of high priority can be obtained by applying the methods of the first embodiment.

V. Multiplexing and Resource Determination Method 3 in PUCCH Collision

The following embodiments relate to a collision situation between LP PUCCH format 0 and HP PUCCH format 0 or 1. Various embodiments are disclosed depending on which UCI of how many bits each PUCCH transmits.

(First embodiment) LP PUCCH format 0 may transmit HARQ-ACK of 2 bits, and HP PUCCH format 0 or 1 may transmit one SR.

If HARQ-ACK of 2 bits and one SR are multiplexed without considering the priority between them, HARQ-ACK of 2 bits and the SR may be multiplexed on and transmitted through PUCCH format 0. Here, mapping of cyclic shift (CS) is shown in FIG. 26(a).

FIG. 26 is a diagram illustrating cyclic shift values according to an embodiment.

Referring to FIG. 26 (a), CS0 can be represented by (A, A, −), CS1 can be represented by (A, A, +), CS3 can be represented by (A, N, −), CS4 can be represented by (A, N, +), CS6 can be represented by (N, N, −), CS7 can be represented by (N, N, +), CS9 can be represented by (N, A, −), and CS10 can be represented by (N, A, +). Here, 'a' in ('a', 'b', 'c') indicates the first HARQ-ACK bit, and 'b' indicates the second HARQ-ACK bit. If c' is '−', it indicates negative SR, and if c is '+', it indicates positive SR.

The ACK and NACK of a low priority HARQ-ACK of the UE satisfy up to two CS intervals. For example, CS1 and CS3 have different second HARQ-ACK bits as ACK and NACK. In this case, the interval of CS is 2. (For reference, one CS interval is π/6) However, the CS interval between a negative SR and a positive SR for an SR of high priority is 1. For example, CS0 is the negative SR and CS1 is the positive SR. Therefore, the HARQ-ACK of low priory have higher reliability than the SR of high priority. This is because when the base station determines the CS with a difference of one, the SR of high priority is incorrectly determined, but the low priority HARQ-ACK is not incorrectly determined.

Referring to FIG. 26(b), among ('a', 'b', 'c'), 'b' indicating ACK or NACK of the second HARQ-ACK bit may indicate whether the SR of high priority is positive or negative, and 'c' placed at the third position may indicate whether the second HARQ-ACK bit is ACK or NACK. More specifically, among ('a', 'b', 'c'), ACK of 'b' indicating ACK or NACK of the second HARQ-ACK bit is used to indicate that the SR of high priority is negative, NACK of 'b' is used to indicate that the SR of high priority is positive, the negative SR of the third 'c' is used to indicate ACK of the second low priority HARQ-ACK, and the positive SR of 'c' is used to indicate NACK of the second low priority HARQ-ACK.

Here, 'a' may be used instead of 'b' placed at the second position.

That is, among ('a', 'b', 'c'), 'a' indicating ACK or NACK of the first HARQ-ACK bit may indicate whether the SR of high priority is positive or negative, and the third 'c' may indicate whether the first HARQ-ACK bit is ACK or NACK. More specifically, among ('a', 'b', 'c'), ACK of 'a' indicating ACK or NACK of the first HARQ-ACK bit is used to indicate that the SR of high priority is negative, NACK of 'a' is used to indicate that the SR of high priority is positive, the negative SR of the third 'c' is used to indicate ACK of the first low priority HARQ-ACK, and the positive SR of 'c' is used to indicate NACK of the first low priority HARQ-ACK.

(Second embodiment) LP PUCCH format 0 transmits 1 bits HARQ-ACK, and HP PUCCH format 0 or 1 transmits 1-bit HARQ-ACK and 1 SR.

If the HARQ-ACK of 2 bits and one SR are multiplexed without considering the priority between LP PUCCH and HP PUCCH, the HARQ-ACK of 2 bits and one SR can be multiplexed on and transmitted through PUCCH format 0. Here, mapping of cyclic shift (CS) is shown in FIG. 27.

FIG. 27 is a diagram illustrating cyclic shift values according to another embodiment.

Referring to FIG. 27(a), CS0 can be represented by (A, A, −), CS1 can be represented by (A, A, +), CS3 can be represented by (A, N, −), CS4 can be represented by (A, N, +), CS6 can be represented by (N, N, −), CS7 can be represented by (N, N, +), CS9 can be represented by (N, A, −), and CS10 can be represented by (N, A, +). Here, in ('a', 'b', 'c'), 'a' indicates an HARQ-ACK bit of high priority, 'b' indicates an HARQ-ACK bit of low priority. If c' is '−', it indicates negative SR, and if c is '+', it indicates positive SR.

Similar to FIG. 26(a), the CS interval between the negative SR and the positive SR for SR of high priority is 1. For example, CS0 is the negative SR and CS1 is the positive SR. Therefore, the HARQ-ACK of low priory have higher reliability than the SR of high priority. This is because when the base station determines the CS with a difference of one, the SR of high priority is incorrectly determined, but the low priority HARQ-ACK is not incorrectly determined.

In order to solve this problem, referring to FIG. 27B, among ('a', 'b', 'c'), 'b' indicating ACK or NACK of the HARQ-ACK bit of low priority may indicate whether the SR of high priority is positive or negative, and the third 'c' may indicate whether the HARQ-ACK bit of low priority is ACK or NACK. More specifically, among ('a', 'b', 'c'), ACK of 'b' indicating ACK or NACK of the HARQ-ACK bit of low priority is used to indicate the negative SR of high priority, NACK of 'b' is used to indicate that the SR of high priority is positive, the negative SR of the third 'c' is used to indicate ACK of the low priority HARQ-ACK, and the positive SR of 'c' is used to indicate NACK of the low priority HARQ-ACK.

VI. Multiplexing and Resource Determination Method 4 in PUCCH Collision

The following embodiment defines various scenarios for multiplexing LP-UCI and HP-UCI according to whether HP-UCI includes HP-SR, and discloses a multiplexing method for each scenario.

In one aspect, when HP-UCI includes HP-SR, consider the following scenarios A1 to A4.

Scenario A1) 1-bit HP-HARQ+1-bit LP-HARQ
Scenario A2) 1-bit HP-HARQ+2-bit LP-HARQ
Scenario A3) 2-bit HP-HARQ+1-bit LP-HARQ
Scenario A4) 2-bit HP-HARQ+2-bit LP-HARQ In another aspect, when HP-UCI includes HP-SR, consider the following scenarios B1 to B6.

Scenario B1) 1 HP-SR+1-bit LP-HARQ
Scenario B2) 1 HP-SR+2-bit LP-HARQ
Scenario B3) 1-bit HP-HARQ/1 HP-SR+1-bit LP-HARQ
Scenario B4) 1-bit HP-HARQ/1 HP-SR+2-bit LP-HARQ
Scenario B5) 2-bit HP-HARQ/1 HP-SR+1-bit LP-HARQ
Scenario B6) 2-bit HP-HARQ/1 HP-SR+2-bit LP-HARQ The UE may multiplex LP UCI and HP UCI and transmit the multiplexed UCI through one PUCCH in each scenario. Here, the one PUCCH may be PUCCH format 0. That is, when LP PUCCH format 0 and HP PUCCH format 0 collide, LP UCI and HP UCI may be transmitted through one PUCCH format 0.

Here, the one PUCCH format 0 may be one of LP PUCCH format 0 and HP PUCCH format 0. Preferably, the one PUCCH format 0 may be HP PUCCH format 0. This is because HP PUCCH format 0 can have higher reliability. As another example, the one PUCCH format 0 may be a third PUCCH format 0. The third PUCCH format 0 may be configured separately from the base station. Here, a new PUCCH format 0 may be a PUCCH usable only in case of multiplexing.

Hereinafter, a method of transmitting one PUCCH format 0 by multiplexing LP UCI and HP UCI for each scenario is disclosed.

(Scenario A1) 1-Bit HP-HARQ+1-Bit LP-HARQ

Referring to Table 6, in HP PUCCH format 0, $m_{CS}=0$ when 1-bit HP-HARQ is NACK, and $m_{CS}=6$ when ACK. Referring to Table 7, in LP PUCCH format 0, $m_{CS}=0$ when 1-bit LP-HARQ is NACK, and $m_{CS}=6$ when ACK.

TABLE 6

| UCI Value {HP-HARQ} | {NACK} | {ACK} |
|---|---|---|
| Sequence cyclic shift | $m_{cs} = 0$ | $m_{cs} = 6$ |

TABLE 7

| UCI Value {LP-HARQ} | {NACK} | {ACK} |
|---|---|---|
| Sequence cyclic shift | $m_{cs} = 0$ | $m_{cs} = 6$ |

The HP PUCCH format 0 and the HP PUCCH format 0 may collide in the same symbol. In this case, the UE can transmit 1-bit LP-HARQ of low priority and 1-bit HP-HARQ of high priority through one PUCCH format 0. That is, 2 bits should be transmitted through the one PUCCH format 0. The methods for this are as follows. (First method) The UE may generate 2-bit HARQ-ACK by combining the 1-bit LP-HARQ of low priority and the 1-bit HP-HARQ of high priority without considering the priority therebetween. And, the UE may transmit the 2-bit HARQ through PUCCH format 0 according to the HARQ of 2 bits transmission method of Rel-15. That is, the HARQ-ACK of 2 bits transmission method is shown in Table 8.

TABLE 8

| UCI Value {HP-HARQ LP-HARQ} | {NACK, NACK} | {NACK, ACK} | {ACK, ACK} | {ACK, NACK} |
|---|---|---|---|---|
| Sequence cyclic shift | $m_{cs} = 0$ | $m_{cs} = 3$ | $m_{cs} = 6$ | $m_{cs} = 9$ |

However, this method of transmitting HARQ-ACK of 2 bits has the following problems. One PUCCH format 0 for transmitting HARQ-ACK of 2 bits may be HP PUCCH format 0. In this case, when the UE fails to receive the PDCCH indicating 1-bit LP-HARQ, the UE transmits only 1-bit HARQ through HP PUCCH format 0. Here, if 1-bit HARQ-ACK is NACK, $m_{CS}=0$, and if ACK, $m_{CS}=6$. The problem is that when the 1-bit HARQ-ACK is ACK, the UE selects $m_{CS}=6$ and transmits PUCCH format 0, but the base station expects that 1-bit LP-HARQ and 1-bit HP-HARQ are multiplexed and transmitted. Accordingly, if the base station detects $m_{CS}=6$, both 1-bit HP-HARQ and 1-bit LP-HARQ are determined as ACKs. Therefore, in the case of LP-HARQ, the base station determines NACK even though the UE has not transmitted LP-HARQ to the base station. Therefore, misunderstanding of LP-HARQ may occur between the base station and the UE. A second method for solving this is as follows. (Second method) As shown in Table 9, it corresponds to the case where, at mCS=6, 1-bit HP-HARQ is ACK and 1-bit LP-HARQ is NACK. In this case, even if reception of the PDCCH indicating transmission of LP-HARQ fails, the base station determines that 1-bit LP-HARQ is NACK. Therefore, it is possible to prevent misunderstanding of LP-HARQ between the base station and the UE.

TABLE 9

| UCI Value {HP-HARQ LP-HARQ} | {NACK, NACK} | {NACK, ACK} | {ACK, NACK} | {ACK, ACK} |
|---|---|---|---|---|
| Sequence cyclic shift | $m_{cs} = 0$ | $m_{cs} = 3$ | $m_{cs} = 6$ | $m_{cs} = 9$ |

The characteristics of the second method are as follows. CSs used when transmitting HP-HARQ alone without LP-HARQ are assumed to be a first CS set. CSs, which are used when LP-HARQ is NACK, when LP-HARQ and HP-HARQ are multiplexed are assumed to be a second CS set. The first CS set and the second CS set may be the same. For example, in the second method described above, the first CS set is {0, 6} and the second CS set is also {0, 6}. Furthermore, HP-HARQs corresponding to CSs included in the first CS set and the second CS set may be the same. For example, when HP-HARQ is transmitted alone without LP-HARQ, HARQ corresponding to $m_{CS}=6$ is ACK, and HP-HARQ corresponding to $m_{CS}=6$ is ACK in the second method, and thus, they may be identical to each other. In the second method, since both HP-HARQ and LP-HARQ are NACK, the UE transmits PUCCH format 0 according to $m_{CS}=0$, but the base station may determine that $m_{CS}=9$. In this case, the base station determines that both HP-HARQ and LP-HARQ are ACK. In this case, a cyclic shift difference (or cyclic shift distance) between $m_{CS}=0$ and $m_{CS}=9$ is 3. If the UE transmits only 1-bit HP-HARQ, the cyclic shift difference is 6 because $m_{CS}=0$ and $m_{CS}=6$ are used. Therefore, when HP-HARQ and LP-HARQ are multiplexed, since the cyclic shift difference is reduced from 6 to 3, the reliability of HP-HARQ is lowered. The third method of the present invention to solve this problem is as follows.

(Third Method)

TABLE 10

| UCI Value {HP-HARQ LP-HARQ} | {NACK, NACK} | {NACK, ACK} | {ACK, NACK} | {ACK, ACK} |
|---|---|---|---|---|
| Sequence cyclic shift | $m_{cs} = 0$ | $m_{cs} = s$ | $m_{cs} = 6$ | $m_{cs} = 6 + s$ |

Referring to Table 10, s may be one value of s=1, 2, 3, 4, 5. Preferably, s may be 1. Assuming s=1, $m_{CS}=1$ if {NACK, ACK}, and $m_{CS}=7$ if {ACK, ACK}. Therefore, the cyclic shift difference (or cyclic shift distance) between {NACK, NACK} and {ACK, ACK} is 5. Therefore, when compared to the second method, the reliability of 1-bit HP-HARQ can be increased. (Scenario A2) 1-bit HP-HARQ+2-bit LP-HARQ Referring to Table 11, in HP PUCCH format 0, $m_{CS}=0$ if 1-bit HP-HARQ is NACK, and $m_{CS}=6$ IF ACK. Referring to Table 12, In LP PUCCH format 0, $m_{CS}=0$ if 2-bit LP-HARQ is {NACK, NACK}, $m_{CS}=3$ if {NACK, ACK}, $m_{CS}=6$ if {ACK, ACK}, and $m_{CS}=9$ if {ACK, NACK}.

TABLE 11

| UCI Value {HP-HARQ} | {NACK} | {ACK} |
|---|---|---|
| Sequence cyclic shift | $m_{cs} = 0$ | $m_{cs} = 6$ |

TABLE 12

| UCI Value {1st LP-HARQ 2nd LP-HARQ} | {NACK, NACK} | {NACK, ACK} | {ACK, ACK} | {ACK, NACK} |
|---|---|---|---|---|
| Sequence cyclic shift | $m_{cs} = 0$ | $m_{cs} = 3$ | $m_{cs} = 6$ | $m_{cs} = 9$ |

The HP PUCCH format 0 and the HP PUCCH format 0 may collide in the same symbol. In this case, the UE can transmit 1-bit LP-HARQ of low priority and 2-bit HP-HARQ of high priority through one PUCCH format 0. That is, 3 bits should be transmitted through the one PUCCH format 0. The methods for this are as follows. (first method) The UE may use a method of simultaneously transmitting 2-bit HARQ-ACK and SR of Rel-15. Here, 1-bit HP-HARQ may correspond to SR, and 2-bit LP-HARQ may correspond to 2-bit HARQ-ACK. In other words, if 1-bit HP-HARQ is NACK, 2-bit LP-HARQ can be transmitted as one value of $m_{CS}$=0, 3, 6, 9. If 1-bit HP-HARQ is ACK, 2-bit LP-HARQ can be transmitted as one value of $m_{CS}$=1, 4, 7, 10. This can be summarized as in Table 13.

In the first and second methods, whether or not a PDCCH indicating transmission of LP-HARQ is received affects the performance of HP-HARQ. More specifically, in the first method, if the UE does not receive the PDCCH indicating transmission of 2-bit LP-HARQ, the UE transmits $m_{CS}$=0 if 1-bit HP-HARQ is NACK, and $m_{CS}$=6 if ACK. However, when the base station detects $m_{CS}$=6, the base station determines 1-bit HP-HARQ as NACK and determines 2-bit HP-HARQ as ACK, ACK. Therefore, 1-bit HP-HARQ is erroneously determined from ACK to NACK, and 2-bit LP-HARQ is erroneously determined to ACK, ACK. In the second method, if the UE does not receive the PDCCH indicating transmission of 2-bit LP-HARQ, the UE transmits $m_{CS}$=0 if 1-bit HP-HARQ is NACK and $m_{CS}$=6 if ACK. However, when the base station detects $m_{CS}$=6, the base station determines 1-bit HP-HARQ as ACK, and determines 2-bit HP-HARQ as ACK, NACK. Therefore, the first bit of 2-bit LP-HARQ is incorrectly determined as ACK. A third method may be used n order to solve this problem.
(Third Method)

The characteristics of the third method are as follows. CSs, which are used when transmitting HP-HARQ alone

TABLE 13

| | HP-HARQ = NACK | | | | HP-HARQ = ACK | | | |
|---|---|---|---|---|---|---|---|---|
| | UCI Value {1st LP-HARQ, 2nd LP-HARQ} | | | | | | | |
| | {NACK, NACK} | {NACK, ACK} | {ACK, ACK} | {ACK, NACK} | {NACK, NACK} | {NACK, ACK} | {ACK, ACK} | {ACK, NACK} |
| Sequence cyclic shift | $m_{cs} = 0$ | $m_{cs} = 3$ | $m_{cs} = 6$ | $m_{cs} = 9$ | $m_{cs} = 1$ | $m_{cs} = 4$ | $m_{cs} = 7$ | $m_{cs} = 10$ |

In the first method, the minimum cyclic shift difference (or cyclic shift distance) of 1-bit HP-HARQ is 1. Therefore, a problem in which the reliability of 1-bit HP-HARQ is deteriorated may occur. Further, the minimum cyclic shift difference (or cyclic shift distance) of 2-bit LP-HARQ is 2. Therefore, LP-HARQ has higher reliability than HP-HARQ. A second method may be used in order to solve this problem. (Second method) The UE may make correspond one bit (the last bit for convenience here) of 2-bit LP-HARQ to SR, and correspond 1-bit HP-HARQ and 1-bit LP-HARQ to 2-bit HARQ-ACK. In other words, if the last bit of 2-bit LP-HARQ is NACK, the first bit of 1-bit HP-HARQ and 1-bit LP-HARQ can be transmitted as one value of $m_{CS}$=0, 3, 6, 9. If the last bit of 2-bit LP-HARQ is ACK, 1-bit IP-HARQ and 1-bit LP-HARQ can be transmitted as one value of $m_{CS}$=1, 4, 7, 10. This can be summarized as in Table 14.

without LP-HARQ, are assumed to be a first CS set. CSs, which are used when 2-bit LP-HARQ is NACK, NACK, when LP-HARQ and HP-HARQ are multiplexed are assumed to be a second CS set. According to an embodiment of the present invention, the first CS set and the second CS set may be the same. For example, in the third method, the first CS set is {0, 6} and the second CS set is also {0, 6}. Furthermore, HP-HARQs corresponding to CSs included in the first CS set and the second CS set may be the same. For example, as shown in Table 15, when HP-HARQ is transmitted alone without LP-HARQ, HARQ corresponding to $m_{CS}$=6 is ACK, and HP-HARQ corresponding to $m_{CS}$=6 is ACK in the third method, and thus, they may be identical to each other.

TABLE 14

| | 2nd LP-HARQ = NACK | | | | 2nd LP-HARQ = ACK | | | |
|---|---|---|---|---|---|---|---|---|
| | UCI Value {HP-HARQ, 1st LP-HARQ} | | | | | | | |
| | {NACK, NACK} | {NACK, ACK} | {ACK, ACK} | {ACK, NACK} | {NACK, NACK} | {NACK, ACK} | {ACK, ACK} | {ACK, NACK} |
| Sequence cyclic shift | $m_{cs} = 0$ | $m_{cs} = 3$ | $m_{cs} = 6$ | $m_{cs} = 9$ | $m_{cs} = 1$ | $m_{cs} = 4$ | $m_{cs} = 7$ | $m_{cs} = 10$ |

TABLE 15

| | 2nd LP-HARQ = NACK | | | | 2nd LP-HARQ = ACK | | | |
|---|---|---|---|---|---|---|---|---|
| | UCI Value {HP-HARQ, 1st LP-HARQ} | | | | | | | |
| | {NACK, NACK} | {NACK, ACK} | {ACK, NACK} | {ACK, ACK} | {NACK, NACK} | {NACK, ACK} | {ACK, NACK} | {ACK, ACK} |
| Sequence cyclic shift | $m_{cs} = 0$ | $m_{cs} = 3$ | $m_{cs} = 6$ | $m_{cs} = 9$ | $m_{cs} = 1$ | $m_{cs} = 4$ | $m_{cs} = 7$ | $m_{cs} = 10$ |

(Fourth method) As another method, 2-bit LP-HARQ can be bundled to make 1-bit LP-HARQ, and the methods of the scenario A1 described above can be applied. Here, in bundling, if 2-bit LP-HARQ is ACK, ACK, 1-bit LP-HARQ is ACK, and if 2-bit LP-HARQ includes at least one NACK, 1-bit LP-HARQ is NACK. (Scenario A3) 2-bit HP-HARQ+1-bit LP-HARQ Referring to Table 16, in HP PUCCH format 0, $m_{CS}=0$ if 2-bit HP-HARQ is {NACK, NACK}, $m_{CS}=3$ if {NACK, ACK}, $m_{CS}=6$ if {ACK, ACK}, and $m_{CS}=9$ if {ACK, NACK}. Referring to Table 17, in LP PUCCH format 0, $m_{CS}=0$ if 1-bit LP-HARQ is NACK, and $m_{CS}=6$ if ACK.

TABLE 16

| UCI Value {1st HP-HARQ, 2nd HP-HARQ} | {NACK, NACK} | {NACK, ACK} | {ACK, ACK} | {ACK, NACK} |
|---|---|---|---|---|
| Sequence cyclic shift | $m_{cs} = 0$ | $m_{cs} = 3$ | $m_{cs} = 6$ | $m_{cs} = 9$ |

TABLE 17

| UCI Value{LP-HARQ} | {NACK} | {ACK} |
|---|---|---|
| Sequence cyclic shift | $m_{cs} = 0$ | $m_{cs} = 6$ |

(First method) The UE may use a method of simultaneously transmitting 2-bit HARQ-ACK and SR according to Rel-15. Here, 1-bit LP-HARQ may correspond to SR, and 2-bit HP-HARQ may correspond to HARQ-ACK of 2 bits. In other words, if 1-bit LP-HARQ is NACK, 2-bit HP-HARQ can be transmitted as one value of $m_{CS}=0, 3, 6, 9$. If 1-bit LP-HARQ is ACK, 2-bit HP-HARQ can be transmitted as one value of $m_{CS}=1, 4, 7, 10$. This can be summarized as shown in Table 18.

TABLE 18

| | LP-HARQ = NACK | | | | LP-HARQ = ACK | | | |
|---|---|---|---|---|---|---|---|---|
| | UCI Value {1st HP-HARQ, 2nd HP-HARQ} | | | | | | | |
| | {NACK, NACK} | {NACK, ACK} | {ACK, ACK} | {ACK, NACK} | {NACK, NACK} | {NACK, ACK} | {ACK, ACK} | {ACK, NACK} |
| Sequence cyclic shift | $m_{cs} = 0$ | $m_{cs} = 3$ | $m_{cs} = 6$ | $m_{cs} = 9$ | $m_{cs} = 1$ | $m_{cs} = 4$ | $m_{cs} = 7$ | $m_{cs} = 10$ |

The characteristics of the first method are as follows. CSs, which are used when transmitting HP-HARQ alone without LP-HARQ, are assumed to be a first CS set. CSs, which are used when 1-bit LP-HARQ is NACK, when LP-HARQ and HP-HARQ are multiplexed are assumed to be a second CS set. According to an embodiment of the present invention, the first CS set and the second CS set may be the same. For example, in the first method described above, the first CS set is {0, 3, 6, 9} and the second CS set is also {0, 3, 6, 9}.

Furthermore, HP-HARQs corresponding to CSs included in the first CS set and the second CS set may be the same. For example, when HP-HARQ is transmitted alone without LP-HARQ, HARQ corresponding to $m_{CS}=6$ is {ACK, ACK}, and HP-HARQ corresponding to $m_{CS}=6$ is {ACK, ACK} in the third method, and thus, they may be identical to each other. This is the same for $m_{CS}=0, 3, 9$. (Second method) As another method, 2-bit HP-HARQ can be bundled to make 1-bit HP-HARQ, and the methods of the scenario A1 described above can be applied. Here, in bundling, if 2-bit HP-HARQ is ACK, ACK, 1-bit HP-HARQ is ACK, and if 2-bit HP-HARQ includes at least one NACK, 1-bit HP-HARQ is NACK.

(Scenario A4) 2-Bit HP-HARQ+2-Bit LP-HARQ

Referring to Table 19, in HP PUCCH format 0, $m_{CS}=0$ if 2-bit HP-HARQ is {NACK, NACK}, $m_{CS}=3$ if {NACK, ACK}, $m_{CS}=6$ if {ACK, ACK}, and $m_{CS}=9$ if {ACK, NACK}. Referring to Table 20, in LP PUCCH format 0, $m_{CS}=0$ if 2-bit LP-HARQ is {NACK, NACK}, $m_{CS}=3$ if {NACK, ACK}, $m_{CS}=6$ if {ACK, ACK}, and $m_{CS}=9$ if {ACK, NACK}.

TABLE 19

| | UCI Value{1st HP-HARQ, 2nd HP-HARQ} | | | |
|---|---|---|---|---|
| | {NACK, NACK} | {NACK, ACK} | {ACK, ACK} | {ACK, NACK} |
| Sequence cyclic shift | $m_{cs} = 0$ | $m_{cs} = 3$ | $m_{cs} = 6$ | $m_{cs} = 9$ |

TABLE 20

| | UCI Value{1st LP-HARQ, 2nd LP-HARQ} | | | |
|---|---|---|---|---|
| | {NACK, NACK} | {NACK, ACK} | {ACK, ACK} | {ACK, NACK} |
| Sequence cyclic shift | $m_{cs} = 0$ | $m_{cs} = 3$ | $m_{cs} = 6$ | $m_{cs} = 9$ |

(First method) In the case of scenario A4, 2-bit HP-HARQ and 2-bit LP-HARQ require 16 cyclic shifts to transmit 16 HARQ-ACK states (NACK, NACK, NACK, NACK) to (ACK, ACK, ACK, ACK) through PUCCH format 0. However, since PUCCH format 0 can have only up to 12 cyclic shifts, only up to 12 of 16 HARQ-ACK states should be selected. According to an embodiment of the present invention, if 2-bit LP-HARQ is {NACK, NACK}, one of $m_{CS}$=0, 3, 6, 9 may be selected according to 2-bit HP-HARQ. More specifically, if 2-bit LP-HARQ is {NACK, NACK}, $m_{CS}$ according to 2-bit HP-HARQ is shown in Table 21 below.

TABLE 21

| | {1st LP-HARQ, 2nd LP-HARQ} = {NACK, NACK} UCI Value{1st HP-HARQ, 2nd HP-HARQ} | | | |
|---|---|---|---|---|
| | {NACK, NACK} | {NACK, ACK} | {ACK, ACK} | {ACK, NACK} |
| Sequence cyclic shift | $m_{cs}$ = 0 | $m_{cs}$ = 3 | $m_{cs}$ = 6 | $m_{cs}$ = 9 |

According to an embodiment of the present invention, if 2-bit LP-HARQ is {ACK, ACK}, one of $m_{CS}$=1, 4, 7, 10 may be selected according to 2-bit HP-HARQ. More specifically, if 2-bit LP-HARQ is {ACK, ACK}, $m_{CS}$ according to 2-bit HP-HARQ is shown in Table 22 below.

TABLE 22

| | {1st LP-HARQ, 2nd LP-HARQ} = {ACK, ACK} UCI Value{1st HP-HARQ, 2nd HP-HARQ} | | | |
|---|---|---|---|---|
| | {NACK, NACK} | {NACK, ACK} | {ACK, ACK} | {ACK, NACK} |
| Sequence cyclic shift | $m_{cs}$ = 1 | $m_{cs}$ = 4 | $m_{cs}$ = 7 | $m_{cs}$ = 10 |

As above, the UE can transmit 2-bit LP-HARQ and 2-bit HP-HARQ using 8 CSs out of 12 CSs. Additionally, the UE can use the extra 4 CSs to indicate the HARQ-ACK states. For example, if the first bit of 2-bit LP-HARQ is ACK and the second bit is NACK, one of $m_{CS}$=2, 5, 8, 11 can be selected according to 2-bit HP-HARQ. More specifically, if the first bit of 2-bit LP-HARQ is ACK and the second bit is NACK, $m_{CS}$ according to 2-bit HP-HARQ is shown in Table 23 below.

TABLE 23

| | {1st LP-HARQ, 2nd LP-HARQ} = {ACK, NACK} UCI Value{1st HP-HARQ, 2nd HP-HARQ} | | | |
|---|---|---|---|---|
| | {NACK, NACK} | {NACK, ACK} | {ACK, ACK} | {ACK, NACK} |
| Sequence cyclic shift | $m_{cs}$ = 2 | $m_{cs}$ = 5 | $m_{cs}$ = 8 | $m_{cs}$ = 11 |

(Second method) As another method, the UE may bundle 2-bit LP-HARQ to make 1-bit LP-HARQ, and apply the methods of the scenario A3 described above. Here, in bundling, if 2-bit LP-HARQ is ACK, ACK, 1-bit LP-HARQ is ACK, and if 2-bit LP-HARQ includes at least one NACK, 1-bit LP-HARQ is NACK. (Third method) As another method, the UE may bundle 2-bit HP-HARQ to make 1-bit HP-HARQ, and apply the methods of the scenario A2 described above. Here, in bundling, if 2-bit HP-HARQ is ACK, ACK, 1-bit HP-HARQ is ACK, and if 2-bit HP-HARQ includes at least one NACK, 1-bit HP-HARQ is NACK.

(Fourth method) As another method, the UE may bundle 2-bit LP-HARQ to make 1-bit LP-HARQ, bundle 2-bit HP-HARQ to make 1-bit HP-HARQ, and apply the methods of the scenario A1 described above.

Scenarios A1, A2, A3, and A4 are cases where HP-SR is not multiplexed. In the UE, PUCCH format 0 for transmitting HP-SR may collide with PUCCH format 0 for transmitting LP-UCI. In this case, the HP-SR and the LP-UCI may be multiplexed on and transmitted through one PUCCH format 0. The following scenarios B1, B2, B3, B4, B5, and B6 are embodiments in which HP-SR is multiplexed.

(Scenario B1) 1 HP-SR+1-Bit LP-HARQ (First method) The UE may regard 1 HP-SR as 1-bit HP-HARQ and use the methods of the scenario A1 described above. Here, if 1 HP-SR is negative SR, 1-bit HP-HARQ is regarded as NACK, and if 1 HP-SR is positive SR, 1-bit HP-HARQ is regarded as ACK. For example, the second method of the scenario A1 described above may be modified as shown in Table 24 below.

TABLE 24

| | UCI Value{HP-SR LP-HARQ} | | | |
|---|---|---|---|---|
| | {negative, NACK} | {negative, ACK} | {positive, NACK} | {positive, ACK} |
| Sequence cyclic shift | $m_{cs}$ = 0 | $m_{cs}$ = 3 | $m_{cs}$ = 6 | $m_{cs}$ = 9 |

However, when HP-SR is negative in the first method, the minimum cyclic shift interval (or cyclic shift distance) of LP-HARQ is given as 3. Since the UE does not frequently request HP-SR from the base station, it is necessary to maintain a large minimum cyclic shift interval (or cyclic shift distance) of LP-HARQ. Accordingly, a second method may be used. (Second Method) In the second method, CS mapping as shown in Table 25 below may be considered.

TABLE 25

| | UCI Value{HP-SR LP-HARQ} | | | |
|---|---|---|---|---|
| | {negative, NACK} | {positive, NACK} | {negative, ACK} | {positive, ACK} |
| Sequence cyclic shift | $m_{cs}$ = 0 | $m_{cs}$ = 3 | $m_{cs}$ = 6 | $m_{cs}$ = 9 |

(Scenario B2) 1 HP-SR+2-bit LP-HARQ (First method) The UE may regard 1 HP-SR as 1-bit TIP-HARQ and use the methods of the scenario A2 described above. Here, if 1 HP-SR is negative SR, 1-bit TIP-HARQ is regarded as NACK, and if 1 HP-SR is positive SR, 1-bit TIP-HARQ is regarded as ACK. For example, the second method of the scenario A2 described above may be modified as shown in Table 26 below.

TABLE 26

| | 2nd LP-HARQ = NACK | | | | 2nd LP-HARQ = ACK | | | |
|---|---|---|---|---|---|---|---|---|
| | UCI Value {HP-SR, 1st LP-HARQ} | | | | | | | |
| | {negative, NACK} | {negative, ACK} | {positive, ACK} | {positive, NACK} | {negative, NACK} | {negative, ACK} | {positive, ACK} | {positive, NACK} |
| Sequence cyclic shift | $m_{cs} = 0$ | $m_{cs} = 3$ | $m_{cs} = 6$ | $m_{cs} = 9$ | $m_{cs} = 1$ | $m_{cs} = 4$ | $m_{cs} = 7$ | $m_{cs} = 10$ |

(Scenario B3) 1-bit HP-HARQ/1 HP-SR+1-bit LP-HARQ (First method) The UE may regard 1 HP-SR as 1-bit HP-HARQ, and use the methods of the scenario A3 described above. More specifically, the UE may regard 1 HP-SR as 1-bit HARQ-ACK and generate 2-bit HP-HARQ by combining it with 1-bit HARQ-ACK. And the UE can multiplex the 2-bit HP-HARQ and the 1-bit LP-HARQ on one PUCCH format 0. Here, if 1 HP-SR is negative SR, 1-bit HP-HARQ is regarded as NACK, and if 1 HP-SR is positive SR, 1-bit HP-HARQ is regarded as ACK. For example, the first method of the scenario A3 described above may be modified as shown in Table 27 below.

TABLE 27

| | 2nd LP-HARQ = NACK | | | | 2nd LP-HARQ = ACK | | | |
|---|---|---|---|---|---|---|---|---|
| | UCI Value {HP-HARQ, HP-SR} | | | | | | | |
| | {NACK, negative} | {NACK, positive} | {ACK, positive} | {ACK, negative} | {NACK, negative} | {NACK, positive} | {ACK, positive} | {ACK, negative} |
| Sequence cyclic shift | $m_{cs} = 0$ | $m_{cs} = 3$ | $m_{cs} = 6$ | $m_{cs} = 9$ | $m_{cs} = 1$ | $m_{cs} = 4$ | $m_{cs} = 7$ | $m_{cs} = 10$ |

Referring to Table 27, 1 HP-SR is appended after 1-bit HARQ-ACK, but 1 HP-SR may be appended before 1-bit HARQ-ACK. (Scenario B4) 1-bit HP-HARQ/1 HP-SR+2-bit LP-HARQ (First method) The UE may regard 1 HP-SR as 1-bit HP-HARQ and use the methods of the scenario A4 described above. More specifically, the UE regards 1 HP-SR as 1-bit HARQ-ACK and generates 2-bit HP-HARQ by combining with it with 1-bit HARQ-ACK. And the UE can multiplex the 2-bit HP-HARQ and the 2-bit LP-HARQ on one PUCCH format 0. Here, if 1 HP-SR is negative SR, 1-bit HP-HARQ is regarded as NACK, and if 1 HP-SR is positive SR, 1-bit HP-HARQ is regarded as ACK. For example, the first method of the scenario A4 described above may be modified as shown in Table 28 below.

TABLE 28

| | {1st LP-HARQ, 2nd LP-HARQ} = {NACK, NACK} | | | |
|---|---|---|---|---|
| | UCI Value{HP-HARQ, HP-SR} | | | |
| | {NACK, NACK} | {NACK, ACK} | {ACK, ACK} | {ACK, NACK} |
| Sequence cyclic shift | $m_{cs} = 2$ | $m_{cs} = 5$ | $m_{cs} = 8$ | $m_{cs} = 11$ |
| | {1st LP-HARQ, 2nd LP-HARQ} = {ACK, ACK} | | | |
| | UCI Value{HP-HARQ, HP-SR} | | | |
| | {NACK, NACK} | {NACK, ACK} | {ACK, ACK} | {ACK, NACK} |
| Sequence cyclic shift | $m_{cs} = 1$ | $m_{cs} = 4$ | $m_{cs} = 7$ | $m_{cs} = 10$ |

TABLE 28-continued

| | {1st LP-HARQ, 2nd LP-HARQ} = {ACK, NACK} | | | |
|---|---|---|---|---|
| | UCI Value{HP-HARQ, HP-SR} | | | |
| | {NACK, NACK} | {NACK, ACK} | {ACK, ACK} | {ACK, NACK} |
| Sequence cyclic shift | $m_{cs} = 2$ | $m_{cs} = 5$ | $m_{cs} = 8$ | $m_{cs} = 11$ |

Here, 1 HP-SR is appended after 1-bit HARQ-ACK. In contrast, 1 HP-SR may be appended before 1-bit HARQ-ACK.

(Scenario B35) 2-Bit HP-HARQ/1 HP-SR+1-Bit LP-HARQ

Scenario B5 requires up to 16 states. A method of mapping each state to 12 CSs of PUCCH format 0 is as follows.

(First method) As an embodiment of the present invention, the UE may bundle 2-bit HP-HARQ into 1-bit HP-HARQ. Here, in the bundling, if 2-bit HP-HARQ is ACK, ACK, 1-bit HP-HARQ is ACK, and if 2-bit HP-HARQ includes at least one NACK, 1-bit HP-HARQ is NACK. After bundling in this way, 1-bit HP-HARQ (bundled), 1 HP-SR, and 1-bit LP-HARQ may be multiplexed on one PUCCH format 0. In this case, the UE may use the methods of the scenario B3 described above.

According to the first method, the UE bundles 2-bit HP-HARQ into 1-bit HP-HARQ. Such bundling affects retransmission of a PDSCH having high priority. For example, when a UE receives one PDSCH but fails to receive another PDSCH, the UE needs to quickly retransmit only the PDSCH that has failed to receive. However, due to bundling, the base station should retransmit both PDSCHs. Therefore, it is difficult to quickly retransmit the PDSCH that has failed to receive. Hereinafter, a second method for solving this problem is disclosed.

(Second method) If 1-bit LP-HARQ is NACK, 2-bit TIP-HARQ and 1 HP-SR can be transmitted using 8 CSs as shown in Table 29 below.

TABLE 29

| | LP-HARQ = {NACK} UCI Value{1st HP-HARQ, 2nd HP-HARQ, HP-SR} | | | |
|---|---|---|---|---|
| | {NACK, NACK, negative} | {NACK, ACK, negative} | {ACK, ACK, negative} | {ACK, NACK, negative} |
| Sequence cyclic shift | $m_{cs} = 0$ | $m_{cs} = 3$ | $m_{cs} = 6$ | $m_{cs} = 9$ |
| | UCI Value{1st HP-HARQ, 2nd HP-HARQ, HP-SR} | | | |
| | {NACK, NACK, positive} | {NACK, ACK, positive} | {ACK, ACK, positive} | {ACK, NACK, positive} |
| Sequence cyclic shift | $m_{cs} = 1$ | $m_{cs} = 4$ | $m_{cs} = 7$ | $m_{cs} = 10$ |

And the UE can transmit transmit them in the case where 1-bit LP-HARQ is ACK using four unused CSs. More specifically, since the UE rarely transmits the HP-SR, the case where the 1-bit LP-HARQ is ACK may include only the case where the HP-SR is negative. As shown in Table 30, the remaining four CS mappings are possible.

TABLE 30

| | LP-HARQ = {ACK} UCI Value{1st HP-HARQ, 2nd HP-HARQ, HP-SR} | | | |
|---|---|---|---|---|
| | {NACK, NACK, negative} | {NACK, ACK, negative} | {ACK, ACK, negative} | {ACK, NACK, negative} |
| Sequence cyclic shift | $m_{cs} = 2$ | $m_{cs} = 5$ | $m_{cs} = 8$ | $m_{cs} = 11$ |

As another example, if LP-HARQ is ACK, there is a high probability that IP-HARQ is also ACK. This is because the base station transmits the PDSCH having a higher priority more reliably. Therefore, when LP-HARQ is ACK, even if 2-bit HP-HARQ is bundled into 1-bit P-HARQ, performance degradation may be small. Bundled 1-bit HARQ and HP-SR may be mapped to the remaining four CSs as shown in Table 31 below.

TABLE 31

| | LP-HARQ = {ACK} UCI Value{HP-HARQ(bundled), HP-SR} | | | |
|---|---|---|---|---|
| | {NACK, negative} | {NACK, positive} | {ACK, positive} | {ACK, negative} |
| Sequence cyclic shift | $m_{cs} = 2$ | $m_{cs} = 5$ | $m_{cs} = 8$ | $m_{cs} = 11$ |

As another method, the bundled 1-bit HARQ and HP-SR may be mapped to the remaining four CSs as shown in Table 32 below.

TABLE 32

| | LP-HARQ = {ACK} UCI Value{HP-HARQ(bundled), HP-SR} | | | |
|---|---|---|---|---|
| | {NACK, negative} | {NACK, positive} | {ACK, negative} | {ACK, positive} |
| Sequence cyclic shift | $m_{cs} = 2$ | $m_{cs} = 5$ | $m_{cs} = 8$ | $m_{cs} = 11$ |

(Scenario B6) 2-Bit TIP-HARQ/1 HP-SR+2-Bit LP-HARQ

Scenario B6 requires up to 32 states. A method of mapping each state to 12 CSs of PUCCH format 0 is as follows.

(First method) As an embodiment of the present invention, 2-bit HP-HARQ may be bundled into 1-bit HP-HARQ. Here, in the bundling, if 2-bit HP-HARQ is ACK, ACK, 1-bit HP-HARQ is ACK, and if 2-bit HP-HARQ includes at least one NACK, 1-bit HP-HARQ is NACK. After bundling in this way, 1-bit HP-HARQ (bundled), 1 HP-SR, and 2-bit LP-HARQ may be multiplexed on one PUCCH format 0. In this case, the methods of the scenario B4 described above may be used.

(Second method) As an embodiment of the present invention, 2-bit LP-HARQ may be bundled into 1-bit LP-HARQ. Here, in the bundling, if 2-bit LP-HARQ is ACK, ACK, 1-bit LP-HARQ is ACK, and if 2-bit LP-HARQ includes at least one NACK, 1-bit LP-HARQ is NACK. After bundling in this way, 2-bit HP-HARQ, 1 HP-SR, and 1-bit LP-HARQ (bundled) may be multiplexed on one PUCCH format 0. In this case, the methods of the scenario B5 described above may be used.

In the embodiment described above, the method for transmitting one PUCCH format 0 by multiplexing LP UCI and HP UCI by the UE has been described. However, since the UE has PUCCH format 0 (LP-PF0) for transmitting LP UCI and PUCCH format 0 (HP-PF0) for transmitting HP UCI, LP-UCI and HP-UCI can be multiplexd on and transmit through two PUCCh format 0 (LP-PF0 and HP-PF0). The present invention discloses a method using two PUCCh format 0 (LP-PF0 and HP-PF0) for each scenario.

(Scenario A1) 1-Bit HP-HARQ+1-Bit LP-HARQ

The UE may transmit HP-PF0 in PRB X or LP-PF0 in PRB Y. In order to transmit 1-bit HP-HARQ, HP-PF0 may have two CSs. If 1-bit HP-HARQ is NACK, $m_{CS}$=0, and if 1-bit HP-HARQ is ACK, $m_{CS}$=6. Similarly, in order to transmit 1-bit LP-HARQ, LP-PF0 may have two CSs. If 1-bit LP-HARQ is NACK, $m_{CS}$=0, and if 1-bit LP-HARQ is NACK, $m_{CS}$=6. When a collision occurs between the HP-PF0 and the LP-PF0 in the same symbol, 1-bit HP-HARQ and 1-bit LP-HARQ can be transmitted using two PUCCh format 0 (LP-PF0 and HP-PF0) through the following method.

Figure 28:
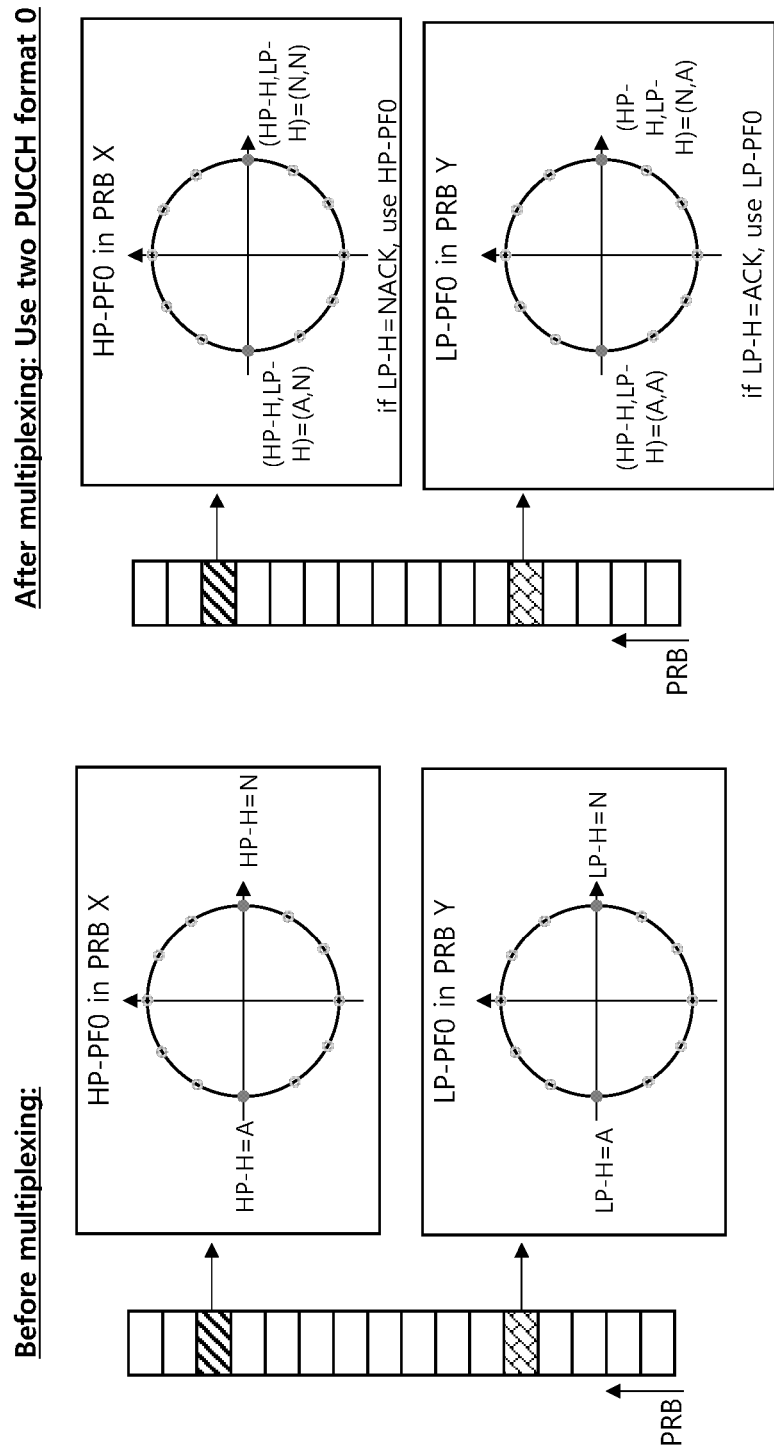
FIG. 28 is a diagram illustrating multiplexing of 1-bit HP-HARQ and 1-bit LP-HARQ according to an embodiment.

(First method) FIG. 28 is a diagram illustrating multiplexing of 1-bit HP-HARQ and 1-bit LP-HARQ according to an embodiment.

Referring to FIG. 28, when the 1-bit LP-HARQ is NACK, the UE may transmit HP-PF0. And, when 1-bit LP-HARQ is ACK, LP-PF0 may be transmitted. In this case, when HP-PF0 or LP-PF0 are transmitted, CS mapping is shown in Table 33 below.

TABLE 33

| | LP-HARQ = {NACK} | | LP-HARQ = {ACK} | |
|---|---|---|---|---|
| | PUCCH resource | | | |
| | HP-PF0 | | LP-PF0 | |
| | UCI Value{HP-HARQ, LP-HARQ} | | | |
| | {NACK, NACK} | {ACK, NACK} | {NACK, ACK} | {ACK, ACK} |
| Sequence cyclic shift | $m_{cs} = 0$ | $m_{cs} = 6$ | $m_{cs} = 0$ | $m_{cs} = 6$ |

Referring to Table 33, when 1-bit LP-HARQ is NACK, HP-PF0 can use two CSs. Here, if 1-bit HP-HARQ is NACK, $m_{CS}=0$, and if 1-bit HP-HARQ is ACK, $m_{CS}=1$. That is, when the base station detects HP-PF0, it can be known that 1-bit LP-HARQ is NACK. In addition, when 0 is detected as the $m_{CS}$ value of the HP-PF0, it can be known that the 1-bit HP-HARQ is NACK. If 1 is detected as the $m_{CS}$ value of the HP-PF0, it can be seen that the 1-bit HP-HARQ is ACK.

When 1-bit LP-HARQ is ACK, two CSs can be used for LP-PF0. Here, if 1-bit HP-HARQ is NACK, $m_{CS}=0$, and if 1-bit HP-HARQ is ACK, $m_{CS}=1$. That is, when the base station detects LP-PF0, it can be known that 1-bit LP-HARQ is ACK. In addition, when 0 is detected as the $m_{CS}$ value of the LP-PF0, it can be known that the 1-bit HP-HARQ is NACK. If 1 is detected as the $m_{CS}$ value of the LP-PF0, it can be seen that the 1-bit HP-HARQ is ACK.

The characteristics of the first method are as follows. Regardless of whether or not the UE transmits LP-HARQ, the base station can correctly receive HP-HARQ. For example, if the UE fails to receive the PDCCH indicating transmission of LP-HARQ, the UE transmits HP-PF0. When HP-PF0 is transmitted, $m_{CS}=0$ if HP-HARQ is NACK, and $m_{CS}=6$ if HP-HARQ is ACK. In this case, the base station cannot know whether or not the UE has succeeded in receiving the PDCCH indicating transmission of LP-HARQ. Therefore, the base station expects that the UE multiplexes LP-HARQ and HP-HARQ and transmits the multiplexed HARQ. Therefore, the base station should determine which of the HP-PF0 and LP-PF0 is transmitted from the UE. Since the UE transmits only HP-HARQ and thus transmits HP-PF0, the UE can detect HP-PF0. Therefore, the UE determines that the LP-HARQ is NACK. Next, ACK/NACK of HP-HARQ may be determined according to $m_{CS}$ of HP-PF0. Through the $m_{CS}$, the base station can correctly determine ACK/NACK of HP-HARQ.

(Power configuration of LP-PF0) In the first method, HP-HARQ may be transmitted not only in HP-PF0 but also in LP-PF0. Therefore, LP-PF0 should guarantee high reliability similarly to HP-PF0. High transmission power is used to obtain the high reliability. In general, in the case of HP-PF0, high transmission power (first transmission power) may be configured for high reliability, and in the case of LP-PF0, relatively low transmission power (second transmission power) may be configured because relatively low reliability is required. In this case, when LP-PF0 is transmitted with the second transmission power, the reliability of HP-HARQ may be lowered.

In order to solve this problem, as an embodiment of the present invention, if the UE transmits HP-HARQ through LP-PF0, the UE may transmit HP-HARQ with higher transmit power instead of the second transmission power. For example, the UE may transmit LP-PF0 using the first transmission power instead of the second transmission power. As another example, LP-PF0 may be transmitted by selecting higher power among the second transmission power and the first transmission power instead of the second transmission power. As another example, LP-PF0 may be transmitted by increasing transmission power of a predetermined level from the second transmission power. Here, the predetermined level may be 3 dB. The above embodiment may equally be applied not only to the scenario A1 but also to other scenarios.

(Scenario A2) 1-Bit HP-HARQ+2-Bit LP-HARQ

The UE may transmit HP-PF0 in PRB X or LP-PF0 in PRB Y. In order to transmit 1-bit HP-HARQ, HP-PF0 may have two CSs. If 1-bit HP-HARQ is NACK, $m_{CS}=0$, and if 1-bit HP-HARQ is ACK, $m_{CS}=6$. In order to transmit 2-bit LP-HARQ, LP-PF0 may have four CSs. If 2-bit LP-HARQ is {NACK, NACK}, $m_{CS}=0$, if 2-bit LP-HARQ is {NACK, ACK}, $m_{CS}=3$, if 2-bit LP-HARQ is {ACK, ACK}, $m_{CS}=6$, and if 2-bit LP-HARQ is {ACK, NACK}, $m_{CS}=9$. When a collision occurs between the HP-PF0 and the LP-PF0 in the same symbol, the UE may transmit 1-bit HP-HARQ and 2-bit LP-HARQ using two PUCCh format 0 (LP-PF0 and HP-PF0) through the following method.

(First method) The UE may use 2 CSs in HP-PF0 and 4 CSs in LP-PF0. Therefore, the UE can use a total of six CSs in two PUCCh format 0. However, the UE needs 8 CSs to transmit 1-bit HP-HARQ and 2-bit LP-HARQ.

Figure 29:
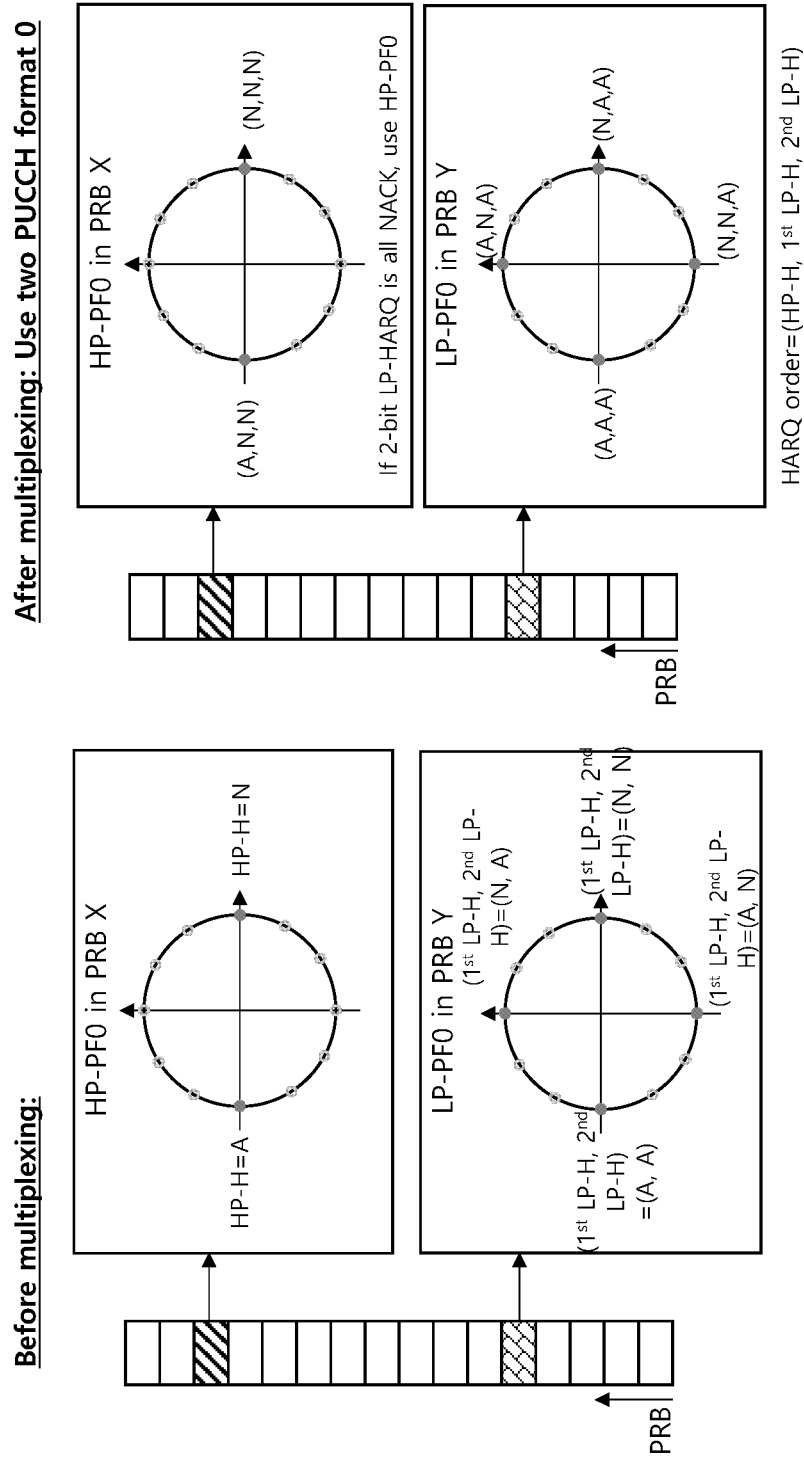
FIG. 29 is a diagram illustrating multiplexing of 1-bit HP-HARQ and 2-bit LP-HARQ according to an embodiment.

FIG. 29 is a diagram illustrating multiplexing of 1-bit HP-HARQ and 2-bit LP-HARQ according to an embodiment.

Referring to FIG. 29, according to an embodiment of the present invention, the UE may transmit HP-PF0 if the 2-bit LP-HARQ is {NACK, NACK}, and may transmit LP-PF0 if the 2-bit LP-HARQ is not {NACK, NACK}. In this case, when HP-PF0 or LP-PF0 are transmitted, CS mapping is shown in Table 34 below.

TABLE 34

| | {1st LP-HARQ, 2nd LP-HARQ} = {NACK, NACK} | {1st LP-HARQ, 2nd LP-HARQ} ≠ {NACK, NACK} | | | |
|---|---|---|---|---|---|
| | | PUCCH resource | | | |
| | HP-PF0 | LP-PF0 | | | |
| | UCI Value {HP-HARQ, 1st LP-HARQ, 2nd LP-HARQ} | | | | |
| | {NACK, NACK, NACK} | {ACK, NACK, NACK} | {NACK, ACK, ACK} | {ACK, NACK, ACK} | {ACK, ACK, ACK} | {ACK, ACK, NACK} |
| Sequence cyclic shift | $m_{cs} = 0$ | $m_{cs} = 6$ | $m_{cs} = 0$ | $m_{cs} = 3$ | $m_{cs} = 6$ | $m_{cs} = 9$ |

Referring to Table 34, when the 2-bit LP-HARQ is {NACK, NACK}, the UE may use two CSs for HP-PF0. Here, if 1-bit HP-HARQ is NACK, $m_{CS}$=0, and if 1-bit HP-HARQ is ACK, $m_{CS}$=1. That is, when the base station detects HP-PF0, it can be known that 2-bit LP-HARQ is {NACK, NACK}. In addition, when 0 is detected as the $m_{CS}$ value of the HP-PF0, it can be known that the 1-bit HP-HARQ is NACK. If 1 is detected as the $m_{CS}$ value of the HP-PF0, it can be known that the 1-bit HP-HARQ is ACK.

If 2-bit LP-HARQ is not {NACK, NACK}, four of {HP-HARQ, 1$^{st}$ LP-HARQ, 2$^{nd}$ LP-HARQ}={NACK, NACK, ACK}, {ACK, NACK, ACK}, {NACK, ACK, NACK}, {ACK, ACK, NACK}, {NACK, ACK, ACK}, {ACK, ACK, ACK} may be selected and mapped to four CSs of LP-PF0. In the previous table, as an example, {HP-HARQ, 1$^{st}$ LP-HARQ, 2$^{nd}$ LP-HARQ}={NACK, ACK, ACK}, {ACK, NACK, ACK}, {ACK, ACK, ACK}, {ACK, ACK, NACK} was selected. And the selected ones can be mapped to mCS=0, 3, 6, 9 in turn. Here, the reason for selecting the four HARQ-ACK states is that HP-HARQ is ACK with a high probability, and thus the HARQ-ACK state in which HP-HARQ is ACK is selected first. And, as the other HARQ-ACK state, a HARQ-ACK state in which HP-HARQ is NACK and LP-HARQs are both ACK is selected. This is an exemplary configuration, and 4 other HARQ-ACK states can be configured and mapped to 4 CSs of LP-PF0.

(Second method) In the first method, since the number of usable CSs is 6, 8 HARQ-ACK states could not be indicated. The UE may indicate all HARQ-ACK states using two additional CSs.

Figure 30:
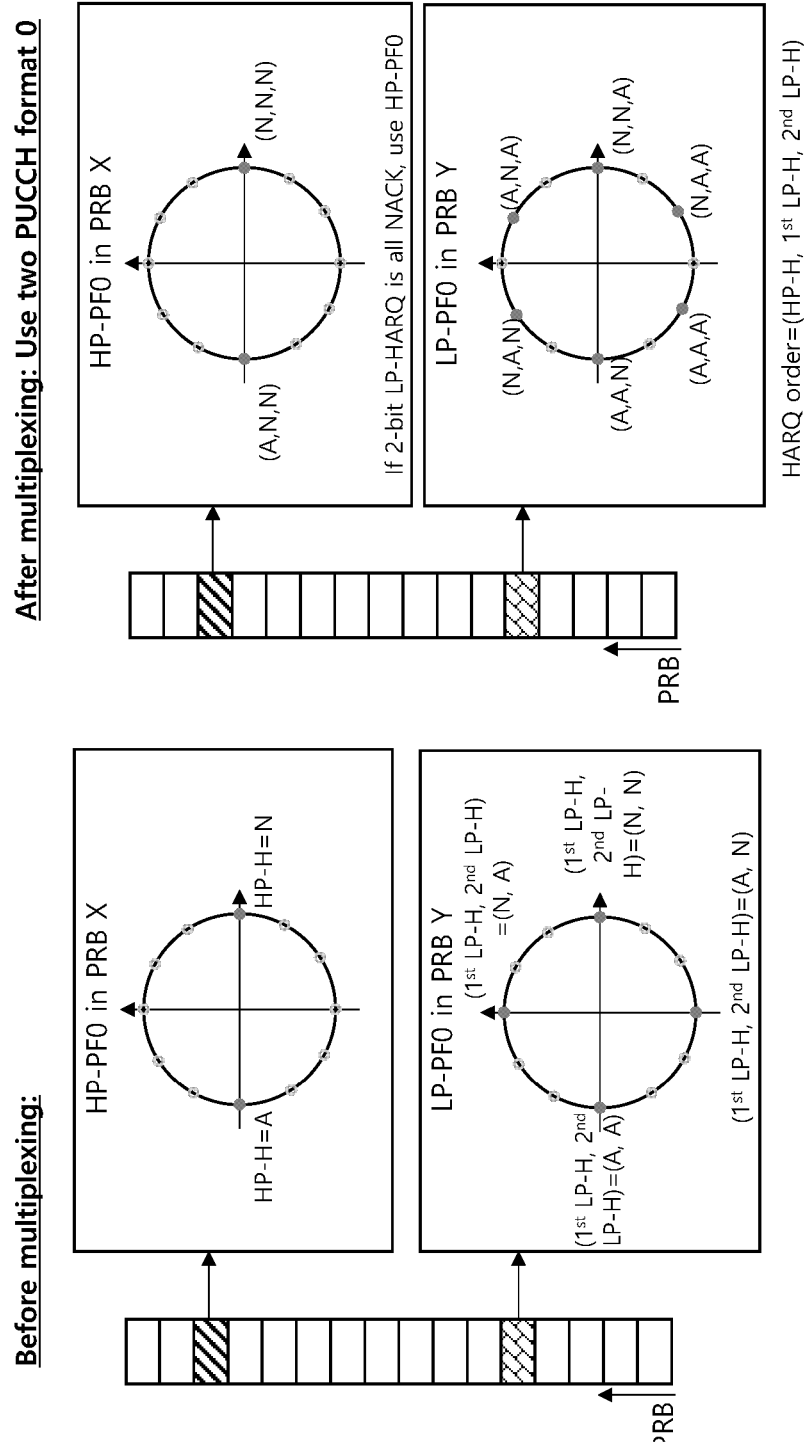
FIG. 30 is a diagram illustrating multiplexing of 1-bit HP-HARQ and 2-bit LP-HARQ according to another embodiment.

FIG. 30 is a diagram illustrating multiplexing of 1-bit HP-HARQ and 2-bit LP-HARQ according to another embodiment.

Referring to FIG. 30, LP-PF0 may use 6 CSs. More specifically, the UE may transmit HP-PF0 if the 2-bit LP-HARQ is {NACK, NACK}, and transmit LP-PF0 if the 2-bit LP-HARQ is not {NACK, NACK}. In this case, when HP-PF0 or LP-PF0 are transmitted, CS mapping is shown in Table 35 below.

TABLE 35

| | {1st LP-HARQ, 2nd LP-HARQ} = {NACK, NACK} | {1st LP-HARQ, 2nd LP-HARQ} ≠ {NACK, NACK} | | | | | |
|---|---|---|---|---|---|---|---|
| | | PUCCH resource | | | | | |
| | HP-PF0 | LP-PF0 | | | | | |
| | UCI Value {HP-HARQ, 1st LP-HARQ, 2nd LP-HARQ} | | | | | | |
| | {NACK, NACK, NACK} | {ACK, NACK, NACK} | {NACK, NACK, ACK} | {ACK, NACK, ACK} | {NACK, ACK, NACK} | {ACK, ACK, NACK} | {ACK, ACK, ACK} | {NACK, ACK, ACK} |
| Sequence cyclic shift | $m_{cs} = 0$ | $m_{cs} = 6$ | $m_{cs} = 0$ | $m_{cs} = 2$ | $m_{cs} = 4$ | $m_{cs} = 6$ | $m_{cs} = 8$ | $m_{cs} = 10$ |

When compared to the first method, if the 2-bit LP-HARQ is {NACK, NACK}, the transmission method of HP-PF0 is the same. However, when 2-bit LP-HARQ is not {NACK, NACK}, 6 HARQ-ACK states are transmitted through 6 CSs of LP-PF0. Here, the six CSs may have an interval of 2, such as 0, 2, 4, 6, 8, 10. As another example, for the six CSs, two CSs may be added to 0, 3, 6, 9. For example, the two CSs to be added may be s and (s+6). Here, s may be one value of s=1, 2. When compared to the first method, the second method has an advantage of expressing all HARQ-ACK states, but requires more CS in LP-PF0. In general, 12 CSs of LP-PF0 can be used by different UEs, but according to the second method, 12 CSs of LP-PF0 cannot be used by different UEs.

(Third method) Similar to the second method, the UE may indicate all HARQ-ACK states by additionally using two CSs.

Figure 31:
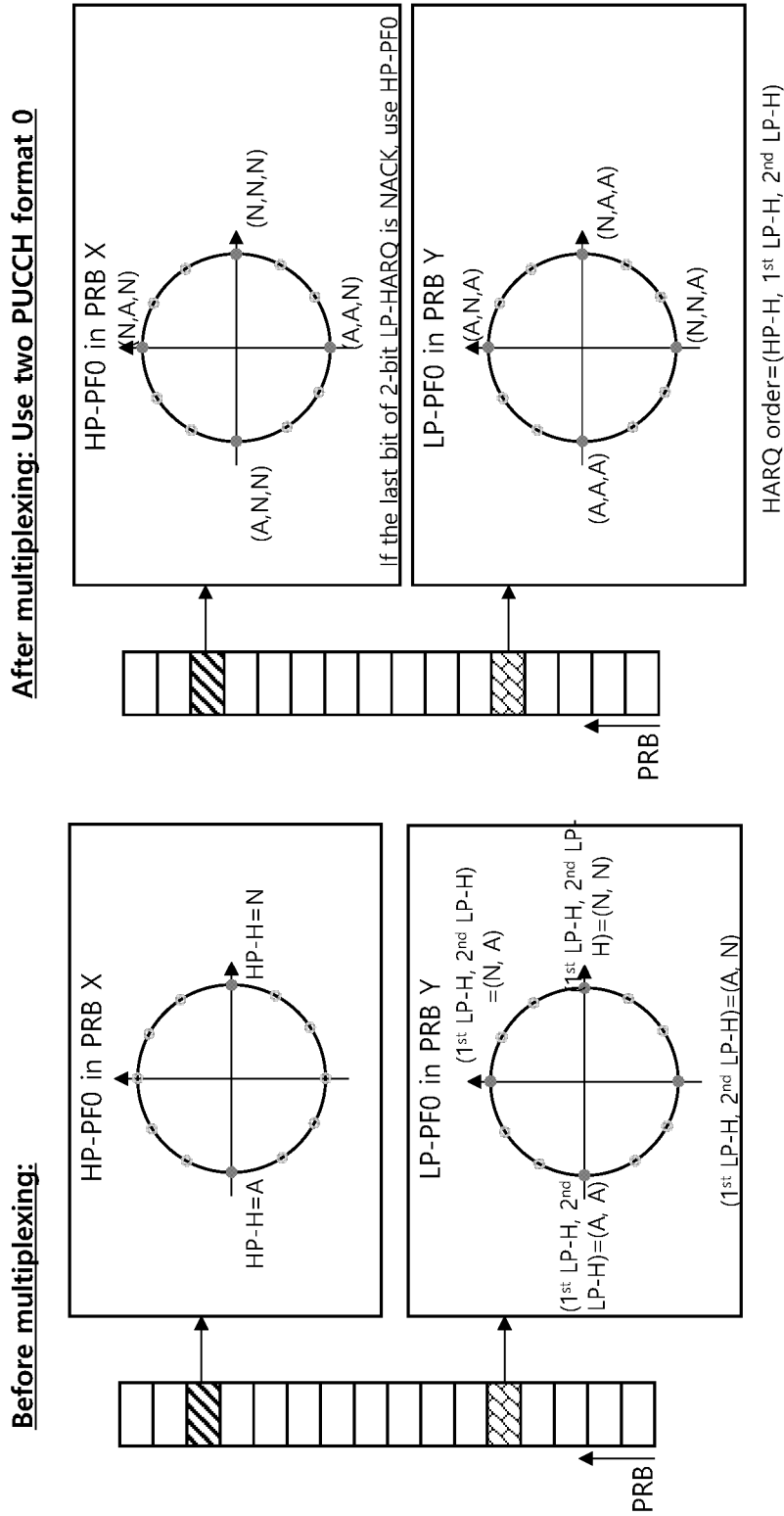
FIG. 31 is a diagram illustrating multiplexing of 1-bit HP-HARQ and 2-bit LP-HARQ according to another embodiment.

FIG. 31 is a diagram illustrating multiplexing of 1-bit HP-HARQ and 2-bit LP-HARQ according to another embodiment.

Referring to FIG. 31, as a third method, HP-PF0 may use 4 CSs. More specifically, if one bit (for example, the last bit) of the 2-bit LP-HARQ is NACK, the UE may transmit HP-PF0, and if one bit (for example, the last bit) of the 2-bit LP-HARQ is ACK, the UE may transmit LP-PF0. In this case, when HP-PF0 or LP-PF0 is transmitted, CS mapping is shown in Table 36 below.

TABLE 36

| | {2nd LP-HARQ} = {NACK} | | | | {2nd LP-HARQ} = {ACK} | | | |
|---|---|---|---|---|---|---|---|---|
| | PUCCH resource | | | | | | | |
| | HP-PF0 | | | | LP-PF0 | | | |
| | UCI Value {HP-HARQ, 1st LP-HARQ, 2nd LP-HARQ} | | | | | | | |
| | {NACK, NACK, NACK} | {NACK, ACK, NACK} | {ACK, NACK, NACK} | {ACK, ACK, NACK} | {NACK, ACK, ACK} | {ACK, NACK, ACK} | {ACK, ACK, ACK} | {NACK, NACK, ACK} |
| Sequence cyclic shift | $m_{cs} = 0$ | $m_{cs} = 3$ | $m_{cs} = 6$ | $m_{cs} = 9$ | $m_{cs} = 0$ | $m_{cs} = 3$ | $m_{cs} = 6$ | $m_{cs} = 9$ |

(Fourth method) As another method, 2-bit LP-HARQ can be bundled to make 1-bit LP-HARQ, and the methods of the scenario A1 described above can be applied. Here, in bundling, if 2-bit LP-HARQ is ACK, ACK, 1-bit LP-HARQ is ACK, and if 2-bit LP-HARQ includes at least one NACK, 1-bit LP-HARQ is NACK.

(Scenario A3) 2-Bit HP-HARQ+1-Bit LP-HARQ

The UE may transmit HP-PF0 in PRB X or LP-PF0 in PRB Y. In order to transmit 2-bit HP-HARQ, HP-PF0 may have four CSs. If 2-bit HP-HARQ is {NACK, NACK}, $m_{CS}=0$, if 2-bit HP-HARQ is {NACK, ACK}, $m_{CS}=3$, if 2-bit HP-HARQ is {ACK, ACK}, $m_{CS}=6$, and if 2-bit HP-HARQ is {ACK, NACK}, $m_{CS}=9$. In order to transmit 1-bit HP-HARQ, HP-PF0 may have two CSs. If 1-bit HP-HARQ is NACK, $m_{CS}=0$, and if 1-bit HP-HARQ is ACK, $m_{CS}=6$. When a collision occurs between the HP-PF0 and the LP-PF0 in the same symbol, 2-bit HP-HARQ and 1-bit LP-HARQ can be transmitted using two PUCCh format 0 (LP-PF0 and HP-PF0) through the following method.

(First method) The UE may use 4 CSs for HP-PF0 and may use 2 CSs for LP-PF0. Therefore, the UE can use a total of six CSs for two PUCCH format 0. However, the UE needs 8 CSs to transmit 2-bit HP-HARQ and 1-bit LP-HARQ.

Figure 32:
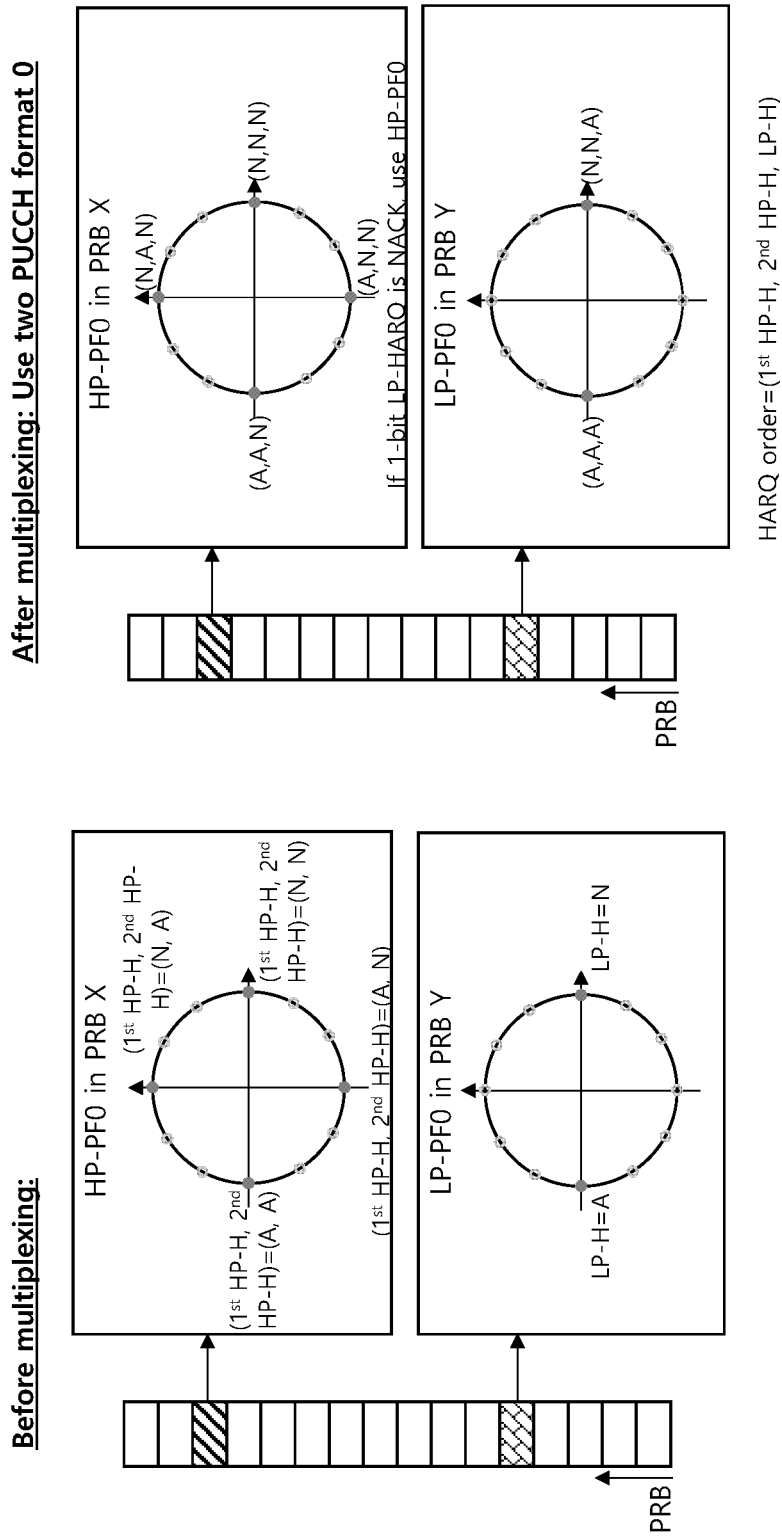
FIG. 32 is a diagram s illustrating multiplexing of 2-bit HP-HARQ and 1-bit LP-HARQ according to an embodiment.

FIG. 32 is a diagram illustrating multiplexing of 2-bit HP-HARQ and 1-bit LP-HARQ according to an embodiment.

Referring to FIG. 32, the UE may transmit HP-PF0 if 1-bit LP-HARQ is NACK, and transmit LP-PF0 if 1-bit LP-HARQ is ACK. In this case, when HP-PF0 or LP-PF0 is transmitted, CS mapping is shown in Table 37 below Referring to Table 37, when 1-bit LP-HARQ is ACK, the UE may select two of {$1^{st}$ HP-HARQ, $2^{nd}$ HP-HARQ, LP-HARQ}={NACK, NACK, ACK}, {NACK,ACK, ACK}, {ACK,NACK,ACK}, {ACK,ACK,ACK} and mapped the selected ones to two CSs of LP-PF0. Table 37 shows that {$1^{st}$ HP-HARQ, $2^{nd}$ HP-HARQ, LP-HARQ}={NACK, NACK, ACK}, {ACK, ACK, ACK} are selected as an example. And the selected ones can be mapped to $m_{CS}=0$, 6 in turn. Here, the two selected HARQ-ACK states are the case where two bits of HP-HARQ are the same. In general, since HP-HARQ is transmitted within a short time, it is highly likely to pass through the same channel environment. Therefore, the probability of being the same bit may be high. That is, correlation between the two bits may be high. Of course, Table 37 is an exemplary configuration, and the UE may configure two other HARQ-ACK states and map these HARQ-ACK states to two CSs of LP-PF0.

(Second method) In the first method, since the number of CSs available to the UE is 6 CSs, 8 HARQ-ACK states could not be represented. The UE may represent all HARQ-ACK states using two additional CSs.

Figure 33:
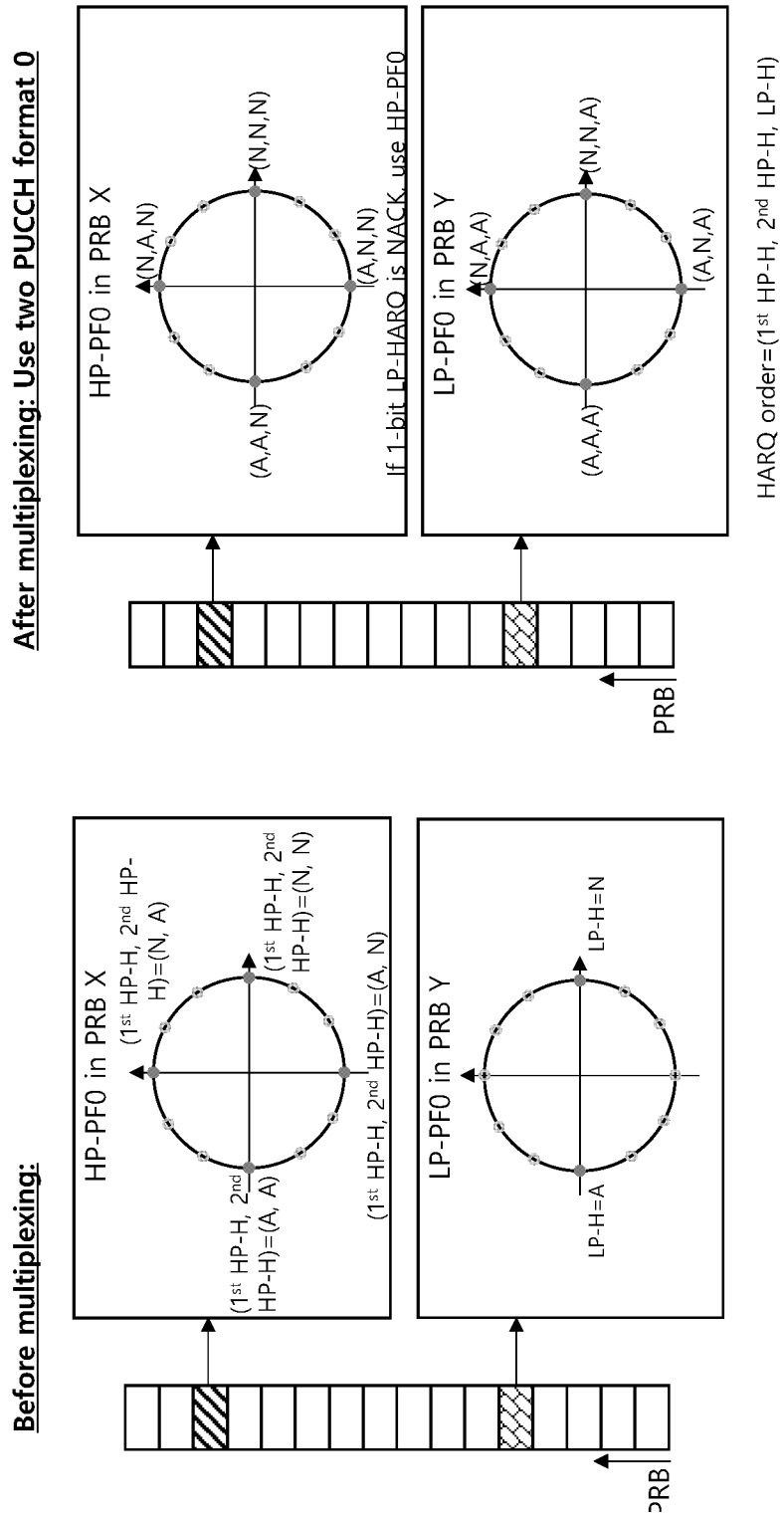
FIG. 33 is a diagram illustrating multiplexing of 2-bit HP-HARQ and 1-bit LP-HARQ according to another embodiment.

FIG. 33 is a diagram illustrating multiplexing of 2-bit HP-HARQ and 1-bit LP-HARQ according to another embodiment.

Referring to FIG. 33, in the second method of the present invention, the UE may use 4 CSs for LP-PF0. More specifically, the UE may transmit HP-PF0 if the 1-bit LP-HARQ is NACK, and transmit LP-PF0 if the 1-bit LP-HARQ is ACK. In this case, when HP-PF0 or LP-PF0 is transmitted, CS mapping is shown in Table 38 below.

TABLE 37

| | LP-HARQ = {NACK} | | | | LP-HARQ = {ACK} | |
|---|---|---|---|---|---|---|
| | PUCCH resource | | | | | |
| | HP-PF0 | | | | LP-PF0 | |
| | UCI Value {1st HP-HARQ, 2nd HP-HARQ, LP-HARQ} | | | | | |
| | {NACK, NACK, NACK} | {NACK, ACK, NACK} | {ACK, ACK, NACK} | {ACK, NACK, NACK} | {NACK, NACK, ACK} | {ACK, ACK, ACK} |
| Sequence cyclic shift | $m_{cs} = 0$ | $m_{cs} = 3$ | $m_{cs} = 6$ | $m_{cs} = 9$ | $m_{cs} = 0$ | $m_{cs} = 6$ |

TABLE 38

| | LP-HARQ = {NACK} | | | | LP-HARQ = {ACK} | | | |
|---|---|---|---|---|---|---|---|---|
| | \multicolumn{8}{c}{PUCCH resource} |
| | HP-PF0 | | | | LP-PF0 | | | |
| | \multicolumn{8}{c}{UCI Value {1st HP-HARQ, 2nd HP-HARQ, LP-HARQ}} |
| | {NACK, NACK, NACK} | {NACK, ACK, NACK} | {ACK, ACK, NACK} | {ACK, NACK, NACK} | {NACK, NACK, ACK} | {NACK, ACK, ACK} | {ACK, ACK, ACK} | {ACK, NACK, ACK} |
| Sequence cyclic shift | $m_{cs} = 0$ | $m_{cs} = 3$ | $m_{cs} = 6$ | $m_{cs} = 9$ | $m_{cs} = 0$ | $m_{cs} = 3$ | $m_{cs} = 6$ | $m_{cs} = 9$ |

(Third method) Since the number of available CSs in the first method is six CSs, eight HARQ-ACK states could not be represented. The UE may represent all HARQ-ACK states using two additional CSs.

Figure 34:
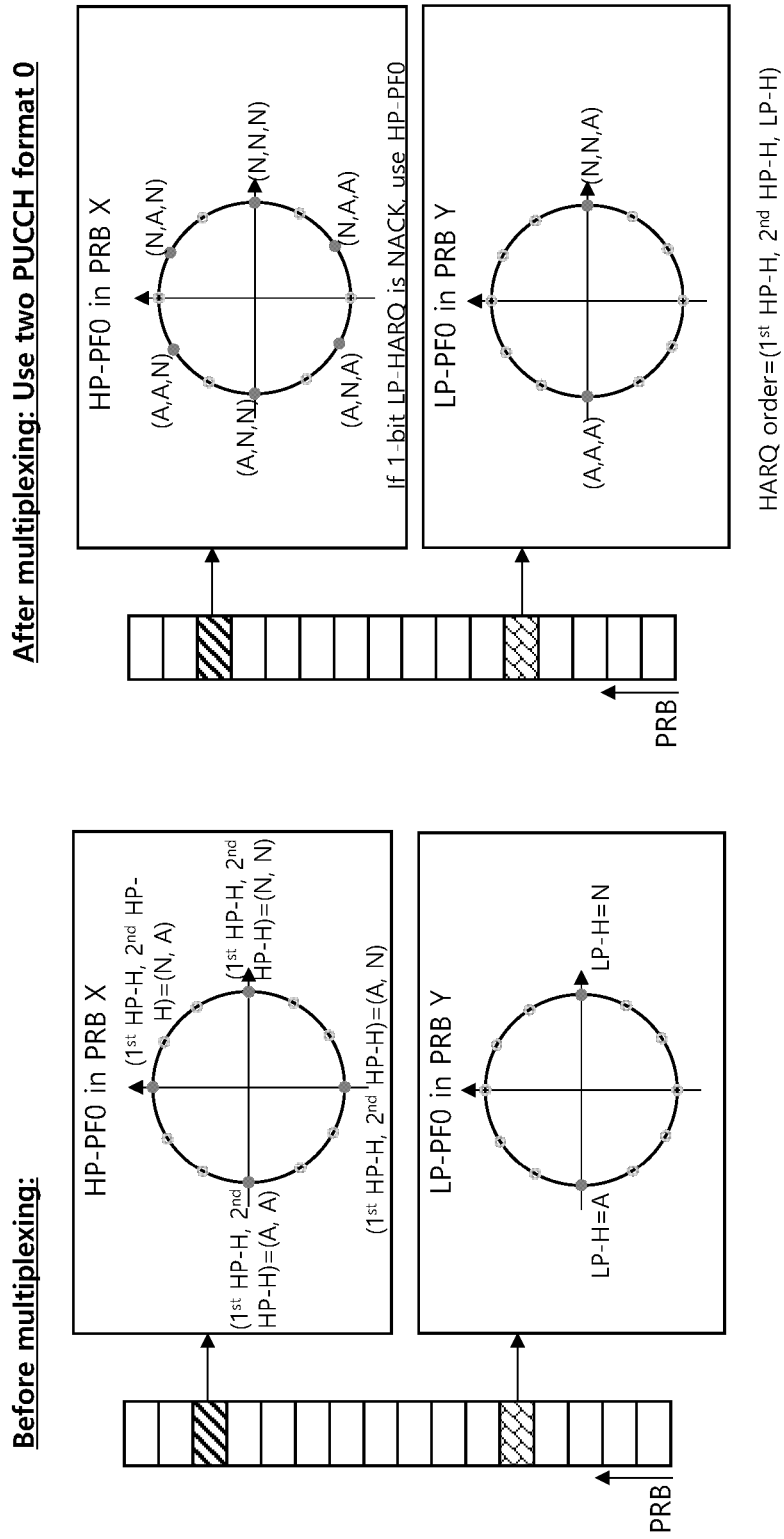
FIG. 34 is a diagram illustrating multiplexing of 2-bit HP-HARQ and 1-bit LP-HARQ according to another embodiment.

FIG. 34 is a diagram illustrating multiplexing of 2-bit P-HARQ and 1-bit LP-HARQ according to another embodiment.

Referring to FIG. 34, in the third method of the present invention, the UE may use 6 CSs for HP-PF0. More specifically, the UE may transmit HP-PF0 if the 1-bit LP-HARQ is NACK, and transmit LP-PF0 if the 1-bit LP-HARQ is ACK. In this case, when HP-PF0 or LP-PF0 are transmitted, CS mapping is shown in Table 39 below.

TABLE 39

| | \multicolumn{8}{c}{PUCCH resource} |
|---|---|---|---|---|---|---|---|---|
| | HP-PF0 | | | | | | LP-PF0 | |
| | \multicolumn{8}{c}{UCI Value {1st HP-HARQ, 2nd HP-HARQ, LP-HARQ}} |
| | {NACK, NACK, NACK} | {NACK, ACK, NACK} | {ACK, ACK, NACK} | {ACK, NACK, NACK} | {ACK, NACK, ACK} | {NACK, NACK, ACK} | {NACK, ACK, ACK} | {ACK, ACK, ACK} |
| Sequence cyclic shift | $m_{cs} = 0$ | $m_{cs} = 2$ | $m_{cs} = 4$ | $m_{cs} = 6$ | $m_{cs} = 8$ | $m_{cs} = 10$ | $m_{cs} = 0$ | $m_{cs} = 6$ |

(Fourth method) As another method, the UE may generate 1-bit HP-HARQ by bundling 2-bit HP-HARQ, and apply the methods of the scenario A1 described above. Here, in the bundling, if 2-bit HP-HARQ is ACK, ACK, 1-bit HP-HARQ is ACK, and if 2-bit HP-HARQ includes at least one NACK, 1-bit HP-HARQ is NACK.

(Scenario A4) 2-Bit HP-HARQ+2-Bit LP-HARQ

The UE may transmit HP-PF0 in PRB X or transmit LP-PF0 in PRB Y. In order to transmit 2-bit HP-HARQ, HP-PF0 may have 4 CSs. If 2-bit HP-HARQ is {NACK, NACK}, $m_{CS}$=0, if 2-bit HP-HARQ is {NACK, ACK}, $m_{CS}$=3, if 2-bit IP-HARQ is {ACK, ACK}, $m_{CS}$=6, and if 2-bit HP-HARQ is {ACK, NACK}, $m_{CS}$=9. In order to transmit 2-bit LP-HARQ, LP-PF0 may have four CSs. If 2-bit LP-HARQ is {NACK, NACK}, $m_{CS}$=0, if 2-bit LP-HARQ is {NACK, ACK}, $m_{CS}$=3, if 2-bit LP-HARQ is {ACK, ACK}, $m_{CS}$=6, and if 2-bit LP-HARQ is {ACK, NACK}, $m_{CS}$=9. When a collision occurs between the HP-PF0 and the LP-PF0 in the same symbol, the UE may transmit 2-bit HP-HARQ and 1-bit LP-HARQ using two PUCCH format 0 (LP-PF0 and HP-PF0) through the following method.

(First method) The UE may use 4 CSs in HP-PF0 and 4 CSs in LP-PF0. Accordingly, the UE may use a total of eight CSs in two PUCCH format 0. However, the UE needs 16 CSs in order to transmit 2-bit HP-HARQ and 2-bit LP-HARQ.

Figure 35:
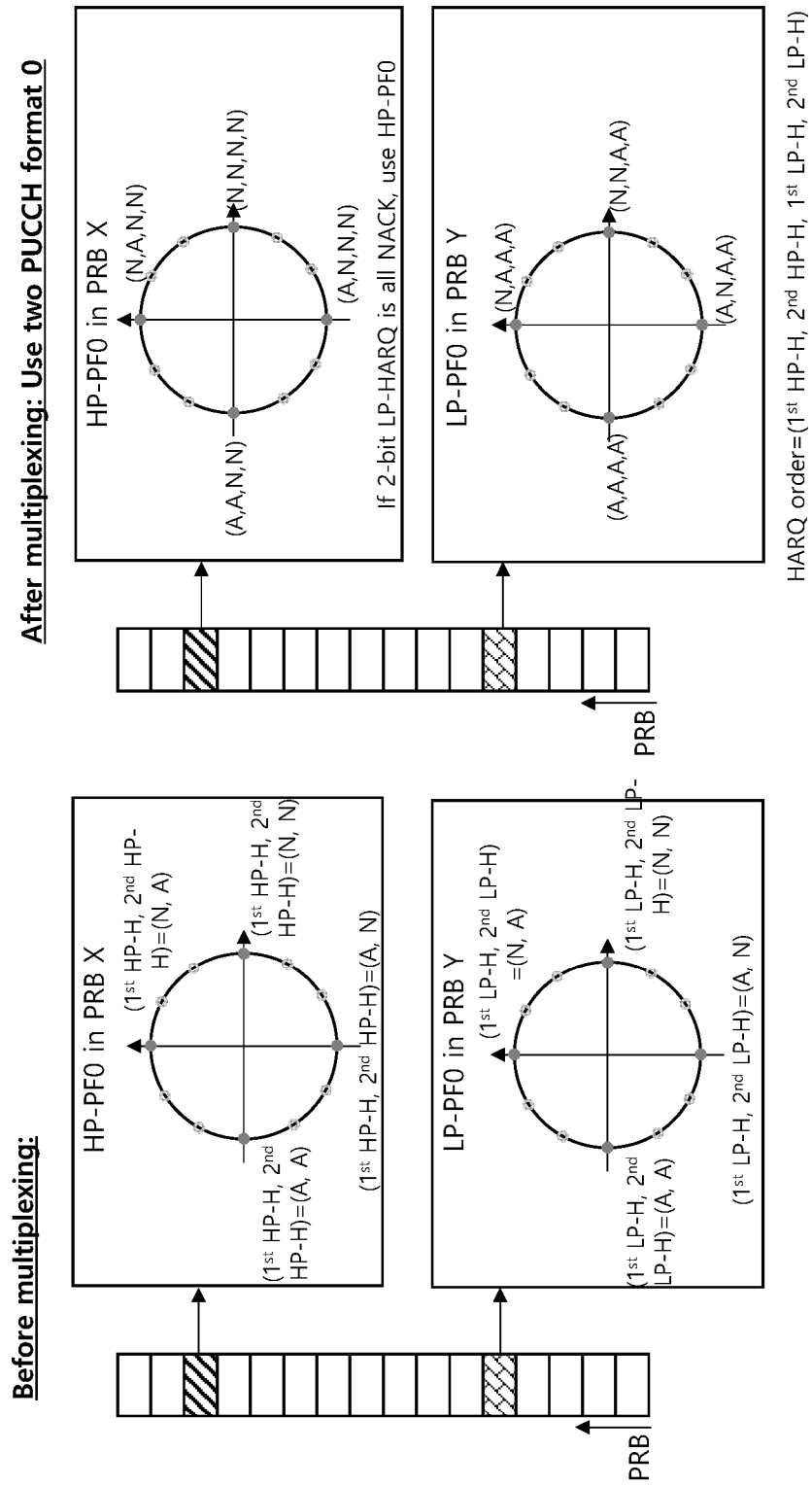
FIG. 35 is a diagram illustrating multiplexing of 2-bit HP-HARQ and 2-bit LP-HARQ according to an embodiment.

FIG. 35 is a diagram illustrating multiplexing of 2-bit HP-HARQ and 2-bit LP-HARQ according to an embodiment.

Referring to FIG. 35, according to an embodiment of the present invention, the UE may transmit HP-PF0 if the 2-bit LP-HARQ is {NACK, NACK}, and may transmit LP-PF0 if the 2-bit LP-HARQ is not {NACK, NACK}. In this case, when HP-PF0 or LP-PF0 is transmitted, CS mapping is shown in Table 40 below.

TABLE 40

| | {1st LP-HARQ, 2nd LP-HARQ} = {NACK, NACK} | | | | {1st LP-HARQ, 2nd LP-HARQ} ≠ {NACK, NACK} | | | |
|---|---|---|---|---|---|---|---|---|
| PUCCH resource | | | | | | | | |
| | HP-PF0 | | | | LP-PF0 | | | |
| UCI Value {1st HP-HARQ, 2nd HP-HARQ, 1st LP-HARQ, 2nd LP-HARQ} | | | | | | | | |
| | {NACK, NACK, NACK, NACK} | {NACK, ACK, NACK, NACK} | {ACK, ACK, NACK, NACK} | {ACK, NACK, NACK, NACK} | {NACK, NACK, ACK, ACK} | {NACK, ACK, ACK, ACK} | {ACK, ACK, ACK, ACK} | {ACK, NACK, ACK, ACK} |
| Sequence cyclic shift | $m_{cs} = 0$ | $m_{cs} = 3$ | $m_{cs} = 6$ | $m_{cs} = 9$ | $m_{cs} = 0$ | $m_{cs} = 3$ | $m_{cs} = 6$ | $m_{cs} = 9$ |

(Second method) As another method, the UE may generate 1-bit LP-HARQ by bundling 2-bit LP-HARQ, and apply the methods of the scenario A3 described above. Here, in the bundling, if 2-bit LP-HARQ is ACK, ACK, 1-bit LP-HARQ is ACK, and if 2-bit LP-HARQ includes at least one NACK, 1-bit LP-HARQ is NACK.

(Third method) As another method, the UE may generate 1-bit HP-HARQ by bundling 2-bit HP-HARQ, and apply the methods of the scenario A2 described above. Here, in the bundling, if 2-bit HP-HARQ is ACK, ACK, 1-bit HP-HARQ is ACK, and if 2-bit HP-HARQ includes at least one NACK, 1-bit HP-HARQ is NACK.

(Fourth method) As another method, the UE may generate 1-bit LP-HARQ by bundling 2-bit LP-HARQ and generate 1-bit HP-HARQ by bundling 2-bit HP-HARQ, and apply the methods of the scenario A1 described above.

Scenarios A1, A2, A3, and A4 are cases where HP-SR is not multiplexed. In the UE, PUCCH format 0 for transmitting HP-SR may collide with PUCCH format 0 for transmitting LP-UCI. In this case, HP-SR and LP-UCI may be multiplexed and transmitted through two PUCCH format 0 (LP-PF0 or HP-PF0). Following scenarios B1, B2, B3, B4, B5, and B6 are examples in which HP-SR is multiplexed.

(Scenario B1) 1 HP-SR+1-Bit LP-HARQ (First method) 1 HP-SR may be regarded as 1-bit HP-HARQ, and the methods of the scenario A1 described above may be used. Here, the UE regards 1-bit HP-HARQ as NACK if 1 HP-SR is negative SR, and regards 1-bit HP-HARQ as ACK if 1 HP-SR is positive SR. For reference, in the case of 1-bit HP-HARQ, two CSs can be used in HP-PF0, but in the case of 1 HP-SR, only one CS can be used in HP-PF0. However, in this method, it is assumed that in the case of 1 HP-SR, two CSs can be used in HP-PF0 as in 1-bit HP-HARQ.

(Scenario B2) 1 HP-SR+2-Bit LP-HARQ (First method) 1 HP-SR may be regarded as 1-bit HP-HARQ, and the methods of the scenario A2 described above may be used. Here, the UE regards 1-bit HP-HARQ as NACK if 1 HP-SR is negative SR, and regards 1-bit HP-HARQ as ACK if 1 HP-SR is positive SR. For reference, in the case of 1-bit HP-HARQ, two CSs can be used in HP-PF0, but in the case of 1 HP-SR, only one CS can be used in HP-PF0. However, in this method, it is assumed that in the case of 1 HP-SR, two CSs can be used in HP-PF0 as in 1-bit HP-HARQ.

(Scenario B3) 1-Bit HP-HARQ/1 HP-SR+1-Bit LP-HARQ (First method) 1 HP-SR may be regarded as 1-bit HP-HARQ, and the methods of the scenario A3 described above may be used. More specifically, the UE regards 1 HP-SR as 1-bit HARQ-ACK and generates 2-bit HP-HARQ by combining it with 1-bit HARQ-ACK. And the UE can multiplex the 2-bit HP-HARQ and 1-bit LP-HARQ on two PUCCH format 0 (LP-PF0 and HP-PF0). Here, the UE regards 1-bit HP-HARQ as NACK if 1 HP-SR is negative SR, and regards 1-bit HP-HARQ as ACK if 1 HP-SR is positive SR. For reference, in the case of 1-bit HP-HARQ, two CSs can be used in HP-PF0, but in the case of 1 HP-SR, only one CS can be used in HP-PF0. However, in this method, it is assumed that in the case of 1 HP-SR, two CSs can be used in HP-PF0 as in 1-bit HP-HARQ.

(Scenario B4) 1-Bit HP-HARQ/1 HP-SR+2-Bit LP-HARQ (First method) 1 HP-SR may be regarded as 1-bit HP-HARQ and the methods of the scenario A4 described above may be used. More specifically, the UE regards 1 HP-SR as 1-bit HARQ-ACK and generates 2-bit HP-HARQ by combining it with 1-bit HARQ-ACK. And, the UE can multiplex the 2-bit HP-HARQ and the 2-bit LP-HARQ on two PUCCH format 0 (LP-PF0 and HP-PF0). Here, if 1 HP-SR is negative SR, 1-bit HP-HARQ is regarded as NACK, and if 1 HP-SR is positive SR, 1-bit HP-HARQ is regarded as ACK.

(Scenario B5) 2-Bit HP-HARQ/1 HP-SR+1-Bit LP-HARQ (First method) As an embodiment of the present invention, 2-bit HP-HARQ may be bundled into 1-bit HP-HARQ. Here, in the bundling, if 2-bit HP-HARQ is ACK, ACK, 1-bit HP-HARQ is ACK, and if 2-bit HP-HARQ includes at least one NACK, 1-bit HP-HARQ is NACK. After bundling in this way, 1-bit HP-HARQ (bundled), 1 HP-SR, and 1-bit LP-HARQ can be multiplexed on one PUCCH format 0. In this case, the methods of the scenario B3 described above may be used.

(Scenario B6) 2-Bit HP-HARQ/1 HP-SR+2-Bit LP-HARQ (First Method) As an embodiment of the present invention, 2-bit HP-HARQ may be bundled into 1-bit HP-HARQ. Here, in the bundling, if 2-bit HP-HARQ is ACK, ACK, 1-bit HP-HARQ is ACK, and if 2-bit HP-HARQ includes at least one NACK, 1-bit HP-HARQ is NACK. After bundling in this way, 1-bit HP-HARQ (bundled), 1 HP-SR, and 2-bit LP-HARQ can be multiplexed on one PUCCH format 0. In this case, the methods of the scenario B4 described above may be used.

(Second method) In an embodiment of the present invention, 2-bit LP-HARQ may be bundled into 1-bit LP-HARQ. Here, in the bundling, if 2-bit LP-HARQ is ACK, ACK, 1-bit LP-HARQ is ACK, and if 2-bit LP-HARQ includes at least one NACK, 1-bit LP-HARQ is NACK. After bundling in this way, 2-bit HP-HARQ, 1 HP-SR, and 1-bit LP-HARQ (bundled) can be multiplexed on one PUCCH format 0. In this case, the methods of the scenario B5 described above may be used.

The following embodiments disclose a multiplexing method in a collision situation between LP PUCCH format 1 and HP PUCCH format 1. Similar to the collision situation between the PUCCH formats 0 described above, a multiplexing method is disclosed for each scenario.

(Scenario A1) 1-Bit HP-HARQ+1-Bit LP-HARQ (First method) 1-bit HP-HARQ and 1-bit LP-HARQ may be multiplexed on one PUCCH format 1 and transmitted. Here, one PUCCH format 1 may be PUCCH format 1 for transmitting 1-bit HP-HARQ. The UE generates 2-bit HARQ by combining 1-bit HP-HARQ and 1-bit LP-HARQ. In addition, the UE may modulate 2-bit HARQ into QPSK symbols and transmit the QPSK symbols through the PUCCH format 1. When performing modulation into the QPSK symbols, modulation can be performed as shown in Table 41 below.

TABLE 41

| | Angle | | | |
|---|---|---|---|---|
| | $1/4 \cdot \pi$ | $3/4 \cdot \pi$ | $5/4 \cdot \pi$ | $7/4 \cdot \pi$ |
| UCI Value{1-bit HP-HARQ, 1-bit LP-HARQ}(with Gray mapping) | {NACK, NACK} | {ACK, NACK} | {ACK, ACK} | {NACK, ACK} |
| UCI Value{1-bit HP-HARQ, 1-bit LP-HARQ}(without Gray mapping) | {NACK, NACK} | {NACK, ACK} | {ACK, NACK} | {ACK, ACK} |

Here, it is possible to modulate 1-bit HP-HARQ and 1-bit LP-HARQ in a gray mapping method. This method shows a low bit error rate because a maximum difference of 1 bit occurs between two adjacent angles. However, if the UE does not receive the PDCCH indicating transmission of LP-HARQ, the UE will perform BPSK modulation on 1-bit HP-HARQ and transmit the 1-bit HP-HARQ through PUCCH format 1. In this case, if the 1-bit HP-HARQ is NACK, a BPSK symbol corresponding to an angle $1/4\pi$ is generated, and if the 1-bit HP-HARQ is ACK, a BPSK symbol corresponding to an angle $5/4\pi$ is generated. When the base station receives a symbol corresponding to $5/4\pi$, the base station interprets the symbol as a QPSK symbol and determines that both 1-bit HP-HARQ and 1-bit LP-HARQ are ACK. Therefore, although the UE did not transmit 1-bit LP-HARQ, it is determined that the 1-bit LP-HARQ is ACK. In order to solve this problem, in the present invention, 1-bit HP-HARQ and 1-bit LP-HARQ may be modulated in a manner that does not use gray mapping. In this case, the QPSK symbol corresponding to $5/4\pi$ indicates that 1-bit HP-HARQ is ACK and 1-bit LP-HARQ is NACK, and thus the above problem does not occur.

(Second method) As another method, the UE may selectively transmit HP-PF1 for transmitting 1-bit HP-HARQ and LP-PF1 for transmitting 1-bit LP-HARQ. More specifically, if the 1-bit LP-HARQ is NACK, the UE may transmit HP-PF1, and if the 1-bit LP-HARQ is ACK, the UE may transmit LP-PF1. If HP-PF1 is transmitted, 1-bit HP-HARQ may be BPSK modulated and transmitted through HP-PF1. If LP-PF1 is transmitted, 1-bit HP-HARQ may be BPSK modulated and transmitted through LP-PF1.

The base station may detect which PUCCH format 1 is transmitted among the LP-PF1 and HP-PF1. If LP-PF1 is detected, it may be determined that 1-bit LP-HARQ is ACK. In addition, ACK/NACK of 1-bit HP-HARQ may be determined through the BPSK symbol of the LP-PF1. If HP-PF1 is detected, it may be determined that 1-bit LP-HARQ is NACK. In addition, ACK/NACK of 1-bit HP-HARQ may be determined through the BPSK symbol of the HP-PF1.

(Scenario A2) 1-Bit HP-HARQ+2-Bit LP-HARQ (First method) 1-bit HP-HARQ and 2-bit LP-HARQ may be multiplexed on one PUCCH format 1 and transmitted. Here, the one PUCCH format 1 may be PUCCH format 1 for transmitting 1-bit HP-HARQ. The UE may combine 1-bit HP-HARQ and 2-bit LP-HARQ to make 3-bit HARQ, modulate the 3-bit HARQ into 8PSK symbols, and transmit the 8PSK symbols through the PUCCH format 1. Since this method uses 8PSK symbols for PUCCH format 1, performance degradation may occur.

(Second method) As another method, 2-bit LP-HARQ can be bundled to make 1-bit LP-HARQ, and the methods of the scenario A1 described above may be applied. Here, in the bundling, if 2-bit LP-HARQ is ACK, ACK, 1-bit LP-HARQ is ACK, and if 2-bit LP-HARQ includes at least one NACK, 1-bit LP-HARQ is NACK.

(Third method) As another method, the UE may selectively transmit HP-PF1 for transmitting 1-bit HP-HARQ and LP-PF1 for transmitting 2-bit LP-HARQ. More specifically, if the 2-bit LP-HARQ is {NACK, NACK}, the UE may transmit HP-PF1, and if the 2-bit LP-HARQ is not {NACK, NACK}, the UE may transmit LP-PF1. If HP-PF1 is transmitted, 1-bit HP-HARQ may be BPSK modulated and transmitted through HP-PF1. If LP-PF1 is transmitted, four of the HARQ-ACK states of 1-bit HP-HARQ and 2-bit LP-HARQ can be selected, QPSK modulated, and transmitted through LP-PF1. Exemplarily, the four HARQ-ACK states are {HP-HARQ, $1^{st}$ LP-HARQ, $2^{nd}$ LP-HARQ}={NACK, ACK, ACK}, {ACK, NACK, ACK}, {ACK, ACK, ACK}, {ACK, ACK, NACK}, and the four HARQ-ACK states may be QPSK modulated and transmitted.

(Fourth method) As another method, the UE may selectively transmit HP-PF1 for transmitting 1-bit HP-HARQ and LP-PF1 for transmitting 2-bit LP-HARQ. More specifically, 1-bit HP-HARQ and 2-bit LP-HARQ represent 8 HARQ-ACK states. These eight HARQ-ACK states can be grouped by four HARQ-ACK states. The first 4 HARQ-ACK states can be transmitted with QPSK modulation of HP-PF1, and the remaining 4 HARQ-ACK states can be transmitted with QPSK modulation of LP-PF1.

(Scenario A3) 2-Bit HP-HARQ+1-Bit LP-HARQ (First method) 2-bit HP-HARQ and 1-bit LP-HARQ may be multiplexed on one PUCCH format 1 and transmitted. Here, the one PUCCH format 1 may be PUCCH format 1 for transmitting 2-bit HP-HARQ. The UE generates 3-bit HARQ by combining 2-bit HP-HARQ and 1-bit LP-HARQ. In addition, the UE may modulate 3-bit HARQ into 8PSK symbols and transmit the 8PSK symbols through PUCCH format 1. Since this method uses 8PSK symbols for PUCCH format 1, performance degradation may occur.

(Second method) As another method, the UE may generate 1-bit HP-HARQ by bundling 2-bit HP-HARQ, and apply the methods of the scenario A1 described above. Here, in the bundling, if 2-bit HP-HARQ is ACK, ACK, 1-bit HP-HARQ is ACK, and if 2-bit HP-HARQ includes at least one NACK, 1-bit HP-HARQ is NACK.

(Third Method) As another method, the UE may selectively transmit HP-PF1 for transmitting 2-bit HP-HARQ and LP-PF1 for transmitting 1-bit LP-HARQ. More specifically, if the 1-bit LP-HARQ is NACK, the UE may transmit HP-PF1, and if the 1-bit LP-HARQ is ACK, the UE may transmit LP-PF1. If HP-PF1 is transmitted, 2-bit HP-HARQ may be QPSK modulated and transmitted through HP-PF1. If LP-PF1 is transmitted, two of the HARQ-ACK states of 2-bit HP-HARQ and 1-bit LP-HARQ may be selected, BPSK modulated, and transmitted through LP-PF1. Exemplarily, two HARQ-ACK states are $\{1^{11}$ HP-HARQ, $2^{nd}$ HP-HARQ, LP-HARQ$\}$={NACK, NACK, ACK}, {ACK, ACK, ACK}, and the two HARQ-ACK states can be BPSK-modulated and transmitted.

(Fourth method) As another method of the third method, if the UE transmits LP-PF1, four HARQ-ACK states of 2-bit HP-HARQ and 1-bit LP-HARQ may be QPSK modulated, and transmitted through LP-PF1.

(Scenario A4) 2-Bit HP-HARQ+2-Bit LP-HARQ (First method) 2-bit HP-HARQ and 2-bit LP-HARQ may be multiplexed on one PUCCH format 1 and transmitted. Here, the one PUCCH format 1 may be PUCCH format 1 for transmitting 2-bit HP-HARQ. The UE may combine 2-bit HP-HARQ and 2-bit LP-HARQ to make 4-bit HARQ, modulate the 4-bit HARQ into 16QAM symbols, and transmit the 16QAM symbols through the PUCCH format 1. Since this method uses 16QAM symbols for PUCCH format 1, performance degradation may occur.

(Second method) As another method, the UE may generate 1-bit LP-HARQ by bundling 2-bit LP-HARQ, and apply the methods of the scenario A3 described above. Here, in the bundling, if 2-bit LP-HARQ is ACK, ACK, 1-bit LP-HARQ is ACK, and if 2-bit LP-HARQ includes at least one NACK, 1-bit LP-HARQ is NACK.

(Third method) As another method, the UE may generate 1-bit HP-HARQ by bundling 2-bit HP-HARQ, and apply the methods of the scenario A2 described above. Here, in the bundling, if 2-bit HP-HARQ is ACK, ACK, 1-bit HP-HARQ is ACK, and if 2-bit HP-HARQ includes at least one NACK, 1-bit HP-HARQ is NACK.

(Fourth method) As another method, the UE may selectively transmit HP-PF1 for transmitting 2-bit HP-HARQ and LP-PF1 for transmitting 2-bit LP-HARQ. More specifically, if the 2-bit LP-HARQ is {NACK, NACK}, the UE may transmit HP-PF1, and if the 2-bit LP-HARQ is not {NACK, NACK}, the UE may transmit LP-PF1. If HP-PF1 is transmitted, 2-bit HP-HARQ may be QPSK modulated and transmitted through HP-PF1. If LP-PF1 is transmitted, four of HARQ-ACK states of 2-bit HP-HARQ and 2-bit LP-HARQ may be selected, QPSK modulated, and transmitted through LP-PF1. Exemplarily, four HARQ-ACK states are $\{1^{st}$ HP-HARQ, $2^{nd}$ HP-HARQ, $1^{st}$ LP-HARQ, $2^{nd}$ LP-HARQ$\}$={NACK, NACK, ACK, ACK}, {NACK, ACK, ACK, ACK}, {ACK, ACK, ACK, ACK}, {ACK, NACK, ACK, ACK}, and the four HARQ-ACK states can be QPSK modulated, and transmitted.

Scenarios A1, A2, A3, and A4 are cases where HP-SR is not multiplexed. In the UE, PUCCH format 1 for transmitting HP-SR may collide with PUCCH format 1 for transmitting LP-UCI. In this case, HP-SR and LP-UCI may be multiplexed on and transmitted through PUCCH format 1. The following scenarios B1, B2, B3, B4, B5, and B6 are embodiments in which HP-SR is multiplexed.

(Scenario B1) 1 HP-SR+1-Bit LP-HARQ (First method) The UE may regard 1 HP-SR as 1-bit HP-HARQ and use the methods of the scenario A1 described above. Here, if 1 HP-SR is negative SR, 1-bit HP-HARQ is regarded as NACK, and if 1 HP-SR is positive SR, 1-bit HP-HARQ is regarded as ACK.

(Scenario B2) 1 HP-SR+2-Bit LP-HARQ (First method) The UE may regard 1 HP-SR as 1-bit HP-HARQ and use the methods of the scenario A2 described above. Here, if 1 HP-SR is negative SR, the UE regards 1-bit HP-HARQ as NACK, and if 1 HP-SR is positive SR, the UE considers 1-bit HP-HARQ as ACK.

(Scenario B3) 1-Bit HP-HARQ/1 HP-SR+1-Bit LP-HARQ (First method) The UE may regard 1 HP-SR as 1-bit HP-HARQ and use the methods of the scenario A3 described above. More specifically, the UE regards 1 HP-SR as 1-bit HARQ-ACK and generates 2-bit HP-HARQ by combining it with 1-bit HARQ-ACK. Here, if 1 HP-SR is negative SR, the UE regards 1-bit HP-HARQ as NACK, and if 1 HP-SR is positive SR, the UE regards 1-bit HP-HARQ as ACK.

(Second Method) As another method, the UE may selectively transmit HP-PF1A (one of HP PUCCH format 1) for transmitting 1-bit HP-HARQ, HP-PF1B (another one of HP PUCCH format 1) for transmitting 1 HP-SR, and LP-PF1 for transmitting 1-bit LP-HARQ. More specifically, if the HP-SR is negative and the 1-bit LP-HARQ is NACK, the UE transmits HP_PF1A, and if the HP-SR is positive and the 1-bit LP-HARQ is NACK, the UE transmits HP_PF1B. In other cases, the UE transmits LP-PF1. If the UE transmits HP-PF1A, 1-bit HP-HARQ may be BPSK modulated and transmitted through HP-PF1A. If the UE transmits HP-PF1B, 1-bit HP-HARQ may be BPSK modulated and transmitted through HP-PF1B. If the UE transmits LP-PF1, two states of 1-bit HP-HARQ, 1 HP-SR, and 1-bit LP-HARQ may be BPSK modulated and transmitted through LP-PF1. Exemplarily, {HP-HARQ, HP-SR, LP-HARQ}={NACK, negative, ACK}, {ACK, positive, ACK} may be BPSK modulated and transmitted through LP-PF1.

(Third method) If the UE transmits LP-PF1 in another method of the second method, four states of 1-bit HP-HARQ, 1 HP-SR, and 1-bit LP-HARQ may be QPSK modulated and transmitted through LP-PF1. Exemplarily, {HP-HARQ, HP-SR, LP-HARQ}={NACK, negative, ACK}, {NACK, positive, ACK}, {ACK, negative, ACK}, {ACK, positive, ACK} may be QPSK modulated and transmitted through LP-PF1.

(Scenario B4) 1-Bit HP-HARQ/1 HP-SR+2-Bit LP-HARQ (First method) The UE may regard 1 HP-SR as 1-bit HP-HARQ and use the methods of the previous scenario A4 described above. More specifically, the UE regards 1 HP-SR as 1-bit HARQ-ACK and generates 2-bit HP-HARQ by combining it with 1-bit HARQ-ACK. Here, if 1 HP-SR is negative SR, the UE regards 1-bit HP-HARQ as NACK, and if 1 HP-SR is positive SR, the UE regards 1-bit HP-HARQ as ACK.

(Second method) As another method, the UE may generate 1-bit LP-HARQ by bundling 2-bit LP-HARQ, and apply the methods of the scenario B3 described above. Here, in the bundling, if 2-bit LP-HARQ is ACK, ACK, 1-bit LP-HARQ is ACK, and if 2-bit LP-HARQ includes at least one NACK, 1-bit LP-HARQ is NACK.

(Third method) As another method, the UE may selectively transmit HP-PF1A (one of HP PUCCH format 1) for transmitting 1-bit HP-HARQ, HP-PF1B (another one of HP PUCCH format 1) for transmitting 1 HP-SR, and LP-PF1 for transmitting 2-bit LP-HARQ. More specifically, if HP-SR is negative and 2-bit LP-HARQ is {NACK, NACK}, the UE transmits HP_PF1A, and if HP-SR is positive and 2-bit LP-HARQ is {NACK, NACK}, the UE transmits HP PF1B. In other cases, LP-PF1 is transmitted. If the UE transmits HP-PF1A, 1-bit HP-HARQ may be BPSK modulated and transmitted through HP-PF1A. If the UE transmits HP-PF1B, 1-bit HP-HARQ may be BPSK modulated and transmitted through HP-PF1B. If the UE transmits LP-PF1, four states among 1-bit HP-HARQ, 1 HP-SR, and 2-bit LP-HARQ may be QPSK modulated and transmitted through LP-PF1.

(Scenario B5) 2-Bit HP-HARQ/1 HP-SR+1-Bit LP-HARQ (First method) The UE may generate 1-bit HP-HARQ by bundling 2-bit HP-HARQ, and apply the methods of the scenario B3 described above. Here, in the bundling, if 2-bit HP-HARQ is ACK, ACK, 1-bit HP-HARQ is ACK, and if 2-bit HP-HARQ includes at least one NACK, 1-bit HP-HARQ is NACK.

(Second method) As another method, the UE may selectively transmit HP-PF1A (one of HP PUCCH format 1) for transmitting 2-bit HP-HARQ, HP-PF1B (another one of HP PUCCH format 1) for transmitting 1 HP-SR, and LP-PF1 for transmitting 1-bit LP-HARQ. More specifically, if the HP-SR is negative and the 1-bit LP-HARQ is NACK, the UE transmits HP_PF1A, and if the HP-SR is positive and the 1-bit LP-HARQ is NACK, the UE transmits HP_PF1B. In other cases, the UE transmits LP-PF1. If the UE transmits HP-PF1A, 2-bit HP-HARQ may be QPSK modulated and transmitted through HP-PF1A. If the UE transmits HP-PF1B, 2-bit HP-HARQ may be QPSK modulated and transmitted through HP-PF1B. If the UE transmits LP-PF1, two states among 2-bit HP-HARQ, 1 HP-SR, and 1-bit LP-HARQ may be BPSK modulated and transmitted through LP-PF1.

(Third method) As another method of the second method, if the UE transmits LP-PF1, four states among 2-bit HP-HARQ, 1 HP-SR, and 1-bit LP-HARQ may be QPSK modulated and transmitted through LP-PF1.

(Scenario B6) 2-Bit HP-HARQ/1 HP-SR+2-Bit LP-HARQ (First method) The UE may generate 1-bit LP-HARQ by bundling 2-bit LP-HARQ, and apply the methods of the scenario B5 described above. Here, in the bundling, if 2-bit LP-HARQ is ACK, ACK, 1-bit LP-HARQ is ACK, and if 2-bit LP-HARQ includes at least one NACK, 1-bit LP-HARQ is NACK.

(Second method) The UE may generate 1-bit HP-HARQ by bundling 2-bit HP-HARQ, and apply the methods of the scenario B4 described above. Here, in the bundling, if 2-bit HP-HARQ is ACK, ACK, 1-bit HP-HARQ is ACK, and if 2-bit HP-HARQ includes at least one NACK, 1-bit HP-HARQ is NACK.

(Second Method) As another method, the UE may selectively transmit HP-PF1A (one of HP PUCCH format 1) for transmitting 2-bit HP-HARQ, HP-PF1B (another one of HP PUCCH format 1) for transmitting 1 HP-SR, and LP-PF1 for transmitting 2-bit LP-HARQ. More specifically, if HP-SR is negative and 2-bit LP-HARQ is {NACK, NACK}, the UE transmits HP_PF1A, and if HP-SR is positive and 2-bit LP-HARQ is {NACK, NACK}, the UE transmits HP_PF1B. In other cases, the UE transmits LP-PF1. If the UE transmits HP-PF1A, 2-bit HP-HARQ may be QPSK modulated and transmitted through HP-PF1A. If the UE transmits HP-PF1B, 2-bit HP-HARQ may be QPSK modulated and transmitted through HP-PF1B. If the UE transmits LP-PF1, four states among 2-bit HP-HARQ, 1 HP-SR, and 2-bit LP-HARQ may be QPSK modulated and transmitted through LP-PF1.

VII. Multiplexing Method of PUCCH and PUSCH

In the above description, a collision between a PUCCH with low priority and a PUCCH with high priority, and a method for multiplexing LP UCI and HP UCI when the collision occurs have been described. Hereafter, this embodiment deals with a method of multiplexing UCI of the PUCCH on a PUSCH when a collision between the PUCCH and the PUSCH occurs.

Figure 36:
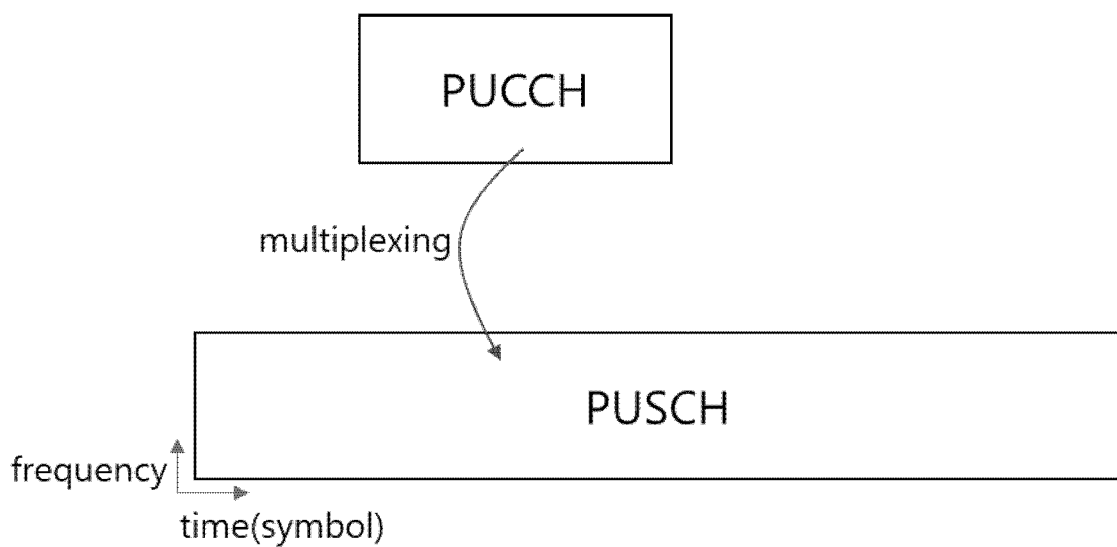
FIG. 36 is a diagram illustrating an operation of multiplexing a PUCCH on a resource on a PUSCH according to an embodiment.

FIG. 36 is a diagram illustrating an operation of multiplexing a PUCCH on a resource on a PUSCH according to an embodiment.

Referring to FIG. 36, the UE may be configured or indicated to overlap at least resources for PUSCH transmission and resources for PUCCH transmission. Here, overlapping includes indicating or configuring a symbol for PUSCH transmission and a symbol for PUCCH transmission at the same time in at least one symbol. Since the UE cannot transmit different channels in one symbol, the UE can perform only one of the PUSCH transmission and the PUCCH transmission. If the UE transmits only the PUSCH, the PUCCH cannot be transmitted. In contrast, when only the PUCCH is transmitted, the PUSCH cannot be transmitted.

In order to solve this problem, in 3GPP NR Rel-15, a method of transmitting UCI which is transmitted through the PUCCH using some resources of the PUSCH may be used. More specifically, some REs of non-DMRS symbols after the first front-loaded DMRS of the PUSCH may be used for the UCI transmitted through the PUCCH, and the remaining REs may be used for information to be transmitted by the PUSCH. Here, the number of REs usable for the UCI may be determined according to a beta offset ($\beta^{PUSCH}_{offset}$) or scaling (a) value.

The UE can receive up to four beta offset values. If the UE receives one beta offset value, the UE determines the number of REs using the beta offset value. If the UE receives two or more beta offset values, the UE may receive an indication of one of the beta offset values. Here, one value may be indicated in the DCI format for scheduling the PUSCH. Here, an indicator indicating the beta offset is called a beta offset indicator.

For example, when the UE receives four beta offset values, the UE may receive an indication of one of the four beta offset values using a 2-bit beta offset indicator included in the DCI format.

One value may be received as the scaling (a) value. The UE may determine the number of REs based on the configured values.

When the UCI is HARQ-ACK and information to be transmitted by the PUSCH is UL-SCH, the number of REs can be calculated as in Equation 1 below.

$$Q'_{ACK} = \min\left\{\left\lceil\frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r}\right\rceil, \left\lceil\alpha \cdot \sum_{l=l_0}^{N^{PUSCH}_{symb,all}-1} M^{UCI}_{sc}(l)\right\rceil\right\} \quad \text{[Equation 1]}$$

In Equation 1, $O_{ACK}$ is the number of HARQ-ACK bits, $L_{ACK}$ is the number of CRC bits, $\beta^{PUSCH}_{offset}$ is a beta offset value configured or indicated by the base station to determine the number of resources used for mapping UCI to PUSCH, $C_{UL-SCH}$ is the number of CBs (code blocks) of the UL-SCH, $K_r$ is the rth CB size of UL-SCH, $M^{UCI}{}_{sc}(l)$ is the number of REs that can be used for UCI transmission in the lth PUSCH symbol, $N^{PUSCH}{}_{symb,all}$ is the total number of symbols used for PUSCH transmission including DMIRS, α is a scaling value configured from a higher layer, and $l_0$ is an index of the first non-DMIRS PUSCH symbol after the DMIRS symbol.

If the DMRS is transmitted in the lth symbol, $M^{UCI}{}_{sc}(l)=0$, otherwise $M^{UCI}{}_{sc}(l)=M^{PUSCH}{}_{sc}-M^{PT-RS}{}_{sc}( )$. Here, $M^{PUSCH}{}_{sc}$ is the number of subcarriers scheduled for PUSCH in the frequency domain, and $M^{PT-RS}{}_{sc}(l)$ is the number of subcarriers of the lth PUSCH symbol including a chase tracking reference signal (PT-RS).

The UE may multiplex the UCI on the PUSCH based on the number of $Q'_{ACK}$ REs obtained from Equation 1.

Although not separately described in the present invention, a method of determining the number of REs of CSI part 1 to CSI part 2 other than HARQ-ACK may follow the method in TS38.212.

A priority may be set for each channel. For example, the PUCCH may be set with one priority, and P the USCH may also be set with one priority. In the present invention, the PUCCH and the PUSCH may have at least one priority of a low priority and a high priority. For convenience, the low priority may be expressed as 0, and the high priority may be expressed as 1. Further extended, the priorities of the PUCCH and the PUSCH may be further subdivided. That is, the priorities may be one value of 0, 1, 2, 3. In the present invention, for convenience, 2-level priorities (low priority and high priority) are assumed and described, but it can be applied to more subdivided priorities.

In Rel-16, only multiplexing between channels having the same priority is supported. More specifically, LP UCI may be multiplexed on resources (REs) on a low priority (LP) PUSCH. UCI of HP PUCCH may be multiplexed on resources (REs) on a high priority (HP) PUSCH. However, the LP UCI cannot be multiplexed on resources (REs) on the high priority PUSCH. Also, HP UCI cannot be multiplexed with resources (REs) on the low priority PUSCH.

FIG. 37 is a diagram illustrating an operation of multiplexing UCI of the same priority on a resource on a PUSCH according to an example.

Referring to FIG. 37, a method of determining resources (number of REs) on PUSCH for transmitting UCI in Rel-16 is as follows.

First, the UE may obtain information about the priority of the PUSCH. Here, the priority of the PUSCH may have one value of 0 or 1. If the priority is 0, it is a low priority, and if the priority is 1, it is a high priority.

Information on the priority of the PUSCH may be indicated in a PDCCH scheduling the PUSCH. For example, the PDCCH may include a PUSCH priority indicator indicating the priority of the PUSCH. The UE can obtain the priority of the PUSCH based on the indicator. For example, if the indicator is 1 bit and the value thereof is 0, the priority of the PUSCH is 0 (low priority), and if the value is 1, the priority of the PUSCH is 1 (high priority).

Information on the priority of the PUSCH may be inferred from the DCI format for scheduling the PUSCH. For example, if the DCI format for scheduling the PUSCH is 00, the priority of the PUSCH is 0 (low priority), and if the DCI format for scheduling the PUSCH is 0_1 or 0_2, the priority of the PUSCH is 1 (high priority). As another example, if the DCI format for scheduling the PUSCH is 0_0 or 0_1, the priority of the PUSCH is 0 (low priority), and if the DCI format for scheduling the PUSCH is 0_2, the priority of the PUSCH is 1 (high priority).

The UE may determine a set of beta offsets and a scaling value based on the priority of the PUSCH. The UE may be may receive one beta offset set and scaling value per PUSCH priority. If the UE can receive indication or configuration of 0 (low priority) and 1 (high priority) as the priority of the PUSCH, the base station may configure a beta offset set (LP beta offset set in FIG. 37) and a scaling value that correspond to a low priority and a beta offset set (HP beta offset set in FIG. 37) and a scaling value that correspond to a high priority to the UE. As mentioned above, since the UE can obtain information about the priority of the PUSCH, the UE can determine the beta offset set and the scaling value suitable for the priority.

One beta offset set per priority may include up to four beta offset values. Also, each beta offset set may include a different number of beta offset values. In this case, the length of bits of the beta offset indicator in the DCI format may be determined based on the beta offset set having the largest number among the beta offset sets, and a value of beta offset may be indicated according to the value of the bits of the DCI format.

For example, a first beta offset set for low priority configured to the UE may include 4 beta offset values, and a second beta offset for high priority configured to the UE may include 2 beta offset values. A 2-bit beta offset indicator may be included in the DCI format based on the first beta offset set including a larger number of beta offset values.

If the DCI format schedules a low priority PUSCH, a beta offset value should be determined in order to multiplex LP UCI on the REs on the PUSCH. In this case, the first beta offset set for low priority may be selected as a beta offset set, and one beta offset value of the first beta offset set may be indicated through the 2-bit beta offset indicator of DCI format. Here, as the value of the 2-bit beta offset indicator, '00' is a first beta offset value of the first beta offset set, '01' is a second beta offset value of the first beta offset set, '10' is a third beta offset value of the first beta offset set, and '11' is a fourth beta offset value of the first beta offset set.

If the DCI format schedules a high priority PUSCH, the beta offset value should be determined in order to multiplex HP UCI on REs on the PUSCH. In this case, the second beta offset set for high priority is selected as a beta offset set, and one value of the second beta offset set may be indicated through the 2-bit beta offset indicator of DCI format. Here, as the value of the 2-bit beta offset indicator, '00' is a first beta offset value of the second beta offset set, and '01' is a second beta offset value of the second beta offset set, and the remaining values may not have a corresponding beta offset value. For reference, the UE may not expect that 2 bits of the DCI format indicate that there is no corresponding beta offset value.

The UE may calculate the number of REs used for transmitting UCI by inserting the determined beta offset value $\beta^{PUSCH}{}_{offset}$ and scaling value α into Equation 1.

In Rel-17, multiplexing between different priorities can be supported. More specifically, LP UCI may be multiplexed on resources on the low priority PUSCH. HP UCI can be multiplexed on resources on the high priority PUSCH. In addition, LP UCI can be multiplexed on resources on the high priority PUSCH. HP UCI can be multiplexed on resources on the low priority PUSCH.

For reference, one PUCCH may include only the UCI of one priority. In this case, the priority of the UCI may be used as the priority of the PUCCH. For example, if the PUCCH transmits only LP UCI, the PUCCH can be said to have a low priority, and if the PUCCH transmits only HP UCI, the PUCCH can be said to have a high priority. In addition, one PUCCH can simultaneously transmit LP UCI and HP UCI. In this case, it is difficult to clearly indicate the priority of the PUCCH. Therefore, in the following description, unless otherwise specified, it is expressed based on the priority of UCI).

When one PUCCH can simultaneously transmit LP UCI and HP UCI, one priority (for example, priority) may be given to the PUCCH. And LP UCI included in the PUCCH can also be regarded as the UCI of high priority. In other words, if one PUCCH includes at least one HP UCI, that PUCCH is of high priority and the UCI transmitted by that PUCCH is also regarded as UCI of high priority. When this embodiment is applied, in the following description, the priority of UCI may be interpreted as being replaced with the priority of PUCCH.

When multiplexing between different priorities is supported in this way, a method for determining the number of REs used for transmitting UCI is as follows.

First, the UE may obtain information about the priority of PUSCH. Here, the priority of PUSCH may have one value of 0 (low priority) and 1 (high priority). As described above, the UE may receive indication of the priority of PUSCH from the PDCCH scheduling the PUSCH or infer it from the DCI format.

In addition, the UE may obtain information about the priority of UCI. When multiplexing the UCI on REs on PUSCH, the UE needs to know what priority the UCI has. In the example of Rel-16 described above in which UCIs of the same priority are multiplexed, when the UE multiplexes UCI on the REs on the PUSCH, the UCI and the PUSCH are limited to having the same priority. However, since UCIs of different priorities can be multiplexed on REs on the PUSCH, the UE should receive indication of the priority of the UCIs. The UE may receive indication of one of the following priorities as the priority of UCI.

1) Low UCI priority: If indication of a low UCI priority is received, the UE can assume that the UCI to be multiplexed on the RE on the PUSCH has a low priority.

2) High UCI priority: If indication of a high UCI priority is received, the UE can assume that the UCI to be multiplexed on the RE on the PUSCH has a high priority.

The UE may receive indication of at least the low UCI priority/high UCI priority from the DCI format for scheduling the PUSCH.

More specifically, the DCI format for scheduling the PUSCH may include a UCI priority indicator. The UCI priority indicator indicates the priority of UCI scheduled on the PUSCH.

As an example, the UCI priority indicator may be 1 bit. Here, if the 1-bit UCI priority indicator is 0, the UCI to be multiplexed on the PUSCH can be assumed to have a low priority, and if the 1-bit UCI priority indicator is 1, the UCI to be multiplexed on the PUSCH can be assumed to have a high priority.

As another example, the UCI priority indicator may be 2 bits. If the 2-bit UCI priority indicator is '00', the UCI to be multiplexed on the PUSCH can be assumed to have has a low priority, if the 2-bit UCI priority indicator is '01', the UCI to be multiplexed on the PUSCH can be assumed to have a high priority, and if the 2-bit UCI priority indicator is '10' the UCI to be multiplexed on the PUSCH can be assumed to include both LP UCI and HP UCI.

As another example, the UCI priority indicator may be 2 bits. If the first bit of the 2-bit UCI priority indicator is '0', it can be assumed that there is no LP UCI to be multiplexed on the PUSCH, and if the first bit is '1', it can be assumed that there is an LP UCI to be multiplexed on the PUSCH. If the second bit of the 2-bit UCI priority indicator is '0', it can be assumed that there is no HP UCI to be multiplexed on the PUSCH, and if the second bit is '1', it can be assumed that there is an HP UCI to be multiplexed on the PUSCH.

FIG. 38 is a diagram illustrating an operation of multiplexing UCIs of different priorities on resources on a PUSCH according to an example.

Referring to FIG. 38, the case where UCI to be multiplexed on the PUSCH includes both LP UCI and HP UCI includes at least the following situations.

A first situation is a case where, as shown in FIG. 38 (*a*), the UCI transmitted by the PUCCH overlapping the PUSCH is composed of the LP UCI and the HP UCI, and a second situation is a case where, as shown in FIG. 38(*b*), a first PUCCH overlapping the PUSCH includes the LP UCI and a second PUCCH overlapping the PUSCH includes the HP UCI.

(First embodiment) According to the first embodiment of multiplexing the UCI, the UE may determine a set of beta offsets and a scaling value based on the priority of PUSCH and the priority of UCI.

The UE may be may receive one beta offset set and scaling value per pair (pair) of the priority of PUSCH and the priority of UCI. Here, the pair can be represented by (priority of PUSCH, priority of UCI). For convenience, a low priority is denoted as 0 and a high priory is denoted as 1.

The UE may receive the beta offset set and the scaling value set according to the priority pair from the base station as follows.

A priority pair (0,0) indicates that the PUSCH has the low priority and the priority of UCI is also the low priority. In this case, the corresponding beta offset set and scaling value can be received.

A priority pair (0, 1) indicates that the PUSCH has the low priority, but the priority of UCI is the high priority. In this case, the corresponding beta offset set and scaling value can be received.

A priority pair (1,0) indicates that the PUSCH has the high priority, but the priority of UCI is also the low priority. In this case, the corresponding beta offset set and scaling value can be received.

A priority pair (1,1) indicates that the PUSCH has the high priority and the priority of the UCI is also the high priority. In this case, the corresponding beta offset set and scaling value can be received.

The UE may determine one beta offset set and a scaling value using the priority of PUSCH and the priority of UCI. More specifically, the UE may obtain a priority pair (priority of PUSCH, priority of UCI). Based on the priority pair, a beta offset set and a scaling value configured in the priority pair may be determined.

If the beta offset set includes two or more more beta offset values, the UE should receive indication of one of the two or more beta offset values. Here, one value may be indicated in the DCI format for scheduling the PUSCH. Here, this indicator is called the beta offset indicator.

If the DCI format for scheduling the PUSCH can schedule only PUSCH of one priority, the UE may determine the length of bits of the beta offset indicator based on a beta offset set including the largest number of beta offset values among a plurality of beta offset sets corresponding to the priority of PUSCH. For example, if the DCI format for scheduling the PUSCH can schedule only the low priority PUSCH, the UE may determine the length of bits of the beta offset indicator based on the set including the values of more beta offsets of the beta offset set of the priority pair (0,0) and the beta offset set of the priority pair (0,1). Similarly, if the DCI format for scheduling PUSCH can schedule only the high priority PUSCH, the UE may determine the length of bits of the beta offset indicator based on the set including more beta offset values of the beta offset set of the priority pair (1,0) and the beta offset set of the priority pair (1,1). Here, the length of bits may be determined as ceiling(log 2 (the number of beta offset values)).

As another method, the UE may determine the length of bits of the beta offset indicator based on a beta offset set including the largest number of beta offset values among a plurality of beta offset sets. That is, the UE may determine the length of bits of the beta offset indicator based on the set including more beta offset values among the beta offset set of priority pair (0,0) and the beta offset set of priority pair (0,1), the beta offset set of priority pair (1,0), and the beta offset set of priority pair (1,1). Here, the length of bits may be determined as ceiling(log 2 (the number of beta offset values)).

Referring to FIG. 38, since the UCI to be multiplexed on a PUSCH includes LP UCI and HP UCI, the UE can obtain a separate beta offset value and scaling value for each of LP UCI and HP UCI. Here, a beta offset set and a scaling value of pairs of UCIs having a low priority (priority pair (0,0) and priority pair (1,0)) may be applied to a UCI corresponding to a low priority, and a beta offset set and a scaling value of pairs of UCIs having a high priority (priority pair (0,1) and priority pair (1,1)) may be applied to a UCI corresponding to a high priority.

For example, assume that the priority of PUSCH is one priority. Here, the priority of PUSCH will be described assuming a low priority.

A first beta offset set and scaling value corresponding to the priority pair (0,0) may be applied to the LP UCI.

A second beta offset set or scaling value corresponding to the priority pair (0,1) may be applied to the HP UCI.

If the first beta offset set includes one first beta offset value and the second beta offset set includes one second beta offset value, the first beta offset value may be used to multiplex the low priority UCI, and the second beta offset value may be used to multiplex the HP UCI. In this case, there is no beta offset indicator for separately indicating a beta offset in the DCI format for scheduling the PUSCH.

If two or more beta offset values are included in at least one of the first beta offset set and the second beta offset set, one of the values should be indicated. Here, one of the two or more beta offset values should be indicated in the DCI format for scheduling the PUSCH. Here, this indicator is called the beta offset indicator. An indicator indicating one beta offset in the first beta offset set is referred to as a beta offset indicator for LP UCI, and an indicator indicating one beta offset in the second beta offset set is referred to as a beta offset indicator for HP UCI.

The DCI format for scheduling the PUSCH should include the beta offset indicator for LP UCI and the beta offset indicator for HP UCI at the same time. If there is only one of the beta offset indicators, as shown in FIG. 23, when the UCI to be multiplexed on the PUSCH includes both LP UCI and HP UCI, the number of REs required for the UCIs of the two priorities cannot be calculated.

As the first method, in the DCI format for scheduling one PUSCH in the first method, a plurality of separate beta offset indicators for indicating beta offsets of UCIs of different priorities may be included. Here, the plurality of separate beta offset indicators within the DCI format may have separate bits.

Here, the length of bits of the beta offset indicator for LP UCI and the length of bits of the beta offset indicator for HP UCI may be determined separately. This can be determined as follows.

If the DCI format for scheduling PUSCH can schedule only the PUSCH of one priority, the UE may determine the length of bits of the beta offset indicator for LP UCI based on the number of beta offset values included in a beta offset set corresponding to a pair of the priority of the PUSCH and low priority PUCCH. For example, when the DCI format can schedule only the low priority PUSCH, the UE may determine the length of bits of the beta offset indicator for the LP UCI based on the number of beta offset values included in the beta offset set corresponding to the priority pair (0,0).

If the DCI format for scheduling PUSCH can schedule only the PUSCH of one priority, the UE may determine the length of bits of the beta offset indicator for HP UCI based on the number of beta offset values included in a beta offset set corresponding to a pair of the priority of the PUSCH and the high priority PUCCH.

If the DCI format for scheduling the PUSCH can schedule PUSCH of both low priority/high priority, the UE may determine the length of bits of the beta offset indicator for LP UCI based on a beta offset set including the largest number of beta offset values among a plurality of beta offset sets (beta offset set corresponding to the priority pair (0,0) and beta offset set corresponding to the priority pair (1,0)) corresponding to the low priority PUCCH. Similarly, the length of bits of the beta offset indicator for HP UCI may be determined based on a beta offset set including the largest number of beta offset values among a plurality of beta offset sets (beta offset set corresponding to the priority pair (0,1) and beta offset set corresponding to the priority pair (1,1)) corresponding to a high priority PUCCH.

As a second method, a DCI format for scheduling one PUSCH includes one beta offset indicator, and a beta offset value for LP UCI and a beta offset value for HP UCI can be obtained from the indicator.

More specifically, the value of one beta offset indicator indicated by the DCI format can be used as a beta offset indicator value for LP UCI and also as a beta offset indicator value for HP UCI. That is, if one beta offset indicator indicated by DCI format indicates to use the first value, the first value of the beta offset set for LP UCI may be used as the beta offset value for LP UCI, and the first value of the beta offset set for HP UCI may be used as the beta offset value for HP UCI.

When compared with the first method, the second method requires fewer bits as the indicator of the beta offset in the DCI format.

(Second embodiment) According to the second embodiment of multiplexing UCI, the UE may determine the beta offset set and the scaling value based on the priority of PUSCH. Here, the priority of UCI may not be used to determine the beta offset set or the scaling value.

Referring to FIG. 37, the Rel-16 method described above is used as it is. More specifically, the UE may obtain information about the priority of PUSCH. Here, the priority of PUSCH may have one value of 0 or 1. If the value is 0, it is a low priority, and if the value is 1, it is a high priority.

The UE may determine the set of beta offsets and the scaling value based on the priority of the PUSCH. The UE may receive one beta offset set and scaling value per PUSCH priority. If the UE can receive indication or configuration of 0 (low priority) and 1 (high priority) as the priority of the PUSCH, the base station may configure the beta offset set (LP beta offset set in FIG. 37) and the scaling value that correspond to a low priority and the beta offset set (HP beta offset set in FIG. 37) and the scaling value that correspond to a high priority to the UE. As mentioned above, since the UE can obtain information about the priority of PUSCH, the UE can determine a beta offset set and a scaling value suitable for the priority.

One beta offset set per priority may include up to four beta offset values. Also, each beta offset set may include a different number of beta offset values. In this case, the length of bits of the beta offset indicator in the DCI format may be determined based on the beta offset set having the largest number among the beta offset sets, and the value of the beta offset may be indicated according to the value of the bits of the DCI format.

The UE may determine the number of REs through Equation 1 based on the beta offset value and the scaling value determined based on the priority of the PUSCH, without considering the priority of UCI.

In general, for higher reliability, the beta offset value for HP UCI requires a larger value than the beta offset value for LP UCI. However, in the second embodiment, the same beta offset set is used regardless of the priority of UCI. Therefore, it is difficult for the UE and the system to provide desired reliability to HP UCI. Hereinafter, a method for solving this problem is disclosed.

(Embodiment 2-1) Embodiment 2-1 for multiplexing UCI discloses a method of changing the beta offset value obtained in the second embodiment according to the priority of UCI. More specifically, the value of the beta offset obtained as above may be converted to a larger value for a UCI having a high priority.

As an example, the UE may obtain a beta offset value for the UCI having the high priority by multiplying the beta offset value by a certain value. Here, the certain value may be greater than 1. Here, the certain value may be a value configured by the base station to the UE. A beta offset value for a UCI having a low priority may be obtained by multiplying the beta offset value by a certain value. Here, the certain value may be less than 1. Here, the certain value may be a value configured by the base station to the UE.

As another example, the UE may obtain a beta offset value for the UCI having the high priority by adding a certain value to the beta offset value. Here, the certain value may be greater than 0. Here, the certain value may be a value configured by the base station to the UE. The UE may obtain a beta offset value for the UCI having the low priority by adding a certain value to the beta offset value. Here, the certain value may be less than 0. Here, the certain value may be a value configured by the base station to the UE.

In the above example, the maximum and minimum values of the beta offset may be determined. That is, if the value obtained by multiplying or adding the certain value is out of the range of the maximum value or minimum value that the beta offset value can have, the UE may use the maximum value or the minimum value as the value of the beta offset.

Although the beta offset has been described in the above description, it can be equally applied to the scaling value.

(Embodiment 2-2) Embodiment 2-2 for multiplexing UCI discloses a method of changing the value of the beta offset indicator obtained in the second embodiment according to the priority of UCI. More specifically, the value of the beta offset indicator obtained for the UCI having the high priority may be converted to a larger value.

When the UE receives a beta offset set from the base station, the beta offset set may include a plurality of beta offset values. The UE may obtain an indication value from the beta offset indicator of the DCI format for scheduling the PUSCH. The indication value may correspond to an index for selecting one beta offset value from the beta offset set.

In order to obtain a beta offset value for HP UCI, the UE can obtain an indication value of a new beta offset indicator by adding a certain value to an indication value I of the beta offset indicator. Here, the certain value may be an integer value greater than 0. Here, the certain value may be a value configured by the base station to the UE. Here, beta offset values in the beta offset set may be sorted in ascending order.

In order to obtain a beta offset value for LP UCI, the UE can obtain an indication value of a new beta offset indicator by adding a certain value to the indication value I of the beta offset indicator. Here, the certain value may be an integer value less than 0. Here, the certain value may be a value configured by the base station to the UE. Here, beta offset values in the beta offset set may be sorted in ascending order.

In the above example, the maximum value and the minimum value of the beta offset indicator may be determined. That is, if the value obtained by multiplying or adding the certain value is out of the range of the maximum value or minimum value that the beta offset value can have, the maximum value or the minimum value may be used as the value of the beta offset indicator.

(Third embodiment) According to the third embodiment of multiplexing UCI, the UE may determine a beta offset set and a scaling value based on the priority of the UCI. Here, the priority of PUSCH may not be used to determine the beta offset set or the scaling value.

The UE may may receive one beta offset set and scaling value per UCI priority. For example, the beta offset set and scaling value for LP UCI may be received, and the beta offset set and scaling value for HP UCI may be received.

The UE can obtain the priority of UCI to be multiplexed on the PUSCH from the DCI format for scheduling the PUSCH. With this priority, a low UCI priority or a high UCI priority can be indicated, and can be obtained through the 1-bit UCI priority indicator or the 2-bit UCI priority indicator described above.

The UE may determine the beta offset set and the scaling value according to the priority of UCI. For example, if the priority of UCI is a low priority, the UE can determine a beta offset set and a scaling value of the low priority.

One beta offset set per UCI priority may include up to four beta offset values. Also, each beta offset set may include a different number of beta offset values. In this case, the length of bits of the beta offset indicator in the DCI format may be determined based on the beta offset set having the largest number among the beta offset sets, and indication of the value of the beta offset may be received according to the value of the bits of the DCI format.

In the third embodiment, the UE may determine the number of REs through Equation 1 based on the beta offset value or the scaling value determined based on the priority of the UCI without considering the priority of PUSCH.

In general, for higher reliability, a beta offset value for the high priority PUSCH needs to be a smaller value than the beta offset value for the low priority PUSCH. However, in the third embodiment, the same beta offset set is used regardless of the priority of PUSCH. Therefore, it is difficult for the UE and the system to provide desired reliability to the high priority PUSCH. Therefore, a method for solving this problem is disclosed.

(Embodiment 3-1) Embodiment 3-1 for multiplexing PUSCH includes a method of changing the beta offset value obtained in the third embodiment according to the priority of PUSCH. More specifically, the value of the beta offset obtained as above may be converted to a smaller value for a PUSCH having a high priority.

As an example, the UE may obtain a beta offset value for the PUSCH having the high priority by multiplying the beta offset value by a certain value. Here, the certain value may be less than 1. Here, the certain value may be a value configured by the base station to the UE. A beta offset value for a PUSCH having a low priority may be obtained by multiplying the beta offset value by a certain value. Here, the certain value may be greater than 1. Here, the certain value may be a value configured by the base station to the UE.

As another example, the UE may obtain a beta offset value for the PUSCH having the high priority by adding a certain value to the beta offset value. Here, the certain value may be less than 0. Here, the certain value may be a value configured by the base station to the UE. The UE may obtain a beta offset value for the PUSCH having the low priority by adding a certain value to the beta offset value. Here, the certain value may be greater than 0. Here, the certain value may be a value configured by the base station to the UE.

In the above example, the maximum and minimum values of the beta offset may be determined. That is, if the value obtained by multiplying or adding the certain value is out of the range of the maximum value or minimum value that the beta offset value can have, the UE may use the maximum value or the minimum value as the value of the beta offset.

Although the beta offset has been described in the above description, it can be equally applied to the scaling value.

(Embodiment 3-2) Embodiment 3-2 for multiplexing UCI includes a method of changing the value of the beta offset indicator obtained in the third embodiment according to the priority of PUSCH. More specifically, the value of the beta offset indicator obtained may be converted to a smaller value for the PUSCH having the high priority.

When the UE receives a beta offset set from the base station, the beta offset set may include a plurality of beta offset values. The UE may obtain an indication value from the beta offset indicator of the DCI format for scheduling the PUSCH. The indication value may correspond to an index for selecting one beta offset value from the beta offset set.

In order to obtain a beta offset value for the high priority PUSCH, the UE can obtain an indication value of a new beta offset indicator by adding a certain value to an indication value I of the beta offset indicator. Here, the certain value may be an integer value less than 0. Here, the certain value may be a value configured by the base station to the UE. Here, beta offset values in the beta offset set may be sorted in ascending order.

In order to obtain a beta offset value for the low priority PUSCH, the UE can obtain an indication value of a new beta offset indicator by adding a certain value to the indication value I of the beta offset indicator. Here, the certain value may be an integer value greater than 0. Here, the certain value may be a value configured by the base station to the UE. Here, beta offset values in the beta offset set may be sorted in ascending order.

In the above example, the maximum value and the minimum value of the beta offset indicator may be determined. That is, if the value obtained by multiplying or adding the certain value is out of the range of the maximum value or minimum value that the beta offset value can have, the maximum value or the minimum value may be used as the value of the beta offset indicator.

When multiplexing HARQ-ACK on REs on the PUSCH in Equation 1 described above, the UE determines the beta offset value and the scaling value in order to determine the number of REs. However, Equation 1 with which the UE determines the number of REs may not be suitable when LP UCI and HP UCI are simultaneously multiplexed on the PUSCH. Accordingly, methods for determining the number of REs to solve this problem are disclosed below.

(First method) As a first method for determining the number of REs, the UE may determine the number of REs $Q'_{ACK,HP}$ occupied by a high priority HARQ-ACK through Equation 2 below. In this case, the beta offset $\beta^{PUSCH}_{offset}$ and the scaling $\alpha_{HP}$ value are values corresponding to the HP UCI obtained in the embodiments described above.

$$Q'_{ACK,HP} = \min\left\{ \left[ \frac{(O_{ACK,HP} + L_{ACK,HP}) \cdot \beta^{PUSCH}_{offset,HP} \cdot \sum_{l=0}^{N^{PUSCH}_{symb,all}-1} M^{UCI}_{SC}(l)}{\sum_{r=0}^{C_{UL-SCH}-1} K_r} \right], \left[ \alpha_{HP} \sum_{l=l_0}^{N^{PUSCH}_{symb,all}-1} M^{UCI}_{SC}(l) \right] \right\}$$ [Equation 2]

Based on the value obtained in Equation 2, the UE may determine the number of REs $Q'_{ACK,LP}$ occupied by the HARQ-ACK of low priority through Equation 3 below. The beta offset and scaling value are values corresponding to the LP UCI obtained in the embodiments described above.

[Equation 3]

$$Q'_{ACK,LP} = \min\left\{ \left[ \frac{(O_{ACK,LP} + L_{ACK,LP}) \cdot \beta^{PUSCH}_{offset,LP} \cdot \sum_{l=0}^{N^{PUSCH}_{symb,all}-1} M^{UCI}_{sc}(l)}{\sum_{r=0}^{C_{UL-SCH}-1} K_r} \right], \left[ \alpha_{LP} \sum_{l=0}^{N^{PUSCH}_{symb,all}-1} M^{UCI}_{sc}(l) \right] - Q'_{ACK,LP} \right\}$$

In Equation 3, $O_{ACK,HP}$ and $L_{ACK,HP}$ represent the number of HARQ-ACK bits of high priority and the number of CRC bits, and $O_{ACK,LP}$ and $L_{ACK,LP}$ represent the number of HARQ-ACK bits of low priority and the number of CRC bits.

When comapring Equation 2 and Equation 3, in Equation 2, the REs of $Q'_{HP}$-ACK obtained in Equation 1 were already used to multiplex the HARQ-ACK of high priority, and thus they were excluded. However, the number of REs $Q'_{ACK,LP}$ for the HARQ-ACK of low priority obtained in Equation 3 above may violate $\lfloor \alpha_{HP}\Sigma_{l=l_0}^{N_{symb,all}^{PUSCH}-1} M_{sc}^{UCI}(l) \rfloor$ when the number of REs for the HARQ-ACK of high priority is obtained. For example, when the value of HP is determined to be small and the value of $\alpha_{LP}$ is determined to be large, the above violation may occur. Therefore, Equation 4 may be used instead of Equation 3.

[Equation 4]

$$Q'_{ACK,LP} = \min\left\{\left\lceil\frac{(O_{ACK,LP} + L_{ACK,LP}) \cdot \beta^{PUSCH}_{offset,LP} \cdot \sum_{l=0}^{N^{PUSCH}_{symb,all}-1} M^{UCI}_{sc}(l)}{\sum_{r=0}^{C_{UL-SCH}-1} K_r}\right\rceil, \left\lceil\alpha_{LP}\sum_{l=0}^{N^{PUSCH}_{symb,all}-1} M^{UCI}_{sc}(l)\right\rceil - Q'_{ACK,LP'}, \left\lceil\alpha_{HP}\sum_{l=l_0}^{N^{PUSCH}_{symb,all}-1} M^{UCI}_{sc}(l)\right\rceil\right\}$$

(Second method) As a second method for determining the number of REs, the UE may assume that UCIs to be multiplexed on REs on the PUSCH follow the highest priority among the UCIs. For example, if all UCIs to be multiplexed on REs on the PUSCH have a low priority, the UE may determine that the UCIs have the low priority. And, if all UCIs to be multiplexed on REs on the PUSCH have a high priority, the UE can determine that the UCIs have the high priority. Also, if UCIs to be multiplexed on REs on the PUSCH include low priority UCIs and HP UCIs, the UE may determine that the UCIs have the high priority. If the UCIs are determined to have the high priority, the UE can determine the number of REs used for multiplexing the UCIs using Equation 2. Here, $O_{ACK,HP}$ and $L_{ACK,HP}$ are the number of HARQ-ACK bits of high priority and the number of CRC bits. More specifically, $O_{ACK,HP}$ is the number of bits of all UCIs, and $L_{ACK,HP}$ is the number of CRC bits for the $O_{ACK,HP}$.

The following embodiment discloses a method for determining the number of bits of HARQ-ACK.

HARQ-ACK may be transmitted as a codebook. Here, the codebook may include a type-1 HARQ-ACK codebook (or semi-static HARQ-ACK codebook) or a type-2 HARQ-ACK codebook (or dynamic HARQ-ACK codebook). The UE may include the following information in the DCI for scheduling the PUSCH in order to determine the number of bits of the HARQ-ACK.

1) In the case of the type-1 HARQ-ACK codebook, the DCI for scheduling the PUSCH may include a 1-bit UL downlink assignment index (DAI). Here, if 1 bit UL DAI is 0, it indicates that there is no type-1 HARQ-ACK codebook to be multiplexed on the PUSCH. If the 1-bit UL DAI is 1, it indicates that there is the type-1 HARQ-ACK codebook to be multiplexed on the PUSCH. In this case, the number of HARQ-ACK bits included in the type-1 HARQ-ACK codebook may be determined according to configurations from a higher layer. Here, the configurations from the higher layer may include at least downlink subcarrier spacings for receiving PDSCH, uplink subcarrier spacings for transmitting PUCCH, and table configuration information of DL/UL configuration and time domain resource assignment (TDRA).

2) In the case of the type-2 HARQ-ACK codebook, the DCI for scheduling the PUSCH may include a 2-bit UL DAI. Here, the 2-bit UL DAI may indicate one value of 1, 2, 3, 4. If the UL DAI value is indicated as $N^{UL}$-DAI, the UE may determine that the number of HARQ-ACK bits is $4*i+N^{UL-DAI}$ bits, where i is one of the non-negative integer values. The UE may determine i based on the number of received PDSCHs or a counter-DAI value included in the DCI format for scheduling the PDSCH. Therefore, the UE can determine the number of HARQ-ACK bits included in the type-2 HARQ-ACK codebook based on the UL DAI value. If the value of 2-bit UL DAI indicates 4 and the UE does not receive any PDCCH corresponding to HARQ-ACK to be included in the type-2 HARQ-ACK codebook, the UE may determine that there is no type-2 HARQ-ACK codebook to be multiplexed on a PUSCH. That is, the size of the type-2 HARQ-ACK codebook is 0.

3) In the case where code block group (CBG)-based PDSCH reception is configured to the UE, the DCI for scheduling the PUSCH may include $1^{st}$ UL-DAI and $2^{nd}$ UL-DAI. Each of the two UL-DAIs is 2 bits, and the $1^{st}$ UL-DAI is applied to a $1^{st}$ sub-codebook and the $2^{nd}$ UL-DAI is applied to a $2^{nd}$ sub-codebook of the type-2 HARQ-ACK codebook. Unless otherwise specified, in the present invention, a UE in which CBG-based PDSCH reception is not configured is described as a standard, but the method proposed in the present invention can be equally applied to a UE in which CBG-based PDSCH reception is configured.

One UE can generate up to two HARQ-ACK codebooks at the same time. Here, the first HARQ-ACK codebook is a HARQ-ACK codebook including HARQ-ACK bits of low priority, and the second HARQ-ACK codebook is a HARQ-ACK codebook including HARQ-ACK bits of high priority. Here, the first HARQ-ACK codebook and the second HARQ-ACK codebook may be of the same type or different types, and the following cases are possible when combining them.

1) Case 1: When both the first HARQ-ACK codebook and the second HARQ-ACK codebook are type-1 HARQ-ACK codebooks 2) Case 2: When both the first HARQ-ACK codebook and the second HARQ-ACK codebook are type-2 HARQ-ACK codebooks 3) Case 3: When the first HARQ-ACK codebook is the type-1 HARQ-ACK codebook and the second HARQ-ACK codebook is the type-2 HARQ-ACK codebook 4) Case 4: When the first HARQ-ACK codebook is the type-2 HARQ-ACK codebook and the second HARQ-ACK codebook is the type-1 HARQ-ACK codebook As such, there are four possible cases.

The UE may multiplex the first HARQ-ACK codebook and the second HARQ-ACK codebook on REs on the PUSCH and transmit the multiplexed HARQ-ACK codebook. As described above, the UE uses the UL DAI value to know the number of bits of the HARQ-ACK codebook. However, according to Rel-15/16, the UE multiplexes only one HARQ-ACK codebook corresponding to one priority on the PUSCH. Therefore, the UE can obtain a UL DAI value suitable for the HARQ-ACK codebook in the DCI format for scheduling the PUSCH.

However, the PUSCH may multiplex and transmit both the first HARQ-ACK codebook and the second HARQ-ACK codebook in REs on the PUSCH. In this case, a UL DAI value is required to know the sizes of the first HARQ-ACK codebook and the second HARQ-ACK codebook.

This embodiment discloses a method of obtaining a UL DAI value when one UE simultaneously generates two HARQ-ACK codebooks and a method of determining the number of HARQ-ACK bits included in the HARQ-ACK codebook based on the UL DAI value.

For convenience, assume that the first HARQ-ACK codebook has a low priority and the second HARQ-ACK codebook has a high priority.

(First embodiment) When generating two HARQ-ACKs at the same time, the DCI format for scheduling the PUSCH may include a first UL DAI for the first HARQ-ACK codebook and a second UL DAI for the second HARQ-ACK codebook. The number of bits of the first UL DAI is determined according to the type of the first HARQ-ACK codebook, and the number of bits of the second UL DAI is determined according to the type of the second HARQ-ACK codebook.

The UE may determine the number of HARQ-ACK bits included in the first HARQ-ACK codebook based on the first UL DAI. In addition, the number of HARQ-ACK bits included in the second HARQ-ACK codebook may be determined based on the second UL DAI. Here, a method of determining the number of HARQ-ACK bits in the type-1 HARQ-ACK codebook or the type-2 HARQ-ACK codebook may be used.

For example, when the first HARQ-ACK codebook is configured as the type-1 HARQ-ACK codebook and the second HARQ-ACK codebook is configured as the type-2 HARQ-ACK codebook, the DCI format for scheduling the PUSCH may include a first UL-DAI value of the first HARQ-ACK codebook and a second UL-DAI value of the second HARQ-ACK codebook. Here, the first UL-DAI value may be represented by 1 bit, and the value of the second HARQ-ACK codebook may be represented by 2 bits. The UE may determine the size of the first HARQ-ACK codebook according to the first UL-DAI value. Since the first HARQ-ACK codebook is the type-1 HARQ-ACK codebook, the size can be determined using the 1 bit. The UE may determine the size of the second HARQ-ACK codebook according to the second UL-DAI value. Since the second HARQ-ACK codebook is the type-2 HARQ-ACK codebook, the size can be determined using the 2 bits.

(Second embodiment) When generating two HARQ-ACKs at the same time, if both the first HARQ-ACK codebook and the second HARQ-ACK codebook are configured as the type-2 HARQ-ACK codebook, the DCI format for scheduling PUSCH may include one UL DAI value. The UE may use the UL DAI value as a UL-DAI value of the first HARQ-ACK codebook and a UL-DAI value of the second HARQ-ACK codebook.

More specifically, the DCI format for scheduling the PUSCH may include a 2-bit UL DAI. The size of the first HARQ-ACK codebook and the size of the second HARQ-ACK codebook may be determined according to a value of the 2-bit UL DAI. When the value of the 2-bit UL DAI is $N^{UL}$-DAI, the size of the first HARQ-ACK codebook may be determined as $4*I+N^{UL-DAI}$, where i is one of the non-negative integer values. The UE may determine i based on the number of received PDSCHs corresponding to HARQ-ACK of the first HARQ-ACK codebook and a counter-DAI value included in the DCI format for scheduling the PDSCH. In addition, the size of the second HARQ-ACK codebook may be determined as $4*j+N^{UL-DAI}$, where j is one of the non-negative integer values. The UE may determine j based on the number of received PDSCHs corresponding to the HARQ-ACK of the second HARQ-ACK codebook and the counter-DAI value included in the DCI format for scheduling the PDSCH. Accordingly, when the sizes of the first HARQ-ACK codebook and the second HARQ-ACK codebook are divided by 4, they may have the same remainder.

If CBG-based PDSCH reception is configured in the first HARQ-ACK codebook, the UL DAI may be limited to either the $1^{st}$ UL DAI or the $2^{nd}$ UL DAI. For example, when it is limited to the $1^{st}$ UL DAI, the UE may determine the size of the $1^{st}$ sub-codebook of the first HARQ-ACK codebook based on a 2-bit $1^{st}$ UL DAI. And, the UE may determine, based on the 2-bit $1^{st}$ UL DAI, the size of the second HARQ-ACK codebook. The UE may determine the size of the $2^{nd}$ sub-codebook of the first HARQ-ACK codebook based on the 2-bit $2^{nd}$ UL DAI. Accordingly, when the size of the $1^{st}$ sub-codebook of the first HARQ-ACK codebook and the size of the second HARQ-ACK codebook are divided by 4, they may have the same remainder.

(Third embodiment) When generating two HARQ-ACKs at the same time, if both the first HARQ-ACK codebook and the second HARQ-ACK codebook are configured as type-1 HARQ-ACK codebook, the DCI format for scheduling PUSCH may include one UL DAI value. The UE may use the UL DAI value as the UL-DAI value of the first HARQ-ACK codebook and the UL-DAI value of the second HARQ-ACK codebook.

More specifically, the DCI format for scheduling PUSCH may include 1-bit UL DAI. The size of the first HARQ-ACK codebook and the size of the second HARQ-ACK codebook may be determined according to a value of the 1-bit UL DAI. If the value of the 1-bit UL DAI is '0', the UE may determine that there is no first HARQ-ACK codebook and second HARQ-ACK codebook to be multiplexed on REs on the PUSCH. If the value of the 1-bit UL DAI is '1', the UE may determine that the first HARQ-ACK codebook and the second HARQ-ACK codebook exist. In this case, the size of the first HARQ-ACK codebook and the size of the second HARQ-ACK codebook may be determined based on values configured from a higher layer.

(Fourth embodiment) When generating two HARQ-ACKs at the same time, if one of the first HARQ-ACK codebook and the second HARQ-ACK codebook is configured as the type-1 HARQ-ACK codebook and the other is configured as the type-2 HARQ-ACK codebook, the DCI format for scheduling PUSCH may include one UL DAI value. The UE may use the UL DAI value as the UL-DAI value of the first HARQ-ACK codebook and the UL-DAI value of the second HARQ-ACK codebook. For convenience, description will be made on the assumption that the first HARQ-ACK codebook is set to the type-1 HARQ-ACK codebook and the second HARQ-ACK codebook is set to the type-2 HARQ-ACK codebook.

Specifically, the DCI format for scheduling the PUSCH may include a 2-bit UL DAI. Here, the number of UL DAI bits is determined as the maximum value of the number of UL DAI bits required for the first HARQ-ACK codebook and the number of UL DAI bits required for the second HARQ-ACK codebook. The bits of the 2-bit UL DAI may have '00', '01', '10', and '11'.

The second HARQ-ACK codebook is the type-2 HARQ-ACK codebook, and the UE can interpret the bits as the 2-bit UL DAI value. That is, the UE can interpret '00' as 1, '01' as 2, '10' as 3, and '11' as 4. The size of the second HARQ-ACK codebook may be determined based on the UL DAI value. When the value of the 2-bit UL DAI is $N^{UL-DAI}$, the size of the second HARQ-ACK codebook may be determined as $4*i+N^{UL-DAI}$, where i is one of the non-negative integer values. The UE may determine i based on the number of received PDSCHs corresponding to the HARQ-ACK of the second HARQ-ACK codebook and the counter-DAI value included in the DCI format for scheduling the PDSCH.

The first HARQ-ACK codebook is the type-1 HARQ-ACK codebook, and the UE may select two code-points among the '00', '01', '10', and '11' of 2 bits and recognize them as UL DAI values of 0 or 1. For example, if the 2-bit UL DAI is '11', the UL DAI value can be recognized as 0, and if the 2-bit UL DAI is '10', the UL DAI value can be recognized as 1. The size of the first HARQ-ACK codebook may be determined based on the UL DAI values 0 and 1. If the value of the 1-bit UL DAI is '0', the UE may determine that there is no first HARQ-ACK codebook to be multiplexed on REs on the PUSCH. If the value of the 1-bit UL DAI is '1', the UE may determine that the first HARQ-ACK codebook exists. In this case, the size of the first HARQ-ACK codebook may be determined based on the values configured from a higher layer.

In the above embodiment, the UL DAI values 0 and 1 of the type-1 HARQ-ACK codebook were obtained by reinterpreting two code-points of 2-bit UL DAI '00', '01', '10', and '11'. Here, if the 2 bits are '11', the UL DAI value may be determined as 0. In addition, if 2 bits are '10', the UL DAI value may be determined as 1. This is an example, and a reinterpretation method using another code-point may be possible.

The reason why the UL DAI value is determined as 0 when 2 bits are '11' is as follows. The UE should determine, based on the 2-bit UL DAI, which HARQ-ACK codebook among the first HARQ-ACK codebook and the second HARQ-ACK codebook to be multiplexed on REs on the PUSCH. Here, the UE should determine one of 1) multiplexing only the first HARQ-ACK codebook, 2) multiplexing only the second HARQ-ACK codebook, 3) multiplexing both the first HARQ-ACK codebook and the second HARQ-ACK codebook, and 4) there is no HARQ-ACK codebook to be multiplexed. In a case where the UL DAI value is determined as 0 if 2 bits are '11', if the bits of the 2-bit UL DAI indicate '11', the UE can know that there is no need to multiplex the first HARQ-ACK codebook on at least REs on the PUSCH. In addition, if the bits of the 2-bit UL DAI are '11', the UE may determine 4 as the UL DAI value in the second HARQ-ACK codebook. Accordingly, the size of the second HARQ-ACK codebook may be set to 4*i+4. If the PDSCH or PDCCH corresponding to the HARQ-ACK included in the second HARQ-ACK codebook is not received, the size of the second HARQ-ACK codebook may be determined as 0. Therefore, if 2 bits indicate '11', the UE may not need to multiplex the second HARQ-ACK codebook on REs on the PUSCH. Therefore, in order to determine 4) there is no HARQ-ACK codebook to be multiplexed among the above four determinations, it is preferable to determine the UL DAI value as 0 when 2 bits are '11'.

(Fifth embodiment) When generating two HARQ-ACKs at the same time, the DCI format for scheduling the PUSCH may include only the UL DAI value of one HARQ-ACK codebook and may not include the UL DAI value of the other HARQ-ACK codebook. Here, one HARQ-ACK codebook of which UL DAI value is included in the DCI format may be determined based on one of the following methods or a combination thereof.

(First method) When the first HARQ-ACK codebook has a low priority and the second HARQ-ACK codebook has a high priority, the UE may determine one HARQ-ACK codebook of which the UL DAI value is included in the DCI format according to a priority. For example, the UL DAI value of the second HARQ-ACK codebook having a high priority may be included in the DCI format. Alternatively, for example, the UL DAI value of the first HARQ-ACK codebook having a low priority may be included in the DCI format.

(Second method) If one of the first HARQ-ACK codebook and the second HARQ-ACK codebook is the type-1 HARQ-ACK codebook and the other is the type-2 HARQ-ACK codebook, the UE may determine one HARQ-ACK codebook of which the UL DAI value is included in the DCI format according to the type. For example, the UL-DAI value of the type-1 HARQ-ACK codebook may be included in the DCI format. Alternatively, for example, the UL-DAI value of the type-2 HARQ-ACK codebook may be included in the DCI format.

VIII. Multiplexing and Resource Mapping Method of PUCCH and PUSCH

Hereinafter, this embodiment discloses a method of multiplexing LP HARQ-ACK and HP HARQ-ACK on a PUSCH and a method of mapping the LP HARQ-ACK and HP HARQ-ACK to REs of the PUSCH. Here, the PUSCH may be a low priority PUSCH or a high priority PUSCH.

As an example, a UCI of low priority may be a low priority HARQ-ACK.

As another example, the high priority UCI may include a high priority HARQ-ACK, CSI part 1, and CSI part 2.

In the following, for convenience of explanation, a method of multiplexing the low priority HARQ-ACK and the high priority HARQ-ACK on PUSCH will be described.

(First embodiment) As a first step, the UE may determine the number of REs (or number of modulation symbols, $Q'_{HP-ACK}$) to be occupied by the high priority HARQ-ACK in the PUSCH and the number of REs (or number of modulation symbols, $Q'_{LP-ACK}$) to be occupied by the low priority HARQ-ACK in the PUSCH as follows.

The UE may determine the number of REs (or the number of modulation symbols, $Q'_{HP-ACK}$) to be occupied by the high priority HARQ-ACK in the PUSCH through the following equation.

$$Q'_{HP-ACK} = \min \left\{ \left\lceil \frac{(O_{HP-ACK} + L_{HP-ACK}) \cdot \beta^{HARQ-ACK}_{offSet,HP-to-X}}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil \right\}$$ [Equation 5]

Referring to Equation 5, $O_{HP-ACK}$ is the number of HARQ-ACK bits of high priority, $L_{HP-ACK}$ is the number of CRC bits of high priority, $\beta^{HARQ-ACK}_{offSet,HP-to-X}$ is $\beta^{HARQ-ACK}_{offSet,HP-to-X} = \beta^{HARQ-ACK}_{offSet,HP-to-HP}$ when multiplexed on high priority PUSCH, and $\beta^{HARQ-ACK}_{offSet,HP-to-X} = \beta^{HARQ-ACK}_{offSet,HP-to-LP}$ when multiplexed on low priority PUSCH.

In addition, $\beta^{HARQ-ACK}_{offSet,HP-to-HP}$ and $\beta^{HARQ-ACK}_{offSet,HP-to-LP}$ are values configured or indicated from the base station, and offset values for determining the number of resources for mapping the high priority HARQ-ACK, $C_{UL-SCH}$ is the number of code blocks (CBs) of UL-SCH, $K_r$ is the rth CB size of UL-SCH, $M^{UCI}_{sc}(l)$ is the number of REs that can be used for UCI transmission in the lth PUSCH symbol, $N^{PUSCH}_{symb,all}$ is the total number of symbols used for PUSCH transmission including DMRS, a is a scaling value configured from a higher layer, and $l_0$ is an index of a first non-DMRS PUSCH symbol after the DMRS symbol.

If DMRS is transmitted in the lth symbol, $M^{UCI}_{sc}(l)=0$, otherwise $M^{UCI}_{sc}(l)=M^{PUSCH}_{sc}-M^{PT-RS}_{sc}(l)$. Here, $M^{PUSCH}_{sc}$ is the number of subcarriers scheduled for the PUSCH in the frequency domain, and $M^{PT-RS}_{sc}(l)$ is the number of subcarriers of the lth PUSCH symbol including the PTRS.

The UE may determine the number of REs (or the number of modulation symbols, $Q'_{LP-ACK}$) to be occupied in the PUSCH by the low priority HARQ-ACK through Equation 6 below.

$$Q'_{LP-ACK} = \min \left\{ \begin{bmatrix} \dfrac{(O_{LP-ACK} + L_{LP-ACK}) \cdot \beta^{HARQ-ACK}_{offset,LP-to-X}}{\sum_{l=0}^{N^{PUSCH}_{symb,all}-1} M^{UCI}_{sc}(l)} \\ \dfrac{\sum_{r=0}^{C_{UL-SCH}-1} K_r} \end{bmatrix}, \right.$$

$$\left. \begin{bmatrix} \alpha \cdot \sum_{l=l_0}^{N^{PUSCH}_{symb,all}-1} M^{UCI}_{sc}(l) - Q'_{HP-ACK} \end{bmatrix} \right\}$$

[Equation 6]

Referring to Equation 6, $O_{LP-ACK}$ is the number of HARQ-ACK bits of low priority, LLP-ACK is the number of CRC bits of low priority, $\beta^{HARQ-ACK}_{offset,LP-to-X}$ is $\beta^{HARQ-ACK}_{offset,LP-to-X} = \beta^{HARQ-ACK}_{offset,LP-to-HP}$ when multiplexed on the high priority PUSCH, and $\beta^{HARQ-ACK}_{offset,LP-to-X} = \beta^{HARQ-ACK}_{offset,LP-to-LP}$ when multiplexed on the low priority PUSCH.

In addition, $\beta^{HARQ-ACK}_{offset,LP-to-HP}$ and $\beta^{HARQ-ACK}_{offset,LP-to-LP}$ are values configured or indicated from the base station, and offset values for determining the number of resources for mapping the low priority HARQ-ACK.

In a second step, the UE can select $Q'_{HP-ACK}$ REs for high priority HARQ-ACK transmission and $Q'_{LP-ACK}$ REs for low priority HARQ-ACK transmission in PUSCH, based on the number of REs (or the number of modulation symbols, $Q'_{HP-ACK}$) to be occupied by the high priority HARQ-ACK in a PUSCH and the number of REs (or the number of modulation symbols, $Q'_{LP-ACK}$) to be occupied by the low priority HARQ-ACK in the PUSCH. Detailed examples are as follows.

In one aspect, the UE can determine REs for high priority HARQ-ACK and low priority HARQ-ACK transmission in the PUSCH based on $Q'_{ACK} = Q'_{LP-ACK} - Q'_{HP-ACK}$. Here, a specific $Q'_{ACK}$ selection method can be selected according to 6.2.7 Data and control multiplexing in 3GPP standard document TS38.212. The UE should determine $Q'_{HP-ACK}$ REs for high priority HARQ-ACK transmission and $Q'_{LP-ACK}$ REs for low priority HARQ-ACK transmission among the selected $Q'_{ACK}$ REs. This can be determined in one of the following methods.

In another aspect, the UE may assign the indexes of the $Q'_{ACK}$ REs to 0, 1, ..., $Q'_{ACK}-1$. Here, in the order of indexes, the RE having the lowest frequency of the most preceding OFDM symbol may be set to 0, and the indexes can be assigned in ascending order of frequency. Then, in the next OFDM symbol, indexes may be assigned in ascending order of frequencies. By repeating this process, the indexes of $Q'_{ACK}$ REs can be assigned.

Figure 39:
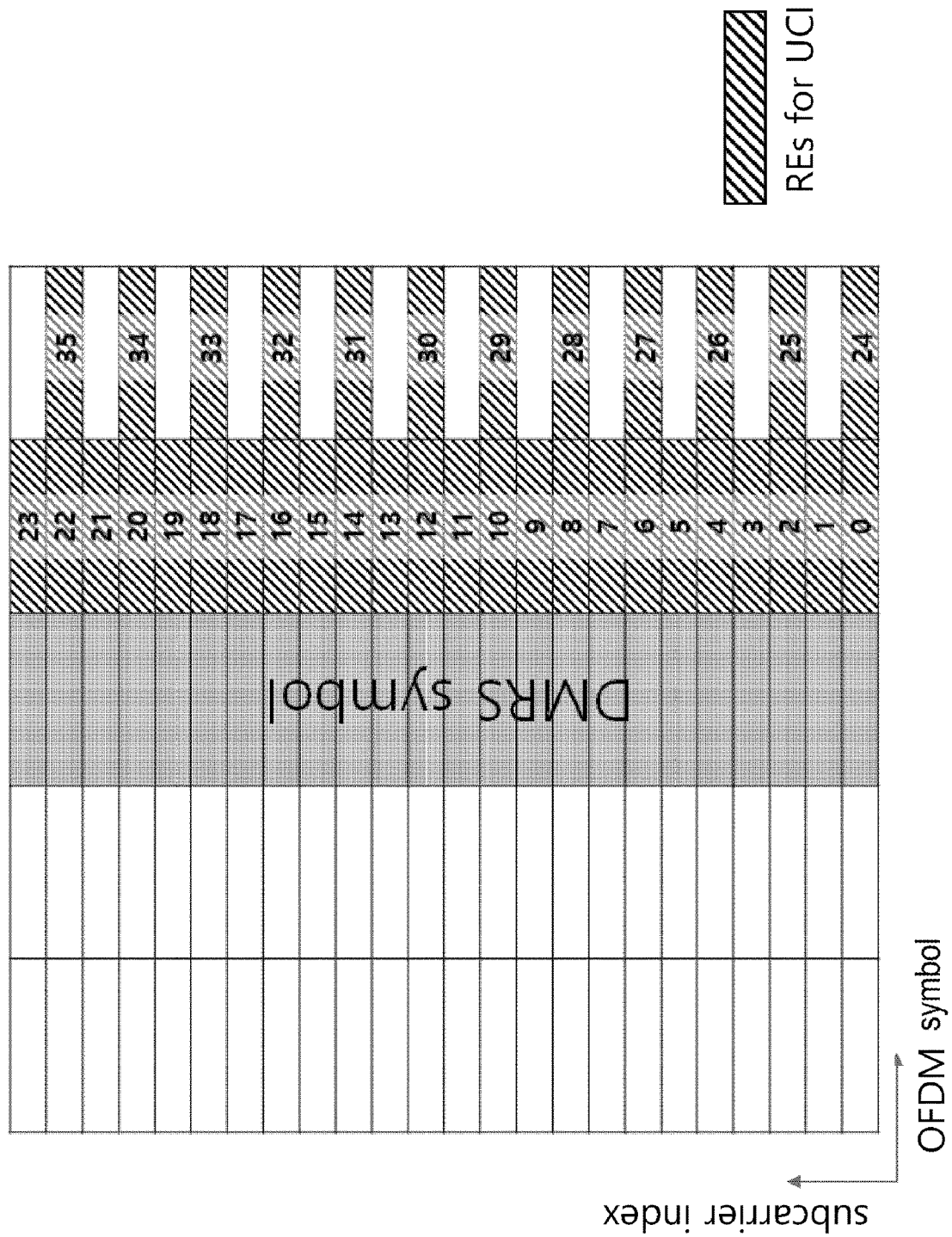
FIG. 39 illustrates an indexing method of REs according to an example.

FIG. 39 illustrates a method of indexing REs according to an example. FIG. 39 is an example of $Q'_{ACK}=36$. Referring to FIG. 39, in the symbol immediately following the DMRS, 24 REs are assigned indexes of 0, 1, 2, ..., 23, and the next symbol is assigned indexes of 24, 25, ..., 35.

(First method) The UE may determine $Q'_{HP-ACK}$ REs (0, 1, ... $Q'_{HP-ACK}-1$) of the most preceding index as REs used for transmitting the high priority HARQ-ACK. In addition, $Q'_{LP-ACK}$ REs ($Q'_{HP-ACK}, Q'_{HP-ACK}-1, ..., Q'_{ACK}-1$) having subsequent indexes may be determined as REs used for transmitting low priority HARQ-ACK. This is because it can be transmitted more quickly in time because REs having preceding indexes can be placed in a preceding OFDM symbol, and it can be transmitted with higher reliability because the preceding OFDM symbol is adjacent to the DMRS symbol.

Figure 40:
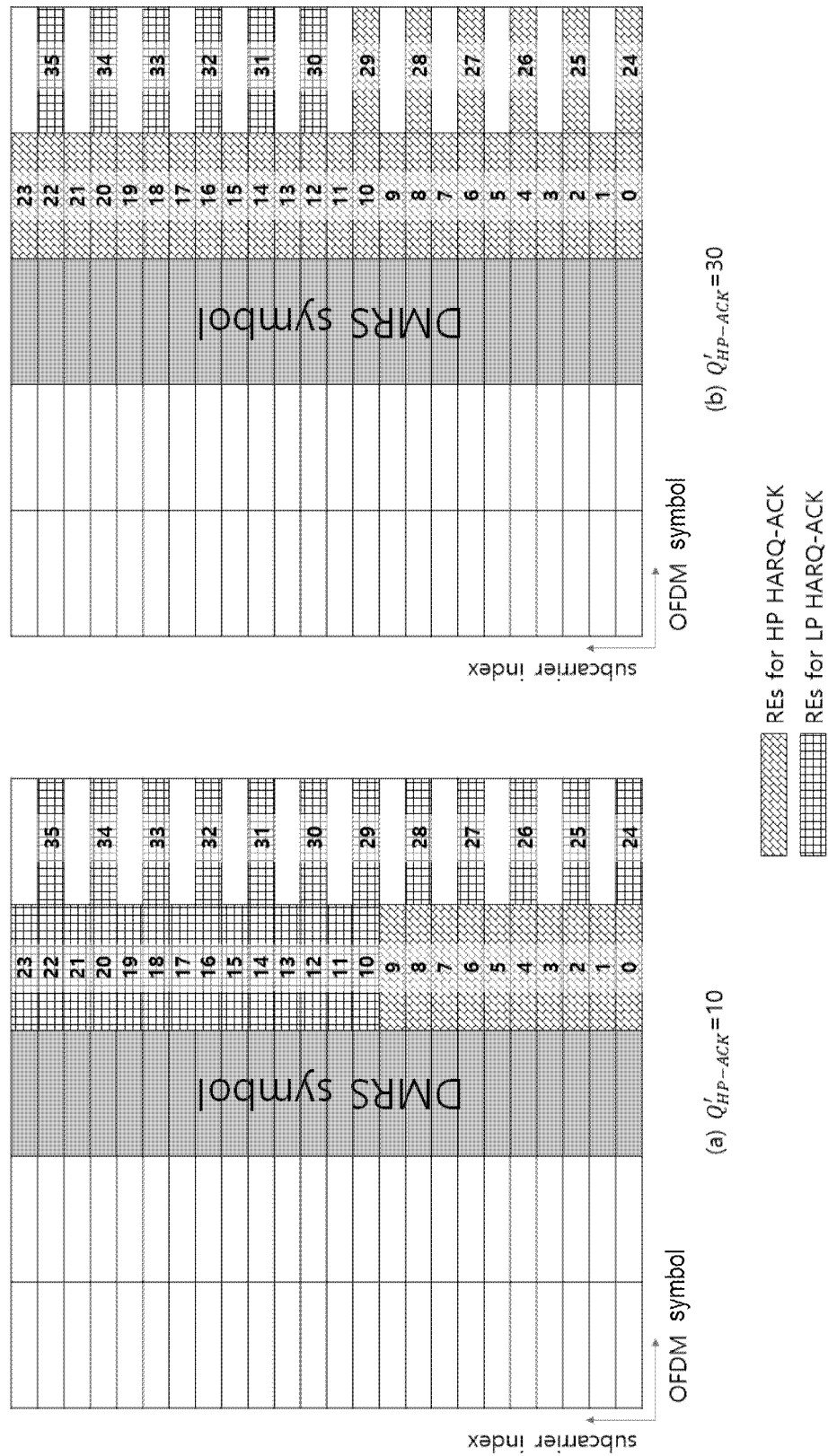
FIG. 40 illustrates an indexing method of REs according to another example.

FIG. 40 illustrates a method of indexing REs according to another example.

Referring to FIG. 40, examples of (a) $Q'_{HP-ACK}=10$ and (b) $Q'_{HP-ACK}=30$ according to the first method are shown. If $Q'_{HP-ACK}=10$, the UE can determine indexes 0, 1, ..., 9 as REs used for transmitting the high priority HARQ-ACK. If $Q'_{HP-ACK}=30$, the UE may determine indexes 0, 1, ..., 29 as REs used for transmitting the high priority HARQ-ACK.

(Second method) The UE may determine REs having indexes of 0, s, 2*s, 3*s, ..., ($Q'_{HP-ACK}-1$) as REs used for transmitting a high priority HARQ-ACK. Here, s may be determined as s=floor($Q'_{ACK}/Q'_{HP-ACK}$). That is, the UE can select $Q'_{HP-ACK}$ REs that are as far apart as possible at equal intervals among the $Q'_{ACK}$ REs. Through this, REs of high priority can be distributed in the frequency domain to obtain a high frequency diversity gain. However, in this method, high priority REs are distributed over several OFDM symbols. Also, since REs of high priority may be located in later OFDM symbols in time, they may not be suitable for services requiring low delay.

Figure 41:
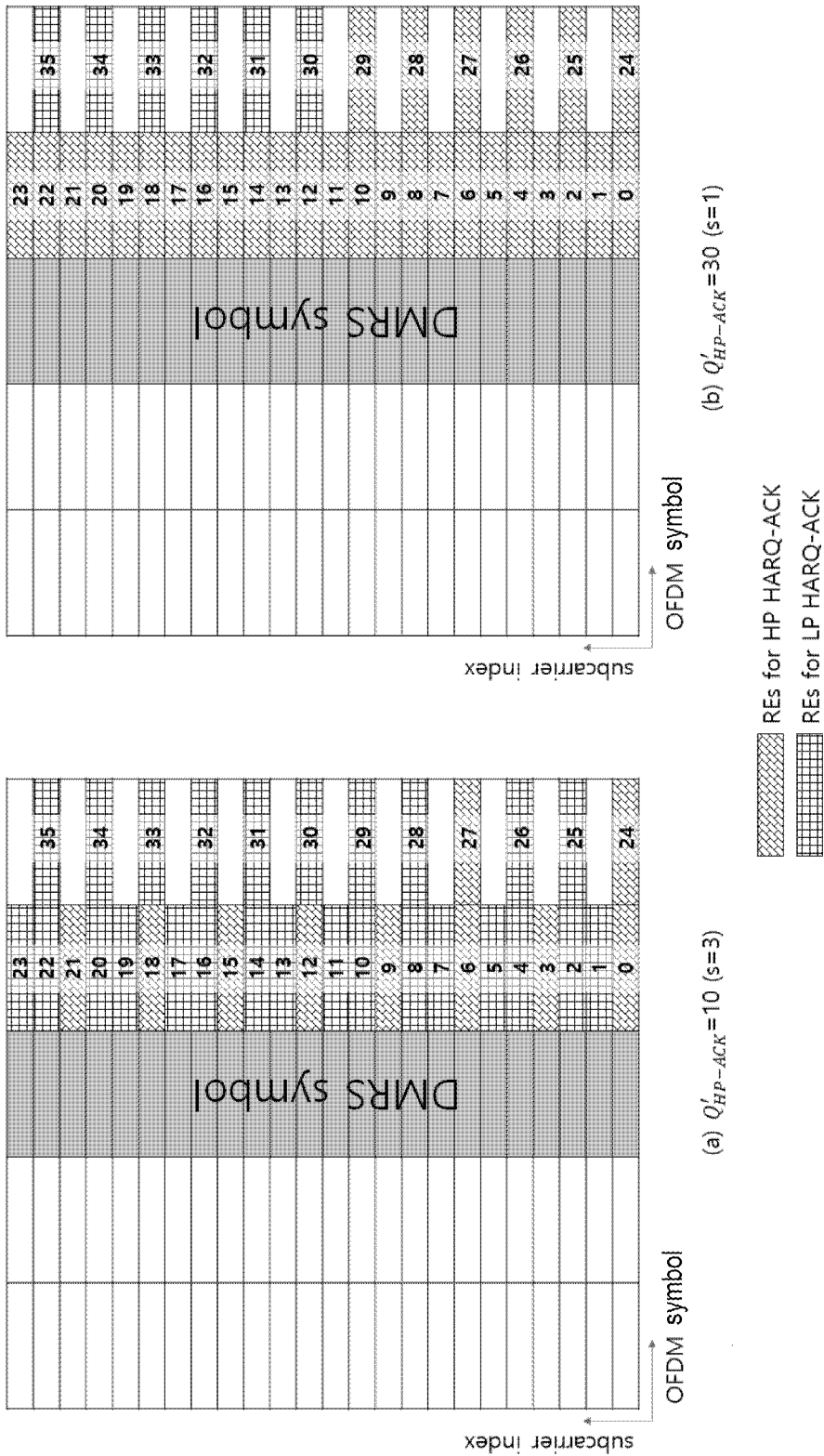
FIG. 41 illustrates an indexing method of REs according to another example.

FIG. 41 illustrates a method of indexing REs according to another example.

Referring to FIG. 41, examples of (a) $Q'_{HP-ACK}=10$ and (b) $Q'_{HP-ACK}=30$ according to the second method are shown. If $Q'_{HP-ACK}=10$, the UE may determine s=3. That is, the UE can select REs at intervals of 3 indexes of REs and use them for high priority HARQ-ACK transmission. The indexes determined here are 0, 3, 6, 9, 12, 15, 18, 21, 24, 27. If $Q'_{HP-ACK}=30$, the UE may determine s=1. That is, the UE can select REs at an interval of one index of REs and use them for high priority HARQ-ACK transmission. The indexes determined here are 0, 1, ..., 29. For reference, if s=1, the second method is the same as the first method.

(Third method) The UE may select $Q'_{HP-ACK}$ REs from among $Q'_{ACK}$ REs as follows.

First, assume that the number of REs located in the most preceding OFDM symbol (first OFDM symbol for convenience) among $Q'_{ACK}$ REs is $Q'_{ACK,1}$. The indexes of the REs are 0, 1, ..., $Q'_{ACK,1}-1$. Assume that the number of REs located in the next preceding OFDM symbol (second OFDM symbol for convenience) is $Q'_{ACK,2}$. The indexes of the REs are $Q'_{ACK,1}, Q'_{ACK,1}-1, ..., Q'_{ACK,2}-1$. In this way, the number of REs located in all OFDM symbols can be determined.

The UE finds the smallest integer j that satisfies the following condition.

1) Condition: $j = \Sigma_{i=1}^{j} Q'_{ACK,i} \geq Q'_{HP-ACK}$.

According to the above condition, $Q'_{ACK,1} + Q'_{ACK,2} + ... + Q'_{ACK,j-1} < Q'_{HP-ACK}$.

The UE may use all REs of the first OFDM symbol to the (j−1)th OFDM symbol for HARQ-ACK transmission of high priority. This is to use REs of OFDM symbols earlier in time as possible for HARQ-ACK transmission of high priority. That is, REs having indexes of 0,1, ..., $Q'_{ACK,1} + Q'_{ACK,2} + ... + Q'_{ACKj-1,1}$ may be determined as REs used for transmitting the high priority HARQ-ACK.

The UE may use some REs of the jth OFDM symbol for HARQ-ACK transmission of high priority. Here, the number of some REs is $X = Q'_{HP-ACK} - (Q'_{ACK,1} + Q'_{ACK,2} + ... + Q'_{ACKj-1})$. That is, X is the number of REs lacking in the preceding OFDM symbols. The UE may determine REs having indexes of Y+0, Y+s, Y+2*s, Y+3*s, ..., Y+(X−1)*s as REs used for transmitting high priority HARQ-ACK. Here, the RE having an index of $Y = Q'_{ACK,1} +$ $Q'_{ACK,2} + \ldots + Q'_{ACK,j-1}$ is the RE having the lowest frequency of the j OFDM symbol. s is s=floor($Q'_{ACK,j}$/X). That is, the UE can select X REs as far away as possible at equal intervals from among the $Q'_{ACK,j}$ REs of the jth OFDM symbol.

FIG. 42 illustrates aa method of indexing REs according to another example.

Referring to FIG. 42, examples of (a) $Q'_{HP-ACK}=10$ and (b) $Q'_{HP-ACK}=30$ according to the second method are shown. If $Q'_{HP-ACK}=10$, the UE may determine j as j=1. That is, among REs of the first OFDM symbol (the symbol immediately following the DMRS symbol), $Q'_{HP-ACK}=10$ REs can be used for high priority HARQ-ACK transmission. Here, s may be s=2. Accordingly, REs having indexes corresponding to 0, 2, 4, 6, 8, 10, 12, 14, 16, and 18 can be used for high priority HARQ-ACK transmission. If $Q'_{HP-ACK}=30$, the UE can determine j as j=2. That is, all REs of the first OFDM symbol (the symbol immediately following the DMRS symbol) can be used for high priority HARQ-ACK transmission. And X=6 REs of the second OFDM symbol can be used for high priority HARQ-ACK transmission. Here, s can be determined as s=2. That is, the UE can select REs at intervals of two indexes of REs of the second OFDM symbol and use them for high priority HARQ-ACK transmission. The indexes determined here are 24, 26, 28, 30, 32, 34.

PUSCH Rate-Matching & Puncturing

The UE determines REs to transmit high priority HARQ-ACK and REs to transmit low priority HARQ-ACK based on at least one of the first method, the second method, and the third method. The UE may performs rate matching and transmit the PUSCH in REs other than the REs.

Here, when the following conditions are satisfied, the UE may performs rate matching on the PUSCH including the REs, performs puncturing of the locations of the REs, and use them for high priority HARQ-ACK or low priority HARQ-ACK transmission.

1) Condition 1: The sum of the number of high priority HARQ-ACK bits and low priority HARQ-ACK bits to be multiplexed on PUSCH is equal to or less than a certain number 2) Condition 2: The number of high priority HARQ-ACK bits to be multiplexed on PUSCH is equal to or less than a certain number and the number of low priority HARQ-ACK bits is equal to or less than a certain number.

Here, when the following condition 3 is satisfied, the UE may perform rate matching on the PUSCH including REs for low priority HARQ-ACK transmission, and perform puncturing of positions of the REs, and use them for low priority HARQ-ACK transmission. For reference, PUSCH can be subjected to rate matching by always avoiding REs for high priority HARQ-ACK transmission.

3) Condition 3: The number of low priority HARQ-ACK bits to be multiplexed to PUSCH is equal to or less than a certain number.

Here, when the following condition is satisfied, the UE may perform rate matching on the PUSCH including REs for high priority HARQ-ACK transmission, and perform puncturing of positions of the Res, and use them for high priority HARQ-ACK transmission. For reference, PUSCH can be subjected to rate matching by always avoiding REs for low priority HARQ-ACK transmission.

3) Condition 4: The number of high priority HARQ-ACK bits to be multiplexed on PUSCH is equal to or less than a certain number. Here, the certain number may be 2.

The UE determines REs to transmit high priority HARQ-ACK and REs to transmit low priority HARQ-ACK based on at least one of the first method, the second method, and the third method. The UE may perform rate matching and transmit PUSCH in REs other than the REs. If the number of bits of the high priority HARQ-ACK to be transmitted by the UE is less than a certain number, the UE may assume that the number of bits of the high priority HARQ-ACK is the certain number. In this case, NACKs may be added to the least significant bit (LSB) as much as the insufficient bits. If the number of bits of the low priority HARQ-ACK to be transmitted by the UE is less than a certain number, the UE may assume that the number of bits of the low priority HARQ-ACK is the certain number. In this case, NACKs may be added to the least significant bit (LSB) as much as the insufficient bits. By assuming it as the certain number in this way, even if the UE fails to receive some PDCCHs indicating HARQ-ACK transmission, rate matching of the PUSCH is not affected. Here, the certain number may be 2.

Multiplexing of LP HARQ-ACK and CSI Part 1 on PUSCH

In the following, for convenience of explanation, a method of multiplexing the low priority HARQ-ACK and the CSI part 1 on a PUSCH will be described. For reference, the high priority HARQ-ACK or CSI part 2 may be additionally multiplexed on the PUSCH.

(First embodiment) As a first step, the UE may determine the number of REs (or number of modulation symbols, $Q'_{HP-ACK}$) to be occupied by the high priority HARQ-ACK in the PUSCH, the number of REs (or number of modulation symbols, $Q'_{LP-ACK}$) to be occupied by the low priority HARQ-ACK in the PUSCH, and the number of REs to be occupied by CSI part 1 in the PUSCH (or the number of modulation symbols, $Q'_{CSI-part1}$) as follows.

The UE may determine the number of REs (or the number of modulation symbols, $Q'_{HP-ACK}$) to be occupied by the high priority HARQ-ACK in the PUSCH through the following equation 7.

$$Q'_{HP-ACK} = \min \left\{ \left\lceil \frac{(O_{HP-ACK} + L_{LP-ACK}) \cdot \beta^{HARQ-ACK}_{offset,HP-to-X}}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil \right\}$$ [Equation 7]

Referring to Equation 7, $O_{HP-ACK}$ is the number of HARQ-ACK bits of high priority, $L_{HP-ACK}$ is the number of CRC bits of high priority, $\beta^{HARQ-ACK}_{offSet,HP-to-X}$ is $\beta^{HARQ-ACK}_{offset,HP-to-X}=\beta^{HARQ-ACK}_{offset,HP-to-HP}$ when multiplexed on high priority PUSCH, and $\beta^{HARQ-ACK}_{offset,HP-to-X}=\beta^{HARQ-ACK}_{offset,HP-to-LP}$ when multiplexed on low priority PUSCH.

In addition, $\beta^{HARQ-ACK}_{offSet,HP-to-HP}$ and $\beta^{HARQ-ACK}_{offSet,HP-to-LP}$ are values configured or indicated from the base station, and offset values for determining the number of resources t for mapping the high priority HARQ-ACK, $C_{UL-SCH}$ is the number of code blocks (CBs) of UL-SCH, $K_r$ is the rth CB size of UL-SCH, $M^{UCI}_{sc}(l)$ is the number of REs that can be used for UCI transmission in the lth PUSCH symbol, $N^{PUSCH}_{symb,all}$ is the total number of symbols used for PUSCH transmission including DMRS, a is a scaling value configured from the higher layer, and $l_0$ is an index of a first non-DMRS PUSCH symbol after the DMRS symbol.

If DMRS is transmitted in the lth symbol, $M^{UCI}_{sc}(l)=0$, otherwise $M^{UCI}_{sc}(l)=M^{PUSCH}_{sc}-M^{PT-RS}_{sc}(l)$. Here, $M^{PUSCH}_{sc}$ is the number of subcarriers scheduled for the PUSCH in the frequency domain, and $M^{PT-RS}_{sc}(l)$ is the number of subcarriers of the lth PUSCH symbol including the PTRS.

The number of REs (or the number of modulation symbols, $Q'_{LP-ACK}$) to be occupied by the low priority HARQ-ACK in the PUSCH and the number of REs (or the number of modulation symbols, $Q'_{CSI-part1}$) to be occupied by the CSI part 1 in the PUSCH are obtained by at least one of the following methods.

(First method) The UE may determine the number of REs (or the number of modulation symbols, $Q'_{LP-ACK}$) to be occupied in the PUSCH by the low priority HARQ-ACK through Equation 8 below.

$$Q'_{LP-ACK} = \min \left\{ \left\lceil \frac{(O_{LP-ACK} + L_{LP-ACK}) \cdot \beta^{HARQ-ACK}_{offset,LP-to-X}}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) - Q'_{HP-ACK} \right\rceil \right\}$$ [Equation 8]

Referring to Equation 8, $\beta_{LP-ACK}$ is the number of HARQ-ACK bits of low priority, LLP-ACK is the number of CRC bits of low priority, $\beta^{HARQ-ACK}_{offset,LP-to-X}$ is $\beta^{HARQ-ACK}_{offset,LP-to-X}=\beta^{HARQ-ACK}_{offset,LP-to-HP}$ when multiplexed on the high priority PUSCH, and $\beta^{HARQ-ACK}_{offset,LP-to-X}=\beta^{HARQ-ACK}_{offset,LP-to-LP}$ when multiplexed on the low priority PUSCH. In addition, $\beta^{HARQ-ACK}_{offset,LP-to-HP}$, $\beta^{HARQ-ACK}_{offset,LP-to-LP}$ are values configured or indicated from the base station, and offset values for determining the number of resources for mapping the low priority HARQ-ACK.

After obtaining $Q'_{LP-ACK}$, the UE may determine the number of REs (or the number of modulation symbols, $Q'_{CSI-part1}$) to be occupied by CSI part 1 in the PUSCH through Equation 9 below.

$$Q'_{CSI-part1} = \min \left\{ \left\lceil \frac{(O_{CSI-part1} + L_{CSI-part1}) \cdot \beta^{CSI-part1}_{offset,X}}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) - Q'_{HP-ACK} - Q'_{LP-ACK} \right\rceil \right\}$$ [Equation 9]

Referring to Equation 9, $O_{CSI-part1}$ is the number of bits of CSI part 1, $L_{CSI-part1}$ is the number of CRC bits of CSI part 1, $\beta^{CSI-part1}_{offset,X}$ is $\beta^{CSI-part1}_{offset,X}=\beta^{CSI-part1}_{offset,HP}$ when multiplexed to the high priority PUSCH, and $\beta^{CSI-part1}_{offset,X}=\beta^{CSI-part1}_{offset,LP}$ when multiplexed to the low priority PUSCH.

Here, $\beta^{CSI-part1}_{offset,HP}$ and $\beta^{CSI-part1}_{offset,LP}$ are values configured or indicated from the base station, and are offset values for determining the number of resources for mapping HARQ-ACK of CSI part 1.

(Second method) The UE may determine the number of REs (or the number of modulation symbols, $Q'_{CSI-part1}$) to be occupied by CSI part 1 in the PUSCH through Equation 10 below.

$$Q'_{CSI-part1} = \min \left\{ \left\lceil \frac{(O_{CSI-part1} + L_{CSI-part1}) \cdot \beta^{CSI-part1}_{offset,X}}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) - Q'_{HP-ACK} \right\rceil \right\}$$ [Equation 10]

Referring to Equation 10, $O_{CSI-part1}$ is the number of bits of CSI part 1, $L_{CSI-part1}$ is the number of CRC bits of CSI part 1, $\beta^{CSI-part1}_{offset,X}$ is $\beta^{CSI-part1}_{offset,X}=\beta^{CSI-part1}_{offset,HP}$ when multiplexed on the high priority PUSCH, and $\beta^{CSI-part1}_{offset,X}=\beta^{CSI-part1}_{offset,LP}$ when multiplexed on the low priority PUSCH. In addition, $\beta^{CSI-part1}_{offset,HP}$, $\beta^{CSI-part1}_{offset,LP}$ are values configured or indicated from the base station, and are offset values for determining the number of resources for mapping HARQ-ACK of CSI part 1.

After obtaining $Q'_{CSI-part1}$, the UE may determine the number of REs (or the number of modulation symbols, $Q'_{LP-ACK}$) to be occupied by the low priority HARQ-ACK in the PUSCH through Equation 11 below.

$$Q'_{LP-ACK} = \min \left\{ \left\lceil \frac{(O_{LP-ACK} + L_{LP-ACK}) \cdot \beta^{HARQ-ACK}_{offset,LP-to-X}}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) - Q'_{HP-ACK} - Q'_{CSI-part1} \right\rceil \right\}$$ [Equation 11]

Referring to Equation 11, $O_{LP-ACK}$ is the number of HARQ-ACK bits of low priority, LLP-ACK is the number of CRC bits of low priority, $\beta^{HARQ-ACK}_{offset,LP-to-X}$ is $\beta^{HARQ-ACK}_{offset,LP-to-X}=\beta^{HARQ-ACK}_{offset,LP-to-HP}$ when multiplexed on the high priority PUSCH, and $\beta^{HARQ-ACK}_{offset,LP-to-X}=\beta^{HARQ-ACK}_{offset,LP-to-LP}$ when multiplexed on the low priority PUSCH.

In addition, $\beta^{HARQ-ACK}_{offset,LP-to-HP}$ and $\beta^{HARQ-ACK}_{offset,LP-to-LP}$ are values configured or indicated from the base station, and offset values for determining the number of resources for mapping the low priority HARQ-ACK.

In a second step, the UE can select $Q'_{LP-ACK}$ REs for low priority HARQ-ACK transmission and $Q'_{CSI-part1}$ REs for CSI part 1 transmission in PUSCH, based on the number of REs (or the number of modulation symbols, $Q'_{LP-ACK}$) to be occupied by the low priority HARQ-ACK in PUSCH and the number of REs (or the number of modulation symbols, $Q'_{CSI-part1}$) to be occupied by the CSI part 1 in the PUSCH. Detailed examples are as follows. For reference, for high priority HARQ-ACK, REs were previously determined and mapped thereto regardless of Res for transmission of the low priority HARQ-ACK or CSI part 1. It is assumed that the mapping of high priority HARQ-ACK to REs follows the HARQ-ACK RE mapping method of 6.2.7 Data and control multiplexing of 3GPP standard document TS38.212.

The UE may determine REs for low priority HARQ-ACK and CSI part 1 transmission in the PUSCH based on $Q'_{LP-ACK/CSI}=Q'_{LP-ACK}+Q'_{CSI-part1}$. Here, a specific method for selecting $Q'_{LP-ACK/CS}$ REs can be selected according to the CSI part 1 RE mapping method of 6.2.7 Data and control multiplexing of 3GPP standard document TS38.212. The UE should determine $Q'_{LP-ACK}$ REs for low priority HARQ-ACK transmission and $Q'_{CSI-part1}$ REs for CSI part 1 transmission among the selected $Q'_{LP-ACK/CSI}$ Res. This can be determined by one of the following methods.

The indexes of $Q'_{LP-ACK/CSI}$ REs may be assigned 0, 1, . . . , $Q'_{LP-ACK/CSI}-1$. Here, in the order of the index, the RE having the lowest frequency of the most preceding OFDM symbol may be set to 0, and the indexes can be assigned in ascending order of frequencies. Then, in the next OFDM symbol, indexes may be assigned in ascending order of frequencies. By repeating this process, the indexes of $Q'_{LP-ACK/CSI}$ REs can be assigned.

In the first method, the UE may determine $Q'_{LP-ACK}$ REs (0, 1, . . . $Q'_{LP-ACK}-1$) of the preceding index as REs used for transmitting the low priority HARQ-ACK. In addition, $Q'_{CSI-part1}$ REs ($Q'_{LP-ACK}$, $Q'_{LP-ACK}+1$, . . . , $Q'_{LP-ACK/CSI}-1$) having subsequent indexes may be determined as REs used for transmitting the low priority HARQ-ACK. This is because it can be transmitted more quickly in time because REs having preceding indexes can be placed in a preceding OFDM symbol, and it can be transmitted with higher reliability because the preceding OFDM symbol is adjacent to the DMRS symbol.

In the first method, the order can be changed as follows. The UE may determine $Q'_{CSI-part1}$ REs (0, 1, . . . , $Q'_{CSI-part1}-1$) having the preceding index as REs used for transmitting CSI part 1. In addition, $Q'_{LP-ACK}$ REs ($Q'_{CSI-part1}$, $Q'_{CSI-part1}+1$, . . . , $Q'_{LP-ACK/CSI}-1$) having subsequent indexes may be determined as REs used for transmitting low priority HARQ-ACK.

In the second method, the UE may determine the REs having the indexes of 0, s, 2*s, 3*s, . . . , ($Q'_{LP-ACK}-1$)*s as REs used for transmitting the low priority HARQ-ACK. Here, s may be determined as s=floor($Q'_{LP-ACK/CSI}$/ $Q'_{LP-ACK}$). That is, the UE may select $Q'_{LP-ACK}$ REs that are as far apart as possible at equal intervals among the $Q'_{LP-ACK/CSI}$ REs. The remaining REs are used as REs for CSI transmission. Through this, REs of low priority can be distributed in the frequency domain and a high frequency diversity gain can be obtained. However, in this method, REs of high priority are distributed over several OFDM symbols. In addition, the REs of low priority may be located in later OFDM symbols in time, delay of low priority HARQ-ACK occurs.

The second method may be applied to CSI. The UE may determine REs having the indexes of 0, s, 2*s, 3*s, . . . , ($Q'_{CSI-part1}-1$)*s as REs used for transmitting CSI part1. Here, s may be determined as s=floor($Q'_{LP-ACK/CSI}$/ $Q'_{CSI-part1}$). That is, the UE may select $Q'_{CSI-part1}$ REs that are as far apart as possible at equal intervals among the $Q'_{LP-ACK/CSI}$ REs. The remaining REs are used as REs for low priority HARQ-ACK transmission. Through this, the REs of low priority can be distributed in the frequency domain and a high frequency diversity gain can be obtained. However, in this method, the REs of high priority are distributed over several OFDM symbols. In addition, the REs of low priority may be located in later OFDM symbols in time, delay of low priority HARQ-ACK occurs.

As a third method, the UE may select $Q'_{LP-ACK}$ REs from among $Q'_{LP-ACK/CSI}$ REs as follows. First, assume that the number of REs located in the most preceding OFDM symbol (a first OFDM symbol for convenience) among $Q'_{LP-ACK/CSI}$ RES is $Q'_{LP-ACK/CSI,1}$. The indexes of the REs are 0, 1, . . . $Q'_{LP-ACK/CSI,1}-1$. Assume that the number of REs located in the next preceding OFDM symbol (second OFDM symbol for convenience) is $Q'_{LP-ACK/CSI,2}$. The indexes of the REs are $Q'_{LP-ACK/CSI,1}$, $Q'_{LP-ACK/CSI,1}-1$, . . . $Q'_{LP-ACK/CSI,2}-1$. In this way, the number of REs located in all OFDM symbols can be determined.

The UE finds the smallest integer j that satisfies the following condition.

1) Condition 1

$$\Sigma_{i=1}^{j} Q'_{LP-\frac{ACK}{CSI},i} \geq Q'_{LP-ACK}$$

According to the above condition, $Q'_{LP-ACK/CSI,1}+Q'_{LP-ACK/CSI,2}+ \ldots +Q'_{LP-ACK/CSI,j-1}<Q'_{LP-ACK}$.

The UE may use all REs of the first OFDM symbol to the (j−1)th OFDM symbol for HARQ-ACK transmission of low priority. This is to use REs of OFDM symbols earlier in time as possible for HARQ-ACK transmission of low priority. That is, REs having indexes of 0,1, . . . $Q'_{LP-ACK/CSI,1}+Q'_{LP-ACK/CSI,2}+ \ldots +Q'_{LP-ACK/CSI,j-1}-1$ may be determined as REs used for transmitting the low priority HARQ-ACK.

The UE may use some REs of the jth OFDM symbol for HARQ-ACK transmission of low priority. Here, the number of some REs is $X=Q'_{LP-ACK}-(Q'_{LP-ACK/CSI,1}+Q'_{LP-ACK/CSI,2}+ \ldots +Q'_{LP-ACK/CSI,j-1})$. That is, X is the number of REs lacking in the preceding OFDM symbols. The UE may determine REs having indexes of Y+0, Y+s, Y+2*s, Y+3*s, . . . , Y+(X−1)*s as REs used for transmitting high priority HARQ-ACK. Here, the RE having an index of $Y=Q'_{LP-ACK/CSI,1}+Q'_{LP-ACK/CSI,2}+ \ldots +Q'_{LP-ACK/CSI,j-1}$ is the RE of the lowest frequency of the j OFDM symbol. s is s=floor($Q'_{LP-ACK/CSI,j}$/X). That is, the UE can select X REs as far away as possible at equal intervals from among the $Q'_{LP-ACK/CSI,j}$ REs of the jth OFDM symbol and use them for CSI part 1 transmission. The remaining REs are used as REs for CSI part 1 transmission.

The third method can be applied to CSI part 1. The UE may select $Q'_{CSI-part1}$ REs among the $Q'_{LP-ACK/CSI}$ REs as follows.

First, assume that the number of REs located in the most preceding OFDM symbol (a first OFDM symbol for convenience) among $Q'_{LP-ACK/CSI}$ REs is $Q'_{LP-ACK/CSI,1}$. The indexes of the REs are 0, 1, . . . $Q'_{LP-ACK/CSI,1}-1$. Assume that the number of REs located in the next preceding OFDM symbol (second OFDM symbol for convenience) is $Q'_{LP-ACK/CSI,2}$. The indexes of the REs are $Q'_{LP-ACK/CSI,1}$, $Q'_{LP-ACK/CSI,1}-1$, . . . , $Q'_{LP-ACK/CSI,2}-1$. In this way, the number of REs located in all OFDM symbols can be determined.

The UE finds the smallest integer j that satisfies the following condition.

2) Condition 2:

$$\Sigma_{i=1}^{j} Q'_{LP-\frac{ACK}{CSI},i} \geq Q'_{CSI-part1}$$

According to the above condition, $Q'_{LP\text{-}ACK/CSI,1} + Q'_{LP\text{-}ACK/CSI,2} + \cdots + Q'_{LP\text{-}ACK/CSI,j-1} < Q'_{CSI\text{-}part1}$.

The UE may use all REs of the first OFDM symbol to the (j−1)th OFDM symbol for HARQ-ACK transmission of low priority. This is to use REs of OFDM symbols earlier in time as possible for HARQ-ACK transmission of low priority. That is, REs having indexes of 0, 1, ... $Q'_{LP\text{-}ACK/CSI,1} + Q'_{LP\text{-}ACK/CSI,2} + \cdots + Q'_{LP\text{-}ACK/CSI,j-1} - 1$ may be determined as REs used for transmitting the low priority HARQ-ACK.

The UE may use some REs of the jth OFDM symbol for HARQ-ACK transmission of low priority. Here, the number of some REs is $X = Q'_{CSI\text{-}part1} - (Q'_{LP\text{-}ACK/CSI,1} + Q'_{LP\text{-}ACK/CSI,2} + \cdots + Q'_{LP\text{-}ACK/CSI,j-1})$. That is, X is the number of REs lacking in the preceding OFDM symbols. The UE may determine REs having indexes of Y+0, Y+s, Y+2*s, Y+3*s, ..., Y+(X−1)*s as REs used for transmitting high priority HARQ-ACK. Here, the RE having an index of $Y = Q'_{LP\text{-}ACK/CSI,1} + Q'_{LP\text{-}ACK/CSI,2} + \cdots + Q'_{LP\text{-}ACK/CSI,j-1}$, is the RE of the lowest frequency of the j OFDM symbol. s is $s = \text{floor}(Q'_{LP\text{-}ACK/CSI,j}/X)$. That is, the UE can select X REs as far away as possible at equal intervals from among the $Q'_{LP\text{-}ACK/CSI,j}$ REs of the jth OFDM symbol and use them for CSI part 1 transmission. The remaining REs are used as REs for low priority HARQ-ACK transmission.

Figure 43:
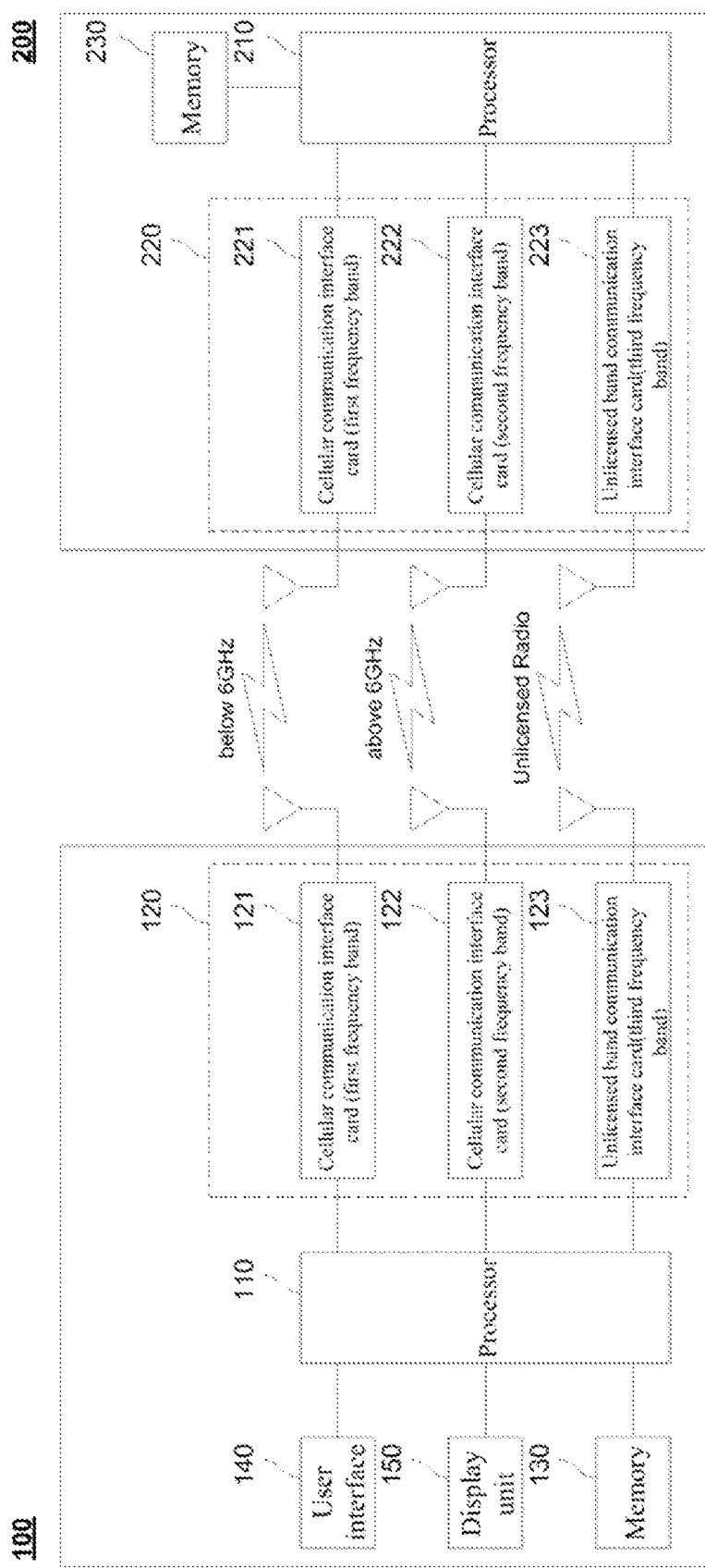
FIG. 43 is a block diagram showing the configurations of a UE and a base station according to an embodiment of the present disclosure.

FIG. 43 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP)

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as a single type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A user equipment (UE) for use in a wireless communication system, the UE comprising:
a processor; and
a communication module,
wherein the processor is configured to:
receive a downlink control information (DCI) format in a slot #n, wherein the DCI format requests uplink control information (UCI) re-transmission and includes:
a modulation and coding scheme (MCS) field, and
a physical downlink shared channel-to-hybrid automatic repeat request (PDSCH-to-HARQ) feedback timing indicator field; and
transmit HARQ-acknowledgement (HARQ-ACK) information in-associated with a slot #(n–k) via a physical uplink control channel (PUCCH) in a slot #(n+p), wherein the k is determined based on a value of the MCS field, and wherein the slot #(n+p) is after the slot #(n–k), and the p is determined based on a value of the PDSCH-to-HARQ feedback timing indicator field.

2. The UE of claim 1, wherein the DCI format further includes an indication information, and the indication information is associated with the HARQ-ACK information among a plurality of HARQ-ACK information in slot #(n–k).

3. The UE of claim 1, wherein the HARQ-ACK information in associated with slot #(n–k) is HARQ-ACK information with a lower priority among a plurality of HARQ-ACK information in slot #(n–k).

4. The UE of claim 1, wherein the DCI format further includes a PUCCH indicator, and the PUCCH is indicated by using a value of the PUCCH indicator among a plurality of PUCCH candidates.

5. The UE of claim 1, wherein the DCI format does not schedule a PDSCH.

6. A method for use by a user equipment (UE) in a wireless communication system, the method comprising:
- receiving a downlink control information (DCI) format in a slot #n, wherein the DCI format requests uplink control information (UCI) re-transmission and includes:
  - a modulation and coding scheme (MCS) field, and
  - a physical downlink shared channel-to-hybrid automatic repeat request (PDSCH-to-HARQ) feedback timing indicator field; and
- transmitting HARQ-acknowledgement (HARQ-ACK) information in-associated with a slot #(n−k) via a physical uplink control channel (PUCCH) in a slot #(n+p),
- wherein the k is determined based on a value of the MCS field, and
- wherein the slot #(n+p) is after the slot #(n−k), and the p is determined based on a value of the PDSCH-to-HARQ feedback timing indicator field.

7. The method of claim 6, wherein the DCI format further includes an indication information, and the indication information is associated with the HARQ-ACK information among a plurality of HARQ-ACK information in slot #(n−k).

8. The method of claim 6, wherein the HARQ-ACK information associated with slot #(n−k) is HARQ-ACK information with a lower priority among a plurality of HARQ-ACK information in slot #(n−k).

9. The method of claim 6, wherein the DCI format further includes a PUCCH indicator, and the PUCCH is indicated by using a value of the PUCCH indicator among a plurality of PUCCH candidates.

10. The method of claim 6, wherein the DCI format does not schedule a PDSCH.

11. A base station (BS) for use in a wireless communication system, the BS comprising:
- a processor; and
- a communication module,
- wherein the processor is configured to:
  - transmit a downlink control information (DCI) format in a slot #n, wherein the DCI format requests uplink control information (UCI) re-transmission and includes:
    - a modulation and coding scheme (MCS) field, and
    - a physical downlink shared channel-to-hybrid automatic repeat request (PDSCH-to-HARQ) feedback timing indicator field; and
  - receive HARQ-acknowledgement (HARQ-ACK) information in-associated with a slot #(n−k) via a physical uplink control channel (PUCCH) in a slot #(n+p),
- wherein the k is determined based on a value of the MCS field, and
- wherein the slot #(n+p) is after the slot #(n−k), and the p is determined based on a value of the PDSCH-to-HARQ feedback timing indicator field.

12. The BS of claim 11, wherein the DCI format further includes an indication information, and the indication information is associated with the HARQ-ACK information among a plurality of HARQ-ACK information in slot #(n−k).

13. The BS of claim 11, wherein the HARQ-ACK information in associated with slot #(n−k) is HARQ-ACK information with a lower priority among a plurality of HARQ-ACK information in slot #(n−k).

14. The BS of claim 11, wherein the DCI format further includes a PUCCH indicator, and the PUCCH is indicated by using a value of the PUCCH indicator among a plurality of PUCCH candidates.

15. The BS of claim 11, wherein the DCI format does not schedule a PDSCH.

16. A method for use by a base station (BS) in a wireless communication system, the method comprising:
- transmitting a downlink control information (DCI) format in a slot #n, wherein the DCI format requests uplink control information (UCI) re-transmission and includes:
  - a modulation and coding scheme (MCS) field, and
  - a physical downlink shared channel-to-hybrid automatic repeat request (PDSCH-to-HARQ) feedback timing indicator field; and
- receiving HARQ-acknowledgement (HARQ-ACK) information in-associated with a slot #(n−k) via a physical uplink control channel (PUCCH) in a slot #(n+p),
- wherein the k is determined based on a value of the MCS field, and
- wherein the slot #(n+p) is after the slot #(n−k), and the p is determined based on a value of the PDSCH-to-HARQ feedback timing indicator field.

17. The method of claim 16, wherein the DCI format further includes an indication information, and the indication information is associated with the HARQ-ACK information among a plurality of HARQ-ACK information in slot #(n−k).

18. The method of claim 16, wherein the HARQ-ACK information associated with slot #(n−k) is HARQ-ACK information with a lower priority among a plurality of HARQ-ACK information in slot #(n−k).

19. The method of claim 16, wherein the DCI format further includes a PUCCH indicator, and the PUCCH is indicated by using a value of the PUCCH indicator among a plurality of PUCCH candidates.

20. The UE-method of claim 16, wherein the DCI format does not schedule a PDSCH.

* * * * *

UNITED STATES PATENT AND TRADEMARK OFFICE
CERTIFICATE OF CORRECTION

PATENT NO. : 12,323,987 B2
APPLICATION NO. : 18/510649
DATED : June 3, 2025
INVENTOR(S) : Kyungjun Choi et al.

Page 1 of 1

It is certified that error appears in the above-identified patent and that said Letters Patent is hereby corrected as shown below:

In the Claims

In Claim 1, Column 108, Line 47, "in-associated" should be changed to "associated".
In Claim 3, Column 108, Line 59, "in" should be deleted.
In Claim 6, Column 109, Line 12, "in-associated" should be changed to "associated".
In Claim 11, Column 109, Line 49, "in-associated" should be changed to "associated".
In Claim 13, Column 110, Line 10, "in" should be deleted.
In Claim 16, Column 110, Line 30, "in-associated" should be changed to "associated".

Signed and Sealed this
Fifth Day of August, 2025

Coke Morgan Stewart
*Acting Director of the United States Patent and Trademark Office*